US012096784B2

(12) United States Patent
Mahadevan et al.

(10) Patent No.: US 12,096,784 B2
(45) Date of Patent: Sep. 24, 2024

(54) PROTEIN COMPOSITIONS AND CONSUMABLE PRODUCTS THEREOF

(71) Applicant: Clara Foods Co., Daly City, CA (US)

(72) Inventors: Kritika Mahadevan, Daly City, CA (US); Joel Andrew Kreps, Daly City, CA (US); Isha Joshi, Daly City, CA (US); Farnoosh Ayoughi, Daly City, CA (US); Weixi Zhong, Daly City, CA (US); Harshal Kshirsagar, Daly City, CA (US); Alexandre Chapeaux, Daly City, CA (US); Wesley Rutherford-Jenkins, Daly City, CA (US); Ranjan Patnaik, Daly City, CA (US); Frank Douglas Ivey, Daly City, CA (US); Eric Lin, Daly City, CA (US); Sridharan Govind, Daly City, CA (US)

(73) Assignee: Clara Foods Co., Daly City, CA (US)

( * ) Notice: Subject to any disclaimer, the term of this patent is extended or adjusted under 35 U.S.C. 154(b) by 0 days.

(21) Appl. No.: 18/614,611

(22) Filed: Mar. 22, 2024

(65) Prior Publication Data

US 2024/0260636 A1 Aug. 8, 2024

Related U.S. Application Data

(63) Continuation-in-part of application No. 18/473,146, filed on Sep. 22, 2023, now Pat. No. 11,974,592, which is a continuation of application No. 17/493,067, filed on Oct. 4, 2021, now Pat. No. 11,800,887, which is a continuation of application No. 16/986,016, filed on Aug. 5, 2020, now Pat. No. 11,160,299, which is a continuation of application No. PCT/US2020/041720, filed on Jul. 10, 2020, application No. 18/614,611 is a continuation-in-part of application No. 18/045,425, filed on Oct. 10, 2022, which is a continuation of application No. 17/508,064, filed on Oct. 22, 2021, which is a continuation of application No. PCT/US2020/047076, filed on Aug. 19, 2020.

(60) Provisional application No. 62/873,159, filed on Jul. 11, 2019, provisional application No. 62/873,154, filed on Jul. 11, 2019, provisional application No. 62/888,674, filed on Aug. 19, 2019.

(51) Int. Cl.
*A23L 33/18* (2016.01)
*A23J 1/18* (2006.01)

(52) U.S. Cl.
CPC ................ *A23L 33/18* (2016.08); *A23J 1/18* (2013.01)

(58) Field of Classification Search
CPC .................................. A23L 33/18; A23J 1/18
USPC ......................................................... 426/590
See application file for complete search history.

(56) References Cited

U.S. PATENT DOCUMENTS

| | | | |
|---|---|---|---|
| 897,192 | A | 8/1908 | Cahill |
| 3,251,697 | A | 5/1966 | Lineweaver et al. |
| 3,806,608 | A | 4/1974 | Perret |
| 4,355,022 | A | 10/1982 | Rabussay |
| 4,430,428 | A | 2/1984 | Fraser et al. |
| 4,675,201 | A | 6/1987 | Lee et al. |
| 4,810,508 | A | 3/1989 | Dell'Acqua et al. |
| 4,880,643 | A | 11/1989 | Bamforth et al. |
| 5,019,411 | A | 5/1991 | Johnson et al. |
| 5,149,521 | A | 9/1992 | Hirose et al. |
| 5,283,236 | A | 2/1994 | Chiou |
| 5,336,609 | A | 8/1994 | Oberto et al. |
| 5,514,408 | A | 5/1996 | Lan et al. |
| 5,643,792 | A | 7/1997 | Okabayashi et al. |
| 5,849,477 | A | 12/1998 | O'Malley et al. |
| 6,204,012 | B1 | 3/2001 | Hellmuth et al. |
| 6,316,034 | B1 | 11/2001 | Daeschel et al. |
| 6,465,254 | B1 | 10/2002 | Saito et al. |
| 6,495,344 | B1 | 12/2002 | Carr et al. |
| 6,645,739 | B2 | 11/2003 | Clark |
| 6,699,691 | B2 | 3/2004 | Inan et al. |
| 6,730,499 | B1 | 5/2004 | Cregg |
| 6,803,225 | B2 | 10/2004 | Contreras et al. |
| 6,875,588 | B2 | 4/2005 | Harvey et al. |
| 6,933,146 | B2 | 8/2005 | Helliwell et al. |
| 6,994,876 | B1 | 2/2006 | Sher et al. |
| 7,029,872 | B2 | 4/2006 | Gerngross |
| 7,037,895 | B2 | 5/2006 | Assaly et al. |
| 7,078,488 | B2 | 7/2006 | Jiang |
| 7,205,018 | B2 | 4/2007 | Sherwood et al. |
| 7,252,933 | B2 | 8/2007 | Contreras et al. |
| 7,294,507 | B2 | 11/2007 | Harvey et al. |
| 7,326,681 | B2 | 2/2008 | Gerngross |
| 7,335,761 | B2 | 2/2008 | Harvey et al. |
| 7,345,150 | B2 | 3/2008 | Assaly et al. |

(Continued)

FOREIGN PATENT DOCUMENTS

| | | | |
|---|---|---|---|
| AU | 2005264767 | A1 | 1/2006 |
| AU | 2015307328 | B2 | 8/2019 |

(Continued)

OTHER PUBLICATIONS

Takahashi, N. et al. Production of chicken ovalbumin in *Escherichia coli*. Gene, 161 :211-216 (Year: 1995).*

(Continued)

*Primary Examiner* — Hamid R Badr
(74) *Attorney, Agent, or Firm* — Fenwick & West LLP

(57) ABSTRACT

Provided herein are compositions with enhanced protein content, proteins with high solubility, protein combinations and methods for the preparation thereof.

30 Claims, 30 Drawing Sheets

Specification includes a Sequence Listing.

(56) References Cited

U.S. PATENT DOCUMENTS 7,348,312 B2 3/2008 Assaly et al.
7,507,573 B2 3/2009 Contreras et al.
7,595,186 B2 9/2009 Gerdes et al.
7,598,055 B2 10/2009 Bobrowicz et al.
7,629,163 B2 12/2009 Gerngross
7,745,200 B2 6/2010 Cregg
7,794,770 B2 9/2010 Sherwood et al.
7,799,363 B2 9/2010 Sherwood et al.
7,842,326 B2 11/2010 Sherwood et al.
7,862,826 B2 1/2011 Murphy et al.
7,884,068 B2 2/2011 Assaly et al.
7,897,192 B2 3/2011 Sherwood et al.
7,906,160 B2 3/2011 Sherwood et al.
7,923,430 B2 4/2011 Gerngross
7,923,431 B2 4/2011 Wolff
7,972,809 B2 7/2011 Kobayashi et al.
8,058,053 B2 11/2011 Contreras et al.
8,067,551 B2 11/2011 Gerngross et al.
8,075,919 B2 12/2011 Brown et al.
8,211,691 B2 7/2012 Gerngross
8,222,032 B2 7/2012 Parker et al.
8,227,207 B2 7/2012 Miguel Castro et al.
8,227,436 B2 7/2012 McMillan et al.
8,354,268 B2 1/2013 Contreras et al.
8,445,227 B2 5/2013 Bobrowicz et al.
8,546,136 B2 10/2013 Serber et al.
8,642,017 B2 2/2014 Wagstaff
8,663,971 B2 3/2014 Contreras et al.
8,697,394 B2 4/2014 Bobrowicz et al.
8,753,698 B2 6/2014 Van Amerongen et al.
8,778,659 B2 7/2014 Govindappa et al.
8,809,259 B2 8/2014 Berry et al.
8,815,580 B2 8/2014 Callewaert et al.
8,822,412 B2 9/2014 Berry et al.
8,877,462 B2 11/2014 Gerngross et al.
8,883,445 B2 11/2014 Contreras et al.
8,883,483 B2 11/2014 Gerngross et al.
8,932,825 B2 1/2015 Wildt et al.
8,986,773 B2 3/2015 Beckhoven Van et al.
9,012,175 B2 4/2015 Hartner et al.
9,206,454 B2 12/2015 Weis et al.
9,220,292 B2 12/2015 Jenkins
9,279,129 B2 3/2016 Hartner et al.
9,359,628 B2 6/2016 Contreras et al.
9,598,474 B2 3/2017 Berry et al.
9,605,040 B2 3/2017 Von Maltzahn et al.
9,611,298 B2 4/2017 Berry et al.
9,617,550 B2 4/2017 Gehlsen et al.
9,689,016 B2 6/2017 Marcel et al.
9,700,071 B2 7/2017 Silver et al.
9,757,328 B2 9/2017 Ferrari et al.
9,821,249 B2 11/2017 Oroskar et al.
10,323,237 B2 6/2019 Chen et al.
10,857,483 B2 12/2020 Oroskar et al.
10,927,360 B1 2/2021 Redfearn et al.
11,142,754 B2 10/2021 Redfearn et al.
11,160,299 B2 11/2021 Mahadevan et al.
11,279,748 B2 3/2022 Anchel
11,518,797 B2 12/2022 Anchel
11,649,445 B2 5/2023 Redfearn et al.
2001/0033884 A1 10/2001 Yamada et al.
2002/0098198 A1 7/2002 Watts et al.
2003/0069395 A1 4/2003 Sato et al.
2004/0142906 A1 7/2004 Wang
2004/0166230 A1 8/2004 Bodor et al.
2004/0231010 A1 11/2004 Murray et al.
2005/0026264 A1 2/2005 Jiang
2005/0090001 A1 4/2005 Parker et al.
2005/0202149 A1 9/2005 McClements et al.
2005/0266140 A1 12/2005 Kastenmayer et al.
2006/0228769 A1 10/2006 Yano et al.
2006/0280804 A1 12/2006 Castro et al.
2006/0280840 A1 12/2006 Robertson
2007/0065555 A1 3/2007 Soane et al.
2007/0141139 A1 6/2007 Vandenberg
2007/0231448 A1 10/2007 Takahashi
2008/0166447 A1 7/2008 Strohbehn et al.
2008/0214485 A1 9/2008 McMillan et al.
2008/0260913 A1 10/2008 Orcutt et al.
2009/0029005 A1 1/2009 Van Amerongen et al.
2009/0042249 A1 2/2009 Lubys
2009/0155443 A1 6/2009 De Jongh et al.
2009/0178147 A1 7/2009 Harvey
2009/0191157 A1 7/2009 Albrecht et al.
2009/0263863 A1 10/2009 Contreras et al.
2009/0290005 A1 11/2009 Wanibe et al.
2011/0020811 A1 1/2011 Crowell
2012/0093994 A1 4/2012 Hsieh et al.
2012/0148585 A1 6/2012 Saxon
2013/0084361 A1 4/2013 Shepheard
2014/0099412 A1 4/2014 Ward et al.
2014/0170268 A1 6/2014 Graeber et al.
2014/0345004 A1 11/2014 Callewaert et al.
2014/0356507 A1 12/2014 Tetrick et al.
2014/0369996 A1 12/2014 Ommundsen et al.
2015/0152427 A1 6/2015 Wildt et al.
2015/0191607 A1 7/2015 McDaniel
2015/0284693 A1 10/2015 Nagaoka
2015/0305368 A1 10/2015 Dake et al.
2015/0307562 A1 10/2015 Basu et al.
2016/0024511 A1 1/2016 Tolstorukov et al.
2016/0038428 A1 2/2016 Harel et al.
2016/0039911 A1 2/2016 Lesnicki et al.
2016/0051593 A1 2/2016 Raff
2016/0068880 A1 3/2016 Gerngross
2016/0083722 A1 3/2016 Young et al.
2016/0106137 A1 4/2016 Jenkins
2016/0106701 A1 4/2016 Okada et al.
2016/0183567 A1 6/2016 Choi et al.
2017/0029827 A1 2/2017 Gasser et al.
2017/0037418 A1 2/2017 Mattanovich et al.
2017/0159094 A1 6/2017 Natunen et al.
2017/0253639 A1 9/2017 Berry et al.
2018/0084814 A1 3/2018 Challakere
2018/0355020 A1 12/2018 Anchel
2019/0144887 A1 5/2019 George et al.
2020/0109175 A1 4/2020 Berry et al.
2020/0138066 A1 5/2020 Anchel
2020/0306342 A1 10/2020 Hamill et al.
2020/0345020 A1 11/2020 De La Fuente Melida et al.
2020/0405807 A1 12/2020 Williams et al.
2021/0007384 A1 1/2021 Mahadevan et al.
2021/0169109 A1 6/2021 Challakere
2021/0189369 A1 6/2021 Redfearn et al.
2021/0337816 A1 11/2021 Johnson et al.
2021/0337826 A1 11/2021 Ivey et al.
2022/0039443 A1 2/2022 Mahadevan et al.
2022/0064619 A1 3/2022 Redfearn et al.
2022/0117285 A1 4/2022 Mahadevan et al.
2023/0086338 A1 3/2023 Mahadevan et al.
2023/0135484 A1 5/2023 Anchel
2023/0189857 A1 6/2023 Mahadevan et al.
2023/0329294 A1 10/2023 Mahadevan et al.

FOREIGN PATENT DOCUMENTS

CA 2574558 A1 1/2006
CN 1214729 C 8/2005
CN 1746302 A 3/2006
CN 1332025 C 8/2007
CN 101022737 A 8/2007
CN 101353630 A 1/2009
CN 101623111 A 1/2010
CN 101496575 B 10/2010
CN 101496579 8 10/2010
CN 102076221 A 5/2011
CN 102429307 A 5/2012
CN 102308940 B 8/2012
CN 102978268 A 3/2013
CN 102630865 B 5/2013
CN 102008076 B 7/2013
CN 103445263 A 12/2013
CN 103937830 A 7/2014
CN 104172168 A 12/2014

(56) References Cited

FOREIGN PATENT DOCUMENTS

| | | | |
|---|---|---|---|
| CN | 104172186 | A | 12/2014 |
| CN | 104187634 | A | 12/2014 |
| CN | 104187666 | A | 12/2014 |
| CN | 104256633 | A | 1/2015 |
| CN | 104256648 | A | 1/2015 |
| CN | 104431285 | A | 3/2015 |
| CN | 104694560 | A | 6/2015 |
| CN | 104738624 | A | 7/2015 |
| CN | 104824674 | A | 8/2015 |
| CN | 104855977 | A | 8/2015 |
| CN | 104957356 | A | 10/2015 |
| CN | 104961823 | A | 10/2015 |
| CN | 105012941 | A | 11/2015 |
| CN | 105039189 | A | 11/2015 |
| CN | 103182074 | B | 3/2016 |
| CN | 104146248 | B | 6/2016 |
| CN | 105876440 | A | 8/2016 |
| CN | 106173829 | A | 12/2016 |
| CN | 106259946 | A | 1/2017 |
| CN | 107083373 | A | 8/2017 |
| CN | 108652017 | A | 10/2018 |
| EP | 265884 | B1 | 12/1992 |
| EP | 549230 | A2 | 6/1993 |
| EP | 1156719 | B1 | 5/2003 |
| EP | 1278511 | B1 | 8/2004 |
| EP | 1119264 | B1 | 3/2005 |
| EP | 1297172 | B1 | 11/2005 |
| EP | 1655308 | A1 | 5/2006 |
| EP | 1211310 | B1 | 12/2006 |
| EP | 1294910 | B1 | 11/2008 |
| EP | 1522590 | B1 | 8/2009 |
| EP | 2376349 | B1 | 10/2012 |
| EP | 2001312 | B1 | 5/2014 |
| EP | 2339013 | B1 | 7/2014 |
| EP | 2271222 | B1 | 2/2015 |
| EP | 2862933 | A2 | 4/2015 |
| EP | 2964775 | A1 | 1/2016 |
| EP | 3083966 | A1 | 10/2016 |
| EP | 1467615 | B2 | 3/2017 |
| EP | 3184642 | B1 | 5/2019 |
| ES | 2188336 | A1 | 6/2003 |
| ES | 2329316 | B1 | 10/2010 |
| FR | 2458585 | A1 | 1/1981 |
| GB | 1211361 | A | 11/1970 |
| GB | 2033905 | B | 10/1982 |
| JP | 2007-259805 | A | 10/2007 |
| JP | 2008-507270 | A | 3/2008 |
| JP | 5048487 | | 10/2012 |
| JP | 2014-171424 | A | 9/2014 |
| MX | 2016016695 | A | 6/2018 |
| WO | WO 2001/004328 | A1 | 1/2001 |
| WO | WO 2002/000856 | A2 | 1/2002 |
| WO | WO 2003/102187 | A1 | 12/2003 |
| WO | WO 2004/065593 | A1 | 8/2004 |
| WO | WO 2006/028497 | A2 | 3/2006 |
| WO | WO 2007/106731 | A2 | 9/2007 |
| WO | WO 2012/129036 | A2 | 9/2012 |
| WO | WO 2013/148330 | A1 | 10/2013 |
| WO | WO 2015/048339 | A2 | 4/2015 |
| WO | WO 2015/048342 | A2 | 4/2015 |
| WO | WO 2016/014900 | A2 | 1/2016 |
| WO | WO 2016/032346 | A1 | 3/2016 |
| WO | WO 2016/077457 | A1 | 5/2016 |
| WO | WO 2016/081645 | A1 | 5/2016 |
| WO | WO 2016/160655 | A1 | 10/2016 |
| WO | WO 2016/183056 | A1 | 11/2016 |
| WO | WO 2018/162557 | A2 | 9/2018 |
| WO | WO 2019/144044 | A1 | 7/2019 |
| WO | WO 2020/041483 | A1 | 2/2020 |
| WO | WO 2020/160187 | A2 | 8/2020 |
| WO | WO 2020/219595 | A1 | 10/2020 |
| WO | WO 2021/007565 | A1 | 1/2021 |
| WO | WO 2021/026510 | A1 | 2/2021 |
| WO | WO 2021/034980 | A1 | 2/2021 |
| WO | WO 2021/099655 | A1 | 5/2021 |
| WO | WO 2021/133852 | A1 | 7/2021 |
| WO | WO 2021/158817 | A1 | 8/2021 |
| WO | WO 2022/076615 | A1 | 4/2022 |
| WO | WO 2022/182799 | A1 | 9/2022 |
| WO | WO 2023/004153 | A1 | 1/2023 |

OTHER PUBLICATIONS

Abeyrathne et al. Egg white proteins and their potential use in food processing or as nutraceutical and pharmaceutical agents—A review. Poultry Science 92:3292-3299 (2013).

Ahmad et al. Protein expression in Pichia pastoris: recent achievements and perspectives for heterologous protein production. Appl Microbiol Biotechnol (2014) 98:5301-5317. Published online Apr. 18, 2014.

Alleoni et al. Albumen foam stability and s-ovalbumin contents in eggs coated with whey protein concentrate. Brazilian Journal of Poultry Science, vol. 6, No. 2, pp. 105-110 (Apr.-Jun. 2004).

Alleoni et al. Albumen Protein and Functional Properties of Gelation and Foaming. Sci. Agric. (Piracicaba, Braz.), v.63, n.3, p. 291-298, May/Jun. 2006.

Ambort et al., Perspectives on Mucus Properties and Formation—Lessons from the Biochemical World, Cold Spring Harb Perspect Med; 2:a014159 (9 pages) (2012).

Anumula et al., A comprehensive procedure for preparation of partially methylated alditol acetates from glycoprotein carbohydrates, Anal Biochem., 203(1): 101-108 (1992).

AOAC Official Method 925.09. Solids (Total) and Moisture in Flour, Vacuum Oven Method. Final Action. JAOAC 8, 665(1925); 9, 39, 88(1926); 34, 278(1951). In Official Methods of Analysis of AOAC International, 16th Edition, vol. 2 (Copyright 1995, 1996, 1997, 1998, 1999).

AOAC Official Method 997.02. Yeast and Mold Counts in Foods, Dry Rehydratable Film Method (Petrifilm Method). First Action 1997, Final Action 2000. J AOAC Int 80, 806 (1997). Revised Mar. 2002. AOAC International. One page.

Arakawa et al. Endo-β-N-acetylglucosaminidases Acting on the Carbohydrate Moieties of Glycoproteins the Differential Specificities of the Enzymes from Streptomyces griseus and Diplococcus pneumoniae. J Biochem, 76, 307-317 (1974).

Arii et al. Structural properties of recombinant ovalbumin and its transformation into a thermostabilized form by alkaline treatment. Biosci Biotechnol Biochem. Aug. 1999;63(8):1392-9.doi: 10.1271/bbb.63.1392.

Arntfield et al. Characteristics of heat-induced networks for mixtures of ovalbumin and lysozyme. J Agric. Food Chem 41:2291-2295 (1993).

Aw et al. Can too many copies spoil the broth? Microb Cell Fact. 2013; 12: 128.Published online Dec. 20, 2013. doi: 10.1186/1475-2859-12-128. 9 pages.

Babu. Modulation of Allergic Immune Responses by Engineered Recombinant Ovomucoid Third Domain and Potential Use for Immunotherapy. A Thesis Presented to The Faculty of Graduate Studies of The University of Guelph (Jan. 2006). 162 pages.

Bagger et al. Hydration of a glycoprotein: relative water affinity of peptide and glycan moieties. Eur Biophys J. Apr. 2006;35(4):367-71. doi: 10.1007/s00249-005-0035-5. Epub Dec. 8, 2005.

Betancur et al. Multicopy plasmid integration in Komagataella phaffii mediated by a defective auxotrophic marker. Microb Cell Fact (2017) 16:99. 11 pages.

Buell et al. Isolation of recombinant plasmids bearing cDNA to hen ovomucoid and lysozyme mRNAs. J Biol Chem 254(18): 9277-9283 (Sep. 25, 1979).

Callewaert et al., Use of HDEL-tagged Trichoderma reesei mannosyl oligosaccharide 1,2-α-D-mannosidase for N-glycan engineering in Pichia pastoris, FEBS Letters, 503:173-178 (2001).

Catterall et al. Primary sequence of ovomucoid messenger RNA as determined from cloned complementary DNA. J Cell Biol 87(2 Pt 1):480-7 (Nov. 1980).

Cereghino et al. (2000) "Heterologous protein expression in the methylotrophic yeast Pichia pastoris," FEMS Microbiol Review. 24(1 ):45-66.

(56) References Cited

OTHER PUBLICATIONS

Charoenrat et al. Oxygen-limited fed-batch process: an alternative control for Pichia pastoris recombinant protein processes. Bioprocess Biosyst Eng. Oct. 2005;27(6):399-406. doi: 10.1007/s00449-005-0005-4. Epub Nov. 3, 2005.
Co-pending U.S. Appl. No. 17/147,109, inventors Redfearn; Halle et al., filed Jan. 12, 2021.
Correction to Wang et al. High-level expression of endo-β-N-acetylglucosaminidase H from Streptomyces plicatus in Pichia pastoris and its application for the deglycosylation of glycoproteins. PLOS One. Mar. 17. 2015;10(3):e0120458. doi: 10.1371/journal.pone.0120458. eCollection 2015.
CRE-LOX recombination, Wikipedia, downloaded Jun. 12, 2017.
Damasceno et al. An optimized fermentation process for high-level production of a single-chain Fv antibody fragment in Pichia pastoris. Protein Expr Purif. Sep. 2004;37(1):18-26. doi: 10.1016/j.pep.2004.03.019.
Demain et al. Production of recombinant proteins by microbes and higher organisms. Biotechnology Advances, 27 (2009) 297-306. Available online Jan. 31, 2009.
Digan et al. Continuous Production of a Novel Lysozyme via Secretion from the Yeast, Pichia pastoris. Bio/Technology 7:160-164(1989).
Duan et al. Effect of oxidative modification on structural and foaming properties of egg white protein. Food Hydrocolloids, vol. 75, pp. 223-228, (Feb. 2018). Available online Aug. 13, 2017.
Elena et al. Pichia pastoris engineering for the production of a modified phospholipase C. Process Biochemistry 51 (2016) 1935-1944. Available online Aug. 17, 2016.
Endo H/Endo Hf Protocol, New England BioLabs (Oct. 18, 2012). Retrieved Jun. 7, 2021 from URL: https://www.neb.com/protocols/2012/10/18/endo-hf-protocol . One page.
EP15858729.5 Extended European Report dated Aug. 13, 2018.
EP15858729.5 Partial Supplementary European Search Report dated May 11, 2018.
EP19852293.0 Extended European Search Report dated Jul. 1, 2022.
Fredericq et al. Studies on Ovomucoid. J Biol Chem 181:499-510 (1949).
Froning, Glenn W. Chapter 8: Egg Products Industry and Future Perspectives. In Egg Bioscience and Biotechnology, pp. 307-325, Mine, Ed., John Wiley & Sons, Inc. (2008).
Gemmill et al. Overview of N- and O-linked oligosaccharide structures found in various yeast species. Biochimica et Biophysica Acta 1426:227-237 (1999).
GenBank Accession No. EGR49218. Version No. EGR49218.1. glycoside hydrolase family 79 [Trichoderma reesei QM6a] (Jul. 25, 2016). Retrieved Dec. 9, 2019 at the world wide web ncbi.nlm.nih.gov/protein/EGR49218.1. 2 pages.
Goda et al. Effect of extra N-terminal residues on the stability and folding of human lysozyme expressed in Pichia pastoris. Protein Eng. Apr. 2000;13(4):299-307. doi: 10.1093/protein/13.4.299.
Guerfal et al. The HAC1 gene from Pichia pastoris: characterization and effect of its overexpression on the production of secreted, surface displayed and membrane proteins. Microbial Cell Factories 2010, 9:49. 12 pages.
Harvey et al. Composition of N-Linked Carbohydrates from Ovalbumin and Co-purified Glycoproteins. J Am Soc Mass Spectrom 11, 564-571 (2000).
Hilmenyuk et al. Effects of glycation of the model food allergen ovalbumin on antigen uptake and presentation by human dendritic cells. Immunology, 129, 437-445 (2009).
Hu. Biochemical Profile-Based Computational Inference of Protein Complexes. Dissertation. Department of Molecular Genetics, University of Toronto (2020). Retrieved Sep. 23, 2022 at URL: https://tspace.library.utoronto.ca/bitstream/1807/101314/3/Hu_Zhongming_%20_202006_PhD_thesis.pdf . 142 pages.
Huang et al. Estimation of egg freshness using S-ovalbumin as an indicator. 2012 Poultry Science 91 :739-743.
Huang et al. Regulating unfolded protein response activator HAC1p for production of thermostable raw-starch hydrolyzing a-amylasein Pichia pastoris. Bioprocess Biosyst Eng (2017) 40:341-350. Published online Oct. 28, 2016.
Hughey et al. Antimicrobial activity of lysozyme against bacteria involved in food spoilage and food-borne disease. Appl Environ Microbiol 53(9):2165-70 (Sep. 1987).
Huntington et al. Structure and properties of ovalbumin. Journal of Chromatography B, 756 (2001) 189-198.
Hynes et al. mRNA complexity and egg white protein mRNA content in mature and hormone-withdrawn oviduct. Cell 11:923-932 (Aug. 1977).
International Search Report and Written Opinion dated Feb. 1, 2016 for International Application No. PCT/US2015/060147.
Ioannou et al. Human alpha-galactosidase A: glycosylation site 3 is essential for enzyme solubility. Biochem J. Jun. 15, 1998; 332(Pt 3): 789-797. doi: 10.1042/bj3320789.
Jacobs et al. Engineering complex-type N-glycosylation in Pichia pastoris using GlycoSwitch technology. Nature Protocols, vol. 4, pp. 58-70 (2009). Published online Dec. 18, 2008.
Jensen. The Basics of Western Blotting. Anat Rec (Hoboken) Mar. 2012;295(3):369-71.doi: 10.1002/ar.22424. Epub Feb. 3, 2012.
Johnson et al. Gelation Properties of Albumen Proteins, Singly and in Combination. Poultry Science 60:2071-2083 (1981).
Julshamin et al. Determination of Arsenic, Cadmium, Mercury, and Lead by Inductively Coupled Plasma/Mass Spectrometry in Foods after Pressure Digestion: NMKL Interlaboratory Study. Journal of AOAC International 90(3):844-856 (2007).
Kallas et al. Enzymatic properties of native and deglycosylated hybrid aspen (Populus tremula x tremuloides) xyloglucan endotransglycosylase 16A expressed in Pichia pastoris. Biochem J. Aug. 15, 2005; 390(Pt 1): 105-113. Published online Aug. 9, 2005. Prepublished online Apr. 1, 2005. doi: 10.1042/BJ20041749.
Karpusas et al. The structure of human interferon-beta: implications for activity. Cell Mol Life Sci. Nov. 1998;54(11):1203-16. doi: 10.1007/s000180050248.
Kato et al. Characterization of a highly glycosylated biosynthetic intermediate of ovalbumin. Archives of Biochemistry and Biophysics, vol. 244, No. 2, pp. 408-412 (Feb. 1, 1986).
Kato et al. Chicken ovomucoid: determination of its amino acid sequence, determination of the trypsin reactive site, and preparation of all three of its domains. Biochemistry 26(1):193-201 (Jan. 13, 1987).
Kato et al. Purification and Characterization of Two Biosynthetic Intermediates of Ovalbumin. The Journal of Biochemistry, vol. 95, Issue 2, pp. 455-463 (1984).
KOBOTA. Exo- and endoglycosidases revisited. Proc. Jpn. Acad., Ser. B 89, No. 3, pp. 97-117 (2013).
Krainer et al. Biotechnological advances towards an enhanced peroxidase production in Pichia pastoris. Journal of Biotechnology 233:181-189 (2016).
Lai et al. Molecular structure and flanking nucleotide sequences of the natural chicken ovomucoid gene. Cell 18:829-842 (1979).
Lin et al. Synthesis, Purification, and Active Site Mutagenesis of Recombinant Porcine Pepsinogen. The Journal of Biological Chemistry 264(8):4482-4489 (Mar. 15, 1989).
Lindenmaier et al. Isolation and characterization of the chicken ovomucoid gene. Nucleic Acids Res 7(5): 1221-32 (Nov. 10, 1979).
Liu et al. Improved antioxidant activity and physicochemical properties of curcumin by adding ovalbumin and its structural characterization. Food Hydrocolloids 72:304-311 (2017). Available online Jun. 9, 2017.
Lv et al. Structural and Functional Properties of Ovalbumin Glycated by Dry-Heating in the Presence of Maltodextrin. International Journal of Food Properties, 18:1326-1333, 2015. DOI: 10.1080/10942912.2011.620204. Published online Mar. 3, 2015.
Lysozyme, Egg White (product sheet), Gold Biotechnology (2021). Downloaded Jan. 18, 2021. One page.
Mainwaring et al. Effect of pH on hen egg white lysozyme production and evolution of a recombinant strain of Aspergillus niger. Journal of Biotechnology 75(1):1-10 (Sep. 24, 1999). DOI: 10.1016/S0168-1656(99)00123-6.

(56) References Cited

OTHER PUBLICATIONS

Malik et al. A novel fusion protein system for the production of native human pepsinogen in the bacterial periplasm. Protein Expr Purif. Jun. 2006;47(2): 662-71.doi: 10.1016/j.pep.2006.02.018. Epub Mar. 20, 2006.
Martinet et al. Modification of the protein glycosylation pathway in the methylotrophic yeast Pichia pastoris. Biotechnology Letters 20(12):1171-1177 (Dec. 1998).
Martinez et al. Genome sequencing and analysis of the biomass-degrading fungus Trichoderma reesei (syn. Hypocrea jecorina). Nat Biotechnol 26(5):553-60 (May 2008). Epub May 4, 2008. doi: 10.1038/nbt1 403.
Martinez, D. et al. GenBank Accession No. EGR49218. Version No. EGR49218.1. glycoside hydrolase family 79 [Trichoderma reesei QM6a] (Jul. 25, 2016). Retrieved Dec. 9, 2019 at URL: https://www.ncbi.nlm.nih.gov/protein/EGR49218.1. 2 pages.
Masuda et al. High yield secretion of the sweet-tasting protein lysozyme from the yeast Pichia pastoris. Protein Expression and Purification 39:35-42 (Nov. 2, 2004).
Mine et al. Reduction of antigenicity and allergenicity of genetically modified egg white allergen, ovomucoid third domain. Biochemical and Biophysical Research Communications 302:133-137 (2003).
Mizutani et al., Structural and Functional Characterization of Ovotransferrin Produced by Pichia pastoris, Biosci. Biotechnol. Biochem., 68(2): 376-383 (2004).
Muñoz et al. Cloning of the authentic bovine gene encoding pepsinogen a and its expression in microbial cells. Appl Environ Microbiol. May 2004;70(5):2588-95.doi: 10.1128/aem.70.5.2588-2595.2004.
Nakayama et al., Substrate specificity of a-1,6-mannosyltransferase that initiates N-linked mannose outer chain elongation in *Saccharomyces cerevisiae*, FEBS Letters, 412(3): 547-550 (1997).
Nilsson et al., Intestinal MUC2 mucin supramolecular topology by packing and release resting on D3 domain assembly, J Mol Biol., 426(14): 2567-2579 (2014).
Nisbet et al. The Complete Amino-Acid Sequence of Hen Ovalbumin. European Journal of Biochemistry, vol. 115, pp. 335-345 (1981).
Ovalbumin, Uptima. Interchim, France. Retrieved Nov. 12, 2020 at URL: http://www.interchim.fr/ft/R/R5851B.pdf. Published on Apr. 8, 2009 as per Google Search results. 2 pages.
Palmieri et al. [Topical treatment of some dystrophic and inflammatory lesions of the skin and soft tissues.] Archivio per le Scienze Mediche, Oct.-Dec. 1977, 134(4):481-485.
Partow et al. Characterization of different promoters for designing a new expression vector in Saccharomyces cerevisiae. Yeast 27:955-964 (2010). Published online Jul. 12, 2010. DOI: 10.1002/yea.1806.
PCT/US2015/060147 International Search Report and Written Opinion dated Feb. 1, 2016.
PCT/US2019/047521 International Search Report and Written Opinion dated Jan. 2, 2020.
PCT/US2020/041720 International Search Report and Written Opinion dated Oct. 8, 2020.
PCT/US2020/045519 International Search Report and Written Opinion dated Oct. 28, 2020.
PCT/US2020/047076 International Search Report and Written Opinion dated Oct. 20, 2020.
PCT/US2020/066729 International Search Report and Written Opinion dated Mar. 3, 2021.
PCT/US2021/016658 International Search Report and Written Opinion of the Searching Authority dated May 3, 2021.
PCT/US2021/053850 International Search Report and Written Opinion dated Nov. 30, 2021.
PCT/US2021/065692 International Search Report and Written Opinion dated Mar. 9, 2022.
PCT/US2021/065703 International Search Report and Written Opinion dated Mar. 9, 2022.
PCT/US2022/017580 International Search Report and Written Opinion dated May 20, 2022.
PCT/US2022/030288 International Search Report and Written Opinion dated Aug. 17, 2022.
PCT/US2022/082303 International Search Report and Written Opinion dated Apr. 19, 2023.
Pelegrine et al. Whey proteins solubility as function of temperature and pH. Lebensm.-Wiss. u-Technol. 38: 77-80 (2005).
Pepsin Activity, Food Chemicals Codex, 11th ed, Pharmacopeial Convention, pp. 1386-1387 (2018). Retrieved Jun. 9, 2020 at URL: https://app.knovel.com/web/view/khtml/print.v/rcid:kpFCCE0042/cid:kt011MEBGL/viewerType:khtml/?notes=off.
Pepsin. Sigma Aldrich Pepsin Product Sheet. Sigma Aldrich. Retrieved Aug. 24, 2020 from URL: https://www.sigmaaldrich.com/life-science/metabolomics/enzyme-explorer/analytical-enzymes/pepsin.html. 3 pages.
Peptide Solubility Guidelines. GenScript. 2 pages. Downloaded from GenScript website Dec. 10, 2020. Available on or before Dec. 10, 2020.
PNGase F Protocol, New England BioLabs (Jul. 31, 2014). Retrieved Jun. 7, 2021 at URL: https://www.neb.com/protocols/2014/07/31/pngase-f-protocol . 2 pages.
Proctor et al. The chemistry of lysozyme and its use as a food preservative and a pharmaceutical. Crit Rev Food Sci Nutr 26(4):359-95 (1988).
Puxbaum et al. Quo vadis? The challenges of recombinant protein folding and secretion in Pichia pastoris. Applied Microbiology and Biotechnology, vol. 99, pp. 2925-2938 (2015).
Raeker et al. Cake-Baking (High-Ratio White Layer) Properties of Egg White, Bovine Blood Plasma, and Their Protein Fractions. Cereal Chem 72(3):299-303 (1995).
Rajamanickam et al. A novel bi-directional promoter system allows tunable recombinant protein production in Pichia pastoris. Microb Cell Fact 16:152 (2017). 7 pages. DOI 10.1186/s12934-017-0768-8.
Ramat et al. Protein Purification Using Expanded Bed Chromatography. Master of Science in Chemical Engineering Thesis. Worcester Polytechnic Institute Chemical Engineering Department, Winter 2004. 46 pages.
Ramon et al. Sorbitol co-feeding reduces metabolic burden caused by the overexpression of a Rhizopus oryzae lipase in Pichia pastoris. J Biotechnol. May 31, 2007;130(1):39-46.doi: 10.1016/j.jbiotec.2007.02.025. Epub Mar. 3, 2007.
Rao et al. Crystal structure of endo-beta-N-acetylglucosaminidase H at 1.9 A resolution: active-site geometry and substrate recognition. Structure 3:449-457 (May 15, 1995).
Rao et al. Mutations of endo-beta-N-acetylglucosaminidase H active site residue Asp130 and Glu132: activities and conformations. Protein Sci. Nov. 1999; 8(11): 2338-2346. doi: 10.1110/ps.8.11.2338.
Robbins et al. Primary structure of the Streptomyces enzyme endo-beta-N-acetylglucosaminidase H. J Biol Chem. Jun. 25, 1984;259(12):7577-83.
Roth et al., Identification and Quantification of Protein Glycosylation, International Journal of Carbohydrate Chemistry, vol. 2012, Article ID 640923, 10 pages.
Rupa et al. Engineered recombinant ovomucoid third domain can modulate allergenic response in Balb/c mice model. Biochemical and Biophysical Research Communications 342:710-717 (2006).
Rupa et al. Genetically glycosylated ovomucoid third domain can modulate Immunoglobin E antibody production and cytokine response in BALB/c mice. Clinical and Experimental Allergy 37:918-928 (2007).
Rupa et al. Structural and immunological characterization of recombinant ovomucoid expressed in *Escherichia coli*. Biotechnology Letters 25:427-433 (2003).
Score report to Mcmillan et al per instant SEQ ID No. 1 (U.S. Pat. No. 8,227,436 issued Jul. 24, 2012 & published as 2008/0214485) (Year: 2012).
Score result for SEQ ID No. 3 for Berry et al (WO2015048339 & Silver et al WO2015048342 published Apr. 2, 2015) (Year: 2015).
Score result for SEQ ID No. 9 for Koentgen (WO2003102187-A1 published Dec. 11, 2003) (Year: 2003).
Sequence of ovomucoid—Designated BCC05658 (Year: 2012).
Shintani et al. Engineering of Porcine Pepsin: Alteration of S1 Substrate Specificity of Pepsin to Those of Fungal Aspartic Proteinases by Site-Directed Mutagenesis.J. Biol. Chem. 1997 272:18855-18861. doi:10.1074/jbc.272.30.18855.

(56) References Cited

OTHER PUBLICATIONS

Sturmberger et al. Refined Pichia pastoris reference genome sequence. J Biotechnol. Oct. 10, 2016; 235: 121-131.
Takao et al. Production of swine pepsinogen by protein-producing Bacillus brevis carrying swine pepsinogen cDNA. Appl Microbiol Biotechnol 30, 75-80 (1989). DOI: https://doi.org/10.1007/BF00256000.
Takegawa et al. Effect of deglycosylation of N-linked sugar chains on glucose oxidase from Aspergillus niger. Biochem Cell Biol. Aug. 1989;67(8):460-4. doi: 10.1139/089-072.
Tams et al. Adapting protein solubility by glycosylation. N-glycosylation mutants of Coprinus cinereus peroxidase in salt and organic solutions. Biochim Biophys Acta.Jul. 13, 1999;1432(2): 214-21.doi: 10.1016/s0167-4838(99)00103-x.
Tams, JW and Welinder, KG. Mild chemical deglycosylation of horseradish peroxidase yields a fully active, homogeneous enzyme. Anal Biochem. Jun. 10, 1995;228(1):48-55. doi: 10.1006/abio.1995.1313.
Teh et al., Expression and analysis of the glycosylation properties of recombinant human erythropoietin expressed in Pichia pastoris, Genetics and Molecular Biology, 34(3):464-470 (2011).
Thiex et al. Determination of Ash in Animal Feed: AOAC Official Method 942.05 Revisited. J Aoac Int Sep.-Oct. 2012;95(5):1392-7.
Towbin. Western Blotting. In Encyclopedia of Immunology Second Edition, P. J. Delves, ed., pp. 2503-2507 (1998). Elsevier Ltd.
Trimble et al. Asparaginyl glycopeptides with a low mannose content are hydrolyzed by endo-beta-N-acetylglucosaminidase H. Journal of Biological Chemistry, vol. 253, No. 13, pp. 4508-4511 (Jul. 10, 1978).
Trimble et al. Characterization of N- and O-linked glycosylation of recombinant human bile salt-stimulated lipase secreted by Pichia pastoris. Glycobiology, vol. 14, No. 3, pp. 265-274 (2004). Advance Access publication Dec. 23, 2003.
Trimble et al. Structure of oligosaccharides on Saccharomyces SUC2 invertase secreted by the methylotrophic yeast Pichia pastoris. The Journal of Biological Chemistry, vol. 266, No. 34, pp. 22807-22817 (1991).
U.S. Appl. No. 15/522,986 Notice of Allowance dated Jul. 21, 2022.
U.S. Appl. No. 15/522,986 Office Action dated Aug. 8, 2019.
U.S. Appl. No. 15/522,986 Office Action dated Jan. 25, 2019.
U.S. Appl. No. 15/522,986 Office Action dated Jan. 28, 2021.
U.S. Appl. No. 15/522,986 Office Action dated Nov. 12, 2021.
U.S. Appl. No. 16/701,022 First Action Interview Pilot Program Pre-Interview Communication dated Apr. 28, 2020.
U.S. Appl. No. 16/701,022 First Action Interview-Office Action dated Sep. 24, 2020.
U.S. Appl. No. 16/701,022 Notice of Allowance dated Nov. 8, 2021.
U.S. Appl. No. 16/701,022 Office Action dated Jul. 21, 2021.
U.S. Appl. No. 16/891,835 Notice of Allowance dated Dec. 31, 2020.
U.S. Appl. No. 16/891,835 Office Action dated Sep. 4, 2020.
U.S. Appl. No. 16/986,016 Notice of Allowance dated Sep. 17, 2021.
U.S. Appl. No. 16/986,016 Office Action dated Feb. 2, 2021.
U.S. Appl. No. 16/986,016 Office Action dated Sep. 24, 2020.
U.S. Appl. No. 17/190,173 Notice of Allowance dated Jul. 14, 2021.
U.S. Appl. No. 17/190,173 Notice of Allowance dated Jul. 8, 2021.
U.S. Appl. No. 17/508,064 Office Action dated Jan. 26, 2022.
U.S. Appl. No. 17/508,064 Office Action dated Mar. 9, 2023.
U.S. Appl. No. 17/508,064 Office Action dated May 20, 2022.
U.S. Appl. No. 18/057.134 Office Action dated Mar. 16, 2023.
USP, Pepsin Activity. Ninth Edition of the Food Chemicals Codex (FCC 9). United States Pharmacopeia Convention, Rockville, MD, 2015e, pp. 1410-1411. Retrieved Jun. 9, 2020 at URL: https://app.knovel.com/web/view/khtml/print.v/rcid:kpFCCE0021/cid:kt00U53N01/viewerType:khtml/?notes=off.
Verostek et al. Selective organic precipitation/extraction of released N-glycans following large-scale enzymatic deglycosylation of glycoproteins. Anal Biochem. Feb. 15, 2000;278(2):111-22. doi: 10.1006/abio.1999.4433.
Vervecken et al. In Vivo Synthesis of Mammalian-Like, Hybrid-Type N-Glycans in Pichia pastoris. Applied and Environmental Microbiology, vol. 70, No. 5, pp. 2639-2646 (May 2004).
Wang et al. High-level expression of endo-B-N-acetylglucosaminidase H from Streptomyces plicatus in Pichia pastoris and its application for the deglycosylation of glycoproteins. PLOS One. Mar. 17, 2015;10(3):e0120458. doi: 10.1371/journal.pone.0120458. eCollection 2015.
Wang et al. Methanol-Independent Protein Expression by AOX1 Promoter with trans-Acting Elements Engineering and Glucose-Glycerol-Shift Induction in Pichia pastoris.Sci Rep. 2017; 7: 41850. Sci Rep. 2017; 7: 41850.Published online Feb. 2, 2017. doi: 10.1038/srep41850.
Wang et al., Proteomic analysis of fertilized egg white during early incubation, EuPA Open Proteomics, 2: 38-59 (2014).
Whenham et al. Comparative biology and expression of TENP, an egg protein related to the bacterial permeability-increasing family of proteins. Gene 538 (2014) 99-108. Available online Jan. 10, 2014.
Wieser et al. Preparation of a Defined Gluten Hydrolysate for Diagnosis and Clinical Investigations of Wheat Hypersensitivities. Nutrients. Oct. 2018; 10(10): 1411. Published online Oct. 2, 2018. doi: 10.3390/nu10101411.14 pages.
Xiong et al. Effects of site-specific phosphorylation on the mechanical properties of ovalbumin-based hydrogels. International Journal of Biological Macromolecules 102:1286-1296 (2017). Available online May 8. 2017.
Yamamoto et al. Characterization of Bacillus sp. endo-beta-N-acetylglucosaminidase and its application to deglycosylation of hen ovomucoid. Biotechnol Appl Biochem. Dec. 1998;28 (Pt 3):235-42.
Yoshimasu et al. Soluble expression and purification of porcine pepsinogen from Pichia pastoris. Protein Expression and Purification 25(2):229-236 (2002).
Zahrl et al. Systems biotechnology for protein production in Pichia pastoris. FEMS Yeast Research, 17, 2017. Advance Access Publication Date: Aug. 23, 2017. 15 pages.
Zhang et al. Fermentation strategies for recombinant protein expression in the methylotrophic yeast Pichia pastoris. Biotechnol Bioprocess Eng 5, 275-287 (2000). DOI: https://doi.org/10.1007/BF02942184.
Zocchi et al. Expression and purification of a recombinant avidin with a lowered isoelectric point in Pichia pastoris. Protein Expression and Purification 32:167-174 (2003).
Abeyrathne et al. Enzymatic hydrolysis of ovalbumin and the functional properties of the hydrolysates. 2014 Poultry Science 93 :2678-2686.
Albumin from chicken egg white—lyophilized powder, ~98% (agarose gel electrophoresis). Product No. A5503. Product Specification. Sigma-Aldrich, Saint Louis, MO, USA. Retrieved Mar. 13, 2023 at URL: https://www.sigmaaldrich.com/US/en/substance/albuminfromchickeneggwhite123459006591. One page.
Chen et al. Fusion Protein Linkers: Property, Design and Functionality. Adv Drug Deliv Rev 65:1357-1369 (2013). Available online Sep. 29, 2012.
Cherf et al. Applications of Yeast Surface Display for Protein Engineering. Methods in Molecular Biology, vol. 1319, pp. 155-175 (2015).
Chichili et al. Linkers in the structural biology of protein-protein interactions. Protein Science, vol. 22, pp. 153-167 (2013). Published on line Dec. 6, 2012.
Crasto, C.J. Linker: a program to generate linker sequences for fusion proteins. Protein Engineering, 13(5): 309-312 (2000).
Doi et al. Effects of Limited Proteolysis on Functional Properties of Ovalbumin. JAOCS, vol. 64, No. 12, pp. 1697-1703 (Dec. 1987).
European Patent Office, Extended European Search Report and Opinion, EP Patent Application No. 20855636.5, Jul. 6, 2023, 15 pages.
Fraser et al. Chicken ovalbumin is synthesized and secreted by *Escherichia coli*. Proc Natl Acad Sci USA. 75(12): 5936-5940 (Dec. 1978).
GenBankAccession No. MF321613. Version No. MF321613.1. Gallus gallus clone 3D7-74 OVA (OVA) mRNA, partial eds. Record created Dec. 12, 2017. 2 pages. Retrieved Dec. 1, 2022 at URL: https://www.ncbi.nlm.nih.gov/nuccore/MF321613.1/.

(56) References Cited

OTHER PUBLICATIONS

Healthy Living, Baking 101, Vegan Baking Substitutes: Milk [Online], published May 22, 2019, [retrieved on May 10, 2023] Retrieved from the Internet: <URL: https://www.bobsredmill.com/blog/baking-101/vegan-baking-substitutes-milk/>.
Huntington et al. S-ovalbumin, an ovalbumin conformer with properties analogous to those of loop-inserted serpins. Protein Science 4:613-621 (1995).
Ito et al. Importance of N-glycosylation positioning for secretion and folding of ovalbumin, Biochemical and Biophysical Research Communications 361 (3):725-731 (2007). Available on line Jul. 24, 2007.
Ito et al., Structural Characteristics of Hen Egg Ovalbumin Expressed in Yeast Pichia pastoris, Biosci. Biotechnol. Biochem., 69(4): 755-761 (2005).
Jarvio et al. Ovalbumin production using Trichoderma reesei culture and low-carbon energy could mitigate the environmental impacts of chicken-egg-derived ovalbumin. Nature Food, vol. 2, pp. 1005-1013 (2021).
Lechevalier et al. Evidence for synergy in the denaturation at the air-water interface of ovalbumin, ovotransferrin and lysozyme in ternary mixture. Food Chemistry 92(1):79-87 (2005).
Mercereau-Puijalon et al. Synthesis of a chicken ovalbumin-like protein in the yeast *Saccharomyces cerevisiae*. Gene 11 :163-167 (1980).
Onda et al. Cleaved Serpin Refolds into the Relaxed State via a Stressed Conformer. The Journal of Biological Chemistry, vol. 283, No. 25, pp. 17568-17578 (Jun. 20, 2008). Published, JBC Papers in Press, Apr. 7, 2008.
PCT International Search Report and Written Opinion, PCT Application No. PCT/US2024/021234, Jun. 3, 2024, 12 pages.
Sang et al. Functionality of ovalbumin during Chinese steamed bread-making processing. Food Chemistry 253 (2018) 203-210. Available Jan. 31, 2018.
Stein et al. Crystal structure of ovalbumin as a model for the reactive centre of serpins. Nature, vol. 347, pp. 99-102 (Sep. 6, 1990).
Uniprot, "Methionine aminopeptidase 2," Jan. 30, 2011, five pages, [Online] [Retrieved on Jul. 25, 2023] Retrieved from the Internet <URL: https://www.uniprot.org/uniprot/C4R2P3>.
UniProtKB—Q01589 (SED1_Yeast). UniProt website (1993). Retrieved Jan. 31, 2022 at world wide web at uniprot.org/uniprot/Q01589. 13 pages.
United States Office Action, U.S. Appl. No. 17/508,064, filed Jul. 27, 2023, 16 pages.
Unprot, "Ovalbumin—Gallus gallus (Chicken)," Jan. 23, 2007, pp. 1-8, [Online] [Retrieved on Jul. 25, 2023] Retrieved from the Internet <URL: https://www.uniprot.om/uniprotkb/P01012/entry>.
Upadhyay et al. Purification of recombinant ovalbumin from inclusion bodies of *Escherichia coli*. Protein Expr Purif (2015), pp. 1-7.
Wright. Ovalbumin is an elastase substrate. Journal of Biological Chemistry, vol. 259, Issue 23, pp. 14335-14336 (Dec. 10, 1984).
Yamamoto et al. Thermostabilization of Ovalbumin by an Alkaline Treatment: Examination for the Possible Implications of an Altered Serpin Loop Structure. Biosci. Biotechnol. Biochem., 67 (4), 830-837,2003.
Yang et al. Cloning of a novel ovalbumin gene from quail oviduct and its heterologous expression in Pichia pastoris. J Basic Microbial. Sep. 2009;49 Suppl 1 :S73-8. doi: 10.1002/jobm.200900018.

* cited by examiner

| pH of rOVD solution (4.23% w/v protein basis) | Absorbance of DI water | Absorbance of rOVD solution (4.23% w/v protein basis) | Photo of rOVD solution in DI water (4.23% w/v protein basis) |
|---|---|---|---|
| 4.11 | 0.037 | 0.047 | 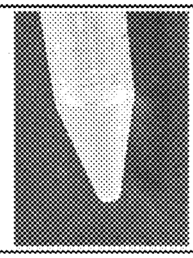 |

FIG. 2

| | Parameter | Pre processing | Post pasteurization | Post hot fill |
|---|---|---|---|---|
| rOVD solution (30% w/v protein based) in deionized water, at pH 4.06 | Absorbance at 600nm | 0.175 | 0.101 | 0.104 |
| | Photos | 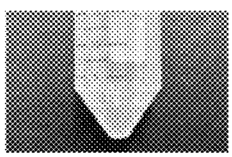 | 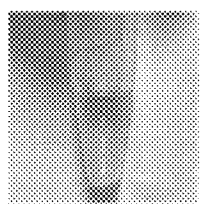 | 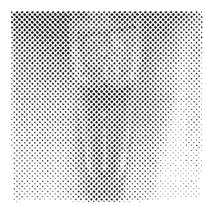 |
| rOVD solution (30% w/v protein based) at pH 6.3 | Absorbance at 600nm | 0.116 | 0.089 | 0.094 |
| | Photos | 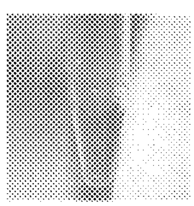 | 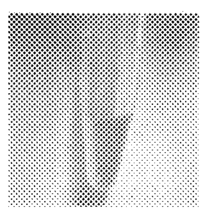 | 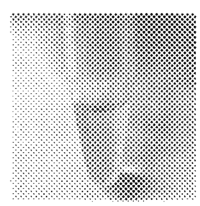 |

FIG. 3 rOVD in deionized water

Room temperature

After pasteurization

After hot fill pH 2.5 pH 4 pH 6 rOVD at room temperature

Pasteurization treated rOVD

Hot Fill treated rOVD

Retort treated rOVD

| | rOVA+ Xanthan gum | rOVA+Potato Starch+Xanthan gum | Control Egg pound cake |
|---|---|---|---|
| **Photos** | | | |
| Cross-section | 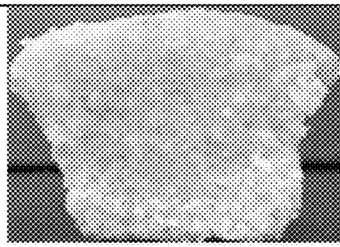 | 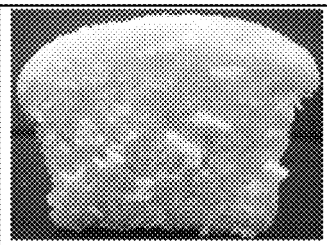 | 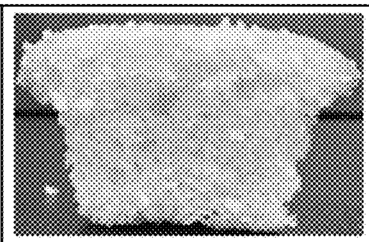 |
| | 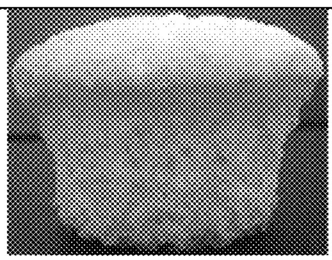 | 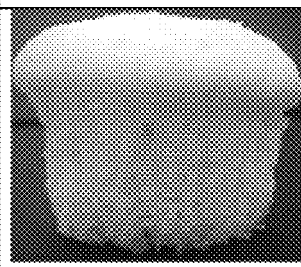 | 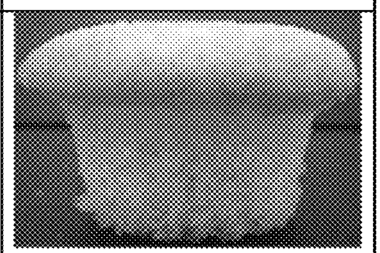 |
FIG. 24
| Egg white meringue | nOVA meringue | rOVA meringue |
|---|---|---|
| 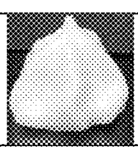 | 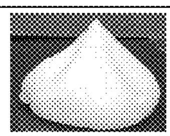 | 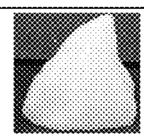 |
FIG. 25

| | Whole egg | Egg white | nOVA |
|---|---|---|---|
| Heat coagulation 72°C for 10min | 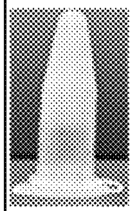 | 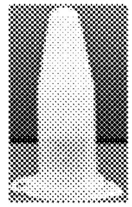 | 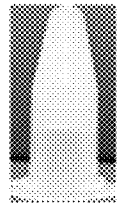 |
| Foaming | 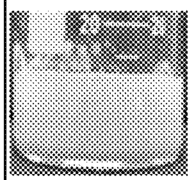 | 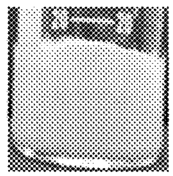 | 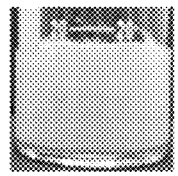 |
FIG. 26
| | Egg white | nOVA | rOVA |
|---|---|---|---|
| Heat coagulation | 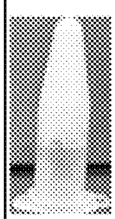 | 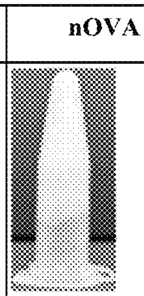 | 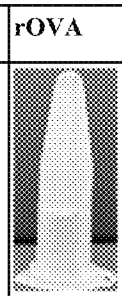 |
| Foaming | 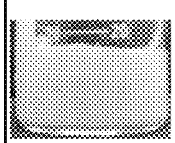 | 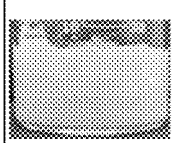 | 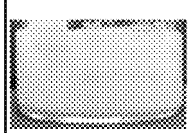 |
FIG. 27

| Sample | pH | Gelation at 72°C before foaming | Gelation at 72°C after foaming |
|---|---|---|---|
| Gallus gallus nOVA | 5.87 | 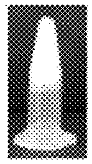 | 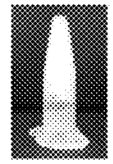 |
| Gallus gallus rOVA | 6.49 | 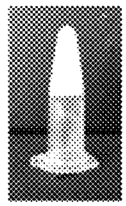 | 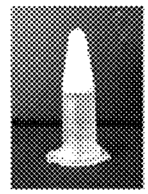 |
| Gallus gallus rOVA (pH adjusted) | 6.08 | 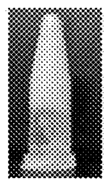 | 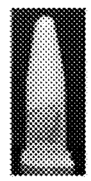 |
| Ostrich rOVA | 3.7 | 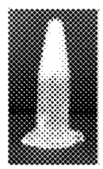 | 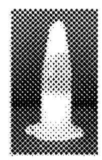 |
| Ostrich rOVA (pH adjusted) | 5.73 | Did not gel | Did not gel |
| Duck rOVA | 4.3 | 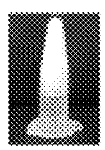 | 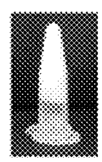 |
| Egg White | 9.01 | 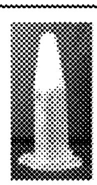 | 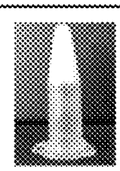 |
FIG. 29

<table>
<tr><th></th><th>Ambient</th><th>Refrigerated</th></tr>
<tr><td>Day 0</td><td colspan="2">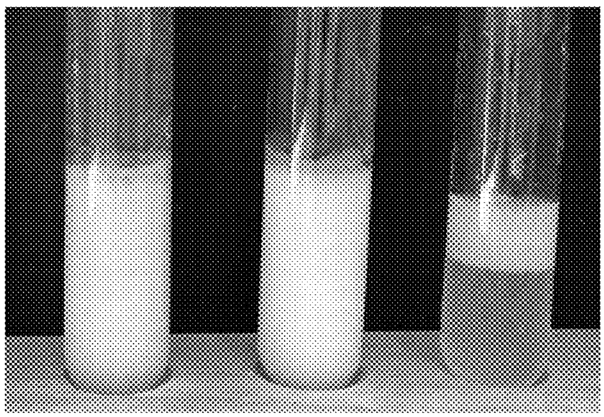<br>L to R: 8%EWP, 8% rOVA, Negative control</td></tr>
<tr><td>Day 3</td><td>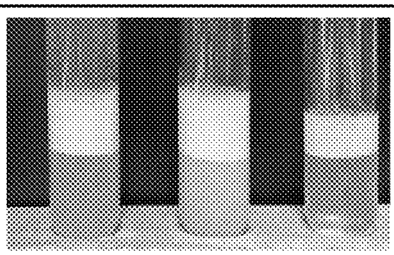<br>L to R: 8%EWP, 8% rOVA, Negative control</td><td>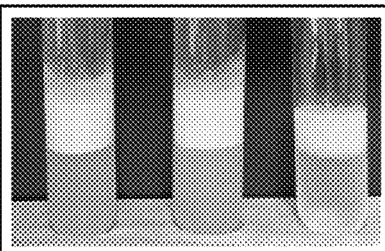<br>L to R: 8%EWP, 8% rOVA, Negative control</td></tr>
</table>
FIG. 31B

| Sample | Cocktail |
| --- | --- |
| Negative Control | 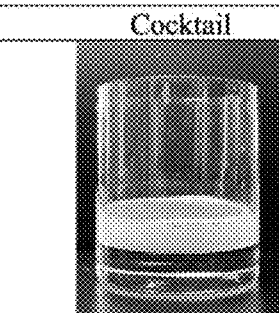 |
| Egg white control |  |
| 7% rOVA | 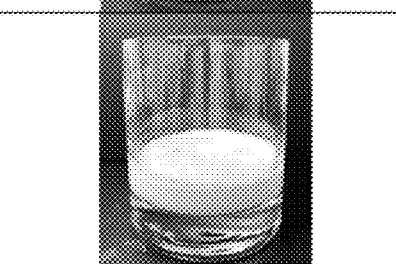 |
| 12% rOVA |  |
FIG. 32

| Parameter | Fresh egg white | rOVA 8.3% + SLS + Xanthan gum | rOVA 8.3% + TEC + Xanthan gum |
|---|---|---|---|
| Photos | 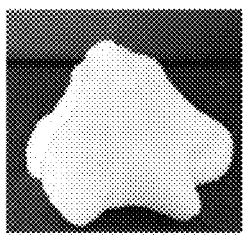 | 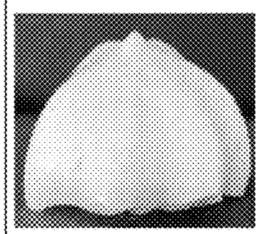 | 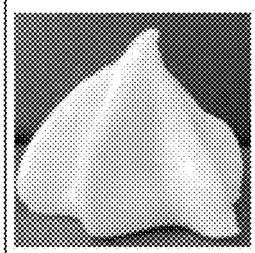 |
| Cross section | 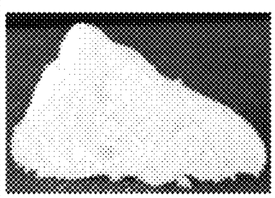 | 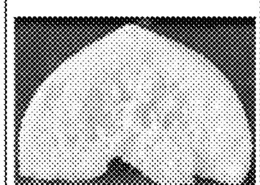 | 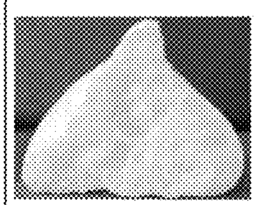 |
n=6
FIG. 34

PROTEIN COMPOSITIONS AND CONSUMABLE PRODUCTS THEREOF

CROSS-REFERENCE TO RELATED APPLICATIONS

This application is a continuation-in-part of U.S. application Ser. No. 18/473,146, filed Sep. 22, 2023, now U.S. Pat. No. 11,974,592, which is a continuation of U.S. application Ser. No. 17/493,067, filed Oct. 4, 2021, now U.S. Pat. No. 11,800,887, which is a continuation of U.S. application Ser. No. 16/986,016, filed Aug. 5, 2020, now U.S. Pat. No. 11,160,299, which is a continuation application of International Patent Application No. PCT/US2020/041720, filed Jul. 10, 2020, which claims the benefit of U.S. Provisional Patent Application No. 62/873,154, filed Jul. 11, 2019, and U.S. Provisional Patent Application No. 62/873,159, filed Jul. 11, 2019; and is a continuation-in-part of U.S. application Ser. No. 18/045,425, filed Oct. 10, 2022, which is a continuation of U.S. application Ser. No. 17/508,064, filed Oct. 22, 2021, which is a continuation of International Application No. PCT/US2020/047076, filed Aug. 19, 2020, which claims the benefit of U.S. Provisional Application No. 62/888,674, filed Aug. 19, 2019. The entire contents of each of the aforementioned patent applications are incorporated herein by reference.

SEQUENCE LISTING

The instant application contains a Sequence Listing which has been submitted electronically in XML format and is hereby incorporated by reference in its entirety. Said XML copy, created on Mar. 18, 2024, is named 41522-58699_717-04_US_CON_sequencelisting.xml and is 184,505 bytes in size.

BACKGROUND

Proteins are important dietary nutrients. They can serve as a fuel source or as sources of amino acids, including the essential amino acids that cannot be synthesized by the body. The daily recommended intake of protein for healthy adults is 10% to 35% of a person's total calorie needs, and currently the majority of protein intake for most humans is from animal-based sources. In addition, athletes and bodybuilders may rely upon increased protein consumption to build muscle mass and improve performance. With the world population growth and the coinciding growth in global food demand, there is a need to provide alternative sustainable, non-animal-based sources of proteins as useful source of protein for daily diet, dietary supplementation and sports nutrition.

SUMMARY

An aspect of the present disclosure is a composition comprising a recombinant ovomucoid protein (rOVD). The rOVD comprises at least one glycosylated asparagine residue and the rOVD is substantially devoid of N-linked mannosylation.

In some embodiments, each glycosylated asparagine comprises a single N-acetylglucosamine. The rOVD may comprise at least three glycosylated asparagine residues. In some cases, the rOVD is a secreted form of the rOVD protein. In various embodiments, the composition is a powder. The composition may have a protein content of at least 30% rOVD protein, at least 40% rOVD protein, at least 50% rOVD protein, at least 60% rOVD protein, at least 70% rOVD protein, at least 80% rOVD protein, at least 85% rOVD protein, at least 90% rOVD protein, or at least 95% rOVD protein on a weight/weight basis and/or a weight per total volume of composition basis. In some cases, the powder is capable of being dissolved in a liquid.

Another aspect of the present disclosure is a composition comprising a recombinant ovomucoid protein (rOVD). The composition is a powder formulated for human or animal consumption and the composition has a protein content of at least 70% rOVD protein, at least 80% rOVD protein, at least 85% rOVD protein, at least 90% rOVD protein, or at least 95% rOVD protein on a weight/weight basis and/or a weight per total volume of composition basis.

The powder may comprise less than 15%, 12%, 10%, 8%, 6%, 5%, 3%, 2% or 1% moisture on a weight/weight basis and/or a weight per total volume of composition basis. The powder may comprise less than 30%, 27%, 25%, 22%, 20%, 17%, 15%, 12%, 10%, 8%, 5%, 3% or 1% free carbohydrate content. In some embodiments, the powder is capable of being dissolved in a liquid.

In embodiments, a composition comprises one or more additional ingredients selected from the group consisting of a flavoring, a coloring agent, a sweetener, an amino acid, a protein, an acidulant, a preservative, and ash. In some cases, the composition comprises less than 5%, 4.5%, 4%, 3.5%, 3%, 2.5%, 2%, 1.5%, 1%, 0.75%, 0.5%, 0.25% or 0.1% ash. The amino acid may be selected from tryptophan, isoleucine, leucine, and valine, or a combination thereof.

Yet another aspect of the present disclosure is a composition comprising a recombinant ovomucoid protein (rOVD). The composition is in a solid form formulated for human or animal consumption, wherein the rOVD provides protein fortification to the composition and at least one additional feature selected from the group consisting of mouthfeel, texture, hardness, stability to heat treatment, and stability to pH.

In various embodiments, the rOVD comprises at least one asparagine residue linked to N-acetyl glucosamine and the rOVD is substantially devoid of N-linked mannosylation. The concentration of rOVD may be greater than about 5%, about 10%, about 15%, about 20%, or about 25% on a weight/weight basis and/or a weight per total volume of composition basis and/or a weight per total volume of composition basis. In some cases, the rOVD does not substantially alter the visible appearance or mouthfeel of the solid consumable composition as compared to a solid consumable composition lacking rOVD; the rOVD does not substantially alter the visible appearance or mouthfeel of the solid consumable composition as compared to a solid consumable composition containing whey protein, soy protein, or pea protein at the same concentration as the rOVD; the rOVD does not substantially affect a sensory rating for odor and/or for taste as compared to a solid consumable composition lacking rOVD; and/or the rOVD does not substantially affect a sensory rating for odor and/or for taste as compared to a comparable composition containing whey protein, soy protein, or pea protein at the same concentration as the rOVD. In some embodiments, the solid consumable composition is a snack bar, a protein bar, a nutrition bar, an energy bar, or a protein supplement. In some cases, the solid consumable composition comprises one or more additional ingredients selected from the group consisting of a flavoring, a coloring agent, a sweetener, an amino acid, a protein, an acidulant, a preservative, and ash.

In an aspect, the present disclosure provides a composition comprising a recombinant ovomucoid protein (rOVD).

The composition is a liquid formulated for human or animal consumption, wherein the rOVD provides protein fortification to the composition and at least one additional feature selected from the group consisting of solubility, mouthfeel, stability to heat treatment, and stability to pH.

In some cases, the composition has a protein content comprising at least 15% rOVD, at least 20% rOVD protein, at least 30% rOVD protein, or at least 40% rOVD protein on a weight/weight basis and/or a weight per total volume of composition basis. The composition may have a protein content comprising at least 5% rOVD, and in which the liquid consumable composition is substantially optically clear. In embodiments, the composition has an optical clarity greater than a comparable composition containing whey protein, soy protein, or pea protein at the same concentration as the rOVD. In some cases, the rOVD does not substantially alter the visible appearance or mouthfeel of the liquid consumable composition as compared to a liquid consumable composition lacking rOVD; the rOVD does not substantially alter the visible appearance or mouthfeel of the liquid consumable composition as compared to a comparable composition containing whey protein, soy protein, or pea protein at the same concentration as the rOVD; the rOVD does not substantially affect a sensory rating for odor and/or for taste as compared to a liquid consumable composition lacking rOVD; and/or the rOVD does not substantially affect a sensory rating for odor and/or for taste as compared to a comparable composition containing whey protein, soy protein, or pea protein at the same concentration as the rOVD. The rOVD may remain substantially soluble after the liquid consumable composition has been heated to a temperature of between about 72° C. and about 121° C. In some cases, the rOVD has a greater solubility, optical clarity or both solubility and optical clarity in the liquid following a heat treatment than the stability of whey protein, soy protein, or pea protein at the same concentration as the rOVD. In some embodiments, the heat treatment comprises exposure of the liquid to a temperature of between about 72° C. and about 121° C. The rOVD may have a solubility in the liquid greater than the solubility of whey protein, soy protein, or pea protein at the same concentration as the rOVD. In some cases, the liquid consumable composition has a pH of between about 2.0 and about 8.0.

In some embodiments, a solid form formulated for human or animal consumption or a liquid formulated for human or animal consumption may comprise one or more additional ingredients selected from the group consisting of a flavoring, a coloring agent, a sweetener, an amino acid, a protein, an acidulant and a preservative. In various embodiments, the amino acid is selected from tryptophan, isoleucine, leucine, and valine, or a combination thereof. In some cases, the protein is a lysozyme protein, e.g., an egg white lysozyme (OVL). The ratio of rOVD to OVL may between about 60% rOVD:40% OVL and about 82% rOVD:18% OVL. The lysozyme may be a recombinant lysozyme protein. In some cases, the protein and/or the amino acid provides an improved amino acid balance to the solid form or the liquid. In embodiments, a protein digestibility corrected amino acid score (PDCAAS) is equal to or greater than about 0.75, e.g., greater than or equal to about 0.8, 0.85, 0.90, 0.95 or the PDCAAS is about or is 1.0. The liquid consumable composition may comprise rOVD and OVL and the proteins are soluble and composition is optically clear.

In some cases, the liquid consumable composition is a beverage selected from the group consisting of a juice, a broth, a soup, a soda, a soft drink, a flavored water, a protein water, a fortified water, a carbonated water, a nutritional drink, an energy drink, a sports drink, a recovery drink, a heated drink, a coffee-based drink, a tea-based drink, a plant-based milk, a milk based drink, a non-dairy, plant based mild drink, infant formula drink, a meal replacement drink. In some embodiments, the beverage comprises carbonation.

A liquid consumable composition may be a syrup comprising between 20% rOVD protein and at least 60% rOVD protein on a weight/weight basis and/or a weight per total volume of composition basis.

In some cases, the liquid consumable composition is an emulsion, e.g., a sauce, a gravy, or a salad dressing.

In another aspect, the present disclosure provides a composition comprising a recombinant ovomucoid protein (rOVD). The composition is in a semi-solid form formulated for human or animal consumption, in which the rOVD provides at least one additional feature selected from the group consisting of mouthfeel, texture, hardness, stability to heat treatment, and stability to pH.

In various embodiments, the semi-solid consumable composition is a gummy, candy, jelly, syrup, gel, a gelled preparation. In some cases, the rOVD does not substantially alter the visible appearance or mouthfeel of the semi-solid consumable composition as compared to a semi-solid consumable composition lacking rOVD; the rOVD does not substantially alter the visible appearance or mouthfeel of the semi-solid consumable composition as compared to a semi-solid consumable composition containing whey protein, soy protein, or pea protein at the same concentration as the rOVD; the rOVD does not substantially affect a sensory rating for odor and/or for taste as compared to a semi-solid consumable composition lacking rOVD; and/or the rOVD does not substantially affect a sensory rating for odor and/or for taste as compared to a comparable composition containing whey protein, soy protein, or pea protein at the same concentration as the rOVD. The semi-solid consumable composition may have an optical clarity greater than a comparable composition containing whey protein, soy protein, or pea protein at the same concentration as the rOVD.

The semi-solid consumable composition may comprise one or more additional ingredients selected from the group consisting of a flavoring, a coloring agent, a sweetener, an amino acid, a protein, an acidulant, and a preservative. The protein and/or the amino acid may provide an improved amino acid balance to the semi-solid consumable composition. In some cases, the amino acid is selected from tryptophan, isoleucine, leucine, and valine, or a combination thereof. In some embodiments, the protein and/or the amino acid provides an improved amino acid balance to the semi-solid consumable composition. The protein and/or the amino acid may provide an improved amino acid balance to the semi-solid consumable composition. In some cases, the amino acid is selected from tryptophan, isoleucine, leucine, and valine, or a combination thereof. In embodiments, the protein is a lysozyme protein, e.g., the lysozyme protein is an egg white lysozyme (OVL). The ratio of rOVD to OVL may be between about 60% rOVD:40% OVL and about 82% rOVD:18% OVL. The lysozyme may be a recombinant lysozyme protein. In various embodiments, a protein digestibility corrected amino acid score (PDCAAS) is equal to or greater than about 0.75, 0.8, 0.85, 0.90, 0.95 or the PDCAAS is about or is 1.0.

In some cases, the rOVD comprises an rOVD that has been exposed to an oxidizing agent or an oxygen-generating agent. In various embodiments, the oxygen-generating agent is hydrogen peroxide, sodium percarbonate, bubbled oxygen, activated chlorine dioxide, or ozone.

In some cases, the rOVD comprises an amino acid sequence that is naturally found in an avian species, e.g., chicken, quail, turkey, turkey vulture, hummingbird, duck, ostrich, goose, gull, guineafowl, pheasant, or emu, and any combination thereof.

The rOVD may comprise an amino acid sequence of one of SEQ ID No. 1-44 or an amino acid sequence having at least 85% sequence identity with one of SEQ ID No. 1-44.

In embodiments, the rOVD is substantially a full-length rOVD amino acid sequence.

In some cases, the rOVD provides protein fortification to the composition.

In some embodiments, the rOVD is produced by a microbial host cell, e.g., In some cases, the microbial host cell is a yeast, a filamentous fungus, or a bacterium. The microbial host cell may be a *Pichia* species, a *Saccharomyces* species, a *Trichoderma* species, a *Pseudomonas* species or an *E. coli* species. The microbial host cell may be *Pichia pastoris* or *Komagataella phaffii*.

Another aspect is a consumable composition comprising a recombinant ovomucoid protein (rOVD). The rOVD provides protein fortification to the composition; in which the rOVD provides a solubility that is comparable or higher than a native ovomucoid protein.

An aspect of the present disclosure is a consumable powder protein composition comprising a recombinant ovomucoid protein (rOVD). The protein content of the composition is greater than 70%; in which the composition comprises less than 2% ash, less than 20% carbohydrates, and less than 1% fat by acid hydrolysis on a weight/weight basis and/or a weight per total volume of composition basis.

Another aspect of the present disclosure is a consumable composition comprising a recombinant ovomucoid protein (rOVD). The composition has a protein content comprising at least 15% rOVD protein on a weight/weight basis and/or a weight per total volume of composition basis.

In an aspect, the present disclosure provides a consumable composition comprising a recombinant ovomucoid protein (rOVD). The rOVD provides protein fortification to the composition; in which the rOVD provides a water retention capacity higher than a native ovomucoid protein.

Yet another aspect of the present disclosure is a beverage composition comprising a recombinant ovomucoid protein (rOVD) and at least one consumable liquid, in which the rOVD is substantially soluble in the composition, in which the beverage composition is substantially optically clear, and in which the concentration of rOVD is greater than about 5% on a weight/weight basis and/or a weight per total volume of composition basis. The beverage is selected from the group consisting of a juice, a broth, a soup, a soda, a soft drink, a flavored water, a protein water, a fortified water, a carbonated water, a nutritional drink, an energy drink, a sports drink, a recovery drink, a heated drink, a coffee-based drink, a tea-based drink, a plant-based milk, a milk based drink, a non-dairy, plant based mild drink, infant formula drink, a meal replacement drink. The beverage may comprise carbonation.

In an aspect, the present disclosure provides a method of preparing a consumable food preparation. The method comprising the steps of: providing a recombinant OVD (rOVD) produced by a microbial host; in which the rOVD comprises N-linked glycosylation and in which rOVD is substantially devoid of N-linked mannosylation; producing a preparation by combining or mixing the rOVD with at least one consumable ingredient; in which the rOVD provides protein fortification to the composition and at least one additional feature selected from the group consisting of solubility, optical clarity, mouthfeel, texture, hardness, stability to heat treatment and stability to pH.

In various embodiments, the rOVD comprises one or more glycosylated asparagine residues, in which each glycosylated asparagine residue comprises a single N-acetylglucosamine. In some cases, the rOVD is present in the consumable food preparation in or in about 1%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% on a weight/weight basis and/or a weight per total volume of the preparation.

The method may further comprise heat-treating the preparation, e.g., exposing the preparation to a temperature between about 72° C. and about 121° C. The heat-treating may comprise hot fill, pasteurization, retort, boiling, baking, broiling or grilling. In embodiments, the preparation has a pH between about 2 and about 6.

In some cases, the method further comprises expressing rOVD protein in the microbial host, e.g., a yeast, a filamentous fungus, or a bacterium. In some embodiments, the microbial host is a *pichia* species, a *saccharomyces* species, a *Trichoderma* species, a *pseudomonas* species or an *E. coli* species. In some cases, the microbial host is *Pichia pastoris* or *Komagataella phaffii*.

In some embodiments, the method further comprises expressing an enzyme in the microbial host having an activity to remove a glycan by cleaving within a chitobiose core of high mannose and hybrid oligosaccharides on an N-linked glycoprotein. In various embodiments, the enzyme comprises EndoH, an OCH1-EndoH fusion or an active fragment of EndoH.

In some cases, the rOVD is secreted from the microbial host, and in which the method further comprises isolating the secreted rOVD prior to combining or mixing the rOVD with the at least one consumable ingredient.

The method may further comprise separating the secreted rOVD from the microbial host and exposing the rOVD to an oxidizing agent or an oxygen-generating agent, e.g., hydrogen peroxide, sodium percarbonate, activated chlorine dioxide, bubbled oxygen, or ozone.

In some cases, the method further comprises drying, powdering, and/or spray-drying the rOVD.

In various embodiments, preparation is suitable for human consumption and/or for animal consumption.

An aspect of the present disclosure is a consumable composition produced by a herein-disclosed method.

Another aspect of the present disclosure is a recombinant ovomucoid (rOVD) protein comprising N-linked glycosylation, in which the N-linked glycosylation comprises N-acetyl glucosamine and substantially lacks mannose residues.

In some cases, the rOVD further comprises O-linked glycosylation. At least one asparagine residue of the OVD is glycosylated and has a single N-acetyl glucosamine residue. In embodiments, at least three asparagine residues of rOVD have a single N-acetyl glucosamine residue. The rOVD protein may comprise an rOVD that has been exposed to an oxidizing agent or an oxygen-generating agent, e.g., hydrogen peroxide, sodium percarbonate, bubbled oxygen, activated chlorine dioxide, or ozone.

Yet another aspect is a composition comprising the rOVD protein according to any herein disclosed aspect or embodiment.

In some embodiments, the composition is in powdered form and in which the protein content of the composition is about 70% or greater on a weight/weight basis and/or a weight per total volume of composition basis. In some cases, the rOVD protein is present in the composition at about 80% or greater on a weight/weight basis and/or a weight per total volume of composition basis.

In an aspect, the present disclosure provides a method of making an rOVD protein. The method comprising: producing rOVD protein in a eukaryotic host cell, in which the rOVD protein is secreted from the host cell and in which the host cell expresses an enzyme having an activity that removes mannose residues from N-acetyl glucosamine linkage; separating the rOVD protein from the host cell; exposing the rOVD protein to an oxidizing agent or an oxygen-generating agent; and separating rOVD from the oxidizing agent or oxygen-generating agent.

In some embodiments, the enzyme comprises EndoH, an OCH1-EndoH fusion, or an active fragment of EndoH. In some cases, the oxidizing agent or oxygen-generating agent comprises hydrogen peroxide, sodium percarbonate, bubbled oxygen, activated chlorine dioxide, or ozone. In some embodiments, the host cell is a yeast or fungal cell.

In some cases, the host cell is a *Pichia* sp.

In any of the herein disclosed methods or compositions, the rOVD may be derived from an avian species.

In any of the herein disclosed methods or compositions, the rOVD may comprise an amino acid sequence of a chicken OVD, a goose OVD protein, a hummingbird OVD, or a turkey vulture OVD.

In any of the herein disclosed methods or compositions, the rOVD may comprise an amino acid sequence selected from the group consisting of SEQ ID No. 1-44 and an amino acid sequence having at least 85% sequence identity with SEQ ID No. 1-44.

Another aspect of the present disclosure includes a composition for producing egg-less food items. The ingredient composition for producing an egg-less food item may comprise a recombinant ovalbumin (rOVA), wherein the pH of the rOVA may be between about 3.5 and about 7.0; wherein the rOVA when present in the egg-less food item in an amount between about 2% and about 15% (w/w); and wherein the rOVA provides to the egg-less food item at least one egg white characteristic selected from gelling, foaming, whipping, fluffing, binding, springiness, aeration, coating, film forming, emulsification, browning, thickening, texturizing, humectant, clarification, and cohesiveness.

In some cases, the composition may be dried or may be a powder. In some cases, the composition may comprise at least 75% rOVA (w/w of total protein or w/w of total composition). In some cases, the powder composition may be a concentrate. In some cases, the powder composition may be an isolate. In some cases, the powder composition may be at least about 75%, at least about 80%, at least about 85%, or at least about 90% rOVA (w/w). In some cases, the powder composition is at least about 80%, at least about 85%, or at least about 90% rOVA (w/w). In some cases, the powder is a concentrate. In some cases, the powder composition is an isolate.

In some cases, the composition may be a liquid. In some cases, the liquid composition may comprise at least 50% rOVA (w/w of total protein or w/w of composition). In some cases, the liquid the composition comprises at least about 60%, at least about 65%, at least about 75%, at least about 80%, at least about 85%, or at least about 90% rOVA (w/w). The term w/w of total protein in the context of a % rOVA means that the rOVA comprises a defined percentage of the total protein in the composition. In one example, a composition comprising at least 50% rOVA w/w of total protein would have at least half of the total protein being rOVA and the other half or so being another protein. Thus, the total composition does not necessarily need to be at least 50% rOVA by weight, only the composition's protein content must be at least 50% rOVA.

In some cases, the rOVA provides an equivalent or an improvement in the characteristic compared to native egg white in a similar food item. In some cases, the rOVA provides a foam capacity of at least 20%, 30%, 40%, or 50% greater than native egg white. In some cases, the rOVA provides a time to foaming that may be at least 20%, 30%, 40%, or 50% faster than native egg white. In some cases, the pH of the rOVA when solubilized is between about 3.5 and about 4.5. In some cases, the rOVA provides a hardness to the egg-less food composition that may be greater than native egg white. In some cases, the rOVA provides a chewiness to the egg-less food composition that may be greater than native egg white. In some cases, the rOVA provides a springiness comparable to native egg white.

In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60. In some cases, the rOVA may comprise an amino acid sequence of a duck OVA, an ostrich OVA, or a chicken OVA. In some cases, the amino acid sequence of the rOVA lacks an N-terminal methionine. In some cases, the rOVA further includes an EAEA amino acid sequence (SEQ ID NO: 135) at its N-terminus.

In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized.

In some cases, the pH when solubilized may be between about 6 and about 6.8. In some cases, the pH of the rOVA when solubilized may be less than about 6.1. In some cases, the rOVA may be present in the egg-less food item in an amount of less than about 8%. In some cases, the rOVA may be present in the egg-less food item in an amount of about 7% or less than 7%.

In some embodiments, provided herein are baked goods. A baked food product, may comprise: (i) a recombinant ovalbumin (rOVA), wherein the pH of the rOVA when solubilized may be between about 3.5 and about 7.0; (ii) at least one fat or oil; (iii) at least one grain starch; and (iv) at least one sweetener; wherein the rOVA provides the baked food product at least one egg white characteristic selected from binding, springiness, aeration, browning, texturizing, humectant, and cohesiveness, and the baked food product does not comprise any natural egg white proteins or a natural egg white.

In some cases, the rOVA may be present at about 2% to 15% in the product (w/w of total protein or w/w of total food product prior to baking). In some cases, the rOVA is present at about 2% to about 5% in the product (w/w). In some cases, the baked good may comprise a dairy component or a leavening agent, or a combination thereof. In some cases, the product may be a cake, a bread, a roll, a pastry, a cracker, a muffin, a scone, a biscuit, or a cookie. In some cases, the baked product may have a crumb structure equivalent to or better than a similar baked product made with a natural egg white or a natural whole egg. In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60. In some cases, the rOVA may comprise an amino acid sequence of a duck OVA, an ostrich OVA, or a chicken OVA. In some cases, the percentage weight loss is lower in a baked product made with rOVA when compared to an equivalent baked product made with whole egg.

In some embodiments, provided herein are emulsified products. An emulsified product may comprise: (i) a recombinant ovalbumin (rOVA); (ii) at least one fat or oil; (iii) water; wherein the rOVA may be present in the product at about 2% to 15% (w/w). In some cases, the emulsified product may comprise an acidifying agent. In some cases, the product may be a salad dressing, a sauce, mayonnaise, sandwich spread or a gravy.

In some embodiments, described herein are food products comprising (i) a recombinant ovalbumin (rOVA), wherein the pH of the rOVA when solubilized may be between about 3.5 and about 7.0; (ii) at least one sweetener; and (iii) optionally, a consumable liquid; wherein the rOVA may be present in the food product at about 2% to about 15% (w/w) and wherein the rOVA provides foaming, whipping, fluffing or aeration to the food product.

In some cases, the rOVA may further provide gelation to the food product. In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized. In some cases, the food product may be a meringue, a whipped dessert, a whipped topping or a soufflé. In some cases, the rOVA may provide a foam capacity to the food product of at least 20%, 30%, 40%, or 50% greater than native egg white. In some cases, the rOVA may provide a time to foaming to the food product that may be at least 20%, 30%, 40%, or 50% faster than native egg white. In some cases, the pH of the rOVA when solubilized is between about 3.5 and about 4.5.

In some cases, the rOVA is present in the food product at about 5% to about 10% (w/w). In some cases, the rOVA is present in the food product at about 7% to about 8% (w/w). In some cases, the rOVA is present in the food product at about 4%, about 7%, or about 12% (w/w). In some cases, the pH of the rOVA when solubilized is about 6. In some cases, the rOVA is present in the food product at between about 9% and about 10% (w/w). In some cases, the pH of the rOVA when solubilized is about 7. In some cases, the product may be a beverage. In some cases, the beverage may be a consumable alcohol. In some cases, the rOVA provides foaming, whipping, fluffing or aeration to the consumable alcohol beverage. In some cases, the beverage is a coffee drink. In some cases, the rOVA provides foaming, whipping, fluffing or aeration to the coffee drink. In some cases, the coffee drink lacks a dairy component.

In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60. In some cases, the rOVA may comprise an amino acid sequence of a duck OVA, an ostrich OVA, or a chicken OVA. In some cases, the rOVA does not contaminate the food product with *Salmonella*. In some cases, the food product is a protein bar, an energy bar, a nutrition bar or a granola bar. In some cases, the food product comprises between about 4% and about 8% (w/w) rOVA. In some cases, the bar is baked or is unbaked.

In some embodiments, described herein is a meat-analog food product. A meat-analog food product may comprise: (i) a recombinant ovalbumin (rOVA); (ii) at least one fat or oil; and (iii) a plant-derived protein; wherein the rOVA may be present in the food product between about 2% and about 15% (w/w); and wherein the rOVA acts as a binding agent or a gelling agent, or a combination thereof.

In some cases, the plant protein may be an extruded plant protein. In some cases, the plant protein may be a non-extruded plant protein. In some cases, the meat analog food product may be selected from a burger, patty, sausage, hot dog, sliced deli meat, jerky, bacon, nugget, a ground meat-like composition, and a formed meat-like composition. In some cases, the rOVA may provide a hardness to the food product that may be greater than native egg white. In some cases, the rOVA may provide a chewiness to the food product that may be greater than native egg white. In some cases, the rOVA may provide a springiness comparable to native egg white.

In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized. In some cases, the rOVA is present in the food product at about 4%, at about 5%, or at about 6% (w/w). In some cases, the rOVA may comprise an amino acid sequence of SEQ ID NO: 2 or SEQ ID NO: 1 or an amino acid sequence with at least 70% identity to SEQ ID NO: 2 or SEQ ID NO: 1. In some cases, the rOVA may comprise an amino acid sequence of a duck OVA, an ostrich OVA, or a chicken OVA.

In some embodiments, provided herein are egg-white substitutes. An egg-white substitute may comprise: (i) a recombinant ovalbumin (rOVA); (ii) at least one fat or oil; and (iii) a polysaccharide or polysaccharide-containing ingredient; wherein the rOVA may be present in the composition at about 2% to 15% (ww); and wherein the composition may have one or more characteristics selected from hardness, adhesiveness, fracturability, cohesiveness, gumminess, and chewiness, and the one or more characteristics are equivalent to or improved as compared to natural egg white when the egg-white substitute may be cooked.

In some cases, the egg-white substitute may further comprise a flavoring agent or a coloring agent, or a combination thereof. In some cases, the polysaccharide or polysaccharide-containing ingredient may be a starch. In some cases, the polysaccharide or polysaccharide-containing ingredient may be selected from gellan gum, sodium alginate, and psyllium or any combination thereof. In some cases, the rOVA may provide a hardness to the food product that may be greater than native egg white.

In some cases, the rOVA may provide a chewiness to the food product that may be greater than native egg white. In some cases, the rOVA may provide a gumminess and/or springiness comparable to native egg white. In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized. In some cases, the rOVA is present in the food product between about 10% and about 12% (w/w).

In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60. In some cases, the rOVA may comprise an amino acid sequence of a duck OVA, an ostrich OVA, or a chicken OVA.

In some embodiments, described herein are powdered ingredient compositions. A powdered ingredient composition may comprise a recombinant ovalbumin (rOVA), wherein the pH of the rOVA when solubilized may be between about 3.5 and about 7.0, wherein the rOVA may be at least 75% w/w of the composition, and wherein the rOVA may comprise one or more N-linked glycosylation sites having mannose linked to an N-acetyl glucosamine, and wherein the N-linked glycosylation sites lack galactose. In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60. In some cases, the rOVA may comprise an amino acid sequence of a duck OVA, an ostrich OVA, or a chicken OVA. In some cases, the amino acid sequence of the rOVA lacks an N-terminal methionine. In some cases, the rOVA further includes an EAEA amino acid sequence (SEQ ID NO: 53) at its N-terminus. In some cases, the composition comprises at least at least about 80%, at least about 85%, or at least about 90% rOVA (w/w).

In some embodiments, a liquid composition may comprise a recombinant ovalbumin (rOVA) and the composition may comprise at least 50% rOVA (w/w of total protein or w/w of total composition). In some cases, the composition may comprise at least about 60%, at least about 65%, at least about 75%, at least about 80%, at least about 85%, or at least about 90% rOVA (w/w).

In some cases, the rOVA may comprise an amino acid sequence of SEQ ID NO: 2 or SEQ ID NO: 1 or an amino acid sequence with at least 70% identity to SEQ ID NO: 2 or SEQ ID NO: 1. In some cases, the rOVA may comprise an amino acid sequence of a duck OVA, an ostrich OVA, or a chicken OVA.

In some cases, the amino acid sequence of the rOVA lacks an N-terminal methionine. In some cases, the rOVA further includes an EAEA amino acid sequence (SEQ ID NO: 75) at its N-terminus. In some cases, the pH of the solubilized rOVA may be between about 3.5 and about 7.0. In some cases, the pH of the solubilized rOVA may be between about 6 and about 6.8. In some cases, the pH of the solubilized rOVA may be less than about 6.1.

In some cases, the rOVA may provide to an egg-less food item at least one egg white characteristic selected from gelling, foaming, whipping, fluffing, binding, springiness, aeration, coating, film forming, emulsification, browning, thickening, texturizing, humectant, clarification, and cohesiveness. In some cases, the rOVA may provide an equivalent or an improvement in the characteristic compared to native egg white in a similar egg-less food item. In some cases, the rOVA may provide to the egg-less food item a foam capacity of at least 20%, 30%, 40%, or 50% greater than native egg white.

In some cases, the rOVA may provide to the egg-less food item a time to foaming that may be at least 20%, 30%, 40%, or 50% faster than native egg white. In some cases, the rOVA may provide to the egg-less food item a hardness that may be greater than native egg white. In some cases, the pH of the rOVA when solubilized is between about 3.5 and about 4.5. In some cases, the rOVA is present in the egg-less food item at about 5% to about 10% (w/w). In some cases, the rOVA is present in the egg-less food item at about 7% to about 8% (w/w). In some cases, the rOVA is present the egg-less food item at about 4%, about 7%, or about 12% (w/w). In some cases, the pH of the rOVA when solubilized is about 6. In some cases, the rOVA may provide to the egg-less food item a chewiness that may be greater than native egg white. In some cases, the rOVA may provide to the egg-less food item a springiness comparable to native egg white.

In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized. In some cases, the rOVA does not contaminate the egg-less food item with *Salmonella*.

In some embodiments, described herein are dry or powdered compositions comprising a recombinant ovalbumin (rOVA), wherein the composition may comprise at least 50% rOVA (w/w of total protein or w/w of total composition). In some cases, the composition may comprise at least about 60%, at least about 65%, at least about 75%, at least about 80%, at least about 85%, at least about 90%, or at least about 95% rOVA (w/w). In some cases, the rOVA may comprise an amino acid sequence of SEQ ID NO: 61 or SEQ ID NO: 60 or an amino acid sequence with at least 70% identity to SEQ ID NO: 61 or SEQ ID NO: 60.

In some cases, the rOVA may comprise an amino acid sequence of a duck OVA, an ostrich OVA, or a chicken OVA. In some cases, the amino acid sequence of the rOVA lacks an N-terminal methionine. In some cases, the rOVA further includes an EAEA amino acid sequence (SEQ ID NO: 75) at its N-terminus. In some cases, the rOVA may provide to an egg-less food item at least one egg white characteristic selected from gelling, foaming, whipping, fluffing, binding, springiness, aeration, coating, film forming, emulsification, browning, thickening, texturizing, humectant, clarification, and cohesiveness. In some cases, the rOVA may provide an equivalent or an improvement in the characteristic compared to native egg white in a similar egg-less food item.

In some cases, the rOVA may provide to the egg-less food item a foam capacity of at least 20%, 30%, 40%, or 50% greater than native egg white. In some cases, the rOVA may provide to the egg-less food item a time to foaming that may be at least 20%, 30%, 40%, or 50% faster than native egg white. In some cases, the pH of the rOVA when solubilized is between about 3.5 and about 4.5. In some cases, the rOVA is present in the egg-less food at about 4%, about 7%, or about 12% (w/w). In some cases, the pH of the rOVA when solubilized is about 6.

In some cases, the rOVA may provide to the egg-less food item a hardness that may be greater than native egg white. In some cases, the rOVA may provide to the egg-less food item a chewiness that may be greater than native egg white. In some cases, the rOVA may provide to the egg-less food item a springiness comparable to native egg white. In some cases, the rOVA provides improved gelation when the rOVA comprises an amino acid sequence of a chicken OVA and the pH is between about 6.5 and 7.0 when solubilized. In some cases, the rOVA provides improved gelation when the rOVA comprises an amino acid sequence of an ostrich OVA and the pH is less than about 6.0 and above about 3.7 when solubilized.

In some embodiments, provided herein are methods of making a food product. A method of making a food product may comprise: (i) providing a recombinant ovalbumin (rOVA) at a pH when solubilized of between about 3.5 and about 7.0; (ii) combining the rOVA in an amount between 2% and 15% (w/w) with one or more consumable ingredients to form a food product, wherein the rOVA may provide at least one egg white characteristic to the food product selected from gelling, foaming, whipping, fluffing, binding, springiness, aeration, coating, film forming, emulsification, browning, thickening, texturizing, humectant, clarification and cohesiveness.

In some embodiments, provided herein are methods of making an ingredient. A method of producing an ingredient composition may comprise: (i) expressing a recombinant ovalbumin (rOVA) in a microbial cell, wherein the rOVA may be secreted by the microbial cell into a liquid media; (ii) harvesting the liquid media containing secreted rOVA; (iii) performing a separation step at a pH of about 3.5; (iv) solubilizing the rOVA at a pH of about 12; (v) adjusting the final pH of the rOVA to between about 3.5 and about 7.0 to generate the ingredient composition.

In some cases, the separation step may comprise ion exchange chromatography or ammonium sulfate precipitation. In some cases, the ion exchange chromatography may be cation exchange chromatography or anion exchange chromatography, or a combination thereof. In some cases, the method further may comprise a filtration step following the solubilizing step. In some cases, the microbial cell may be a fungal cell. In some cases, the fungal cell may be a *Pichia* sp. In some cases, the microbial cell expresses a recombinant helper factor; wherein the helper factor enhances the level of expression or accumulation of rOVA.

In some cases, the rOVA may comprise an amino acid sequence of SEQ ID NO: 61 or SEQ ID NO: 60 or an amino acid sequence with at least 70% identity to SEQ ID NO: 2 or SEQ ID NO: 1. In some cases, the rOVA may comprise an amino acid sequence of a duck OVA, an ostrich OVA, or a chicken OVA. In some cases, the amino acid sequence of the secreted rOVA lacks an N-terminal methionine. In some cases, the secreted rOVA further includes an EAEA amino acid sequence (SEQ ID NO: 53) at its N-terminus.

In some embodiments, an egg-less food product may comprise a recombinant ovalbumin (rOVA) in an amount of between about 15% and about 25% (w/w of total protein or w/w of food product). In some cases, the egg-less food product may comprise the rOVA) in an amount of up to about 23% (w/w).

In some embodiments, provided herein are uses of recombinant ovalbumin (rOVA). The recombinant ovalbumin (rOVA) may be used as an ingredient in making a baked good. rOVA may be used as an ingredient in making an egg-less food product. rOVA may be used as an ingredient in making a meat-analog food product. rOVA may be used as an ingredient in making an egg-white substitute. rOVA may be used as a substitute egg-wash for a baked product; wherein the substitute egg-wash may provide film formation equivalent to or better than an egg-wash may comprise a natural egg white or a natural whole egg.

rOVA may comprise an amino acid sequence of SEQ ID NO: 61 or SEQ ID NO: 60 or an amino acid sequence with at least 70% identity to SEQ ID NO: 61 or SEQ ID NO: 60. rOVA may comprise an amino acid sequence of a duck OVA, an ostrich OVA, or a chicken OVA. In some cases, the rOVA is present in the egg-wash in an amount between 8% and 9% (w/w).

In some embodiments, described herein are large-scale production of recombinant ovalbumin (rOVA). A large-scale production of rOVA, may comprise an at least 1-liter liquid culture of microbial cells expressing the rOVA. In some cases, the large-scale production may comprise an at least 10-liter liquid culture of microbial cells expressing the rOVA. In some cases, the large-scale production may comprise an at least 100-liter liquid culture of microbial cells expressing the rOVA. In some cases, the large-scale production may comprise an at least 1000-liter liquid culture of microbial cells expressing the rOVA. In some cases, the large-scale production comprises an at least 10,000-liter liquid culture of microbial cells expressing the rOVA. In some cases, the large-scale production comprises an at least 100,000-liter liquid culture of microbial cells expressing the rOVA. In some cases, the large-scale production comprises about a 200,000-liter liquid culture of microbial cells expressing the rOVA.

In some embodiments, provided herein may be an ingredient composition for producing an egg-less food item comprising a recombinant ovalbumin. The recombinant ovalbumin may provide at least one egg white characteristic selected from the group consisting of gelling, foaming, whipping, fluffing, binding, springiness, aeration, coating, film forming, emulsification, browning, thickening, texturizing, humectant, clarification and cohesiveness.

The egg white characteristic provided by the recombinant ovalbumin may be substantially the same or better than the same characteristic provided by a native egg white. The composition may not contain any native egg white protein. The composition may not contain any animal products.

The composition may not contain any protein extracted from an egg. The color of the composition may be improved in whiteness or colorlessness as compared to a native egg white. The recombinant ovalbumin may comprise a polypeptide sequence derived from the group consisting of chicken, goose, quail, ostrich, and duck.

The recombinant ovalbumin may be sensory neutral with regard to taste, smell, mouthfeel or any combination thereof. The recombinant ovalbumin may provide the features of foaming and coagulation to the composition.

In some embodiments, provided herein are baked products comprising the ingredient composition provided herein. The recombinant ovalbumin may provide structure, texture or both structure and texture to the baked product. The recombinant ovalbumin may provide a protein fortification to the baked product. The recombinant ovalbumin may be at a concentration of between about 1% and about 20% (weight ovalbumin/weight product) in a baked product. The recombinant ovalbumin may be at a concentration of between about 0.1% and about 5% (weight ovalbumin/weight product) in a baked product.

The recombinant ovalbumin may be compatible with gluten formation. The baked product may be selected from the group consisting of cake, cookie, bagel, biscuit, bread, muffin, cupcake, scone, pancake, macaroon, meringue, choux pastry and soufflé. The cake made using such an ingredient may be pound cake, sponge cake, yellow cake, or angel food cake. The composition may further comprise one or more components selected from the group consisting of a sweetening agent, a gum, a hydrocolloid, a starch, a fiber, a plant protein, algal protein, a coloring agent and a flavoring extract.

The composition may provide one or more characteristics suitable for an egg-like dish, and wherein the characteristic may be selected from the group consisting of foaming, coagulation, binding, structure, texture, film-formation, nutritional profile, cholesterol free and protein fortification. In some embodiments, provided herein are egg-like dishes comprising the ingredient composition described herein. The egg-like dish may be selected from the group consisting of scramble, omelet, patty, soufflé, quiche and frittata. The egg-like dish may be vegan, vegetarian, halal or kosher.

The composition may provide one or more characteristics suitable for a processed meat product or meat-like product, and wherein the characteristic may be selected from the group consisting of high protein content, binding, and sensory neutrality. In some embodiments, provided herein are meat-like products, comprising the ingredient compositions provided herein.

The meat-like product may be selected from the group consisting of a burger, patty, sausage, hot dog, sliced deli meat, jerky, bacon, nugget and ground meat-like mixture or formed meat or meat-like composition. Ovalbumin may be present in an amount between about 0.1% and 30% in the meat-like product (weight ovalbumin/weight product).

The recombinant ovalbumin may provide the characteristic of binding suitable for adhesion of a food coating. A food coating may comprise the ingredients described herein. The food coating may be a batter or a breading. The recombinant ovalbumin may further provide the characteristic of crunchy texture to the food coating when cooked, baked or fried.

The recombinant ovalbumin may provide the characteristic suitable for a confectionary selected from the group consisting of odor neutrality, flavor, mouthfeel, texture, nutritional value and protein fortification. A confectionary product may comprise the ingredient compositions described herein. The confectionary may not contain egg or egg white. The confectionary may not contain any proteins extracted from egg or egg white. The recombinant ovalbumin may provide a firm or chewy texture to the confectionary. The recombinant ovalbumin may be present in an amount between about 0.1% and 15% (weight ovalbumin/weight confectionary). The confectionary may be a gummy, a taffy or a nougat.

The recombinant ovalbumin may provide a characteristic suitable for a dairy-like beverage selected from the group consisting of odor neutrality, flavor, mouthfeel, foaming, frothiness, texture, and nutritional value. A dairy-like beverage may comprise the ingredient compositions described herein. The dairy-like beverage may not contain egg or egg white. The beverage may be selected from the group consisting of smoothie, milkshake, "egg-nog", and coffee beverage. The recombinant ovalbumin may be present in an amount between about 0.1% and 20% (weight ovalbumin/volume beverage).

Recombinant ovalbumin may provide a characteristic suitable for a dessert product selected from the group consisting of creamy texture, low fat content, odor neutrality, flavor, mouthfeel, texture, binding, and nutritional value. A dessert product may comprise the ingredient compositions described herein. The dessert product may be selected from the group consisting of a mousse, a cheesecake, a custard, a pudding, a popsicle, a frozen dessert, and an ice cream. The dessert product may be vegan, vegetarian or dairy-free. The recombinant ovalbumin may be present in an amount between about 0.1% and 10% (weight ovalbumin/weight dessert product).

The recombinant ovalbumin may provide a characteristic suitable for a sauce or dressing selected from the group consisting of binding, emulsifying, odor neutrality, and mouthfeel. A sauce or dressing may comprise the ingredient compositions described herein. The sauce or dressing may be selected from the group consisting of salad dressing, mayonnaise, commercial mayonnaise substitutes, alfredo sauce, and hollandaise sauce. The sauce or dressing may not contain egg, egg white, or any protein extracted from egg.

The recombinant ovalbumin may provide a characteristic suitable for a snack food selected from the group consisting of binding, protein supplementation, flavor neutrality, odor neutrality, and mouth feel. A snack food may comprise the ingredient compositions described herein. The snack food may be a protein bar, a nutrition bar or a granola bar. The ingredient composition may further comprise one or more additional components selected from the group consisting of a sweetener, a gum, a plant protein, algal protein, a flavoring, a colorant, a thickener, an acidulant and an emulsifier.

In some embodiments, provided herein are methods of producing an egg white replacer. The egg-white replacer may comprise providing a recombinant ovalbumin; mixing the recombinant ovalbumin with at least one additional component to form the egg white replacer. The recombinant ovalbumin may provide at least one egg white characteristic selected from the group consisting of gelling, foaming, whipping, fluffing, binding, springiness, aeration, creaminess and cohesiveness to the egg white replacer. The egg white replacer may not contain any egg, egg white, protein extracted or isolated from egg. The at least one egg white characteristic may be the same or better than a native egg provided in the same amount or concentration (weight/volume).

The method may further comprise producing the recombinant ovalbumin in a heterologous host cell, wherein the host cell may be *E. coli*, yeast, filamentous fungus, or *Trichoderma*. The yeast or filamentous fungus may be selected from the group consisting of a *Saccharomyces* species and a *Pichia* species. The recombinant ovalbumin may be secreted from the host cell. The recombinant ovalbumin may be glycosylated by the host cell and wherein the glycosylation of the ovalbumin may be not identical to ovalbumin isolated from chicken egg.

The method may further comprise treating the secreted ovalbumin with a deglycosylation enzyme. The deglycosylation enzyme may be expressed by the host cell.

The host may comprise a nucleic acid sequence encoding the recombinant ovalbumin, and the recombinant ovalbumin has an amino acid sequence of an ovalbumin from an avian species. The host may comprise a nucleic acid sequence encoding the recombinant ovalbumin, and the recombinant ovalbumin has an amino acid sequence of an ovalbumin that has at least 95% sequence identity with an ovalbumin from an avian species. The avian species may be chicken, duck, goose, ostrich, or quail.

The ovalbumin from the avian species may be selected from the group consisting of SEQ ID NO. 60-133.

In some embodiments, provided herein is a recombinant protein composition for use as an egg-white replacer. The composition can comprise a recombinant ovalbumin and at least one additional component. The recombinant ovalbumin may provide at least one egg white characteristic selected from the group consisting of gelling, foaming, whipping, fluffing, binding, springiness, aeration, creaminess and cohesiveness to the composition. The composition may not contain any egg, egg white, protein extracted or isolated from egg. The at least one egg white characteristic may be the same or better than a native egg compared at the same amount or concentration (weight/volume).

The recombinant ovalbumin may have an amino acid sequence of an ovalbumin from an avian species. The recombinant ovalbumin may have an amino acid sequence of an ovalbumin that has at least 95% sequence identity with an ovalbumin from an avian species.

The avian species may be chicken, duck, goose, ostrich, or quail. The ovalbumin from the avian species may be selected from the group consisting of SEQ ID NO. 60-133.

An animal nutrition composition may comprise a recombinant ovalbumin (rOVA). The rOVA may be in a form selected from whole cell extract, fractionated cell extract and isolated protein. The composition may be comprised within a pet food, an animal feed, a chewy treat, bone broth, smoothie or other liquid for animal nutrition and a solid nutritional supplement suitable for animal consumption.

Additionally, any composition, food product, ingredient, use, or method disclosed herein is applicable to any herein-disclosed composition, food product, ingredient, use, or method. In other words, any aspect or embodiment described herein can be combined with any other aspect or embodiment as disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. The drawings and description are to be regarded as illustrative in nature, and not as restrictive. Any description herein concerning a specific composition and/or method apply to and may be used for any other specific composition and/or method as disclosed herein. Additionally, any composition disclosed herein is applicable to any herein-disclosed method. In other words, any aspect or embodiment described herein can be combined with any other aspect or embodiment as disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 2 illustrates rOVD solution properties with 4.23% w/v rOVD.

FIG. 3 illustrates rOVD solution clarity at about pH 4 and about pH 6 with 30% w/v rOVD after different heat treatments, measured using absorbance at 600 nm.

FIG. 17A: solution at time 0 hours and FIG. 17B: after 48 hours storage at 4° C.

FIG. 24 illustrates pound cakes and their cross-sections made using rOVA compared to cakes made using eggs.

FIG. 25 illustrates meringues made using rOVA compared to meringues made using eggs.

FIG. 26 illustrates heat coagulation and foaming properties of whole egg, egg white and native OVA solutions.

FIG. 27 illustrates heat coagulation and foaming properties of egg white and native OVA compared to rOVA.

FIG. 29 illustrates gelation results before and after foaming of various OVA samples compared to egg white.

FIGS. 31A-B illustrates emulsification results of nOVA, rOVA and egg white protein at acidic and neutral pH.

FIG. 32 illustrates foaming of rOVA and control samples in an alcohol-based drink.

FIG. 34 illustrates meringues made using rOVA samples and egg white proteins.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Provided herein are compositions and methods of making compositions for non-animal-based sources of proteins as useful source of consumable protein for ingestion by an animal, including a human, such as for daily diet, dietary supplementation, consumer food and beverage, and nutrition.

Provided herein are consumable compositions comprising ovomucoid (OVD). Such consumable compositions can be used in a food product, drink product, nutraceutical, pharmaceutical, cosmetic, or as an ingredient for a final product. In embodiments herein, the consumable composition is in a liquid form or a semi-solid form. In embodiments herein, the consumable composition is provided in a powdered form; this powder may be used to produce a liquid, solid, or semi-solid consumable composition. Preferably, the OVD in such consumable compositions is made recombinantly, and may be referred to herein as a recombinant OVD (rOVD).

Unless indicated otherwise, the term OVD includes both native OVD (nOVD) and rOVD. The nOVD or rOVD in the consumable compositions herein is provided in concentrations that both increase the protein content of the consumable composition and also maintain one or more additional characteristics such as high clarity, high solubility, reduced turbidity, or substantial sensory neutrality.

The use of rOVD in any of the consumable compositions herein allows for a non-animal-based source of protein, while providing additional features such as solubility, clarity, hardness, texture, mouthfeel, compatibility with heat treatment, compatibility with pH ranges and maintaining a consumer-favorable sensory profile. Various embodiments of such compositions, methods of making them, and methods of using them are provided herein.

In some embodiments, the compositions and methods for making compositions herein increase the protein content of a consumable, and also provide additional features such as compatibility with other ingredients (such as, for example, compatibility with gluten, vitamins, minerals, and carbonation), coloration, smell, taste and compatibility with food and beverage preparation and/or storage conditions.

Figure 1A:
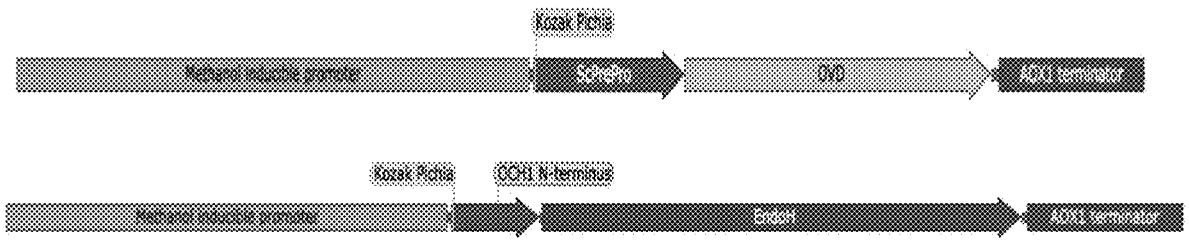
FIG. 1A illustrates the vector constructs used for the expression of rOVD.
Figure 1B:
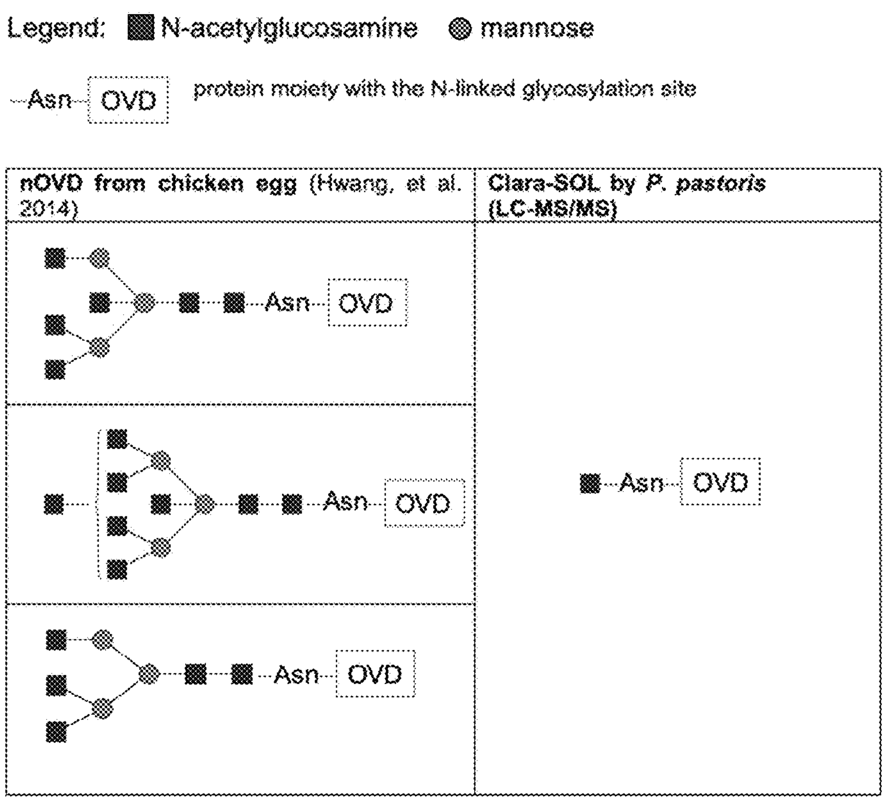
FIG. 1B illustrates a comparison in the glycosylation pattern of native ovomucoid and a recombinant ovomucoid produced in *P. pastoris* and according to the present disclosure. Shown is a lack of the complex branched glycosylation (including a lack of mannose residues) on the recombinant ovomucoid when produced in a strain of *P. pastoris* comprising endoglycosidases.
Figure 1C:
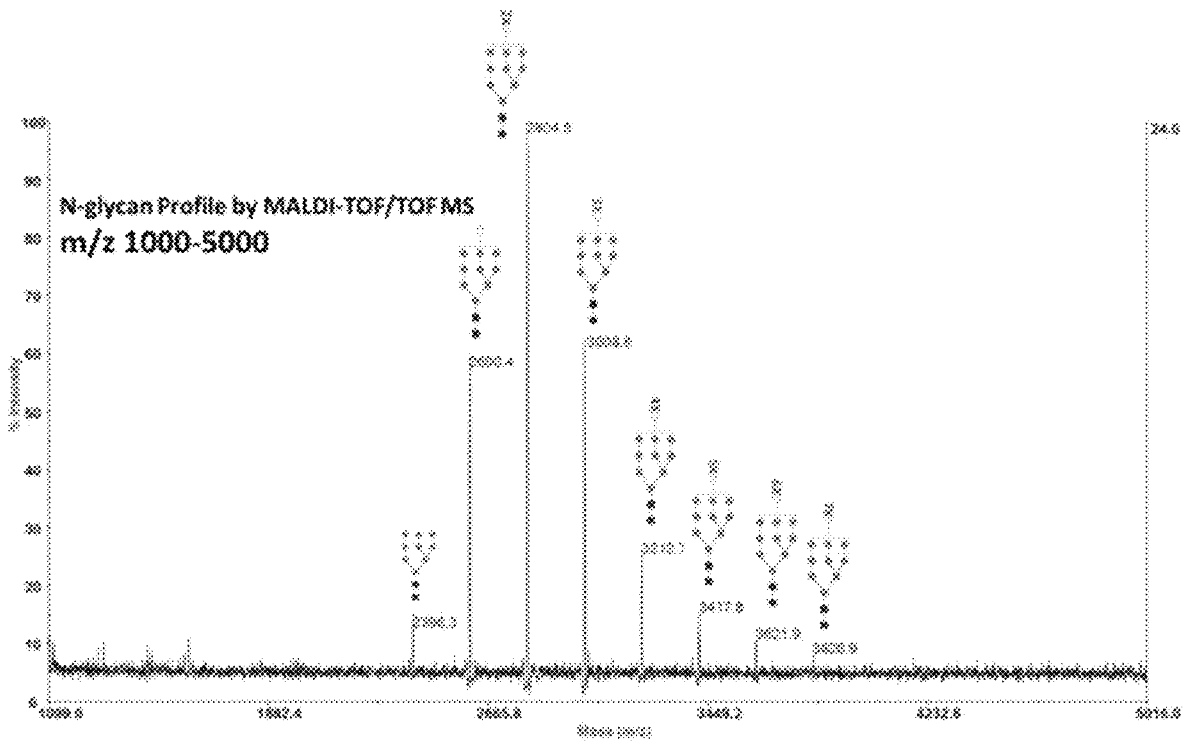
FIG. 1C illustrates the glycosylation patterns of the recombinant OVD produced by *P. pastoris* without an endoglycosidase treatment. rOVD thus produced have complex branched glycosylation patterns.

Native ovomucoid (nOVD), such as isolated from a chicken or other avian egg, has a highly complex branched form of glycosylation. The glycosylation pattern comprises N-linked glycan structures such as N-acetylglucosamine units and N-linked mannose units. See, e.g., FIG. 1B (left-hand column). In some cases, the rOVD for use in a herein disclosed consumable composition and produced using the methods described herein has a glycosylation pattern which is different than the glycosylation pattern of nOVD. For example, when rOVD is produced in a *Pichia* sp., the protein may be highly glycosylated. FIG. 1C illustrates the glycosylation patterns of rOVD produced by *P. pastoris*, showing a complex branched glycosylation pattern. In some embodiments of the compositions and methods herein, rOVD is treated such that the glycosylation pattern is modified from that of nOVD and also modified as compared to rOVD produced by a *Pichia* sp. without such treatment. In some cases, the rOVD has no glycosylation. In other cases, the rOVD has reduced glycosylation. In some cases, the rOVD is modified by N-acetylglucosamine at one or more asparagine residues of the protein and lacks or is substantially devoid of N-linked mannosylation. See, e.g., FIG. 1B (right hand column). The changes in glycosylation described herein may lead to an increase in the solubility and clarity of rOVD as compared to other forms of protein such as whey proteins, soy proteins, pea proteins, and nOVD. The modifications in glycosylation of rOVD may lead to a change in the nitrogen to carbon ratio of the protein, such that reducing or removing substantially all of the mannose residues, the nitrogen to carbon ratio is increased (such as compared to nOVD or to rOVD produced without the modification to the glycosylation pattern).

In some embodiments, the composition is a consumable food product. In some embodiments, the consumable food product is a finished product. In some embodiments, the composition is an ingredient of a finished product, e.g., a powder comprising rOVD or consisting essentially of rOVD.

As used herein, the term "consumable food composition" refers to a composition, which comprises an isolated protein and may be consumed by an animal, including but not limited to humans and other mammals. Consumable food compositions include food products, beverage products, dietary supplements, food additives, and nutraceuticals, as non-limiting examples.

Consumable food compositions also include compositions as an ingredient of a food or beverage or a product ingested as part of an animal diet.

Since the rOVD of the present disclosure is not obtained from an animal source, a consumable composition comprising the rOVD is considered vegetarian and/or vegan.

As used herein, a "finished product" refers to a consumable food composition directed to or suitable itself as a food or beverage for animal consumption. As used herein, an "ingredient" or "component" in reference to a consumable food composition refers to a composition that is used with other ingredient(s) or component(s) to create a finished product.

Compositions with rOVD

Provided herein are consumable food compositions and methods of making such compositions that increase the protein content of a consumable food composition through the addition of a recombinant ovomucoid protein (rOVD). In some embodiments, rOVD is added to a consumable food composition to increase the protein content, such as for added nutrition. In some embodiments, rOVD is present in the consumable food composition between about 1% and about 40% on a weight per total weight (w/w) and/or weight per total volume (w/v) of composition basis. For example, in a composition of 100 ml, rOVD is present at 30 g and the rOVD is thus at a 30% concentration. In some embodiments, the concentration of rOVD is or is about 1%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% on a w/w and/or w/v of composition basis. In some embodiments, the rOVD is present at a concentration of or of about 1-5%, 5-10%, 10-15%, 15-20%, 20-25%, 25-30% or rOVD is present concentration greater than 5%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% w/w and/or w/v.

A consumable product can include one or more other proteins, such as a non-OVD protein or a non-recombinant protein. The rOVD can increase amount of protein content in a consumable product, and/or it can also increase solubility of the one or more other proteins. For example, the consumable composition can include a whey protein, a pea protein, a soy protein, an almond protein, an oat protein, a flax seed protein, a vegetable protein, or an egg-white protein. In some cases, the one or more other proteins can comprise OVD having an amino acid sequence naturally found in an avian or a reptile.

In some embodiments, the compositions and methods for making compositions increase the protein content, and provide solubility of the protein in the composition, as well as maintain or not substantially reduce the clarity of the composition. In some embodiments, the compositions and methods for making compositions increase the protein content, and provide solubility and maintain clarity, while not adversely affecting the stability, or one or more sensory qualities of the composition.

In some embodiments, the consumable food compositions and methods for making consumable food compositions comprise rOVD and the rOVD increases the protein content of the consumable food composition and the rOVD is substantially soluble in the consumable food composition. The consumable food composition may be a finished product or an ingredient for making a finished product, e.g., a powdered rOVD composition.

rOVD protein may be used on its own or in combination with other components to form a composition. In some embodiments, a composition may contain about or at least about 10%, 20%, 30%, 40%, 50%, 55%, 60%, 65%, 70%, 75%, 80%, 85%, 90%, 95%, 96%, 97%, 98%, or 99% protein, e.g., rOVD, by weight per total weight (w/w) and/or weight per total volume (w/v). In some cases, a composition described herein may contain up to about 10%, 20%, 30%, 40%, 50%, 55%, 60%, 65%, 70%, 75%, 80%, 85%, 90%, 95%, 96%, 97%, 98%, or 99% protein, e.g., rOVD, by w/w or w/v.

In some embodiments, a composition described herein contains total protein at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, or 75 g total protein per 100 mL liquid (e.g., water). In some cases, a composition described herein contains total protein at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, 75, 80, 85, 90, 95, or 100 g total protein per 100 g composition (e.g., powder).

In some embodiments, a composition described herein contains total protein at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g total protein per 100 mL liquid (e.g., water). In some cases, a composition described herein contains total protein at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g total protein per 100 g composition (e.g., powder).

In some embodiments, the rOVD consumable composition is a liquid composition. In such cases, the concentration of rOVD in the liquid composition may be between 0.1% to 40%. The concentration of rOVD in the liquid composition may be at least 0.1%. The concentration of rOVD in the liquid composition may be at most 40%. The concentration of rOVD in the liquid composition may be from 0.1% to 1%, 0.1% to 5%, 0.1% to 10%, 0.1% to 15%, 0.1% to 20%, 0.1% to 25%, 0.1% to 30%, 0.1% to 35%, 0.1% to 40%, 1% to 5%, 1% to 10%, 1% to 15%, 1% to 20%, 1% to 25%, 1% to 30%, 1% to 35%, 1% to 40%, 5% to 10%, 5% to 15%, 5% to 20%, 5% to 25%, 5% to 30%, 5% to 35%, 5% to 40%, 10% to 15%, 10% to 20%, 10% to 25%, 10% to 30%, 10% to 35%, 10% to 40%, 15% to 20%, 15% to 25%, 15% to 30%, 15% to 35%, 15% to 40%, 20% to 25%, 20% to 30%, 20% to 35%, 20% to 40%, 25% to 30%, 25% to 35%, 25% to 40%, 30% to 35%, 30% to 40%, or 35% to 40% in weight per total volume (w/v). The concentration of rOVD in the liquid composition may be about 0.1%, 1%, 5%, 10%, 15%, 20%, 25%, 30%, 35%, or 40% w/v. The concentration of rOVD in the liquid composition may be at least 0.1%, 1%, 5%, 10%, 15%, 20%, 25%, 30% or 35% w/v. The concentration of rOVD in the liquid composition may be at most 1%, 5%, 10%, 15%, 20%, 25%, 30%, 35% or 40% w/v.

In some embodiments, the rOVD consumable composition is a solid composition. In such cases, the concentration of rOVD in the solid composition may be between 0.1% to 70%. The concentration of rOVD in the solid composition may be at least 0.1%. The concentration of rOVD in the solid composition may be at most 70%. The concentration of rOVD in the solid composition may be 0.1% to 1%, 0.1% to 10%, 0.1% to 20%, 0.1% to 30%, 0.1% to 40%, 0.1% to 50%, 0.1% to 60%, 0.1% to 70%, 1% to 10%, 1% to 20%, 1% to 30%, 1% to 40%, 1% to 50%, 1% to 60%, 1% to 70%, 10% to 20%, 10% to 30%, 10% to 40%, 10% to 50%, 10% to 60%, 10% to 70%, 20% to 30%, 20% to 40%, 20% to 50%, 20% to 60%, 20% to 70%, 30% to 40%, 30% to 50%, 30% to 60%, 30% to 70%, 40% to 50%, 40% to 60%, 40% to 70%, 50% to 60%, 50% to 70%, or 60% to 70% weight per total weight (w/w) and/or weight per total volume (w/v). The concentration of rOVD in the solid composition may be 0.1%, 1%, 10%, 20%, 30%, 40%, 50%, 60%, or 70% w/w or w/v. The concentration of rOVD in the solid composition may be at least 0.1%, 1%, 10%, 20%, 30%, 40%, 50% or 60% w/w or w/v. The concentration of rOVD in the solid composition may be at most 1%, 10%, 20%, 30%, 40%, 50%, 60%, or 70% w/w or w/v.

In some embodiments, the rOVD consumable composition is a powdered composition. In such cases, the concentration of rOVD in the powder composition may be between 15% to 99% weight per total weight (w/w) and/or weight per total volume (w/v). The concentration of rOVD in the powder composition may be at least 15% w/w or w/v. In embodiments, the concentration of rOVD in the powder composition may be at most 99% w/w or w/v. The concentration of rOVD in the powder composition may be 15% to 30%, 15% to 45%, 15% to 60%, 15% to 75%, 15% to 80%, 15% to 85%, 15% to 90%, 15% to 95%, 15% to 99%, 30% to 45%, 30% to 60%, 30% to 75%, 30% to 80%, 30% to 85%, 30% to 90%, 30% to 95%, 30% to 99%, 45% to 60%, 45% to 75%, 45% to 80%, 45% to 85%, 45% to 90%, 45% to 95%, 45% to 99%, 60% to 75%, 60% to 80%, 60% to 85%, 60% to 90%, 60% to 95%, 60% to 99%, 75% to 80%, 75% to 85%, 75% to 90%, 75% to 95%, 75% to 99%, 80% to 85%, 80% to 90%, 80% to 95%, 80% to 99%, 85% to 90%, 85% to 95%, 85% to 99%, 90% to 95%, 90% to 99%, or 95% to 99% w/w or w/v. The concentration of rOVD in the powder composition may be about 15%, 30%, 45%, 60%, 75%, 80%, 85%, 90%, 95%, or 99% w/w or w/v. The concentration of rOVD in the powder composition may be at least 15%, 30%, 45%, 60%, 75%, 80%, 85%, 90% or 95% w/w or w/v. The concentration of rOVD in the powder composition may be at most 30%, 45%, 60%, 75%, 80%, 85%, 90%, 95%, or 99% w/w or w/v.

In some embodiments, the rOVD consumable composition is a concentrated syrup composition. In such cases, the concentration of rOVD in the syrup composition may be between 10% to 60% weight per total weight (w/w) and/or weight per total volume (w/v). The concentration of rOVD in the syrup may be at least 10% w/w or w/v. The concentration of rOVD in the syrup may be at most 60% w/w or w/v. The concentration of rOVD in the syrup may be 10% to 20%, 10% to 30%, 10% to 40%, 10% to 50%, 10% to 60%, 20% to 30%, 20% to 40%, 20% to 50%, 20% to 60%, 30% to 40%, 30% to 50%, 30% to 60%, 40% to 50%, 40% to 60%, or 50% to 60% w/w or w/v. The concentration of rOVD in the syrup may be about 10%, 20%, 30%, 40%, 50%, or 60% w/w or w/v. The concentration of rOVD in the syrup may be at least 10%, 20%, 30%, 40% or 50% w/w or w/v. The concentration of rOVD in the syrup may be at most 20%, 30%, 40%, 50%, or 60% w/w or w/v. The syrup may include any solvent, e.g., water and juice.

Solubility and Clarity

Provided herein, in particular, are compositions of OVD where the OVD protein remains soluble in the composition. In some embodiments of any composition described herein, the proteins are fully soluble at a protein concentration between the lowest amounts of rOVD (e.g., 0.1 g or less) and in increasing amounts up to and including about 30 or 40 grams of rOVD protein per 100 mL of solution. In some embodiments of any composition described herein, the proteins are fully soluble at a concentration of about 1, 2, 5, 7, 10, 12 or 15 g, total OVD protein per 100 mL volume, for example when formulated in a liquid such as water. In some embodiments of any composition described herein, the proteins are fully soluble at a concentration of about 15, about 20, about 25, about 30, or about 40 g, total OVD protein per 100 mL volume, for example when formulated in a liquid such as water. In the compositions herein, the OVD may be native OVD or a recombinant OVD. In some embodiments, OVD is an isolated recombinant protein. In some embodiments, OVD is rOVD with modified glycosylation, such as having one or more asparagine residues modified by N-acetylglucosamine and substantially devoid of N-linked mannosylation.

Solubility of rOVD may be measured by a variety of techniques including visual detection and measuring absorbance of the solution at a wavelength of 600 nm (OD600). In some embodiments, solubilized protein composition described herein have absorbance less than 1 (<1) as measured using 600 nm wavelength. In some embodiments, solubilized rOVD compositions described herein have an observed measured transmittance at 600 nm of greater than about 90%, 91%, 92%, 93%, 94%, 95%, 96%, 97%, 98% or 99%. In some embodiments, the addition of rOVD to a composition does not change or only slightly changes the OD600 measurement as compared to the composition without rOVD.

In some embodiments, the addition of rOVD to a composition may increase the OD600 measurement as compared to the composition without rOVD and the increase is less than what would be seen with the addition of another protein, such as whey protein or a native OVD added to the composition in the same amount.

In some embodiments, the addition of rOVD to a composition has a solubility better than whey protein or native OVD, when compared at the same protein concentration and under equivalent conditions (such as pH and temperature treatment). In some embodiments, the addition of rOVD to a composition has a solubility better than whey protein or native OVD when compared at the same protein concentration and the composition is a consumable food composition such as an ingredient or a finished product.

"Clear" or "clarity" as used herein refers to a lack of turbidity. Clarity may be assessed by visual observation, including by comparison to a solution that has no protein included. Such comparisons can be made by machine, by an individual or by a panel of testers, e.g., testers trained in the art of detecting clarity. Clarity of a solution can be tested by a panel of (at least 3, 5, 7, 10, or 12 individuals) or people skilled at such tests. Preferably, at least a majority of testers may be unable to visibly differentiate the rOVD composition from a solution comprising no protein, or a different protein at the same concentration.

In some embodiments, the rOVD compositions exhibit improved clarity as compared to composition with other compositions having a different protein at an equivalent concentration, such as a composition containing pea protein, whey isolates or whey protein, native egg white proteins (e.g., nOVD), or whole egg white. In some embodiments, at least a majority or more of testers may be unable to visibly differentiate the rOVD added to a composition from a solution comprising no protein.

A clear solution may be colored or may be colorless. In some embodiments, a solubilized rOVD protein in a composition may have a lack of color as measured by less than 0.15 absorbance at wavelengths between 350 nm and 850 nm. In some embodiments, a solubilized rOVD protein in a composition may provide a color such as yellow, green or brown or shades thereof to a consumable food composition. In some cases, rOVD and/or the solubilized rOVD protein may be treated with an oxidizing agent or oxygen generating agent to modify the color of the solution to a lighter or less intense color.

In some embodiments, a composition of rOVD in solution, such as in a liquid consumable food composition, is essentially clear at a protein concentration between the lowest amounts of rOVD (e.g., 0.1 g) and in increasing amounts up to and including about 30 grams of rOVD protein per 100 mL of solution. In some embodiments, a composition of rOVD in solution, such as in a liquid consumable food composition, is essentially clear at a high protein concentration of about 10, 11, 12, 13, 14, 15, 16, 17, 18, 19, 20, 21, 22, 23, 24, 25, 26, 27, 28, 29 or 30 grams of rOVD protein per 100 mL of solution. In some embodiments, an rOVD composition is essentially clear with at least about 9, 10, 11, 12, 13, 14, 15, 16, 17, 18, 19, 20, 21, 22, 23, 24, 25, 26, 27, 28, 29, or 30 g of total rOVD protein per 100 mL of solution (e.g., such as in 100 mL of water).

In some embodiments, an rOVD composition has a clarity better than whey protein, such as whey protein isolate or whey protein concentrate, when compared at the same protein concentration and under equivalent conditions (such as pH and temperature). In some embodiments, an rOVD composition has a clarity better than whey protein when compared at the same protein concentration and the rOVD composition is a component of a consumable food composition such as a finished product or as an ingredient in a finished product.

In some embodiments, an rOVD composition has a clarity better than native OVD (nOVD) when compared at the same protein concentration and under equivalent conditions (such as pH and temperature). In some embodiments, an rOVD composition has a clarity better than an nOVD composition when compared at the same protein concentration and the rOVD composition is a component of a consumable food composition such as a finished product or as an ingredient in a finished product.

In some embodiments herein, a composition of rOVD has both substantial solubility and is substantially clear at concentrations at least about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water).

In some cases, rOVD remains soluble and clear in a consumable composition when the composition is heated to a temperature greater than 50° C., 60° C., or 70° C. or between about 70° C. and about 120° C., even when the rOVD is at a concentration of at least 2%, 4%, 10%, 20, 30%, 40%, or 50% on a w/v basis.

In one instance, clarity of a consumable composition herein is determined using absorbance of visible light, such as by measuring absorbance of the solution at a wavelength of 600 nm (OD600). Preferably, a liquid or semi-liquid consumable composition herein has an absorbance that is less than 1.2, 1.1, 1, 0.5, 0.4, 0.3, 0.2, 0.1, 0.09, 0.08, 0.07, 0.06, 0.05 or 0.04 when determined using visible light at 600 nm. Other methods to measure solubility include examining solubility by centrifuge concentration followed by protein concentration assays such as Coomassie Plus (Bradford) Protein Assay (Thermo Scientific) and Bicinchoninic Acid (BCA) Protein Assay (Sigma-Aldrich).

In some instances, clarity of a consumable composition is one that is not substantially different from the clarity of the solution before the addition of rOVD. For example, an addition of rOVD to a solution (consumable composition) does not change or does not substantially change (change of less than 0.03, 0.02, 0.01) the OD600 measurement as compared to the composition without rOVD.

Thus, a consumable composition comprising rOVD may have a clarity less than 2 as measured at OD600 in room temperature, with a concentration of rOVD of at least or about 10%, 15%, 20%, 25%, or 30% rOVD weight per total weight (w/w) and/or weight per total volume (w/v). Alternatively, a solution comprising rOVD at a concentration greater than 10% w/w or w/v can have a clarity that is less than 2, 1.8, 1.6, 1.4, 1.2, 1, 0.8, 0.6, 0.4, 0.2, 0.1, 0.08, 0.06, 0.04 or 0.02 as measured at OD 600 in room temperature. A substantially optically clear solution may refer to a solution where the OD600 measurement is less than or equal to about 0.1. In some cases, a substantially optically clear solution has an OD600 measurement of less than 0.08, 0.06, 0.05 or 0.02.

In some embodiments, addition of rOVD increases the protein concentration by at least 1%, 2%, 3%, 4%, 5%, 6%, 7%, 8%, 9%, 10%, 11%, 12%, 13%, 14%, 15%, 16%, 17%, 18%, 19% or 20% weight per total weight (w/w) and/or weight per total volume (w/v) without reducing clarity or increasing turbidity by more than 1%, 2%, 3%, 4%, 5%, 6%, 7%, 8%, 9%, or 10% w/w or w/v of the solution as compared to the solution before introduction of the rOVD.

In some embodiments, rOVD protein may be added in an amount (such as a percentage by total weight or volume of the consumable food composition) that is greater than what could be added with other protein sources used in edible products such as whey proteins (such as whey protein isolate (WPI) and whey protein concentrate (WPC)), all embodiments of pea protein, soy protein, whole egg or egg white proteins (e.g., native OVD), while still maintaining the solubility, or solubility and clarity properties of the composition.

Sensory Neutrality and Improved Sensory Appeal

In some embodiments, in addition to the increased protein nutrition content, the addition of rOVD to a consumable food composition provides sensory neutrality or an improved sensory appeal as compared to other proteins in such compositions. As used herein "sensory neutrality" refers to the absence of a strong or distinctive taste, odor (smell) or combination of taste and smell, as well as texture, mouth-feel, aftertaste and color. A sensory panel such as one described in Kemp et al. 2009 may be used by a panel of trained analysts. Sensory neutrality may provide an improved sensory appeal to a taster, such as a tester of foods or a consumer, when a consumable food composition containing rOVD with another like composition that has a different protein such as whey protein, pea protein, soy protein, whole egg or egg white protein at the same concentration.

In some embodiments, rOVD when added to a consumable food composition is substantially odorless, such as measured by a trained sensory panel, in comparison with different solutions with a different protein component present in an equal concentration to the rOVD containing solution, for example, in the comparison is whey, soy, collagen, pea, egg white solid isolates and/or native OVD. In some embodiments of the rOVD compositions described herein, such compositions are essentially odorless at a protein concentration between about 5-10%, 10-15%, 15-20%, 20-25%, 25-30% or greater than 30% rOVD weight per total weight (w/w) and/or weight per total volume (w/v) or at a protein concentration of about 10, 11, 12, 13, 14, 15, 16, 17, 18, 19, 20, 21, 22, 23, 24, 25, 26, 27, 28, 29, 30 or more than 30 g of total rOVD protein per 100 mL solution (e.g., per 100 mL water).

In some embodiments, the addition of rOVD to a consumable food composition also provides a neutral taste in addition to the characteristics such as increased protein nutrition content, solubility, clarity, and/or odorless. A neutral taste can be measured for example, by a trained sensory panel in comparison with solutions containing a different protein present in an equal concentration to the rOVD, for example, whey, soy, collagen, pea, whole egg, and egg white solid isolates (including native OVD).

In some embodiments, the addition of rOVD provides a reduction in a certain odor and/or taste that is associated with other proteins used for supplementation. For example, addition of rOVD has less of an "egg-like" odor or taste as compared to the addition of whole egg, fractionated egg or egg-white to a consumable food composition. In some embodiments, addition of rOVD has less of a metallic odor or taste as compared to other protein sources.

In some embodiments, the addition of rOVD has an improved mouth-feel as compared to the addition of other protein sources. For example, the addition of rOVD is less grainy or has less precipitate or solids as compared to other protein sources.

In some embodiments, the addition of rOVD has an improved texture, for example, as compared to other available supplemental protein sources.

In some embodiments, the addition of rOVD has an improved or appealing color or visual appeal as compared to other available supplemental protein sources. For example, the addition of rOVD may maintain the clarity of a liquid (such as a carbonated drink, a protein water, sports drink) and provide visual appeal for the consumer.

A consumable composition with rOVD may also have an improved sensory appeal as compared to the composition without rOVD or with a different protein present in an equal concentration to the rOVD. Such improved sensory appeal may relate to taste and/or smell. Taste and smell can be measured, for example, by a trained sensory panel. In some instances, a sensory panel compares a consumable composition with rOVD to one without it or with a different protein in an equivalent amount.

As described herein, a consumable composition herein can be in a liquid form. A liquid form can be an intermediate product such as soluble rOVD solution. In some cases, a liquid form can be a final product, such as a beverage comprising rOVD. Example of different types of beverages contemplated herein include: a juice, a soda, a soft drink, a flavored water, a protein water, a fortified water, a carbonated water, a nutritional drink, an energy drink, a sports drink, a recovery drink, a heated drink, a coffee-based drink, a tea-based drink, a plant-based milk, a milk based drink, a non-dairy, plant based mild drink, infant formula drink, and a meal replacement drink.

Non-limiting examples of juice drinks include Odwalla®, Naked®, and MinuteMaid®.

Non-limiting examples of soda drinks include: Coca-Cola®, Pepsi®, Sprite® and 7Up®.

Non-limiting examples of recovery drinks include Gatorade™, Pedialyte®, Poweradeo and Propel®.

Non-limiting examples of an energy drink include Red Bull™, Monster™, Full Throttle®, AMP®, Rockstar®, Bang™, Reign™, NOS®, Venom®, and energy shots such as 5-Hour Energy™.

Other examples of liquid form final products include broth, soup and liquid food.

A liquid form can be a cold drink, a hot or warm drink, or a room-temperature drink Any of the liquid forms herein can be carbonated. Carbonation can be achieved using any safe gas such as carbon dioxide.

In one embodiment, a consumable composition is sparkling water (such as San Pellegrino™) and has between 0.5 and 30% w/w or w/v rOVD. Such product has an OD 600 less than 0.2, preferably less than 0.15 while remaining essentially colorless, odorless and tasteless.

In one embodiment, a consumable composition is a soda drink (such as Diet Coke™ Pepsi™, Coke™) and has between 0.5 and 30% w/w or w/v rOVD. Such product retains a sensory profile (taste, odor, smell and clarity) comparable to the composition without the addition of rOVD.

In some embodiments, a consumable composition is in a semi-sold form. Examples of semi-solid consumable compositions include: a jelly, a candy, a broth, a soup, a syrup, a gelatin-containing product, a gelled product, and a gummy product, or a combination thereof.

Compatibility with Additional Ingredients

Provided herein are compositions with rOVD wherein the rOVD is compatible with one or more additional ingredients that are used in the preparation of a consumable food composition, including a finished product. Such compatibility provides fortification of protein content to the consumable food composition, while maintaining one or more desired characteristics of the consumable food composition.

In some embodiments, rOVD is compatible with gluten-containing ingredients. For example, rOVD can be added with a gluten-containing ingredient to achieve protein fortification and maintain gluten-structure necessary for the ingredient and/or finished product. For example, rOVD can be used as an ingredient for the production of protein fortified baked goods, a bread, a cookie, a cracker, a biscuit, a frozen dairy product, a frozen "dairy-like" product, a prepared meal, a meat product, a meatless product, a burger, a patty, a protein supplement, a snack bar, a protein bar, a nutrition bar, an energy bar, a dessert, a salad dressing, an egg-wash product, or an "egg-like" product, pastries, cakes and noodles. In the finished product, the rOVD does not substantially interfere with the gluten structure or has a substantially reduced interference with gluten structure as compared to other protein sources.

In some embodiments, rOVD is compatible with gluten-free ingredients. For example, rOVD can be added with a gluten-free ingredient mix to achieve protein fortification and provide structure and/or texture to the finished product. Gluten-free ingredients and finished products include such grains and starches (rice, corn, sorghum, and other cereals), root tubers such as potato, and legumes and pulses such as chickpeas and lentils. For example, rOVD can be used as an ingredient for the production of protein fortified gluten-free products including baked goods, a bread, a cookie, a cracker, a biscuit, a frozen dairy product, a frozen "dairy-like" product, a prepared meal, a meat product, a meatless product, a burger, a patty, a protein supplement, a snack bar, a protein bar, a nutrition bar, an energy bar, a dessert, or an "egg-like" product, pastries, cakes and noodles.

In some embodiments, rOVD is compatible with salts such that rOVD protein does not precipitate out from solution. For example, for use in foods and beverages such as protein smoothies, vegan milk and fruit juices fortified with rOVD, the protein remains substantially in solution. Addition of rOVD does not precipitate in vitamin/mineral fortified environment such as present with fruit juice and juice-like products, and rOVD provides increased protein content and nutrition.

rOVD Combinations with a Second Source of Amino-Acids

In some embodiments, rOVD is added to a consumable food composition and a second source of amino acids is added, such that the combination has an increased protein content and provides a desired amount or balance of amino acid content. In some embodiments, the second source of amino acids is a second protein (either a native protein or a recombinant protein). In some embodiments, the second source of amino acids is provided by adding one or more free amino acids.

In some embodiments, rOVD is added to a consumable food composition and a second protein is added, such that the combination has an increased protein content and provides a desired amount or balance of amino acid content. In some embodiments, the second protein is a recombinant protein. In some embodiments, the second protein is a native protein, e.g., isolated from its native source.

Protein content of compositions can be measured by various methods such as the protein digestibility-corrected amino acid score (PDCAAS) method. PDCAAS refers to a method for the measurement of the protein value in human nutrition. The method is based on comparison of the concentration of the first limiting essential amino acid in the test protein with the concentration of that amino acid in a reference (scoring) pattern. The method compares the amino acid profile of the specific food protein against a standard amino acid profile with the highest possible score being a 1.0, such 1.0 score meaning the specific food protein provides per unit of protein 100% or more of the indispensable amino acids required for human nutrition (see e.g., FAO/WHO/UNU Expert Consultation 1985).

The formula for calculating the PDCAAS percentage is: (mg of limiting amino acid in 1 g of test protein/mg of same amino acid in 1 g of reference protein)×fecal true digestibility percentage. PDCAAS scores above 1.0 are truncated to 1.0. Amino acid score (not corrected or truncated) can exceed 1.0.

In some embodiments, the combination of rOVD and a second protein increases the protein content and provides a PDCAAS of greater than about 0.75. In some embodiments, the combination provides a PDCAAS of or of about 0.75, 0.76, 0.77, 0.78, 0.79, 0.80, 0.81, 0.82, 0.83, 0.84, 0.85, 0.86, 0.87. 0.88, 0.89, 0.90, 0.91, 0.92, 0.93, 0.94, 0.95, 0.96, 0.97, 0.98, 0.99 or 1.0. In some embodiments, the combination provides a PDCAAS of greater than or greater than about 0.75, 0.76, 0.77, 0.78, 0.79, 0.80, 0.81, 0.82, 0.83, 0.84, 0.85, 0.86, 0.87. 0.88, 0.89, 0.90, 0.91, 0.92, 0.93, 0.94, or 0.95. In some embodiments the combination provides a PDCAAS of or of about 1.0.

In some embodiments, the ratio of rOVD and second protein is selected to provide a PDCAAS of at least about 0.75 and wherein the combination of rOVD and second protein remains soluble in the consumable food composition. In some embodiments of a herein-disclosed combination of rOVD and a second protein, rOVD is present in the combination at or at about 95%, 90%, 89%, 88%, 87%, 86%, 85%, 84%, 83%, 82%, 81%, 80%, 79%, 78%, 77%, 76%, 75%, 74%, 73%, 72%, 71%, or 70% weight per total weight (w/w) and/or weight per total volume (w/v). In some embodiments of a herein-disclosed combination of rOVD and a second protein, rOVD is present in the combination at or at about 69%, 78%, 67%, 66%, 65%, 64%, 63%, 62%, 61%, 60%, 59%, 58%, 57%, 56%, 55%, 54%, 53%, 52%, 51%, or 50% w/w or w/v. In some embodiments of the combination of rOVD and the second protein, rOVD is present in the combination in a percentage of total protein at least or at least about 60%, 65%, 70%, 75%, 80% or greater than 80% w/w or w/v. In some embodiments of a herein-disclosed combination of rOVD and a second protein, the second protein is present in the combination at an above percentage, such the rOVD is provided in a lesser amount than the second protein.

In some embodiments, a second protein is selected based on its amino acid composition. In some embodiments, a second protein provides tryptophan to the composition. In some embodiments, a second protein provides tryptophan such that the combination with rOVD has a tryptophan content of at least about 1.7 g per 100 g total protein.

In some embodiments, the second protein is lysozyme. In some embodiments, the second protein is egg white lysozyme. In some embodiments, the second protein is a recombinant protein. In some embodiments, the second protein is a recombinant egg white lysozyme (rOVL).

The rOVD and rOVL can be processed or mixed together prior to mixing with any other food ingredients or consumable food products. Alternatively, either the rOVD or the rOVL can be processed or mixed individually, either at the same time or separately, with any other food ingredients or consumable food products. In embodiments, a single transformed cell expresses both rOVL and rOVD.

In some embodiments, the second protein is rOVL and the combination of rOVD and rOVL provides protein fortification while remaining soluble in the composition and providing a PDCAAS of about 1.0. The ratio of rOVD to rOVL can be between about 60% rOVD:40% rOVL to about 82% rOVD:18% rOVL, or between about 75% rOVD:25% rOVL to about 82% rOVD:18% rOVL weight per total weight (w/w) and/or weight per total volume (w/v).

Native OVD has a PDCAAS of approximately 0.02. Addition of rOVL to rOVD increases the amino acid score and PDCAAS of the combination. As an example, a 78.3% rOVD and 21.7% rOVL blend result in an amino acid score of 0.86 and a PDCAAS of 0.79. With a ratio of rOVD to rOVL from about 78.3% rOVD+21.7% rOVL to about 60% rOVD+40% rOVL provides a range of 0.86 to 1.06 amino acid score. In these exemplary ranges, the combination of rOVD and rOVL remains soluble.

In some embodiments, a consumable composition comprises a protein mixture of rOVD and rOVL. In some cases, a composition comprising a mixture of rOVD and rOVL has about 20%-99% rOVD and 1-20% rOVL. In some examples, the concentration of rOVD in a protein mixture of rOVD and rOVL may be at least 20%. The concentration of rOVD in a protein mixture of rOVD and rOVL may be at most 99%. The concentration of rOVD in a protein mixture of rOVD and rOVL may be about 20% to 30%, 20% to 40%, 20% to 50%, 20% to 60%, 20% to 70%, 20% to 80%, 20% to 90%, 20% to 99%, 30% to 40%, 30% to 50%, 30% to 60%, 30% to 70%, 30% to 80%, 30% to 90%, 30% to 99%, 40% to 50%, 40% to 60%, 40% to 70%, 40% to 80%, 40% to 90%, 40% to 99%, 50% to 60%, 50% to 70%, 50% to 80%, 50% to 90%, 50% to 99%, 60% to 70%, 60% to 80%, 60% to 90%, 60% to 99%, 70% to 80%, 70% to 90%, 70% to 99%, 80% to 90%, 80% to 99%, or 90% to 99% weight per total weight (w/w) and/or weight per total volume (w/v). The concentration of rOVD in a protein mixture of rOVD and rOVL may be about 20%, 30%, 40%, 50%, 60%, 70%, 80%, 90%, or 99% w/w or w/v. The concentration of rOVL in a protein mixture of rOVD and rOVL may be 1% to 20%. The concentration of rOVL in a protein mixture of rOVD and rOVL may be at least 1%. The concentration of rOVL in a protein mixture of rOVD and rOVL may be at most 20%. The concentration of rOVL in a protein mixture of rOVD and rOVL may be 1% to 5%, 1% to 10%, 1% to 15%, 1% to 20%, 5% to 10%, 5% to 15%, 5% to 20%, 10% to 15%, 10% to 20%, or 15% to 20% w/w or w/v. The concentration of rOVL in a protein mixture of rOVD and rOVL may be about 1%, 5%, 10%, 15%, or 20% w/w or w/v.

In some embodiments, the rOVD and second protein provide a PDCAAS similar to other protein sources such as whey protein and whey protein isolate, and the rOVD and second protein provide at least one feature improved as compared to the other protein source including solubility, clarity, sensory neutrality or improvement of taste and/or odor, improved mouthfeel, and compatibility with an additional ingredient. In some embodiments, the rOVD and second protein provide a PDCAAS similar to other protein sources and provided improved solubility and clarity in food preparation and processing conditions, such as pH, heating and carbonation.

In some embodiments, the second source of amino acids added with rOVD is one or more free amino acids. In some embodiments, rOVD can be combined with free amino acids such as Tryptophan, Isoleucine, Leucine and Valine to selectively increase PDCAAS. In some embodiments, the addition of one or more free amino acids provides an amino acid balance similar to the addition of a second protein, such as similar to the PDCAAS achieved with the addition of rOVL. For example, one or more of the following can be added with rOVD: Tryptophan=1.7 g/100 g sample, Isoleucine=2.03 g/100 g sample, Leucine=4.55 g/100 g sample, Valine=4.94 g/100 g sample.

Heating Conditions and pH of Compositions

In some embodiments, the consumable food compositions and methods of making such compositions include a particular pH range, and in such range, the rOVD remains soluble in the composition. In some embodiments, the pH is between about 1.0 and about 8.0. In some embodiments, the pH is between about 2.0 and about 6.0, 6.5, or 7.0. In some embodiments, the pH is between about 2.0 to about 2.5, about 2.5 to about 3.0, about 2.5 to about 3.5, about 3.5 to about 4.0, about 2.5 to about 4.5, about 2.0 to about 4.0, about 4.0 to about 6.0, about 2.0 to about 6.0, about 4.0 to about 6.5, or about 2.0 to about 6.5. In some embodiments, the pH is less than 2.0, or equal to 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5 or greater than 4.5. At such pH or pH range, rOVD remains soluble in the consumable food composition, when the rOVD is an ingredient of a finished product (e.g., as a powdered form for use in a finished product) or in a finished product itself. At such pH or pH range, rOVD remains soluble in the consumable food composition without affecting the texture or graininess of the composition. In semi-solid and solid foods, the solubility of rOVD enables protein fortification without jeopardizing functional and sensory properties of the food product. For instance, the addition of rOVD provides fortification and maintains sensory appeal such as a good mouth-feel and lack of graininess. In some embodiments, the addition of rOVD provides fortification, maintains solubility and as such provides the ability of the rOVD to blend with other ingredients.

In some embodiments, the consumable food compositions and methods of making such compositions include a heating condition. For example, a consumable food composition may be a heated (e.g., fried, boiled, or baked) or may it may be a hot beverage, such as a warm or hot drink, a soup or a broth. In some cases, a consumable food composition may have a heating step as part of the preparation or sterilization process for producing an ingredient or a finished product. For example, a heating step may include pasteurization, hot fill, and/or retorting. In some embodiments, the heating step include heating to a temperature between about 72° C. and about 121° C. For example, a heating step may be a pasteurization, where the composition is heated to 72° C. for 1 minute and then cooled and stored, including storage at room temperature or refrigerated. For hot fill, a composition may be heated to 85° C. to 95° C., such as for 30 seconds and then placed at room temperature. Retorting may include heating to 121° C. under pressure, such as heating for 15 minutes at 19 psi, and then storing at room temperature.

Preparation of a consumable composition can also include one or more heating steps. A heating step can comprise pasteurization, hot fill, and/or retorting. In some embodiments, the heating step includes heating to a temperature between about 70° C. and about 150° C.

In one example, a pasteurization heating step is performed at temperatures ranging between 70° C. and 100° C.

In one example, hot filling heating step is performed at about 90° C. to about 97° C.

In one example, retorting is performed at about 100° C. to about 140° C. The retorting may be performed for about 10 or more minutes and at about or at least 12 psi.

In some embodiments, the consumable food compositions and methods of making such compositions with rOVD provide a greater protein solubility or a greater protein solubility and improved clarity at pH ranges and/or with heating as compared to composition containing a different protein, such as whey protein, soy protein, pea protein, whole egg protein (e.g., native OVD), or whole egg white protein at the same concentration.

In some cases, rOVD provides protein solubility in a consumable food composition at a pH between about 2 and about 6, at rOVD concentrations of concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis. In some cases, rOVD provides protein solubility and clarity in a consumable food composition at a pH between about 2 and about 6, at rOVD concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis.

In some cases, rOVD provides protein solubility in a consumable food composition when the composition is heated to a temperature between about 72° C. and about 121° C. at rOVD concentrations of concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis. In some cases, rOVD provides protein solubility and clarity in a consumable food composition when the composition is heated to a temperature between about 72° C. and about 121° C. at rOVD concentrations of concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis.

In some cases, rOVD provides protein solubility in a consumable food composition when the composition is heated to a temperature between about 72° C. and about 121° C. and where the composition has a pH between about 2 and about 4, or a pH about 2 to about 6, at rOVD concentrations of concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis. In some cases, rOVD provides protein solubility and clarity in a consumable food composition when the composition is heated to a temperature between about 72° C. and about 121° C., and where the composition has a pH between about 2 and about 4, or a pH about 2 to about 6, at rOVD concentrations of concentrations of about 9, 10, 11, 12, 13, 14, 15, 16, 17, 18, 19, 20, 21, 22, 23, 24, 25, 26, 27, 28, 29, 30 g or more than 30 g of total rOVD protein per 100 mL of solution (e.g., such as in 100 mL of water) or at a percentage of about 9, 10, 11, 12, 13, 14, 15, 16, 17, 18, 19, 20, 21, 22, 23, 24, 25, 26, 27, 28, 29, 30 percent on a weight per total composition volume basis.

Consumable Food Compositions

Consumable food compositions described herein include food products, beverage products, dietary supplements, food additives, and nutraceuticals as non-limiting examples, and also include compositions as an ingredient of a food or beverage or a product ingested as part of an animal diet. In some embodiments, a consumable food composition is a finished product, such as a food or beverage for animal consumption or for human consumption, a dietary supplement, or a nutraceutical product.

In some embodiments, a finished product is a beverage containing rOVD, and optionally a second protein, such as rOVL. The beverage can be a clear beverage, and can be selected from a juice, a soda, a soft drink, a flavored water, an unflavored water, a fortified water, a carbonated water, a nutritional drink, an energy drink, a sports drink, a recovery drink, a heated drink, a coffee-based drink, a tea-based drink, a cocoa based drink, a smoothie, a milk shake, coconut water, beer, wine, alcoholic beverage, nut milks, juice-based beverages, dairy-based beverages, and a plant-based milk. Many of these beverages have a pH that is between about 2 and about 7, and rOVD and/or rOVD and second protein combination remains soluble in such beverages. In some embodiments, the beverage is a heated beverage. In some embodiments, the beverage is a cold beverage or a beverage served or stored at room temperature. In some embodiments, the beverage contains alcohol from 3 to 40% weight per total weight (w/w) and/or weight per total volume (w/v).

In some embodiments the beverage is carbonated. The carbonation may be created by, for example, carbon dioxide, carbonic acid, sodium bicarbonate, and potassium bicarbonate. A composition described herein may be carbonated. In some cases, a composition described herein has about or at least about 0.1, 0.2, 0.3, 0.4, 0.5, 0.6, 0.7, 0.8, 0.9, 1, 1.5, 2, 2.5, 3, 3.5, or 4 volumes of carbon dioxide gas present per volume of beverage. In some cases, a composition described herein has up to about 0.1, 0.2, 0.3, 0.4, 0.5, 0.6, 0.7, 0.8, 0.9, 1, 1.5, 2, 2.5, 3, 3.5, or 4 volumes of carbon dioxide gas present per volume of beverage. In some cases, a composition described herein has about 0.1 volumes to about 4 volumes or about 1.5 volumes to about 3.5 volumes of carbon dioxide gas present per volume of beverage.

In some embodiments, a protein composition may comprise carbon dioxide, and wherein the amount of carbon dioxide added to the soluble protein composition may be in a proportion between 0.01 g and 4.4 g in 355 mL or the gaseous carbon dioxide may be between 0.02 volumes and 5 volumes for every 1 volume of soluble protein composition, and wherein the beverage may have a pH range between about 2 and about 6 or about 2 and about 4. In some embodiments, a carbonated beverage has a pH between 1.0 and 6.0 or about 1.0 and about 4 or between about 1.6 and about 3.4.

In some embodiments, the beverage preparation includes a heating step, such as hot fill, pasteurization or retorting and the rOVD in the beverage remains soluble during and subsequent to the heating step. In some embodiments, the addition of rOVD to the beverage does not substantially alter the visible appearance, smell, flavor or mouthfeel of the beverage as compared to a beverage that does not contain the composition. In some embodiments, the addition of rOVD to the beverage is sensory neutral and provides an improved sensory appeal as compared to other proteins when added to the beverage at the same concentration, such as whey protein, soy protein, pea protein, egg white proteins or whole egg proteins. In some embodiments, the beverage preparation also includes a second protein such as rOVL and the combination of rOVD and the second protein remains soluble during and subsequent to the heating step.

In some embodiments, a finished product is a food product containing rOVD. The food product can be a jelly, a candy, a broth, a soup, a gelatin-containing product, a gelled product and a gummy product. Additional exemplary categories of food products in which rOVD can be added include sauces, dressings, condiments.

rOVD can also be added to seasoning mixes and spices. rOVD can also be used in coating and breadings. rOVD may also be used to increase the protein content of snacks such as fruit and vegetable-based snacks.

rOVD may be used as an egg wash to promote adhesion of seeds or grains to a baked good and/or to improve the visual appearance, such as browning, of the baked good.

In some embodiments herein, a consumable food composition containing rOVD is a composition that is used as an ingredient with other ingredient(s) or component(s) to create a finished product. For example, rOVD can be mixed with water or other liquid, and then this mixture used as an ingredient to create a beverage, food product, dietary supplement or nutraceutical. In some cases, rOVD is mixed with other ingredients, such as other liquids (e.g., nut milks, fruit juices, vegetable extracts or carbonated solutions. This solution can be an ingredient that is then mixed with other ingredients to make a final product for an end-user; for example, the solution may be a syrup containing concentrated rOVD. A final or finished product is one that is ready for an end-user's consumption. The finished product can be a processed product, such as processed food or a processed drink. In some instances, the rOVD is provided in a separate container to be mixed into the final product by the end-user. In some cases, rOVD is mixed with other ingredients, such as gelling agents to make candies, gummy products, gelled products (such as a Jello™) or sports gels.

During or after preparation of a consumable food product containing rOVD may be formulated as a liquid, solid, syrup, or powder. A composition may be refrigerated, frozen, stored warm, stored at room temperature or held at a heated temperature. Preparation of the food product can include a heating step or the food product is stored or served at a heated temperature, and the rOVD remains soluble in the food product during and subsequent to the heating step.

In some cases, the food product can have a pH that is between about 2 and about 6, and rOVD remains soluble in the food product.

Examples of liquid consumable compositions or beverages include: a soda, a vitamin drink, a protein shake, a meal replacement shake, a juice, a refreshment drink, a milk-based drink or a non-dairy based drink, flavored water, a carbonated drink, coffee, caffeinated drink, tea, flower-based drink, beer, liquor, and a sports drink.

Any of the liquid or semi-solid consumable compositions herein can be created by mixing a powdered rOVD into a solution. The solution can be the final product or an intermediate solution which is then further modified to generate a final product.

Examples of solvents that can be used to prepare an rOVD solution include still water, carbonated water, alcohol, juices, and any other commercially available drink including those described in more detail herein.

A method of generating a consumable composition comprising rOVD may comprise mixing rOVD with a solvent and, optionally, one or more other components. The mixing may be performed by any conventionally used mixing method including mortar and pestle, mechanical grinder, blending, homogenization process or a sonication process.

The amount of rOVD added to the solution can be one that generates an rOVD concentration as derived herein (either in the final product or an intermediate product).

Preferably, addition of the rOVD to the solution results in most or nearly all of the rOVD solubilized into the solution at room temperature. In one instance, solubility is determined based on clarity or degree of lack of turbidity.

The consumable compositions herein can also be subjected to a heating step. Such a step can modify or increase solubility of the rOVD. For example, it was found that performing a heating step in the process of making a product such as retorting, hot filling, or pasteurization can increase solubility and hence clarity of an rOVD solution herein.

Preparation of a consumable food product containing rOVD may include processing steps, for example, freezing, chilling, heating, baking, roasting, broiling, boiling, blanching, packaging, canning, bleaching, enriching, drying, pressing, grinding, mixing, par cooking, cooking, proofing, marinating, cutting, slicing, dicing, crushing, shredding, chopping, shaking, coring, spiralizing, rolling, juicing, straining, filtering, kneading, whisking, beating, whipping, grating, stuffing, peeling, deseeding, smoking, curing, salting, preserving, pickling, fermenting, homogenizing, pasteurizing, sterilizing, irradiating, cold plasma processing, high pressure processing, pulse electric field processing, microwave assisted thermal sterilization, stabilizing, blending, pureeing, fortifying, refining, hydrogenating, aging, extending shelf life, or adding enzymes.

Preparation of a consumable food product containing rOVD may include drying and/or concentrating. In some cases, drying forms a dry, dehydrated, concentrated, and/or solid protein or composition. Some non-limiting examples of drying methods include thermal drying, evaporation (e.g., by means of vacuum or air), distillation, boiling, heating in an oven, vacuum drying, spray drying, freeze drying, and lyophilization, or any combination thereof.

Preparation of a consumable food product containing rOVD may include diluting and/or hydrating. In some cases, the diluting may comprise addition of a liquid, which may be water or another liquid form. For example, a composition can be diluted (e.g., from 20% water to 99.9% water). In another example, a dry composition can be hydrated (e.g., from a dry solid to 99.9% water).

In some embodiments, the consumable food composition containing rOVD is in powder form and when the powdered composition is formulated into a solution, the rOVD is substantially fully soluble. In some embodiments, when the powdered composition is formulated into a solution, the rOVD is substantially fully soluble and the solution is substantially clear. In some embodiments, when the powdered composition is formulated into a solution, the rOVD is substantially fully soluble, the solution is substantially clear and the solution is essentially sensory neutral or has an improved sensory appeal as compared to solutions made with other powder zed proteins such whey protein, soy protein, pea protein, egg white protein or whole egg proteins. In some embodiments, the powdered composition is solubilized in water where the concentration of rOVD is or is about 1%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% weight per total weight (w/w) and/or weight per total volume (w/v) of composition.

In some embodiments of the consumable food compositions described herein, the composition is essentially free of animal-derived component, whey protein, caseinate, fat, lactose, hydrolyzed lactose, soy protein, collagen, hydrolyzed collagen, or gelatin, or any combination thereof. A composition described herein may be essentially free of cholesterol, glucose, fat, saturated fat, trans fat, or any combination thereof. In some cases, a composition described herein comprises less than 10%, 5%, 4%, 3%, 2%, 1%, or 0.5% fat by dry weight. In some embodiments, the composition may be fat-containing (e.g., such as a mayonnaise) and such composition may include up to about 60% fat or a reduced-fat composition (e.g., reduced fat mayonnaise) and such composition may include lesser percentages of fat. A composition that free of an animal-derived component can be considered vegetarian and/or vegan.

In some embodiments, an rOVD powder composition comprises less than 5% ash. The term "ash" is an art-known term and represents inorganics such as one or more ions, elements, minerals, and/or compounds In some cases, the rOVD powder composition comprises less than 5%, 4.5%, 4%, 3.5%, 3%, 2.5%, 2%, 1.5%, 1%, 0.75%, 0.5%, 0.25% or 0.1% ash weight per total weight (w/w) and/or weight per total volume (w/v).

In some embodiments, the moisture content of an rOVD powder composition may be less than 15%. The rOVD powder composition may have less than 15%, 12%, 10%, 8%, 6%, 5%, 3%, 2% or 1% moisture weight per total weight (w/w) and/or weight per total volume (w/v). In some embodiments, the carbohydrate content of an rOVD powder composition may be less than 30%. The rOVD powder composition may have less than 30%, 27%, 25%, 22%, 20%, 17%, 15%, 12%, 10%, 8%, 5%, 3% or 1% carbohydrate content w/w or w/v.

In some cases, the protein content of an rOVD powder composition may be 30% to 99% weight per total weight (w/w) and/or weight per total volume (w/v). In some cases, the protein content of an rOVD powder composition may be at least 30% w/w or w/v. In some cases, the protein content of an rOVD powder composition may be at most 99% w/w or w/v. In some cases, the protein content of an rOVD powder composition may be 30% to 40%, 30% to 50%, 30% to 60%, 30% to 70%, 30% to 75%, 30% to 80%, 30% to 85%, 30% to 90%, 30% to 95%, 30% to 99%, 40% to 50%, 40% to 60%, 40% to 70%, 40% to 75%, 40% to 80%, 40% to 85%, 40% to 90%, 40% to 95%, 40% to 99%, 50% to 60%, 50% to 70%, 50% to 75%, 50% to 80%, 50% to 85%, 50% to 90%, 50% to 95%, 50% to 99%, 60% to 70%, 60% to 75%, 60% to 80%, 60% to 85%, 60% to 90%, 60% to 95%, 60% to 99%, 70% to 75%, 70% to 80%, 70% to 85%, 70% to 90%, 70% to 95%, 70% to 99%, 75% to 80%, 75% to 85%, 75% to 90%, 75% to 95%, 75% to 99%, 80% to 85%, 80% to 90%, 80% to 95%, 80% to 99%, 85% to 90%, 85% to 95%, 85% to 99%, 90% to 95%, 90% to 99%, or 95% to 99% w/w or w/v. In some cases, the protein content of an rOVD powder composition may be about 30%, 40%, 50%, 60%, 70%, 75%, 80%, 85%, 90%, 95%, or 99% w/w or w/v. In some cases, the protein content of an rOVD powder composition may be at least 30%, 40%, 50%, 60%, 70%, 75%, 80%, 85%, 90% or 95% w/w or w/v. In some cases, the protein content of an rOVD powder composition may be at most 40%, 50%, 60%, 70%, 75%, 80%, 85%, 90%, 95%, or 99% w/w or w/v.

Additional Components of Compositions

The consumable food compositions containing rOVD disclosed herein and the methods of making such compositions may including adding or mixing the rOVD with one or more ingredients. For example, food additives may be added in or mixed with the compositions. Food additives can add volume and/or mass to a composition. A food additive may improve functional performance and/or physical characteristics. For example, a food additive may prevent gelation or increased viscosity due to the lipid portion of the lipoproteins in the freeze-thaw cycle. An anticaking agent may be added to make a free-flowing composition. Carbohydrates can be added to increase resistance to heat damage, e.g., less protein denaturation during drying and improve stability and flowability of dried compositions. Food additives include, but are not limited to, food coloring, pH adjuster, natural flavoring, artificial flavoring, flavor enhancer, batch marker, food acid, filler, anticaking agent (e.g., sodium silico aluminate), antigreening agent (e.g., citric acid), food stabilizer, foam stabilizer or binding agent, antioxidant, acidity regulatory, bulking agent, color retention agent, whipping agent (e.g., ester-type whipping agent, triethyl citrate, sodium lauryl sulfate), emulsifier (e.g., lecithin), humectant, thickener, excipient, solid diluent, salts, nutrient, sweetener, glazing agent, preservative, vitamin, dietary elements, carbohydrates, polyol, gums, starches, flour, oil, or bran.

Food coloring includes, but is not limited to, FD&C Yellow #5, FD&C Yellow #6, FD&C Red #40, FD&C Red #3, FD&C Blue No. 1, FD&C Blue No. 2, FD&C Green No. 3, carotenoids (e.g., saffron, β-carotene), anthocyanins, annatto, betanin, butterfly pea, caramel coloring, chlorophyllin, elderberry juice, lycopene, carmine, pandan, paprika, turmeric, curcuminoids, quinoline yellow, carmoisine, Ponceau 4R, Patent Blue V, and Green S.

Ingredients for pH adjustment include, but are not limited to, Tris buffer, potassium phosphate, sodium hydroxide, potassium hydroxide, citric acid, sodium citrate, sodium bicarbonate, and hydrochloric acid.

Salts include, but are not limited, to acid salts, alkali salts, organic salts, inorganic salts, phosphates, chloride salts, sodium salts, sodium chloride, potassium salts, potassium chloride, magnesium salts, magnesium chloride, magnesium perchlorate, calcium salts, calcium chloride, ammonium chloride, iron salts, iron chlorides, zinc salts, and zinc chloride.

Nutrient includes, but is not limited to, macronutrient, micronutrient, essential nutrient, non-essential nutrient, dietary fiber, amino acid, essential fatty acids, omega-3 fatty acids, and conjugated linoleic acid.

Sweeteners include, but are not limited to, sugar substitute, artificial sweetener, acesulfame potassium, advantame, alitame, aspartame, sodium cyclamate, dulcin, glucin, neohesperidin dihydrochalcone, neotame, P-4000, saccharin, aspartame-acesulfame salt, sucralose, brazzein, curculin, glycyrrhizin, glycerol, inulin, mogroside, mabinlin, malto-oligosaccharide, mannitol, miraculin, monatin, monellin, osladin, pentadin, stevia, trilobatin, and thaumatin.

Carbohydrates include, but are not limited to, sugar, sucrose, glucose, fructose, galactose, lactose, maltose, mannose, allulose, tagatose, xylose, arabinose, high fructose corn syrup, high maltose corn syrup, corn syrup (e.g., glucose-free corn syrup), sialic acid, monosaccharides, disaccharides, and polysaccharides (e.g., polydextrose, maltodextrin).

Polyols include, but are not limited to, xylitol, maltitol, erythritol, sorbitol, threitol, arabitol, hydrogenated starch hydrolysates, isomalt, lactitol, mannitol, and galactitol (dulcitol).

Gums include, but are not limited to, gum arabic, gellan gum, guar gum, locust bean gum, acacia gum, cellulose gum, and xanthan gum.

Vitamins include, but are not limited to, niacin, riboflavin, pantothenic acid, thiamine, folic acid, vitamin A, vitamin B6, vitamin B12, vitamin D, vitamin E, lutein, zeaxanthin, choline, inositol, and biotin.

Dietary elements include, but are not limited to, calcium, iron, magnesium, phosphorus, potassium, sodium, zinc, copper, manganese, selenium, chlorine, iodine, sulfur, cobalt, molybdenum, nickel, and bromine.

Packaging

One of the benefits of the consumable compositions disclosed herein is that they allow for simpler packaging. In one instance, a consumable liquid composition disclosed herein may be packaged in a clear container as the lack of turbidity in the composition results in a more consumer-appealing product.

A consumable composition can be refrigerated, frozen, stored warm, stored at room temperature or held at a heated temperature.

An rOVD composition may be packaged as a powder, a concentrated syrup, a consumable food product, a beverage, a ready-to-use foodstuff, an ingredient, or a finished product.

Recombinant OVD and OVL

In any composition described herein, the protein may be recombinantly expressed in a host cell. The recombinant protein may be OVD, a first non-recombinant protein (e.g., OVD) and a second recombinant protein such as lysozyme (e.g. rOVL), or OVD and at least one second protein may both be recombinantly produced (for example rOVD and rOVL).

rOVD or rOVL can have an amino acid sequence from any species. For example, an rOVD can have an amino acid sequence of OVD native to a bird (avian) or a reptile or Platypus and a rOVL can have an amino acid sequence of OVL native to a bird or a reptile or Platypus. An rOVD and/or rOVL having an amino acid sequence from an avian OVD and/or OVL can be selected from the group consisting of: poultry, fowl, waterfowl, game bird, chicken, quail, turkey, turkey vulture, hummingbird, duck, ostrich, goose, gull, guineafowl, pheasant, emu, and any combination thereof. An rOVD and/or rOVL can have an amino acid sequence native to a single species, such as *Gallus gallus domesticus*. Alternatively, an rOVD and/or rOVL can have an amino acid sequence native to two or more species, and as such be a hybrid.

Exemplary OVD and OVL amino acid sequences contemplated herein are provided in Table 1 below as SEQ ID NOs: 1-44 and 45-51, respectively.

TABLE 1

| Sequences | | |
|---|---|---|
| Sequence Description | SEQ ID NOs | SEQUENCES |
| Ovomucoid (canonical) mature chicken OVD | SEQ ID NO: 1 | AEVDCSRFPNATDKEGKDVLVCNKDLRPICGTDGVTYTNDCLLCAYSIEFGT NISKEHDGECKETVPMNCSSYANTTSEDGKVMVLCNRAFNPVCGTDGVTYD NECLLCAHKVEQGASVDKRHDGGCRKELAAVSVDCSEYPKPDCTAEDRPLC GSDNKTYGNKCNFCNAVVESNGTLTLSHFGKC |
| Ovomucoid variant of SEQ ID 1 | SEQ ID NO: 2 | AEVDCSRFPNATDMEGKDVLVCNKDLRPICGTDGVTYTNDCLLCAYSVEFGT NISKEHDGECKETVPMNCSSYANTTSEDGKVMVLCNRAFNPVCGTDGVTYD NECLLCAHKVEQGASVDKRHDGGCRKELAAVSVDCSEYPKPDCTAEDRPLC GSDNKTYGNKCNFCNAVVESNGTLTLSHFGKC |
| G162M F167A Ovomucoid Variant of Chicken OVD in Genbank | SEQ ID NO: 3 | AEVDCSRFPNATDMEGKDVLVCNKDLRPICGTDGVTYTNDCLLCAYSVEFGT NISKEHDGECKETVPMNCSSYANTTSEDGKVMVLCNRAFNPVCGTDGVTYD NECLLCAHKVEQGASVDKRHDGGCRKELAAVSVDCSEYPKPDCTAEDRPLC GSDNKTYMNKCNACNAVVESNGTLTLSHFGKC |
| Ovomucoid isoform 1 precursor full length | SEQ ID NO: 4 | MAMAGVFVLFSFVLCGFLPDAAFGAEVDCSRFPNATDKEGKDVLVCNKDLR PICGTDGVTYTNDCLLCAYSIEFGTNISKEHDGECKETVPMNCSSYANTTSED GKVMVLCNRAFNPVCGTDGVTYDNECLLCAHKVEQGASVDKRHDGGCRKE LAAVSVDCSEYPKPDCTAEDRPLCGSDNKTYGNKCNFCNAVVESNGTLTLSH FGKC |
| Ovomucoid [*Gallus gallus*] | SEQ ID NO: 5 | MAMAGVFVLFSFVLCGFLPDAVFGAEVDCSRFPNATDMEGKDVLVCNKDLR PICGTDGVTYTNDCLLCAYSVEFGTNISKEHDGECKETVPMNCSSYANTTSED GKVMVLCNRAFNPVCGTDGVTYDNECLLCAHKVEQGASVDKRHDGGCRKE LAAVSVDCSEYPKPDCTAEDRPLCGSDNKTYGNKCNFCNAVVESNGTLTLSH FGKC |
| Ovomucoid isoform 2 precursor [*Gallus gallus*] | SEQ ID NO: 6 | MAMAGVFVLFSFVLCGFLPDAAFGAEVDCSRFPNATDKEGKDVLVCNKDLR PICGTDGVTYTNDCLLCAYSIEFGTNISKEHDGECKETVPMNCSSYANTTSED GKVMVLCNRAFNPVCGTDGVTYDNECLLCAHKVEQGASVDKRHDGGCRKE LAAVDCSEYPKPDCTAEDRPLCGSDNKTYGNKCNFCNAVVESNGTLTLSHFG KC |
| Ovomucoid [*Gallus gallus*] | SEQ ID NO: 7 | AEVDCSRFPNATDKEGKDVLVCNKDLRPICGTDGVTYNNECLLCAYSIEFGT NISKEHDGECKETVPMNCSSYANTTSEDGKVMVLCNRAFNPVCGTDGVTYD NECLLCAHKVEQGASVDKRHDGECRKELAAVSVDCSEYPKPDCTAEDRPLC GSDNKTYGNKCNFCNAVVESNGTLTLSHFGKC |
| Ovomucoid [*Numida meleagris*] | SEQ ID NO: 8 | MAMAGVFVLFSFALCGFLPDAAFGVEVDCSRFPNATNEEGKDVLVCTEDLRP ICGTDGVTYSNDCLLCAYNIEYGTNISKEHDGECREAVPVDCSRYPNMTSEEG KVLILCNKAFNPVCGTDGVTYDNECLLCAHNVEQGTSVGKKHDGECRKELA AVDCSEYPKPACTMEYRPLCGSDNKTYDNKCNFCNAVVESNGTLTLSHFGKC |
| PREDICTED: Ovomucoid isoform X1 [*Meleagris gallopavo*] | SEQ ID NO: 9 | MQTITWRQPQGDHLRSRAPAATCRAGQYLTMAMAGIFVLFSFALCGFLPDAA FGVEVDCSRFPNTTNEEGKDVLVCTEDLRPICGTDGVTHSECLLCAYNIEYGT NISKEHDGECREAVPMDCSRYPNTTNEEGKVMILCNKALNPVCGTDGVTYD NECVLCAHNLEQGTSVGKKHDGGCRKELAAVSVDCSEYPKPACTLEYRPLC GSDNKTYGNKCNFCNAVVESNGTLTLSHFGKC |
| Ovomucoid [*Meleagris gallopavo*] | SEQ ID NO: 10 | VEVDCSRFPNTTNEEGKDVLVCTEDLRPICGTDGVTHSECLLCAYNIEYGTN ISKEHDGECREAVPMDCSRYPNTTSEEGKVMILCNKALNPVCGTDGVTYDNE CVLCAHNLEQGTSVGKKHDGECRKELAAVSVDCSEYPKPACTLEYRPLCGSD NKTYGNKCNFCNAVVESNGTLTLSHFGKC |
| PREDICTED: Ovomucoid isoform X2 [*Meleagris gallopavo*] | SEQ ID NO: 11 | MQTITWRQPQGDHLRSRAPAATCRAGQYLTMAMAGIFVLFSFALCGFLPDAA FGVEVDCSRFPNTTNEEGKDVLVCTEDLRPICGTDGVTHSECLLCAYNIEYGT NISKEHDGECREAVPMDCSRYPNTTNEEGKVMILCNKALNPVCGTDGVTYD NECVLCAHNLEQGTSVGKKHDGGCRKELAAVDCSEYPKPACTLEYRPLCGS DNKTYGNKCNFCNAVVESNGTLTLSHFGKC |
| Ovomucoid [*Bambusicola thoracicus*] | SEQ ID NO: 12 | EYGTNISIKHNGECKETVPMDCSRYANMTNEEGKVMMPCDRTYNPVCGTDG VTYDNECQLCAHNVEQGTSVDKKHDGVCGKELAAVSVDCSEYPKPECTAEE RPICGSDNKTYGNKCNFCNAVVYVQP |
| Ovomucoid [*Callipepla squamata*] | SEQ ID NO: 13 | VDCSRFPNTTNEEGKDVLACTKELHPICGTDGVTYSNECLLCYYNIEYGTNIS KEHDGECTEAVPVDCSRYPNTTSEEGKVLIPCNRDFNPVCGSDGVTYENECLL CAHNVEQGTSVGKKHDGGCRKEFAAVSVDCSEYPKPDCTLEYRPLCGSDNK TYASKCNFCNAVVIWEQEKNTRHHASHSVFFISARLVC |
| Ovomucoid [*Colinus virginianus*] | SEQ ID NO: 14 | MLPLGLREYGTNTSKEHDGECTEAVPVDCSRYPNTTSEEGKVRILCKKDINPV CGTDGVTYDNECLLCSHSVGQGASIDKKHDGGCRKEFAAVSVDCSEYPKPAC MSEYRPLCGSDNKTYVNKCNFCNAVVYVQPWLHSRCRLPPTGTSFLGSEGRE TSLLTSRATDLQVAGCTAISAMEATRAAALLGLVLLSSFCELSHLCFSQASCD VYRLSGSRNLACPRIFQPVCGTDNVTYPNECSLCRQMLRSRAVYKKHDGRCV |

TABLE 1-continued

| Sequence Description | SEQ ID NOs | SEQUENCES |
|---|---|---|
| | | KVDCTGYMRATGGLGTACSQQYSPLYATNGVIYSNKCTFCSAVANGEDIDLL AVKYPEEESWISVSPTPWRMLSAGA |
| Ovomucoid-like isoform X2 [*Anser cygnoides domesticus*] | SEQ ID NO: 15 | MSWWGIKPALERPSQEQSTSGQPVDSGSTSTTTMAGIFVLLSLVLCCFPDAAF GVEVDCSRFPNTTNEEGKEVLLCTKDLSPICGTDGVTYSNECLLCAYNIEYGT NISKDHDGECKEAVPVDCSTYPNMTNEEGKVMLVCNKMFSPVCGTDGVTYD NECMLCAHNVEQGTSVGKKYDGKCKKEVATVDCSDYPKPACTVEYMPLCG SDNKTYDNKCNFCNAVVDSNGTLTLSHFGKC |
| Ovomucoid-like isoform X1 [*Anser cygnoides domesticus*] | SEQ ID NO: 16 | MSSQNQLHRRRRPLPGGQDLNKYYWPHCTSDRFSWLLHVTAEQFRHCVCIY LQPALERPSQEQSTSGQPVDSGSTSTTTMAGIFVLLSLVLCCFPDAAFGVE VDCSRFPNTTNEEGKEVLLCTKDLSPICGTDGVTYSNECLLCAYNIEYGTN ISKDHDGECKEAVPVDCSTYPNMTNEEGKVMLVCNKMFSPVCGTDGVTYDN ECMLCAHNVEQGTSVGKKYDGKCKKEVATVDCSDYPKPACTVEYMPLCGSD NKTYDNKCNFCNAVVDSNGTLTLSHFGKC |
| Ovomucoid [*Coturnix japonica*] | SEQ ID NO: 17 | VEVDCSRFPNTTNEEGKDEVVCPDELRLICGTDGVTYNHECMLCFYNKEYGT NISKEQDGECGETVPMDCSRYPNTTSEDGKVTILCTKDFSFVCGTDGVTYDNE CMLCAHNVVQGTSVGKKHDGECRKELAAVSVDCSEYPKPACPKDYRPVCGS DNKTYSNKCNFCNAVVESNGTLTLNHFGKC |
| Ovomucoid [*Coturnix japonica*] | SEQ ID NO: 18 | MAMAGVFLLFSFALCGFLPDAAFGVEVDCSRFPNTTNEEGKDEVVCPDELRLI CGTDGVTYNHECMLCFYNKEYGTNISKEQDGECGETVPMDCSRYPNTTSED GKVTILCTKDFSFVCGTDGVTYDNECMLCAHNIVQGTSVGKKHDGECRKEL AAVSVDCSEYPKPACPKDYRPVCGSDNKTYSNKCNFCNAVVESNGTLTLNHF GKC |
| Ovomucoid [*Anas platyrhynchos*] | SEQ ID NO: 19 | MAGVFVLLSLVLCCFPDAAFGVEVDCSRFPNTTNEEGKDVLLCTKELSPVCG TDGVTYSNECLLCAYNIEYGTNISKDHDGECKEAVPADCSMYPNMTNEEGK MTLLCNKMFSPVCGTDGVTYDNECMLCAHNVEQGTSVGKKYDGKCKKEVA TVDCSGYPKPACTMEYMPLCGSDNKTYGNKCNFCNAVVDSNGTLTLSHFGEC |
| Ovomucoid, partial [*Anas platyrhynchos*] | SEQ ID NO: 20 | QVDCSRFPNTTNEEGKEVLLCTKELSPVCGTDGVTYSNECLLCAYNIEYGTNI SKDHDGECKEAVPADCSMYPNMTNEEGKMTLLCNKMFSPVCGTDGVTYDN ECMLCAHNVEQGTSVGKKYDGKCKKEVATVSVDCSGYPKPACTMEYMPLC GSDNKTYGNKCNFCNAVV |
| Ovomucoid-like [*Tyto alba*] | SEQ ID NO: 21 | MTMPGAFVVLSFVLCCFPDATFGVEVDCSTYPNTTNEEGKEVLVCSKILSPIC GTDGVTYSNECLLCANNIEYGTNISKYHDGECKEFVPVNCSRYPNTTNEEGK VMLICNKDLSPVCGTDGVTYDNECLLCAHNLEPGTSVGKKYDGECKKEIATV DCSDYPKPVCSLESMPLCGSDNKTYSNKCNFCNAVVDSNETLTLSHFGKC |
| Ovomucoid [*Balearica regulorum gibbericeps*] | SEQ ID NO: 22 | MTMAGVFVLLSFALCCFPDAAFGVEVDCSTYPNTTNEEGKEVLVCTKILSPIC GTDGVTYSNECLLCAYNIEYGTNVSKDHDGECKEVVPVDCSRYPNSTNEEGK VVMLCSKDLNPVCGTDGVTYDNECVLCAHNVESGTSVGKKYDGECKKETA TVDCSDYPKPACTLEYMPFCGSDSKTYSNKCNFCNAVVDSNGTLTLSHFGKC |
| Turkey vulture [*Cathartes aura*] OVD (native sequence) bolded is native signal sequence | SEQ ID NO: 23 | **MTTAGVFVLLSFALCSFPDAAFG**VEVDCSTYPNTTNEEGKEVLVCTKILSPI CGTDGVTYSNECLLCAYNIEYGTNVSKDHDGECKEFVPVDCSRYPNTTNEDG KVVLLCNKDLSPICGTDGVTYDNECLLCARNLEPGTSVGKKYDGECKKEIAT VDCSDYPKPVCSLEYMPLCGSDSKTYSNKCNFCNAVVDSNGTLTLSHFGKC |
| Ovomucoid-like [*Cuculus canorus*] | SEQ ID NO: 24 | MTTAGVFVLLSFTLCSFPDAAFGVEVDCSPYPNTTNEEGKEVLVCNKILSPI CGTDGVTYSNECLLCAYNLEYGTNISKDYDGECKEVAPVDCSRHPNTTNEEG KVELLCNKDLNPICGTNGVTYDNECLLCARNLESGTSIGKKYDGECKKEIAT VDCSDYPKPVCTLEEMPLCGSDNKTYGNKCNFCNAVVDSNGTLTLSHFGKC |
| Ovomucoid [*Antrostomus carolinensis*] | SEQ ID NO: 25 | MTTAVVFVLLSFALCCFPDAAFGVEVDCSTYPNSTNEEGKDVLVCPKILGPIC GTDGVTYSNECLLCAYNIQYGTNVSKDHDGECKEIVPVDCSRYPNTTNEEGK VVFLCNKNFDPVCGTDGDTYDNECMLCARSLEPGTTVGKKHDGECKREIAT VDCSDYPKPTCSAEDMPLCGSDSKTYSNKCNFCNAVVDSNGTLTLSRFGKC |
| Ovomucoid [*Cariama cristata*] | SEQ ID NO: 26 | MTMTGVFVLLSFAICCFPDAAFGVEVDCSTYPNTTNEEGKEVLVCTKILSPIC GTDGVTYSNECLLCAYNIEYGTNVSKDHDGECKEVVPVDCSKYPNTTNEEGKV VLLCSKDLSPVCGTDGVTYDNECLLCARNLEPGSSVGKKYDGECKKEIATIDC SDYPKPVCSLEYMPLCGSDSKTYDNKCNFCNAVVDSNGTLTLSHFGKC |
| Ovomucoid-like isoform X2 [*Pygoscelis adeliae*] | SEQ ID NO: 27 | MTTAGVFVLLSFVLCCFPDAVFGVEVDCSTYPNTTNEEGKEVLVCTKILSPIC GTDGVTYSNECLLCAYNIEYGTNVSKDHDGECKEVVPVNCSRYPNTTNEEGK VVLRCSKDLSPVCGTDGVTYDNECLMCARNLEPGAVVGKNYDGECKKEIAT VDCSDYPKPVCSLEYMPLCGSDSKTYSNKCNFCNAVVDSNGTLTLSHFGKC |

TABLE 1-continued

| Sequence Description | SEQ ID NOs | SEQUENCES |
|---|---|---|
| Ovomucoid-like [*Nipponia nippon*] | SEQ ID NO: 28 | MTTAGVFVLLSIALCCFPDAAFGVEVDCSAYSNTTSEEGKEVLSCTKILSPIC GTDGVTYSNECLLCAYNIEYGTNISKDHDGECKEVVSVDCSRYPNTTNEEGKA VLLCNKDLSPVCGTDGVTYDNECLLCAHNLEPGTSVGKKYDGACKKEIATV DCSDYPKPVCTLEYLPLCGSDSKTYSNKCDFCNAVVDSNGTLTLSHFGKC |
| Ovomucoid-like [*Phaethon lepturus*] | SEQ ID NO: 29 | MTTAGVFVLLSFALCCFPDAAFGVEVDCSTYPNTTNEEGKEVLVCTKILSPIC GTDGTTYSNECLLCAYNIEYGTNVSKDHDGECKVVPVDCSKYPNTTNEDGK VVLLCNKALSPICGTDRVTYDNECLMCAHNLEPGTSVGKKHDGECQKEVAT VDCSDYPKPVCSLEYMPLCGSDGKTYSNKCNFCNAVVNSNGTLTLSHFEKC |
| Ovomucoid-like isoform X1 [*Melopsittacus undulatus*] | SEQ ID NO: 30 | MTTAGVFVLLSFVLCCFFPDAAFGVEVDCSTYPNTTNEEGKEVLVCAKILSPV CGTDGVTYSNECLLCAHNIENGTNVGKDHDGKCKEAVPVDCSRYPNTTDEE GKVVLLCNKDVSPVCGTDGVTYDNECLLCAHNLEAGTSVDKKNDSECKTED TTLAAVSVDCSDYPKPVCTLEYLPLCGSDNKTYSNKCRFCNAVVDSNGTLTL SRFGKC |
| Ovomucoid [*Podiceps cristatus*] | SEQ ID NO: 31 | MTTAGVFVLLSFALCCSPDAAFGVEVDCSTYPNTTNEEGKEVLACTKILSPIC GTDGVTYSNECLLCAYNMEYGTNVSKDHDGKCKEVVPVDCSRYPNTTNEEG KVVLLCNKDLSPVCGTDGVTYDNECLLCARNLEPGASVGKKYDGECKKEIA TVDCSDYPKPVCSLEHMPLCGSDSKTYSNKCTFCNAVVDSNGTLTLSHFGKC |
| Ovomucoid-like [*Fulmarus glacialis*] | SEQ ID NO: 32 | MTTAGVFVLLSFALCCFPDAAFGVEVDCSTYPNTTNEEGREVLVCTKILSPIC GTDGVTYSNECLLCAYNIEYGTNVSKDHDGECKEVAPVGCSRYPNTTNEEGK VVLLCNKDLSPVCGTDGVTYDNECLLCARHLEPGTSVGKKYDGECKKEIATV DCSDYPKPVCSLEYMPLCGSDSKTYSNKCNFCNAVLDSNGTLTLSHFGKC |
| Ovomucoid [*Aptenodytes forsteri*] | SEQ ID NO: 33 | MTTAGVFVLLSFALCCFPDAVFGVEVDCSTYPNTTNEEGKEVLVCTKILSPIC GTDGVTYSNECLLCAYNIEYGTNVSKDHDGECKEVVPVDCSRYPNTTNEEGK VVLRCNKDLSPVCGTDGVTYDNECLMCARNLEPGAIVGKKYDGECKKEIAT VDCSDYPKPVCSLEYMPLCGSDSKTYSNKCNFCNAVVDSNGTLILSHFGKC |
| Ovomucoid-like isoform X1 [*Pygoscelis adeliae*] | SEQ ID NO: 34 | MTTAGVFVLLSFVLCCFPDAVFGVEVDCSTYPNTTNEEGKEVLVCTKILSPIC GTDGVTYSNECLLCAYNIEYGTNVSKDHDGECKEVVPVDCSRYPNTTNEEGK VVLRCSKDLSPVCGTDGVTYDNECLMCARNLEPGAVVGKNYDGECKKEIAT VDCSDYPKPVCSLEYMPLCGSDSKTYSNKCNFCNAVVDSNGTLTLSHFGKC |
| Ovomucoid isoform X1 [*Aptenodytes forsteri*] | SEQ ID NO: 35 | MSSQNQLPSRCRPLPGSQDLNKYYQPHCTGDRFCWLFYVTVEQFRHCICIYLQ LALERPSHEQSGQPADSRNTSTMTTAGVFVLLSFALCCFPDAVFGVEVDCSTY PNTTNEEGKEVLVCTKILSPICGTDGVTYSNECLLCAYNIEYGTNVSKDHDGE CKEVVPVDCSRYPNTTNEEGKVVLRCNKDLSPVCGTDGVTYDNECLMCARN LEPGAIVGKKYDGECKKEIATVDCSDYPKPVCSLEYMPLCGSDSKTYSNKCN FCNAVVDSNGTLILSHFGKC |
| Ovomucoid, partial [*Antrostomus carolinensis*] | SEQ ID NO: 36 | MTTAVVFVLLSFALCCFPDAAFGVEVDCSTYPNSTNEEGKDVLVCPKILGPIC GTDGVTYSNECLLCAYNIQYGTNVSKDHDGECKEIVPVDCSRYPNTTNEEGK VVFLCNKNFDPVCGTDGDTYDNECMLCARSLEPGTTVGKKHDGECKREIAT VDCSDYPKPTCSAEDMPLCGSDSKTYSNKCNFCNAVV |
| rOVD as expressed in pichia secreted form 1 | SEQ ID NO: 37 | EAEAAEVDCSRFPNATDKEGKDVLVCNKDLRPICGTDGVTYTNDCLLCAYSI EFGTNISKEHDGECKETVPMNCSSYANTTSEDGKVMVLCNRAFNPVCGTDGV TYDNECLLCAHKVEQGASVDKRHDGGCRKELAAVSVDCSEYPKPDCTAEDR PLCGSDNKTYGNKCNFCNAVVESNGTLTLSHFGKC |
| rOVD as expressed in pichia secreted form 2 | SEQ ID NO: 38 | EEGVSLEKREAEAAEVDCSRFPNATDKEGKDVLVCNKDLRPICGTDGVTYTN DCLLCAYSIEFGTNISKEHDGECKETVPMNCSSYANTTSEDGKVMVLCNRAF NPVCGTDGVTYDNECLLCAHKVEQGASVDKRHDGGCRKELAAVSVDCSEYP KPDCTAEDRPLCGSDNKTYGNKCNFCNAVVESNGTLTLSHFGKC |
| rOVD [*gallus*] coding sequence containing an alpha mating factor signal sequence (bolded) as expressed in pichia | SEQ ID NO: 39 | **MRFPSIFTAVLFAASSALAAPVNTTTEDETAQIPAEAVIGYSDLEGDFDVA VLPFSNSTNNGLLFINTTIASIAAKEEGVSLEKREAEA**AEVDCSRFPNATDK EGKDVLVCNKDLRPICGTDGVTYTNDCLLCAYSIEFGTNISKEHDGECKETVP MNCSSYANTTSEDGKVMVLCNRAFNPVCGTDGVTYDNECLLCARKVEQGA SVDKRHDGGCRKELAAVSVDCSEYPKPDCTAEDRPLCGSDNKTYGNKCNFC NAVVESNGTLTLSHFGKC |
| Turkey vulture OVD coding sequence containing secretion signals as expressed in pichia | SEQ ID NO: 40 | **MRFPSIFTAVLFAASSALAAPVNTTTEDETAQIPAEAVIGYSDLEGDFDVA VLPFSNSTNNGLLFINTTIASIAAKEEGVSLEKREAEA**VEVDCSTYPNTTNE EGKEVLVCTKILSPICGTDGVTYSNECLLCAYNIEYGTNVSKDHDGECKEFVP VDCSRYPNTTNEDGKVVLLCNKDLSPICGTDGVTYDNECLLCARNLEPGTSV GKKYDGECKKEIATVDCSDYPKPVCSLEYMPLCGSDSKTYSNKCNFCNAVV DSNGTLTLSHFGKC |

TABLE 1-continued

| Sequences | | |
|---|---|---|
| Sequence Description | SEQ ID NOs | SEQUENCES |
| bolded is an alpha mating factor signal sequence | | |
| Turkey vulture OVD in secreted form expressed in Pichia | SEQ ID NO: 41 | EAEAVEVDCSTYPNTTNEEGKEVLVCTKILSPICGTDGVTYSNECLLCAYNIE<br>YGTNVSKDHDGECKEFVPVDCSRYPNTTNEDGKVVLLCNKDLSPICGTDGVT<br>YDNECLLCARNLEPGTSVGKKYDGECKKEIATVDCSDYPKPVCSLEYMPLCG<br>SDSKTYSNKCNFCNAVVDSNGTLTLSHFGKC |
| Humming bird OVD (native sequence) bolded is the native signal sequence | SEQ ID NO: 42 | **MTMAGVFVLLSFILCCFPDTAFG**VEVDCSIYPNTTSEEGKEVLVCIETLSPIC<br>GSDGVTYNNECQLCAYNVEYGTNVSKDHDGECKEIVPVDCSRYPNTTEEGR<br>VVMLCNKALSPVCGTDGVTYDNECLLCARNLESGTSVGKKFDGECKKEIAT<br>VDCTDYPKPVCSLDYMPLCGSDSKTYSNKCNFCNAVMDSNGTLTLNHFGKC |
| Humming bird OVD coding sequence as expressed in Pichia bolded is an alpha mating factor signal sequence | SEQ ID NO: 43 | **MRFPSIFTAVLFAASSALAAPVNTTTEDETAQIPAEAVIGYSDLEGDFDVA**<br>**VLPFSNSTNNGLLFINTTIASIAAKEEGVSLDKREAEA**VEVDCSIYPNTTSEE<br>GKEVLVCIETLSPICGSDGVTYNNECQLCAYNVEYGTNVSKDHDGECKEIVP<br>VDCSRYPNTIEEGRVVMLCNKALSPVCGTDGVTYDNECLLCARNLESGTSV<br>GKKFDGECKKEIATVDCTDYPKPVCSLDYMPLCGSDSKTYSNKCNFCNAVM<br>DSNGTLTLNHFGKC |
| Humming bird OVD in secreted form from Pichia | SEQ ID NO: 44 | EAEAVEVDCSIYPNTTSEEGKEVLVCIETLSPICGSDGVTYNNECQLCAYNVE<br>YGTNVSKDHDGECKEIVPVDCSRYPNTTEEGRVVMLCNKALSPVCGTDGVT<br>YDNECLLCARNLESGTSVGKKFDGECKKEIATVDCTDYPKPVCSLDYMPLCG<br>SDSKTYSNKCNFCNAVMDSNGTLTLNHFGKC |
| rOVL as expressed in pichia bolded is an alpha mating factor signal sequence | SEQ ID NO: 45 | **MRFPSIFTAVLFAASSALAAPVNTTTEDETAQIPAEAVIGYSDLEGDFDVA**<br>**VLPFSNSTNNGLLFINTTIASIAAKEEGVSLDKREAEA**KVFGRCELAAANIK<br>RHGLDNYRGYSLGNWVCAAKFESNFNTQATNRNTDGSTDYGILQINSRWWC<br>NDGRTPGSRNLCNIPCSALLSSDITASVNCAKKIVSDGNGMNAWVAWRNRCK<br>GTDVQAWIRGCRL |
| rOVL as found after secretion from Pichia | SEQ ID NO: 46 | EAEAKVFGRCELAAAMKRHGLDNYRGYSLGNWVCAAKFESNFNTQATNRN<br>TDGSTDYGILQINSRWWCNDGRTPGSRNLCNIPCSALLSSDITASVNCAK<br>KIVSDGNGMNAWVAWRNRCKGTDVQAWIRGCRL |
| Lysozyme (OVL) from *Gallus gallus* (without signal sequence) | SEQ ID NO: 47 | KVFGRCELAAAMKRHGLDNYRGYSLGNWVCAAKFESNFNTQATNRNTDGS<br>TDYGILQINSRWWCNDGRTPGSRNLCNIPCSALLSSDITASVNCAKKIVSDGN<br>GMNAWVAWRNRCKGTDVQAWIRGCRL |
| Lysozyme | SEQ ID NO: 48 | KVFGRCELAAAMKRHGLDNYRGYSLGNWVCVAKFESNFNTQATNRNTDGS<br>TDYGILQINSRWWCNDGRTPGSRNLCNIPCSALLSSDITASVNCAKKIVSDGN<br>GMSAWVAWRNRCKGTDVQAWIRGCRL |
| Lysozyme C (Human) | SEQ ID NO: 49 | KVFERCELARTLKRLGMDGYRGISLANWMCLAKWESGYNTRATNYNAGDR<br>STDYGIFQINSRYWCNDGKTPGAVNACHLSCSALLQDNIADAVACAKRVVRD<br>PQGIRAWVAWRNRCQNRDVRQYVQGCGV |
| Lysozyme C (*Bos taurus*) | SEQ ID NO: 50 | KVFERCELARTLKKLGLDGYKGVSLANWLCLTKWESSYNTKATNYNPSSEST<br>DYGIFQINSKWWCNDGKTPNAVDGCHVSCRELMENDIAKAVACAKHIVSEQ<br>GITAWVAWKSHCRDHDVSSYVEGCTL |
| Lysozyme (OVL) from *Gallus gallus* Native secretion signal is bolded | SEQ ID NO: 51 | **MRSLLILVLCFLPLAALG**KVFGRCELAAAMKRHGLDNYRGYSLGNWVCAA<br>KFESNFNTQATNRNTDGSTDYGILQINSRWWCNDGRTPGSRNLCNIPCSALLS<br>SDITASVNCAKKIVSDGNGMNAWVAWRNRCKGTDVQAWIRGCRL |
| OCH1:EndoH fusion protein | SEQ ID NO: 52 | MAKADGSLLYYNPHNPPRRYYFYMAIFAVSVICVLYGPSQQLSSPKIDASAPA<br>PVKQGPTSVAYVEVNNNSMLNVGKYTLADGGGNAFDVAVIFAANINYDTGT<br>KTAYLHFNENVQRVLDNAVTQIRPLQQQGIKVLLSVLGNHQGAGFANFPSQQ<br>AASAFAKQLSDAVAKYGLDGVDFDDEYAEYGNNGTAQPNDSSFVHLVTALR<br>ANMPDKIISLYNIGPAASRLSYGGVDVSDKFDYAWNPYYGTWQVPGIALPKA<br>QLSPAAVEIGRTSRSTVADLARRTVDEGYGVYLTYNLDGGDRTADVSAFTRE<br>LYGSEAVRTP |

An rOVD or rOVL can include additional sequences. Expression of rOVD and rOVL in a host cell, for instance a *Pichia* species, a *Saccharomyces* species, a *Trichoderma* species, a *Pseudomonas* species may lead to an addition of peptides to the OVD or OVL sequence as part of post-transcriptional or post-translational modifications. Such peptides may not be part of the native OVD or OVL sequences. For instance, expressing an OVD sequence in a *Pichia* species, such as *Komagataella phaffii* and *Komagataella pastoris* may lead to addition of a peptide at the N-terminus or C-terminus. In some cases, a tetrapeptide EAEA (SEQ ID NO: 53) is added to the N-terminus of the OVD sequence upon expression in a host cell. In some embodiments, rOVD or rOVL or both include the amino acids EAEA at the N-terminus. An OVD or OVL protein sequence can include a signal sequence, such as for directing secretion from a host cell. In some cases, the signal sequence may be a native signal sequence. In some cases, a signal sequence may be a heterologous signal sequence. For instance, an alpha mating factor signal sequence can be fused to an OVD or OVL sequence for expression and secretion in a yeast cell such as a *Pichia* sp. In some cases, the signal sequence is removed in whole or in part when the protein, such as an rOVD or rOVL, is secreted from the host cell.

An rOVD and/or rOVL can be a non-naturally occurring variant of an OVD and/or OVL. Such variant can comprise one or more amino acid insertions, deletions, or substitutions relative to a native OVD or native OVL sequence.

Such an rOVD variant can have at least 70%, 75%, 80%, 85%, 90%, 95%, 96%, 97%, 98%, or 99% sequence identity to SEQ ID NOs: 1-44. A rOVL variant can have at least 70%, 75%, 80%, 85%, 90%, 95%, 96%, 97%, 98%, or 99% sequence identity to SEQ ID NOs: 45-51. The term "sequence identity" as used herein in the context of amino acid sequences is defined as the percentage of amino acid residues in a candidate sequence that are identical with the amino acid residues in a selected sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, ALIGN-2 or Megalign (DNASTAR) software. Those skilled in the art can determine appropriate parameters for measuring alignment, including any algorithms needed to achieve maximal alignment over the full-length of the sequences being compared.

In some embodiments, a variant is one that confers additional features, such as reduced allergenicity. For example, an rOVD can include G162M and/or F167A (such as in SEQ ID NO: 3) relative to a wild type OVD sequence SEQ ID NO: 2 and have reduced allergenicity as compared to the wild type OVD sequence.

Depending on the host organism used to express the rOVD and/or rOVL, the rOVD and/or rOVL can have a glycosylation, acetylation, or phosphorylation pattern different from wildtype OVD (e.g., native OVD) or wildtype OVL (e.g., native OVL). For example, the rOVD and/or rOVL herein may or may not be glycosylated, acetylated, or phosphorylated. An rOVD and/or rOVL may have an avian, non-avian, microbial, non-microbial, mammalian, or non-mammalian glycosylation, acetylation, or phosphorylation pattern.

An rOVD and/or rOVL is recombinantly expressed in a host cell. As used herein, a "host" or "host cell" denotes here any protein production host selected or genetically modified to produce a desired product. Exemplary hosts include fungi, such as filamentous fungi, as well as bacteria, yeast, plant, insect, and mammalian cells. A host cell may be *Arxula* spp., *Arxula adeninivorans, Kluyveromyces* spp., *Kluyveromyces lactis, Komagataella phaffii, Pichia* spp., *Pichia angusta, Pichia pastoris, Saccharomyces* spp., *Saccharomyces cerevisiae, Schizosaccharomyces* spp., *Schizosaccharomyces pombe, Yarrowia* spp., *Yarrowia lipolytica, Agaricus* spp., *Agaricus bisporus, Aspergillus* spp., *Aspergillus awamori, Aspergillus fumigatus, Aspergillus nidulans, Aspergillus niger, Aspergillus oryzae, Bacillus subtilis, Colletotrichum* spp., *Colletotrichum gloeosporiodes, Endothia* spp., *Endothia parasitica, Escherichia coli, Fusarium* spp., *Fusarium graminearum, Fusarium solani, Mucor* spp., *Mucor miehei, Mucor pusillus, Myceliophthora* spp., *Myceliophthora thermophila, Neurospora* spp., *Neurospora crassa, Penicillium* spp., *Penicillium camemberti, Penicillium canescens, Penicillium chrysogenum, Penicillium* (*Talaromyces*) *emersonii, Penicilliumfuniculo sum, Penicillium purpurogenum, Penicillium roqueforti, Pleurotus* spp., *Pleurotus ostreatus, Rhizomucor* spp., *Rhizomucor miehei, Rhizomucor pusillus, Rhizopus* spp., *Rhizopus arrhizus, Rhizopus oligosporus, Rhizopus oryzae, Trichoderma* spp., *Trichoderma altroviride, Trichoderma reesei*, or *Trichoderma vireus*. A host cell can be an organism that is approved as generally regarded as safe by the U.S. Food and Drug Administration.

A recombinant protein can be recombinantly expressed in yeast, filamentous fungi or a bacterium. In some embodiments, recombinant protein is recombinantly expressed in a *Pichia* species (*Komagataella phaffii* and *Komagataella pastoris*), a *Saccharomyces* species, a *Trichoderma* species, a *Trichoderma* species, a *Pseudomonas* species or an *E. coli* species.

A host cell may be transformed to include one or more expression cassettes. As examples, a host cell may be transformed to express one expression cassette, two expression cassettes, three expression cassettes or more expression cassettes.

In some cases, rOVD and/or rOVL may be deglycosylated or modified in its glycosylation (e.g., chemically, enzymatically through endoglucanases (such as EndoH), endoglycosidases, mannosidases (such as alpha-1,2 mannosidase), PNGase F, O-Glycosidase, OCH1, Neuraminidase, β,1-4 Galactosidase, β-N-acetylglucosaminidases, etc.), deacetylated (e.g., protein deacetylase, histone deacetylase, sirtuin), or dephosphorylated (e.g., acid phosphatase, lambda protein phosphatase, calf intestinal phosphatase, alkaline phosphatase). Deglycosylation, deacetylation or dephosphorylation may produce a protein that is more uniform or is capable of producing a composition with less variation.

The present disclosure contemplates modifying glycosylation of the recombinant OVD to alter or enhance one or more functional characteristics of the protein and/or its production. A host cell may comprise heterologous enzymes that modify the glycosylation pattern of ovomucoid. In some cases, one or more enzymes may be used for modifying the glycosylation of rOVD protein. The enzymes used modifying glycosylation of rOVD may be an enzyme or a fusion protein comprising an enzyme or active fragment of an enzyme, for example EndoH or a fusion of OCH1 to EndoH (such as to provide for Golgi retention of the EndoH enzyme) may be provided in a host cell.

Native ovomucoid (nOVD), such as isolated from a chicken or other avian egg, has a highly complex branched form of glycosylation. The glycosylation pattern comprises N-linked glycan structures such as N-acetylglucosamine units and N-linked mannose units. See, e.g., FIG. 1B (left-hand column). In some cases, the rOVD for use in a herein disclosed consumable composition and produced using the methods described herein has a glycosylation pattern which is different than the glycosylation pattern of nOVD. For example, when rOVD is produced in a *Pichia* sp., the protein may be highly glycosylated. FIG. 1C illustrates the glycosylation patterns of rOVD produced by *P. pastoris*, showing a complex branched glycosylation pattern. In some embodiments of the compositions and methods herein, rOVD is treated such that the glycosylation pattern is modified from that of nOVD and also modified as compared to rOVD produced by a *Pichia* sp. without such treatment. In some cases, the rOVD has no glycosylation. In other cases, the rOVD has reduced glycosylation. In some cases, the rOVD is modified by N-acetylglucosamine at one or more asparagine residues of the protein and lacks or is substantially devoid of N-linked mannosylation. See, e.g., FIG. 1B (right hand column). The changes in glycosylation described herein may lead to an increase in the solubility and clarity of rOVD as compared to other forms of protein such as whey proteins, soy proteins, pea proteins, and nOVD.

In some cases, an enzyme used for modifying glycosylation may be transformed into a host cell. In some cases, the enzyme used for modifying glycosylation may be transformed into the same host cell that produces rOVD. In some cases, the enzyme may be provided transiently to the host cell, such as by an inducible expression system. In some cases, when a host cell expresses an enzyme used for modifying glycosylation, the recombinant protein (e.g., rOVD and rOVL) is secreted from the host cell in the modified state.

In one example, a host cell producing OVD comprises a fusion of EndoH and OCH1 enzymes. An exemplary OCH1-EndoH protein sequence is provided as SEQ ID No: 52. In such cases, an rOVD produced from the host cell comprises a glycosylation pattern substantially different from an rOVD which is produced in a cell without such enzymes. The rOVD produced in such cases is also substantially different as compared to a native OVD (e.g., produced by a chicken or other avian egg). FIG. 1B shows a comparison of nOVD (with mannose residues) and rOVD glycosylation patterns wherein the rOVD was treated with EndoH and comprises an N-acetylglucosamine residue at the asparagine but no mannose residues. FIG. 1C shows the glycosylation pattern of rOVD produced in a host cell such as *P. pastoris* and where rOVD was not treated with EndoH and has both N-acetylglucosamine resides as well as the chains of N-linked mannose residues. Modification of the glycosylation of rOVD may provide nutritional benefits to rOVD, such as a higher nitrogen to carbon ratio, and may improve the clarity and solubility of the protein. In some cases, the modification of the glycosylation of rOVD is performed within the host cell that produces rOVD before the rOVD is secreted from the host cell and/or before isolating the rOVD. In some cases, modification of the glycosylation of rOVD is performed after its secretion and/or after isolating rOVD from the host cell.

The molecular weight or rOVD may be different as compared to nOVD. The molecular weight of the protein may be less than the molecular weight of nOVD or less than rOVD produced by the host cell where the glycosylation of rOVD is not modified. In embodiments, the molecular weight of an rOVD may be between 20 kDa and 40 kDa. In some cases, an rOVD with modified glycosylation has a different molecular weight, such as compared to a native OVD (as produced by an avian host species) or as compared to a host cell that glycosylates the rOVD, such as where the rOVD includes N-linked mannosylation. In some cases, the molecular weight of rOVD is greater than the molecular weight of the rOVD that is completely devoid of post-translational modifications. or an rOVD that lacks all forms of N-linked glycosylation.

Expression of an rOVD or rOVL can be provided by an expression vector, a plasmid, a nucleic acid integrated into the host genome or other means. For example, a vector for expression can include: (a) a promoter element, (b) a signal peptide, (c) a heterologous OVD or OVL sequence, and (d) a terminator element.

Expression vectors that can be used for expression of OVD and OVL include those containing an expression cassette with elements (a), (b), (c) and (d). In some embodiments, the signal peptide (c) need not be included in the vector. In general, the expression cassette is designed to mediate the transcription of the transgene when integrated into the genome of a cognate host microorganism.

To aide in the amplification of the vector prior to transformation into the host microorganism, a replication origin (e) may be contained in the vector (such as PUC_ORIC and PUC (DNA2.0)). To aide in the selection of microorganism stably transformed with the expression vector, the vector may also include a selection marker (f) such as URA3 gene and Zeocin resistance gene (ZeoR). The expression vector may also contain a restriction enzyme site (g) that allows for linearization of the expression vector prior to transformation into the host microorganism to facilitate the expression vectors stable integration into the host genome. In some embodiments the expression vector may contain any subset of the elements (b), (e), (f), and (g), including none of elements (b), (e), (f), and (g). Other expression elements and vector element known to one of skill in the art can be used in combination or substituted for the elements described herein.

Exemplary promoter elements (a) may include, but are not limited to, a constitutive promoter, inducible promoter, and hybrid promoter. Promoters include, but are not limited to, acu-5, adh1+, alcohol dehydrogenase (ADH1, ADH2, ADH4), AHSB4m, AINV, alcA, α-amylase, alternative oxidase (AOD), alcohol oxidase I (AOX1), alcohol oxidase 2 (AOX2), AXDH, B2, CaMV, cellobiohydrolase I (cbh1), ccg-1, cDNA1, cellular filament polypeptide (cfp), cpc-2, ctr4+, CUP1, dihydroxyacetone synthase (DAS), enolase (ENO, ENO1), formaldehyde dehydrogenase (FLD1), FMD, formate dehydrogenase (FMDH), G1, G6, GAA, GAL1, GAL2, GAL3, GAL4, GAL5, GAL6, GAL7, GAL8, GAL9, GAL10, GCW14, gdhA, gla-1, α-glucoamylase (glaA), glyceraldehyde-3-phosphate dehydrogenase (gpdA, GAP, GAPDH), phosphoglycerate mutase (GPM1), glycerol kinase (GUTi), HSP82, invl+, isocitrate lyase (ICL1), acetohydroxy acid isomeroreductase (ILV5), KAR2, KEX2, β-galactosidase (lac4), LEU2, melO, MET3, methanol oxidase (MOX), nmt1, NSP, pcbC, PET9, peroxin 8 (PEX8), phosphoglycerate kinase (PGK, PGK1), pho1, PHO5, PH089, phosphatidylinositol synthase (PIS1), PYK1, pyruvate kinase (pki1), RPS7, sorbitol dehydrogenase (SDH), 3-phosphoserine aminotransferase (SER1), SSA4, SV40, TEF, translation elongation factor 1 alpha (TEF1), THI11, homoserine kinase (THR1), tpi, TPS1, triose phosphate isomerase (TPI1), XRP2, YPT1, a sequence or subsequence chosen from SEQ ID Nos: 121 to 132, and any combination thereof. Illustrative inducible promoters include methanol-induced promoters, e.g., DAS1 and pPEX11.

A signal peptide (b), also known as a signal sequence, targeting signal, localization signal, localization sequence, signal peptide, transit peptide, leader sequence, or leader peptide, may support secretion of a protein or polynucleotide. Extracellular secretion of a recombinant or heterologously expressed protein from a host cell may facilitate protein purification. A signal peptide may be derived from a precursor (e.g., prepropeptide, preprotein) of a protein. Signal peptides can be derived from a precursor of a protein other than the signal peptides in native OVD and/or OVL.

Any nucleic acid sequence that encodes OVD and/or OVL can be used as (c). Preferably such sequence is codon optimized for the host cell.

Exemplary transcriptional terminator elements include, but are not limited to, acu-5, adh1+, alcohol dehydrogenase (ADH1, ADH2, ADH4), AHSB4m, AINV, alcA, α-amylase, alternative oxidase (AOD), alcohol oxidase I (AOX1), alcohol oxidase 2 (AOX2), AXDH, B2, CaMV, cellobiohydrolase I (cbh1), ccg-1, cDNA1, cellular filament polypeptide (cfp), cpc-2, ctr4+, CUP1, dihydroxyacetone synthase (DAS), enolase (ENO, ENO1), formaldehyde dehydrogenase (FLD1), FMD, formate dehydrogenase (FMDH), G1, G6, GAA, GAL1, GAL2, GAL3, GAL4, GAL5, GAL6, GAL7, GAL8, GAL9, GAL10, GCW14, gdhA, gla-1, α-glucoamylase (glaA), glyceraldehyde-3-phosphate dehydrogenase (gpdA, GAP, GAPDH), phosphoglycerate mutase (GPM1), glycerol kinase (GUTi), HSP82, invl+, isocitrate lyase (ICL1), acetohydroxy acid isomeroreductase (ILV5), KAR2, KEX2, β-galactosidase (lac4), LEU2, melO, MET3, methanol oxidase (MOX), nmt1, NSP, pcbC, PET9, peroxin 8 (PEX8), phosphoglycerate kinase (PGK, PGK1), pho1, PHO5, PH089, phosphatidylinositol synthase (PIS1), PYK1, pyruvate kinase (pki1), RPS7, sorbitol dehydrogenase (SDH), 3-phosphoserine aminotransferase (SER1), SSA4, SV40, TEF, translation elongation factor 1 alpha (TEF1), THI11, homoserine kinase (THR1), tpi, TPS1, triose phosphate isomerase (TPI1), XRP2, YPT1, and any combination thereof.

Exemplary selectable markers (f) may include but are not limited to: an antibiotic resistance gene (e.g. zeocin, ampicillin, blasticidin, kanamycin, nurseothricin, chloroamphenicol, tetracycline, triclosan, ganciclovir, and any combination thereof), an auxotrophic marker (e.g. ade1, arg4, his4, ura3, met2, and any combination thereof).

In one example, a vector for expression in *Pichia* sp. can include an AOX1 promoter operably linked to a signal peptide (alpha mating factor) that is fused in frame with a nucleic acid sequence encoding OVD and/or OVL, and a terminator element (AOX1 terminator) immediately downstream of the nucleic acid sequence encoding OVD and/or OVL.

In another example, a vector comprising a DAS1 promoter is operably linked to a signal peptide (alpha mating factor) that is fused in frame with a nucleic acid sequence encoding OVD and/or OVL and a terminator element (AOX1 terminator) immediately downstream of OVD and/or OVL.

A recombinant protein described herein may be secreted from the one or more host cells. In some embodiments, rOVD and/or rOVL protein is secreted from the host cell. The secreted rOVD and/or rOVL may be isolated and purified by methods such as centrifugation, fractionation, filtration, affinity purification and other methods for separating protein from cells, liquid and solid media components and other cellular products and byproducts. In some embodiments, rOVD and/or rOVL is produced in a *Pichia* Sp. and secreted from the host cells into the culture media. The secreted rOVD and/or rOVL is then separated from other media components for further use.

In some cases, multiple vectors comprising OVD may be transfected into one or more host cells. A host cell may comprise more than one copy of OVD. A single host cell may comprise 2, 3, 4, 5, 6, 7, 8, 9, 10, 11, 12, 13, 14, 15, 16, 17, 18, 19 or 20 copies of OVD. A single host cell may comprise one or more vectors for the expression of OVD. A single host cell may comprise 2, 3, 4, 5, 6, 7, 8, 9 or 10 vectors for OVD expression. Each vector in the host cell may drive the expression of OVD using the same promoter. Alternatively, different promoters may be used in different vectors for OVD expression.

The consumable products and rOVD and/or rOVL compositions herein can be essentially free of any microbial cells or microbial cell contaminants. For instance, rOVD and/or rOVL may be isolated from a culture comprising microbial growth.

rOVD may be treated chemically or enzymatically before it is purified for use in a consumable composition. Such treatments may be performed to reduce impurities in an rOVD protein composition. Such treatments may be performed to improve the sensory attributes of the rOVD protein composition. Treatments may include but are not limited to purification steps, filtration, chemical treatments, and enzymatic treatments.

In some cases, rOVD protein and compositions containing rOVD protein, including forms of rOVD with modified glycosylation (e.g., such forms with N-acetylglucosamine but lacking N-linked mannose residues) may be treated with oxidizing agent or an oxygen-generating agent to modify components of the rOVD composition, such as impurities. The oxidizing agent or oxygen-generating agent may comprise hydrogen peroxide, sodium percarbonate, activated chlorine dioxide, bubbled oxygen or ozone. The treatment may improve the solubility and clarity of an rOVD composition. The treatment may reduce the odor of an rOVD composition. The treatment may neutralize the color of an rOVD composition; for instance, the rOVD composition may lose color after a treatment, e.g., to a less intense/lighter coloration. In embodiments, the color may change form greenish to yellowish and/or from yellowish to essentially colorless.

In some examples, rOVD may be treated with an oxidizing agent or an oxygen-generating agent, e.g., hydrogen peroxide or sodium percarbonate, before it is purified for use in a consumable composition. A culture medium comprising secreted or isolated rOVD may be treated with an oxygen-generating agent, e.g., hydrogen peroxide or sodium percarbonate. Using hydrogen peroxide as an example, a hydrogen peroxide treatment may be followed by one or more wash steps and/or filtration steps to remove hydrogen peroxide from the resulting rOVD compositions. Such steps may be performed following treatments with other oxygen-generating agents, e.g., sodium percarbonate.

In some cases, the concentration of hydrogen peroxide used for treating rOVD may be from 1% to 20%. The concentration of hydrogen peroxide used for treating rOVD may be at least 1%. The concentration of hydrogen peroxide used for treating rOVD may be at most 20%. The concentration of hydrogen peroxide used for treating rOVD may be 1% to 2%, 1% to 5%, 1% to 7%, 1% to 10%, 1% to 12%, 1% to 15%, 1% to 17%, 1% to 20%, 2% to 5%, 2% to 7%, 2% to 10%, 2% to 12%, 2% to 15%, 2% to 17%, 2% to 20%, 5% to 7%, 5% to 10%, 5% to 12%, 5% to 15%, 5% to 17%, 5% to 20%, 7% to 10%, 7% to 12%, 7% to 15%, 7% to 17%, 7% to 20%, 10% to 12%, 10% to 15%, 10% to 17%, 10% to 20%, 12% to 15%, 12% to 17%, 12% to 20%, 15% to 17%, 15% to 20%, or 17% to 20% weight per total weight (w/w) and/or weight per total volume (w/v). The concentration of hydrogen peroxide used for treating rOVD may be about 1%, 2%, 5%, 7%, 10%, 12%, 15%, 17%, or 20% w/w or w/v. The concentration of hydrogen peroxide used for treating rOVD may be at least 1%, 2%, 5%, 7%, 10%, 12%, 15% or 17% w/w or w/v. The concentration of hydrogen peroxide used for treating rOVD may be at most 2%, 5%, 7%, 10%, 12%, 15%, 17%, or 20% w/w or w/v.

rOVD may be treated with hydrogen peroxide for a limited duration of time. For instance, rOVD may be exposed to hydrogen peroxide for at least 1 hour, 2 hours, 3 hours, 5 hours, 7 hours, 10 hours, 12 hours, 15 hours, 17 hours, 20 hours, 22 hours, 24 hours, 26 hours, 28 hours, 30 hours, 34 hours, 36 hours, 40 hours, 44 hours or 48 hours. Hydrogen peroxide may be added to the rOVD culture media throughout the culturing process.

rOVD may be treated with hydrogen peroxide at a pH of about 3 to 6. rOVD may be treated with hydrogen peroxide at a pH of about 3, 3.2, 3.4, 3.6, 3.8, 4, 4.1, 4.2, 4.4, 4.6, 4.8, 5, 5.2, 5.4, 5.6, 5.8 or 6. rOVD may treated with hydrogen peroxide at a pH of at least 3, 3.2, 3.4, 3.6, 3.8, 4, 4.1, 4.2, 4.4, 4.6, 4.8, 5, 5.2, 5.4, 5.6 or 5.8. rOVD may treated with hydrogen peroxide at a pH of at most 3.2, 3.4, 3.6, 3.8, 4, 4.1, 4.2, 4.4, 4.6, 4.8, 5, 5.2, 5.4, 5.6, 5.8 or 6.

rOVD may be filtered before treatment with an oxygen-generating agent. In some cases, rOVD may be filtered before and after treatment with an oxygen-generating agent.

rOVA

Proteins are important dietary nutrients and food ingredients. They can serve as a fuel source or as sources of amino acids, including the essential amino acids that cannot be synthesized by the body. The daily recommended intake of protein for healthy adults is 10% to 35% of a person's total calorie needs, and currently the majority of protein intake for most humans is from animal-based sources. In addition, proteins are used in a wide variety of foods and food ingredients. In many cases, these proteins are sourced from animals. With the world population growth and the coinciding growth in global food demand, there is a need to provide alternative sustainable, non-animal-based sources of proteins as useful source of protein for daily diet, food ingredients and food products.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Provided herein are compositions and methods of making compositions for non-animal-based sources of proteins which provide nutritional as well as functional properties to food ingredients and consumable products for ingestion by an animal, including a human, such as for daily diet, ingredients for human food and treats and for human and animal nutrition.

The compositions and methods provided herein contain fermentation-derived ovalbumin, produced through recombinant technology, i.e., a recombinant ovalbumin (rOVA). The compositions and methods for making compositions comprising rOVA can increase the protein content of a consumable or food ingredient, and also provide functional features for use in the preparation of food ingredients and consumable food products for animal and human ingestion.

In some embodiments, the rOVA provides one or more functional characteristics such as of gelling, foaming, whipping, fluffing, binding, springiness, aeration, coating, film forming, emulsification, browning, thickening, texturizing, humectant, clarification, and cohesiveness. The rOVA with such feature(s) can be a food ingredient that provides for production of an egg-less or animal-free food ingredient or food product.

As used herein "native" in the context of native egg white, native egg protein, native ovalbumin and native egg, refers to the egg white, egg protein, ovalbumin or whole egg, respectively, produced by an animal or collected from an animal, in particular an egg-laying animal such as a bird. The rOVA and compositions containing rOVA can be used in food ingredients and food products, such that the ingredient or product does not contain any native egg white, native egg protein, native ovalbumin or native egg. In some cases, the ingredients or food products made using rOVA do not include any egg-white proteins other than rOVA. The rOVA and compositions containing rOVA can be used in food ingredients and food products, such that the ingredient or product does not contain any animal products.

In some embodiments, the rOVA can (alone or with other ingredients) substitute for the use of whole egg or egg white in the production of a food product. In some embodiments, the feature(s) provided by the rOVA is substantially the same or better than the same characteristic provided by a native egg white or native egg. For example, the rOVA and compositions containing rOVA can have gelling, foaming, whipping, fluffing, binding, springiness, aeration, coating, film forming, emulsification, browning, thickening, texturizing, preserving moisture (humectant), clarification, and cohesiveness, improved color, such as a whiter color, as compared to native egg white or native whole egg and compositions made with native egg white.

Food Ingredients and Food Products with rOVA

Food ingredients and food products disclosed herein include compositions that comprise, consists essentially of, or consist of rOVA, where rOVA provides at least one functional feature to the composition, food ingredient, or food product. In some cases, at least one functional feature provided by the rOVA is comparable or substantially similar to a native egg or egg white or native OVA (nOVA). For instance, it may provide any one of gelling, foaming, whipping, fluffing, binding, springiness, aeration, coating, film forming, emulsification, browning, thickening, texturizing, preserving moisture (humectant), clarification, and cohesiveness comparable to a whole egg, egg-white or nOVA composition. In some embodiments, the at least one functional feature is provided by or provided substantially by the inclusion of rOVA in the food ingredient or food product, for example, in the absence of any other whole egg proteins or egg white proteins.

Such compositions can include rOVA in an amount between 0.1% and 25% on a weight/weight (w/w) or weight/volume (w/v) basis. rOVA may be present at or at least at 0.1%, 0.2%, 0.25%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% on a weight/weight (w/w) or weight/volume (w/v) basis. These concentrations can be based on the dry weight of the composition. Additionally, or alternatively, the concentration of rOVA in such compositions is at most 30%, 20%, 15%, 10%, 5%, 4%, 3%, 2% or 1% on a w/w or w/v basis. In some embodiments, the rOVA in the food ingredient or food product can be at a concentration range of 0.1%-20%, 1%-20%, 0.1%-10%, 1%-10%, 0.1%-5%, 1%-5%, 2-10%, 4-8%, 4-10%, 4-12%, 0.1%-2%, 1%-2% or 0.1-1%.

Provided herein are consumable food compositions and methods of making such compositions where rOVA provides at least one feature of whole egg or egg-whites to a consumable food composition. In some embodiments, rOVA is added to a consumable food composition to increase the protein content, such as for added nutrition. In some embodiments, rOVA is present in the consumable food composition between about 1% and about 40% on a weight per total weight (w/w) and/or weight per total volume (w/v) of composition basis. For example, in a composition of 100 ml, rOVA is present at 30 g and the rOVA is thus at a 30% concentration (w/v) or for example, in a composition of 100 g, rOVA is present at 30 g and the rOVA is thus at a 30% concentration (w/w). In some embodiments, the concentration of rOVA is or is about 0.5%, 1%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% on a w/w and/or w/v of composition basis. In some embodiments, the rOVA is present at a concentration of or of about 0.5-1%, 1-5%, 2-8%, 4-8%, 2-12%, 4-12%, 5-10%, 10-15%, 15-20%, 20-25%, 25-30% or rOVA is present concentration greater than 1%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% w/w and/or w/v.

A consumable product can include one or more other proteins, such as a non-OVA protein or a non-recombinant protein. The rOVA can increase amount of protein content in a consumable product, and/or provide one or more egg-white like features. For example, the consumable composition can include a whey protein, a pea protein, a soy protein, an almond protein, an oat protein, a flax seed protein, a vegetable protein, or an egg-white protein. The consumable protein may include an extruded plant protein or a non-extruded plant protein. In some cases, the one or more other proteins can comprise OVA having an amino acid sequence naturally found in a bird or a reptile.

In some embodiments, the compositions and methods for making compositions have an egg-white like property and increase the protein content in the composition. In some embodiments, the compositions and methods for making compositions with an egg-white like property increase the protein content, while not adversely affecting the stability, or one or more sensory qualities of the composition.

In some embodiments, the consumable food compositions and methods for making consumable food compositions comprise rOVA and the addition of rOVA generates an egg-white like composition. The consumable food composition may be a finished product or an ingredient for making a finished product, e.g., a liquid or a powdered rOVA composition.

rOVA protein may be used on its own or in combination with other components to form a composition. In some embodiments, rOVA is used as an ingredient to form a composition and the rOVA ingredient (or rOVA starting composition to be added) may contain about or at least about 10%, 20%, 30%, 40%, 50%, 55%, 60%, 65%, 70%, 75%, 80%, 85%, 90%, 95%, 96%, 97%, 98%, or 99% rOVA by weight per total weight (w/w) and/or weight per total volume (w/v). In some cases, a composition described herein may contain up to about 10%, 20%, 30%, 40%, 50%, 55%, 60%, 65%, 70%, 75%, 80%, 85%, 90%, 95%, 96%, 97%, 98%, or 99% rOVA by w/w or w/v. In some embodiments, about or at least about 10%, 20%, 30%, 40%, 50%, 55%, 60%, 65%, 70%, 75%, 80%, 85%, 90%, 95%, 96%, 97%, 98%, or 99% of the protein in a composition is rOVA by weight per total weight (w/w) and/or weight per total volume (w/v). In some cases, up to or about 10%, 20%, 30%, 40%, 50%, 55%, 60%, 65%, 70%, 75%, 80%, 85%, 90%, 95%, 96%, 97%, 98%, or 99% of the protein in a composition is rOVA by w/w or w/v.

In some embodiments, a composition described herein contains total protein at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, or 75 g total protein per 100 mL liquid (e.g., water). In some cases, a composition described herein contains total protein at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, 75, 80, 85, 90, 95, or 100 g total protein per 100 g composition (e.g., powder).

In some embodiments, a composition described herein contains rOVA at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, or 75 g per 100 mL liquid (e.g., water). In some cases, a composition described herein contains rOVA at a concentration of about or at least 5, 6, 7, 8, 9, 10, 11, 12, 13, 13.2, 14, 15, 16, 17, 18, 19, 20, 21, 22, 23, 24, 25, 30, 35, 40, 45, 50, 55, 60, 65, 70, 75, 80, 85, 90, 95, or 100 g total protein per 100 g composition (e.g., powder)

In some embodiments, a composition described herein contains total protein at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g total protein per 100 mL liquid (e.g., water). In some cases, a composition described herein contains total protein at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g total protein per 100 g composition (e.g., powder).

In some embodiments, a composition described herein contains rOVA at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g per 100 mL liquid (e.g., water). In some cases, a composition described herein contains rOVA at a concentration of about or at least 0.1, 0.2, 0.3, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7 or 5 g per 100 g composition (e.g., powder).

In some embodiments, the rOVA consumable composition is a liquid composition. In such cases, the concentration of rOVA in the liquid composition may be between 0.1% to 90%. The concentration of rOVA in the liquid composition may be at least 0.1%. The concentration of rOVA in the liquid composition may be at most 90%. The concentration of rOVA in the liquid composition may be from 0.1% to 1%, 0.1% to 5%, 0.1% to 10%, 0.1% to 15%, 0.1% to 20%, 0.1% to 25%, 0.1% to 30%, 0.1% to 35%, 0.1% to 40%, 1% to 5%, 1% to 10%, 1% to 15%, 1% to 20%, 1% to 25%, 1% to 30%, 1% to 35%, 1% to 40%, 5% to 10%, 5% to 15%, 5% to 20%, 5% to 25%, 5% to 30%, 5% to 35%, 5% to 40%, 10% to 15%, 10% to 20%, 10% to 25%, 10% to 30%, 10% to 35%, 10% to 40%, 15% to 20%, 15% to 25%, 15% to 30%, 15% to 35%, 15% to 40%, 20% to 25%, 20% to 30%, 20% to 35%, 20% to 40%, 25% to 30%, 25% to 35%, 25% to 40%, 30% to 35%, 30% to 40%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, or 90% to 95% in weight per total volume (w/v). The concentration of rOVA in the liquid composition may be about 0.1%, 1%, 5%, 10%, 15%, 20%, 25%, 30%, 35%, 40%, 45%, 50%, 55%, 60%, 65%, 70%, 75%, 80%, 85%, 90%, or 95% w/v. The concentration of rOVA in the liquid composition may be at least 0.1%, 1%, 5%, 10%, 15%, 20%, 25%, 30%, 35%, 40%, 45%, 50%, 55%, 60%, 65%, 70%, 75%, 80%, 85%, 90%, or 95% w/v. The concentration of rOVA in the liquid composition may be at most 1%, 5%, 10%, 15%, 20%, 25%, 30%, 35% 40%, 45%, 50%, 55%, 60%, 65%, 70%, 75%, 80%, 85%, 90%, or 95% w/v. In some embodiments, rOVA is the sole protein in the liquid composition. In other embodiments, a liquid composition comprises proteins other than rOVA.

In some embodiments, the rOVA consumable composition is a solid composition. In such cases, the concentration of rOVA in the solid composition may be between 0.1% to 70%. The concentration of rOVA in the solid composition may be at least 0.1%. The concentration of rOVA in the solid composition may be at most 70%. The concentration of rOVA in the solid composition may be 0.1% to 1%, 0.1% to 10%, 0.1% to 20%, 0.1% to 30%, 0.1% to 40%, 0.1% to 50%, 0.1% to 60%, 0.1% to 70%, 1% to 10%, 1% to 20%, 1% to 30%, 1% to 40%, 1% to 50%, 1% to 60%, 1% to 70%, 10% to 20%, 10% to 30%, 10% to 40%, 10% to 50%, 10% to 60%, 10% to 70%, 20% to 30%, 20% to 40%, 20% to 50%, 20% to 60%, 20% to 70%, 30% to 40%, 30% to 50%, 30% to 60%, 30% to 70%, 40% to 50%, 40% to 60%, 40% to 70%, 50% to 60%, 50% to 70%, or 60% to 70% weight per total weight (w/w) and/or weight per total volume (w/v). The concentration of rOVA in the solid composition may be 0.1%, 1%, 10%, 20%, 30%, 40%, 50%, 60%, or 70% w/w or w/v. The concentration of rOVA in the solid composition may be at least 0.1%, 1%, 10%, 20%, 30%, 40%, 50% or 60% w/w or w/v. The concentration of rOVA in the solid composition may be at most 1%, 10%, 20%, 30%, 40%, 50%, 60%, or 70% w/w or w/v.

In some embodiments, the rOVA consumable composition is a powdered composition. In such cases, the concentration of rOVA in the powder composition may be between 15% to 99% weight per total weight (w/w) and/or weight per total volume (w/v). The concentration of rOVA in the powder composition may be at least 15% w/w or w/v. In embodiments, the concentration of rOVA in the powder composition may be at most 99% w/w or w/v. The concentration of rOVA in the powder composition may be 15% to 30%, 15% to 45%, 15% to 60%, 15% to 75%, 15% to 80%, 15% to 85%, 15% to 90%, 15% to 95%, 15% to 99%, 30% to 45%, 30% to 60%, 30% to 75%, 30% to 80%, 30% to 85%, 30% to 90%, 30% to 95%, 30% to 99%, 45% to 60%, 45% to 75%, 45% to 80%, 45% to 85%, 45% to 90%, 45% to 95%, 45% to 99%, 60% to 75%, 60% to 80%, 60% to 85%, 60% to 90%, 60% to 95%, 60% to 99%, 75% to 80%, 75% to 85%, 75% to 90%, 75% to 95%, 75% to 99%, 80% to 85%, 80% to 90%, 80% to 95%, 80% to 99%, 85% to 90%, 85% to 95%, 85% to 99%, 90% to 95%, 90% to 99%, or 95% to 99% w/w or w/v. The concentration of rOVA in the powder composition may be about 15%, 30%, 45%, 60%, 75%, 80%, 85%, 90%, 95%, or 99% w/w or w/v. The concentration of rOVA in the powder composition may be at least 15%, 30%, 45%, 60%, 75%, 80%, 85%, 90% or 95% w/w or w/v. The concentration of rOVA in the powder composition may be at most 30%, 45%, 60%, 75%, 80%, 85%, 90%, 95%, or 99% w/w or w/v. In some embodiments, rOVA is the sole protein in the powder composition. In other embodiments, a powder composition comprises proteins other than rOVA.

In some cases, a powder composition may be a concentrate which comprises at least 70% rOVA w/w. In some cases, a powder composition may be a concentrate which comprises at least 80% rOVA w/w. In some cases, a powder composition may be an isolate which comprises at least 90% rOVA w/w. In some cases, a powder composition may be an isolate which comprises at least 95% rOVA w/w.

In some embodiments, the rOVA consumable composition is a concentrated liquid composition. In such cases, the concentration of rOVA in the concentrated liquid composition may be between 10% to 60% weight per total weight (w/w) and/or weight per total volume (w/v). The concentration of rOVA in the concentrated liquid may be at least 10% w/w or w/v. The concentration of rOVA in the concentrated liquid may be at most 60% w/w or w/v. The concentration of rOVA in the concentrated liquid may be 10% to 20%, 10% to 30%, 10% to 40%, 10% to 50%, 10% to 60%, 20% to 30%, 20% to 40%, 20% to 50%, 20% to 60%, 30% to 40%, 30% to 50%, 30% to 60%, 40% to 50%, 40% to 60%, or 50% to 60% w/w or w/v. The concentration of rOVA in the concentrated liquid may be about 10%, 20%, 30%, 40%, 50%, or 60% w/w or w/v. The concentration of rOVA in the concentrated liquid may be at least 10%, 20%, 30%, 40% or 50% w/w or w/v. The concentration of rOVA in the concentrated liquid may be at most 20%, 30%, 40%, 50%, or 60% w/w or w/v. The liquid may include any consumable solvent, e.g., water, dairy, oil, or other cooking base.

In some embodiments, the rOVA consumable composition is a prepared food for example, as a baked good, a salad dressing, an egg-like dish (such as an egg-patty or scramble), a dessert or dairy-like product or a meat-analog (such as a vegan meat patty, sausage or hot dog). Such compositions can include rOVA in an amount between 0.1% and 20% on a weight/weight (w/w) or weight/volume (w/v) basis. rOVA may be present at or at least at 0.1%, 0.2%, 0.25%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, or 20% on a weight/weight (w/w) or weight/volume (w/v) basis. Additionally, or alternatively, the concentration of rOVA in such compositions is at most 30%, 20%, 15%, 10%, 5%, 4%, 3%, 2% or 1% on a w/w or w/v basis. In some embodiments, the rOVA in the food ingredient or food product can be at a concentration range of 0.1%-20%, 1%-20%, 0.1%-10%, 1%-10%, 0.1%-5%, 1%-5%, 0.1%-2%, 1%-2% or 0.1-1%.

Features and Characteristics of rOVA Compositions and Food Ingredients and Food Products Containing rOVA The rOVA containing compositions herein can provide one or more functional features to food ingredients and food products. In some embodiments, the rOVA provides a nutritional feature such as protein content, protein fortification and amino acid content to a food ingredient or food product. The nutritional feature provided by rOVA in the composition may be comparable or substantially similar to an egg, egg white or native OVA (nOVA). The nutritional feature provided by rOVA in the composition may be better than that provided by a native whole egg or native egg white. In some cases, rOVA provides the one or more functional features of egg-white in absence of any other egg-white proteins.

rOVA compositions disclosed herein can provide foaming and foam capacity to a composition. For example, rOVA can be used for forming a foam to use in baked products, such as cakes, for meringues and other foods where rOVA can replace egg white to provide foam capacity. In some cases, rOVA provides foaming and foam capacity of egg-white in absence of any other egg-white proteins.

A composition comprising rOVA may have a foam height greater than a foam height of an egg white or a composition comprising nOVA. In some cases, a composition comprising rOVA may have a foam height of about or at least 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white, nOVA compositions or a substitute egg white. In some cases, a composition comprising rOVA may have a foam height of up to 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white, nOVA compositions or a substitute egg white. Substitute egg whites may include products such as aquafaba, chia seeds, flax seeds, starches; apple sauce, banana puree; condensed milk, etc. which are commonly used as egg white substitutes.

A composition comprising rOVA may have a foam stability greater than a foam stability of an egg white, nOVA compositions or a substitute egg white. In some cases, a composition comprising rOVA may have a foam stability of about or at least 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white or a substitute egg white. In some cases, a composition comprising rOVA may have a foam stability of up to 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white. Foam stability may be calculated by measuring drainage of a foamed solution. The drainage may be measured in 10-minute increments for 30 minutes to gather data for foam stability. The drained volume after 30 minutes may be compared to the initial liquid volume (5 mL) for instance, foam Stability (%): (Initial volume−drained volume)/initial volume*100.

A composition comprising rOVA may have a foam capacity greater than a foam capacity of an egg white, nOVA compositions or a substitute egg white. In some cases, a composition comprising rOVA may have a foam capacity of about or at least 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white, nOVA or a substitute egg white. In some cases, a composition comprising rOVA may have a foam capacity of up to 50%, 55%, 60%, 65%, 70%, 75%, 80%, 85%, 90%, 95%, 100%, 105%, 110%, 115%, 120%, 125%, 130%, 135%, 140%, 145%, 150%, 160%, 170%, 180%, 190%, 200%, 210%, 220%, 230%, 240%, 250%, 260%, 270%, 280%, 290%, 300%, 350%, 400%, 450%, or 500% relative to an egg white, nOVA compositions or a substitute egg white. Foam capacity may be determined by measuring the initial volume of foam following the whipping and compare against the initial volume of 5 mL. Foam Capacity (%)=(volume of foam/initial volume)*100.

A liquid composition may foam faster than a composition comprising egg whites, nOVA or a substitute egg white. In some cases, an rOVA composition foams at least 1%, 5%, 10%, 15%, 20%, 25%, 30%, 35%, 40%, 45%, 50%, 55%, 60%, 65%, 70%, 75%, 80%, 85%, 90%, 95%, 100%, faster than an egg white, nOVA or substitute egg-white composition. In some cases, an rOVA composition foams up to 1%, 5%, 10%, 15%, 20%, 25%, 30%, 35%, 40%, 45%, 50%, 55%, 60%, 65%, 70%, 75%, 80%, 85%, 90%, 95%, 100% faster than an egg white, nOVA or substitute egg-white composition.

A composition comprising rOVA may have a gel strength greater than a gel strength of an egg white, nOVA composition or a egg white substitutes. In some cases, the rOVA composition may have a gel strength within the range from 100 g to 1500 g, from 500 g to 1500 g, or from 700 g to 1500 g. In some cases, an rOVA composition has a gel strength of about or at least 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 g. In some cases, an rOVA composition has a gel strength of up to 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 g. In some cases, an rOVA composition has a gel strength of about or at least 50%, 55%, 60%, 65%, 70%, 75%, 80%, 85%, 90%, 95%, 100% relative to an egg white, nOVA or egg white substitutes. In some cases, an rOVA composition has a gel strength of up to 50%, 55%, 60%, 65%, 70%, 75%, 80%, 85%, 90%, 95%, 100% relative to an egg white, nOVA or egg white substitutes.

rOVA compositions disclosed herein can provide structure, texture or a combination of structure and texture. In some embodiments, rOVA is added to a food ingredient or food product for baking and the rOVA provides structure, texture or a combination of structure and texture to the baked product. rOVA can be used in such baked products in place of native egg white, native egg or native egg protein. The addition of rOVA to baked products can also provide protein fortification to improve the nutritional content. In some embodiments, rOVA is used in a baked product in an amount between 0.1% and 25% on a weight/weight or weight/volume basis. In some embodiments, rOVA is used in a baked product in an amount between 0.1% and 5%. In some cases, rOVA provides the structure and/or texture of egg-white in absence of any other egg-white proteins.

rOVA compositions disclosed herein can be compatible with gluten formation, such that the rOVA can be used where gluten formation provides structure, texture and/or form to a food ingredient or food product.

Exemplary baked products in which rOVA can be used as an ingredient include, but are not limited to cake, cookie, bread, bagel, biscuits, muffin, cupcake, scone, pancake, macaroon, choux pastry, meringue, and soufflé. For example, rOVA can be used as an ingredient to make cakes such as pound cake, sponge cake, yellow cake, or angel food cake, where such cakes do not contain any native egg white, native whole egg or native egg protein. Along with rOVA, baked products may contain additional ingredients such as flour, sweetening agents, gum, hydrocolloids, starches, fibers, flavorings (such as flavoring extracts) and other protein sources. In some embodiments, a baked product may include rOVA and at least one fat or oil, at least one grain starch, and optionally at least one sweetener. Grain starch for use in such compositions include flours such as wheat flour, rice flour, corn flour, millet flour, spelt flour, and oat flour, and starches such as from corn, potato, sorghum, and arrowroot. Oil and fat for use in such compositions include plant-derived oils and fats, such as olive oil, corn oil, avocado oil, nut oils (e.g., almond, walnut and peanut) and safflower oil. rOVA may provide such baked goods with at least one characteristic of an egg white such as binding, springiness, aeration, browning, texturizing, humectant, and cohesiveness of the baked product. In some cases, the baked product does not comprise any natural egg white or natural egg, and/or does not include any other egg white derived proteins except rOVA. In some cases, rOVA is provided to the baked composition as an ingredient, such as starting with a concentrate, isolate or powder form of rOVA. In some cases, the rOVA provided as an ingredient for baked products is at a pH range between about 3.5 and 7.0. In some cases, a sweetener is included in the baked product such as a sugar, syrup, honey or sugar-substitute.

rOVA compositions disclosed herein can also be used to prepare egg-less food products, such as food products made where native whole egg or native egg white is a primary or featured ingredient such as scramble, omelet, patty, soufflé, quiche and frittata. In some embodiments, rOVA provides one or more functional features to the preparation including foaming, coagulation, binding, structure, texture, film-formation, nutritional profile, absence of cholesterol (i.e., cholesterol free) and protein fortification. Such egg-less preparations can be vegan, vegetarian, halal, or kosher, or a combination thereof. An egg-less preparation (also referred to as an egg-white substitute) may include rOVA and at least one fat or oil, a polysaccharide or polysaccharide-containing ingredient, and a starch. In some cases, the egg-less preparation may also include a flavoring agent (such as to provide a salty, sulfur-like or umami flavor), and/or a coloring agent (for example to provide yellow-like or off-white color to the baked product). In some cases, the inclusion or rOVA in the egg-less preparation provides a characteristic of natural (native) egg white such as hardness, adhesiveness, fracturability, cohesiveness, gumminess and chewiness when the composition is heated or cooked. Exemplary polysaccharide or polysaccharide-containing ingredients for such compositions include gellan gum, sodium alginate, and psyllium. Oil and fat for use in such compositions include plant-derived oils and fats, such as olive oil, corn oil, avocado oil, and safflower oil.

rOVA compositions disclosed herein can be used for a processed meat product or meat-like product, or for fish-like or shell-fish-like products. In such products, rOVA can provide one or more functional characteristics such as protein content and protein supplementations as well as binding, texturizing properties. Exemplary meat and meat-like products include burger, patty, sausage, hot dog, sliced deli meat, jerky, bacon, nugget and ground meat-like mixtures. Meat-like products can resemble beef, pork, chicken, lamb and other edible and consumed meats for humans and for other animals. Fish-like and shell-fish like products can resemble, for example, fish cakes, crab cakes, shrimp, shrimp balls, fish sticks, seafood meat, crab meat, fish fillets and clam strips. In some embodiments, rOVA is present in an amount between about 0.1% and 30% w/w/or w/v in the meat or meat-like product. In some embodiments, rOVA is used for a meat-like product (also referred to as a meat-analog and includes at least one fat or oil; and a plant-derived protein. Oil and fat for use in such compositions include plant-derived oils and fats, such as olive oil, corn oil, avocado oil, and safflower oil. Plant-derived proteins for use in meat analogs include soy protein, nut proteins, pea protein, lentil and other pulse proteins and whey protein. In some cases, such plant protein is extruded, in other cases, such plant protein is non-extruded protein. In some cases, a meat analog include rOVA at about 2% to 15% (w/w). In some cases for meat analog compositions, rOVA acts as a binding agent, a gelling agent or a combination of a binding and gelling agent for such compositions.

rOVA compositions disclosed herein can be employed in coatings for food products. For example, rOVA can provide binding or adhesion characteristics to adhere batter or breading to another food ingredient. rOVA can be used as an "egg-less egg wash" where the rOVA protein provides appearance, color and texture when coated onto other food ingredients or food products, such as baked products. In one example, the "egg-less egg wash" may be used to coat a baked good such that the baked good adheres to a coating (e.g., seed, salt, spice, and herb). The addition of rOVA as a coating to a food product can provide a crunchy texture or increase the hardness, for example, of the exterior of a food product such as when the product is cooked, baked or fried.

rOVA compositions disclosed herein include sauces and dressings, such as an eggless mayonnaise, commercial mayonnaise substitutes, gravy, sandwich spread, salad dressing or food sauce. Inclusion of rOVA in a sauce or dressing, and the like, can provide one or more characteristics such as binding, emulsifying, odor neutrality, and mouthfeel. In some embodiments rOVA is present in such sauces and dressing in an amount between 0.1% and 3% or between about 3% and about 5% w/w/ or w/v. In some cases, the amount of rOVA in a sauce or dressing may be substantially similar to the amount of whole egg, egg-white or nOVA used in a commercially available or commonly used recipe. Exemplary sauces and dressing include mayonnaise, commercial mayonnaise substitutes, alfredo sauce, and hollandaise sauce. In some embodiments, the rOVA-containing sauce or dressing does not contain whole egg, egg white, or any other protein extracted from egg. In some cases, the sauce, dressing or other emulsified product made with rOVA includes at least one fat or oil and water. Exemplary fats and oils for such compositions include corn oil, safflower oil, nut oils, and avocado oil.

rOVA compositions can be used to prepare confectionaries such as eggless, animal-free, vegetarian and vegan confectionaries. rOVA can provide one or more functional features to the confectionary including odor neutrality, flavor, mouthfeel, texture, gelling, cohesiveness, foaming, frothiness, nutritional value and protein fortification. In some embodiments, the prepared confectionary containing rOVA does not contain any native egg protein or native egg white. rOVA in such confectionaries can provide a firm or chewy texture. In some embodiments, rOVA is present between about 0.1% and 15% in a confectionary. Exemplary confectionaries include a gummy, a taffy, a divinity candy, meringue, marshmallow, and a nougat. In some embodiments, a confectionary includes rOVA, at least one sweetener and optionally a consumable liquid. Exemplary sweeteners include sugar, honey, sugar-substitutes and plant-derived syrups. In some cases, the rOVA is provided as an ingredient for making confectionaries at a pH between about 3.5 and about 7. In some cases, the rOVA is present in the confectionary composition at about 2% to about 15% (w/v). In some embodiments, the confectionary is a food product such as a meringue, a whipped dessert, or a whipped topping. In some embodiments, rOVA in the confectionary provides foaming, whipping, fluffing or aeration to the food product, and/or provides gelation. In some cases, the confectionary is a liquid, such as a foamed drink. In some cases, the liquid may include a consumable alcohol (such as in a sweetened cocktail or after-dinner drink).

rOVA compositions herein can be used in dairy products, dairy-like products or dairy containing products. For example, rOVA can be used in preparations of beverages such as a smoothie, milkshake, “egg-nog”, and coffee beverage. In some embodiments, rOVA is added to additional ingredients where at least one ingredient is a dairy ingredient or dairy-derived ingredient (such as milk, cream, whey, and butter). In some embodiments, rOVA is added to additional ingredients to create a beverage that does not contain any native egg protein, native egg white or native egg. In some embodiments, rOVA is an ingredient in a beverage that does not contain any animal-derived ingredients, such as one that does not contain any native egg-derived or any dairy-derived ingredients. Examples of such non-dairy derived drinks include nut milks, such as soy milk or almond milk. rOVA can also be used to create beverage additions, such as creamer or “milk” to provide protein, flavor, texture and mouthfeel to a beverage such as a coffee, tea, alcohol-based beverages or cocoa. In some embodiments, rOVA is present in a beverage ingredient or beverage addition in an amount between about 0.1% and 20% w/w or w/v.

In some embodiments herein, rOVA can be used to prepare a dairy-like product such as yogurt, cheese or butter. Dairy products with rOVA can include other animal-based dairy components or proteins. In some embodiments, dairy products prepared with rOVA do not include any animal-based ingredients.

Preparations of dessert products can be prepared using rOVA. In dessert products rOVA can provide one or more characteristics such as creamy texture, low fat content, odor neutrality, flavor, mouthfeel, texture, binding, and nutritional value. rOVA may be present in an ingredient or set of ingredients that is used to prepare a dessert product. Exemplary dessert products suitable for preparation with rOVA include a mousse, a cheesecake, a custard, a pudding, a popsicle and an ice cream. In some embodiments, dessert products prepared to include rOVA are vegan, vegetarian or dairy-free. Dessert products that include rOVA can have an amount of rOVA that is between about 0.1% and about 10% rOVA w/w or w/v.

rOVA can be used to prepare a snack food, such as a protein bar, an energy bar, a nutrition bar or a granola bar. The rOVA can provide characteristics to the snack food including one or more of binding, protein supplementation, flavor neutrality, odor neutrality, coating and mouth feel. In some embodiments, rOVA is added to a preparation of a snack food in an amount between about 0.1% and 30% w/w or w/v.

rOVA can be used for nutritional supplements such as in parenteral nutrition, protein drink supplements, protein shakes where rOVA provides a high protein supplement. In some embodiments, rOVA can be added to such compositions in an amount between about 10% and 30% w/w or w/v.

In some embodiments, rOVA compositions can be used as an egg-replacer and an egg white-replacer. rOVA can be mixed or combined with at least one additional component to form the egg white replacer. rOVA can provide one or more characteristics to the egg-replacer or egg white-replacer, such as gelling, foaming, whipping, fluffing, binding, springiness, aeration, creaminess and cohesiveness. In some embodiments, characteristic is the same or better than a native egg or native egg white provided in the same amount or concentration (w/w or w/v). In some embodiments, the egg-replacer or egg white-replacer, does not contain any egg, egg white, protein extracted or isolated from egg.

The rOVA-containing food ingredient and food products, such as described herein, can contain additional ingredients or components. For example, rOVA compositions can be prepared with an additional component such as one or more of a sweetener, a gum, a flavoring, a thickener, an acidulant and an emulsifier. Other ingredients such as flour, grains, oils and fats, fiber, fruit and vegetables can be combined with rOVA. Such rOVA compositions can be vegan, vegetarian, halal, kosher and animal-free, or a combination thereof. In some embodiments, rOVA can be a food ingredient or prepared for a food product that is normally animal based or normally contains animal-derived components, such as meat, dairy or eggs.

Compositions including rOVA including food ingredients and food products can be compatible with one or more steps of consumables preparation such as heated, baked, grilled, roasted, braised, microwaved, broiled, boiled, steamed, extruded, deep fried, or pan-fried, or processed using ohmic heating, Sue Vide, freezing, chilling, blanching, packaging, canning, bleaching, enriching, drying, pressing, grinding, mixing, par cooking, cooking, proofing, marinating, cutting, slicing, dicing, crushing, shredding, chopping, shaking, coring, spiralizing, rolling, juicing, straining, filtering, kneading, whisking, beating, whipping, grating, stuffing, peeling, smoking, curing, salting, preserving, pickling, fermenting, homogenizing, pasteurizing, sterilizing, irradiating, cold plasma processing, high pressure processing, pulse electric field processing, microwave assisted thermal sterilization, stabilizing, blending, pureeing, fortifying, refining, hydrogenating, aging, extending shelf life, or adding enzymes.

Food ingredients and food products prepared with rOVA can be essentially free of any microbial cells or microbial cell debris. For instance, rOVA may be secreted from a microbial host cell and isolated from microbial cells, culture media and/or microbial cell debris.

In some embodiments, rOVA may be prepared as a whole cell extract or fractionated extract such that an rOVA composition contains microbial cells and/or microbial cell components.

In one embodiment, an rOVA composition is prepared for animal consumption where the rOVA is present in a whole cell extract or fractionated extract such that an rOVA composition contains microbial cells and/or microbial cell components. In some embodiments, an rOVA composition is prepared for animal consumption where rOVA is isolated from microbial cells, culture media and microbial cell debris. Exemplary compositions for animal consumption can include a pet food, an animal feed, a chewy treat, bone broth, smoothie or other liquid for animal nutrition and a solid nutritional supplement suitable for animal consumption. In these cases, the microbial cell extract or microbial cell debris may provide additional nutritional value.

Animals which may consume rOVA compositions can include companion animals (e.g., dog, cat, horse), farm animals, exotic animals (lion, tiger, zebra) as well as livestock (such as cow, pig, sheep, goat). rOVA compositions as described herein can also be used for aquaculture (such as for fish and shell fish) and for avian nutrition (such as for bird pets, zoo birds, wild birds, fowl and birds raised for human and animal food).

In some embodiments of the consumable food compositions described herein, the composition is essentially free of animal-derived components, whey protein, caseinate, fat, lactose, hydrolyzed lactose, soy protein, collagen, hydrolyzed collagen, or gelatin, or any combination thereof. A composition described herein may be essentially free of cholesterol, glucose, fat, saturated fat, trans fat, or any combination thereof. In some cases, a composition described herein comprises less than 10%, 5%, 4%, 3%, 2%, 1%, or 0.5% fat by dry weight. In some embodiments, the composition may be fat-containing (e.g., such as a mayonnaise and commercial mayonnaise substitutes) and such composition may include up to about 60% fat or a reduced-fat composition (e.g., reduced fat mayonnaise and commercial mayonnaise substitutes) and such composition may include lesser percentages of fat. A composition that free of an animal-derived component can be considered vegetarian and/or vegan.

In some embodiments, an rOVA powder composition comprises less than 5% ash. The term "ash" is an art-known term and represents inorganics such as one or more ions, elements, minerals, and/or compounds In some cases, the rOVA powder composition comprises less than 5%, 4.5%, 4%, 3.5%, 3%, 2.5%, 2%, 1.5%, 1%, 0.75%, 0.5%, 0.25% or 0.1% ash weight per total weight (w/w) and/or weight per total volume (w/v).

In some embodiments, the moisture content of an rOVA powder composition may be less than 15%. The rOVA powder composition may have less than 15%, 12%, 10%, 8%, 6%, 5%, 3%, 2% or 1% moisture weight per total weight (w/w) and/or weight per total volume (w/v). In some embodiments, the carbohydrate content of an rOVA powder composition may be less than 30%. The rOVA powder composition may have less than 30%, 27%, 25%, 22%, 20%, 17%, 15%, 12%, 10%, 8%, 5%, 3% or 1% carbohydrate content w/w or w/v.

4. Sensory Neutrality and Improved Sensory Appeal

In some embodiments, in addition to the egg-white like properties, the addition of rOVA to a consumable food composition provides increased protein nutritional content, sensory neutrality or an improved sensory appeal as compared to other proteins in such compositions. As used herein "sensory neutrality" refers to the absence of a strong or distinctive taste, odor (smell) or combination of taste and smell, as well as texture, mouth-feel, aftertaste and color. A sensory panel such as one described in Kemp et al. 2009 may be used by a trained sensory analyst. Sensory neutrality may provide an improved sensory appeal to a taster, such as a tester of foods or a consumer, when a consumable food composition containing rOVA is compared with another like composition that has a different protein such as nOVA, whey protein, pea protein, soy protein, whole egg or egg white protein at the same concentration.

In some embodiments, rOVA when added to a consumable food composition is substantially odorless, such as measured by a trained sensory analyst, in comparison with different solutions/products with a different protein component present in an equal concentration to the rOVA containing solution/product, for example, in the comparison is whey, soy, collagen, pea, egg white solid isolates and/or nOVA. In some embodiments of the rOVA compositions described herein, such compositions are essentially odorless at a protein concentration between about 0.5-1%, 1%-5%, 5-10%, 10-15%, 15-20%, 20-25%, 25-30% rOVA weight per total weight (w/w) and/or weight per total volume (w/v) or at a protein concentration of about 0.1, 1, 5, 10, 11, 12, 13, 14, 15, 16, 17, 18, 19, 20, 21, 22, 23, 24, 25, 26, 27, 28, 29 or 30 g of total rOVA protein per 100 mL solution (e.g., per 100 mL water).

In some embodiments, the addition of rOVA to a consumable food composition also provides a neutral taste in addition to the characteristics such as egg-white like properties and increased protein nutrition content. A neutral taste can be measured for example, by a trained sensory analyst in comparison with solutions containing a different protein present in an equal concentration to the rOVA, for example, whey, soy, collagen, pea, whole egg, and egg white solid isolates (including native OVA).

In some embodiments, the addition of rOVA provides a reduction in a certain odor and/or taste that is associated with other proteins or egg-whites. For example, addition of rOVA has less of an "egg-like" odor or taste as compared to the addition of whole egg, fractionated egg or egg-white to a consumable food composition. In some embodiments, addition of rOVA has less of a metallic odor or taste as compared to other protein sources.

In some embodiments, the addition of rOVA has an improved mouth-feel as compared to the addition of other protein sources used to produce egg-white like properties. For example, the addition of rOVA is less grainy or has less precipitates or solids as compared to other protein sources.

In some embodiments, the addition of rOVA has an improved texture, for example, as compared to other available supplemental protein sources.

A consumable composition with rOVA may also have an improved sensory appeal as compared to the composition without rOVA or with a different protein present in an equal concentration to the rOVA. Such improved sensory appeal may relate to taste and/or smell. Taste and smell can be measured, for example, by a trained sensory analyst. In some instances, a sensory analyst compares a consumable composition with rOVA to one without it or with a different protein or protein source in an equivalent amount.

As described herein, a consumable composition herein can be in a liquid form. A liquid form can be an intermediate product such as soluble rOVA solution. In some cases, a liquid form can be a final product, such as a beverage comprising rOVA. Example of different types of beverages contemplated herein include: a juice, a soda, a soft drink, a flavored water, a protein water, a fortified water, a carbonated water, a nutritional drink, an energy drink, a sports drink, a recovery drink, an alcohol-based drink, a heated drink, a coffee-based drink, a tea-based drink, a plant-based milk, a nut milk, a milk based drink, a non-dairy, plant based mild drink, infant formula drink, and a meal replacement drink.

pH of Compositions

The pH of an rOVA composition may be 3.5 to 8. The pH of an rOVA composition may be at least 3.5. The pH of an rOVA composition may be at most 8. The pH of an rOVA composition may be 3.5 to 4, 3.5 to 4.5, 3.5 to 5, 3.5 to 5.5, 3.5 to 6, 3.5 to 6.5, 3.5 to 7, 3.5 to 7.5, 3.5 to 8, 4 to 4.5, 4 to 5, 4 to 5.5, 4 to 6, 4 to 6.5, 4 to 7, 4 to 7.5, 4 to 8, 4.5 to 5, 4.5 to 5.5, 4.5 to 6, 4.5 to 6.5, 4.5 to 7, 4.5 to 7.5, 4.5 to 8, 5 to 5.5, 5 to 6, 5 to 6.5, 5 to 7, 5 to 7.5, 5 to 8, 5.5 to 6, 5.5 to 6.5, 5.5 to 7, 5.5 to 7.5, 5.5 to 8, 6 to 6.5, 6 to 7, 6 to 7.5, 6 to 8, 6.5 to 7, 6.5 to 7.5, 6.5 to 8, 7 to 7.5, 7 to 8, or 7.5 to 8. The pH of an rOVA composition may be 3.5, 4, 4.5, 5, 5.5, 6, 6.5, 7, 7.5, or 8. An rOVA composition with a pH between 3.5 to 7 may have one or more improved functionalities as compared to nOVA, egg white or egg-white substitute compositions.

The pH of an rOVA composition may be 2 to 3.5. The pH of an rOVA composition may be at least 2. The pH of an rOVA composition may be at most 3.5. The pH of an rOVA composition may be 2 to 2.5, 2 to 3, 2 to 3.5, 2.5 to 3, 2.5 to 3.5, or 3 to 3.5. The pH of an rOVA composition may be 2, 2.5, 3, or 3.5.

The pH of an rOVA composition may be 7 to 12. The pH of an rOVA composition may be at least 7. The pH of an rOVA composition may be at most 12. The pH of an rOVA composition may be 7 to 7.5, 7 to 8, 7 to 8.5, 7 to 9, 7 to 9.5, 7 to 10, 7 to 10.5, 7 to 11, 7 to 11.5, 7 to 12, 7.5 to 8, 7.5 to 8.5, 7.5 to 9, 7.5 to 9.5, 7.5 to 10, 7.5 to 10.5, 7.5 to 11, 7.5 to 11.5, 7.5 to 12, 8 to 8.5, 8 to 9, 8 to 9.5, 8 to 10, 8 to 10.5, 8 to 11, 8 to 11.5, 8 to 12, 8.5 to 9, 8.5 to 9.5, 8.5 to 10, 8.5 to 10.5, 8.5 to 11, 8.5 to 11.5, 8.5 to 12, 9 to 9.5, 9 to 10, 9 to 10.5, 9 to 11, 9 to 11.5, 9 to 12, 9.5 to 10, 9.5 to 10.5, 9.5 to 11, 9.5 to 11.5, 9.5 to 12, 10 to 10.5, 10 to 11, 10 to 11.5, 10 to 12, 10.5 to 11, 10.5 to 11.5, 10.5 to 12, 11 to 11.5, 11 to 12, or 11.5 to 12. The pH of an rOVA composition may be 7, 7.5, 8, 8.5, 9, 9.5, 10, 10.5, 11, 11.5, or 12.

In some embodiments, the pH of rOVA may be adjusted prior to its inclusion in a composition or its use as an ingredient. In some embodiments, the pH of rOVA is adjusted during the purification and/or isolation processes. In some embodiments, the pH of the rOVA for use in an ingredient or in production of a food product composition is adjusted to between about 3.5 to about 7.0. In some cases, the pH of rOVA may be adjusted to more than one pH during the production process. For example rOVA may be expressed in a host cell such as a a microbial cell, and in some cases the rOVA is secreted by the host cell into the growth media (e.g., liquid media). rOVA is separated from the host cells and such separation step may be performed at a selected pH, for example at a pH of about 3.5. In some cases, the rOVA at such separation pH may not be soluble or may not be fully soluble and the pH is adjusted to a higher pH, such as about pH 12. The rOVA may then be adjusted to a final pH between about 3.5 and about 7.0. Separation of rOVA from other components of the host cells or other components of the liquid media can include one or more of ion exchange chromatography, such as cation exchange chromatography and/or anion exchange chromatography, filtration and ammonium sulfate precipitation.

Additional Components of Compositions

The consumable food compositions containing rOVA disclosed herein and the methods of making such compositions may including adding or mixing the rOVA with one or more ingredients. For example, food additives may be added in or mixed with the compositions. Food additives can add volume and/or mass to a composition. A food additive may improve functional performance and/or physical characteristics. For example, a food additive may prevent gelation or increased viscosity due to the lipid portion of the lipoproteins in the freeze-thaw cycle. An anticaking agent may be added to make a free-flowing composition. Carbohydrates can be added to increase resistance to heat damage, e.g., less protein denaturation during drying and improve stability and flowability of dried compositions. Food additives include, but are not limited to, food coloring, pH adjuster, natural flavoring, artificial flavoring, flavor enhancer, batch marker, food acid, filler, anticaking agent (e.g., sodium silico aluminate), antigreening agent (e.g., citric acid), food stabilizer, foam stabilizer or binding agent, antioxidant, acidity regulatory, bulking agent, color retention agent, whipping agent (e.g., ester-type whipping agent, triethyl citrate, sodium lauryl sulfate), emulsifier (e.g., lecithin), humectant, thickener, excipient, solid diluent, salts, nutrient, sweetener, glazing agent, preservative, vitamin, dietary elements, carbohydrates, polyol, gums, starches, flour, oil, or bran.

Food coloring includes, but is not limited to, FD&C Yellow #5, FD&C Yellow #6, FD&C Red #40, FD&C Red #3, FD&C Blue No. 1, FD&C Blue No. 2, FD&C Green No. 3, carotenoids (e.g., saffron, β-carotene), anthocyanins, annatto, betanin, butterfly pea, caramel coloring, chlorophyllin, elderberry juice, lycopene, carmine, pandan, paprika, turmeric, curcuminoids, quinoline yellow, carmoisine, Ponceau 4R, Patent Blue V, and Green S.

Ingredients for pH adjustment include, but are not limited to, Tris buffer, potassium phosphate, sodium hydroxide, potassium hydroxide, citric acid, sodium citrate, sodium bicarbonate, and hydrochloric acid.

Salts include, but are not limited, to acid salts, alkali salts, organic salts, inorganic salts, phosphates, chloride salts, sodium salts, sodium chloride, potassium salts, potassium chloride, magnesium salts, magnesium chloride, magnesium perchlorate, calcium salts, calcium chloride, ammonium chloride, iron salts, iron chlorides, zinc salts, and zinc chloride.

Nutrient includes, but is not limited to, macronutrient, micronutrient, essential nutrient, non-essential nutrient, dietary fiber, amino acid, essential fatty acids, omega-3 fatty acids, and conjugated linoleic acid.

Sweeteners include, but are not limited to, sugar substitute, artificial sweetener, acesulfame potassium, advantame, alitame, aspartame, sodium cyclamate, dulcin, glucin, neohesperidin dihydrochalcone, neotame, P-4000, saccharin, aspartame-acesulfame salt, sucralose, brazzein, curculin, glycyrrhizin, glycerol, inulin, mogroside, mabinlin, malto-oligosaccharide, mannitol, miraculin, monatin, monellin, osladin, pentadin, stevia, trilobatin, and thaumatin.

Carbohydrates include, but are not limited to, sugar, sucrose, glucose, fructose, galactose, lactose, maltose, mannose, allulose, tagatose, xylose, arabinose, high fructose corn syrup, high maltose corn syrup, corn syrup (e.g., glucose-free corn syrup), sialic acid, monosaccharides, disaccharides, polysaccharides (e.g., polydextrose, maltodextrin), and starch.

Polyols include, but are not limited to, xylitol, maltitol, erythritol, sorbitol, threitol, arabitol, hydrogenated starch hydrolysates, isomalt, lactitol, mannitol, and galactitol (dulcitol).

Gums include, but are not limited to, gum arabic, gellan gum, guar gum, locust bean gum, acacia gum, cellulose gum, and xanthan gum.

Vitamins include, but are not limited to, niacin, riboflavin, pantothenic acid, thiamine, folic acid, vitamin A, vitamin B6, vitamin B12, vitamin D, vitamin E, lutein, zeaxanthin, choline, inositol, and biotin.

Dietary elements include, but are not limited to, calcium, iron, magnesium, phosphorus, potassium, sodium, zinc, copper, manganese, selenium, chlorine, iodine, sulfur, cobalt, molybdenum, nickel, and bromine.

rOVA Protein and Production of rOVA Protein rOVA can have an amino acid sequence from any species. For example, an rOVA can have an amino acid sequence of OVA from a bird or a reptile or other egg-laying species. An rOVA having an amino acid sequence from an avian can be selected from the group consisting of: poultry, fowl, waterfowl, game bird, chicken, quail, turkey, duck, ostrich, goose, gull, guineafowl, pheasant, emu, and any combination thereof. An rOVA can have an amino acid sequence derived from a single species, such as *Gallus gallus domesticus*. Alternatively, an rOVA can have an amino acid sequence derived from two or more species, and as such be a hybrid.

Exemplary OVA amino acid sequences contemplated herein are provided in Table 43 below as SEQ ID NOs: 60-133.

TABLE 43

| OVA Sequences | | |
|---|---|---|
| Name | SEQ ID | Sequence |
| Chicken Ovalbumin with bolded signal sequence | 60 | **MRFPSIFTAVLFAASSALAAPVNTTTEDETAQIPAEAVIGYS**<br>**DLEGDFDVAVLPFSNSTNNGLLFINTTIASIAAKEEGVSLDK**<br>**R*EAEA***GSIGAASMEFCFDVFKELKVHHANENIFYCPIAIMSAL<br>AMVYLGAKDSTRTQINKVVRFDKLPGFGDSIEAQCGTSVNVH<br>SSLRDILNQITKPNDVYSFSLASRLYAEERYPILPEYLQCVKEL<br>YRGGLEPINFQTAADQARELINSWVESQINGIIRNVLQPSSVD<br>SQTAMVLVNAIVFKGLWEKAFKDEDTQAMPFRVTEQESKPV<br>QMMYQIGLFRVASMASEKMKILELPFASGTMSMLVLLPDEVS<br>GLEQLESIINFEKLTEWTSSNVMEERKIKVYLPRMKMEEKYN<br>LTSVLMAMGITDVFSSSANLSGISSAESLKISQAVHAAHAEINE<br>AGREVVGSAEAGVDAASVSEEFRADHPFLFCIKHIATNAVLFF<br>GRCVSP |
| Chicken OVA sequence as secreted from pichia | 61 | EAEAGSIGAASMEFCFDVFKELKVHHANENIFYCPIAIMSALA<br>MVYLGAKDSTRTQINKVVRFDKLPGFGDSIEAQCGTSVNVHS<br>SLRDILNQITKPNDVYSFSLASRLYAEERYPILPEYLQCVKELY<br>RGGLEPINFQTAADQARELINSWVESQTNGIIRNVLQPSSVDS<br>QTAMVLVNAIVFKGLWEKAFKDEDTQAMPFRVTEQESKPVQ<br>MMYQIGLFRVASMASEKMKILELPFASGTMSMLVLLPDEVSG<br>LEQLESIINFEKLTEWTSSNVMEERKIKVYLPRMKMEEKYNLT<br>SVLMAMGITDVFSSSANLSGISSAESLKISQAVHAAHAEINEA<br>GREVVGSAEAGVDAASVSEEFRADHPFLFCIKHIATNAVLFFG<br>RCVSP |
| Predicted Ovalbumin [*Achromobacter denitrificans*] | 62 | MRVPAQLLGLLLLWLPGARCGSIGAASMEFCFDVFKELKVH<br>HANENIFYCPIAIMSALAMVYLGAKDSTRTQINKVVRFDKLP<br>GFGDSIEAQCGTSVNVHSSLRDILNQITKPNDVYSFSLASRLY<br>AEERYPILPEYLQCVKELYRGGLEPINFQTAADQARELINSWV<br>ESQTNGIIRNVLQPSSVDSQTAMVLVNAIVFKGLWEKAFKDE<br>DTQAMPFRVTEQESKPVQMMYQIGLFRVASMASEKMKILEL<br>PFASGTMSMLVLLPDEVSGLEQLESIINFEKLTEWTSSNVMEE<br>RKIKVYLPRMKMEEKYNLTSVLMAMGITDVFSSSANLSGISS<br>AESLKISQAVHAAHAEINEAGREVVGSAEAGVDAASVSEEFR<br>ADHPFLFCIKHIATNAVLFFGRCVSPLEIKRAAAHHHHHH |
| OLLAS epitope-tagged ovalbumin | 63 | MTSGFANELGPRLMGKLTMGSIGAASMEFCFDVFKELKVHH<br>ANENIFYCPIAIMSALAMVYLGAKDSTRTQINKVVRFDKLPGF<br>GDSIEAQCGTSVNVHSSLRDILNQITKPNDVYSFSLASRLYAE<br>ERYPILPEYLQCVKELYRGGLEPINFQTAADQARELINSWVES<br>QTNGIIRNVLQPSSVDSQTAMVLVNAIVFKGLWEKTFKDEDT<br>QAMPFRVTEQESKPVQMMYQIGLFRVASMASEKMKILELPFA<br>SGTMSMLVLLPDEVSGLEQLESIINFEKLTEWTSSNVMEERKI<br>KVYLPRMKMEEKYNLTSVLMAMGITDVFSSSANLSGISSAES<br>LKISQAVHAAHAEINEAGREVVGSAEAGVDAASVSEEFRADH<br>PFLFCIKHIATNAVLFFGRCVSPSR |
| Serpin family protein [*Achromobacter denitrificans*] | 64 | MGGRRVRWEVYISRAGYVNRQIAWRRHHRSLTMRVPAQLL<br>GLLLLWLPGARCGSIGAASMEFCFDVFKELKVHHANENIFYC<br>PIAIMSALAMVYLGAKDSTRTQINKVVRFDKLPGFGDSIEAQC<br>GTSVNVHSSLRDILNQITKPNDVYSFSLASRLYAEERYPILPEY<br>LQCVKELYRGGLEPINFQTAADQARELINSWVESQTNGIIRNV<br>LQPSSVDSQTAMVLVNAIVFKGLWEKAFKDEDTQAMPFRVT<br>EQESKPVQMMYQIGLFRVASMASEKMKILELPFASGTMSML<br>VLLPDEVSGLEQLESIINFEKLTEWTSSNVMEERKIKVYLPRM<br>KMEEKYNLTSVLMAMGITDVESSSANLSGISSAESLKISQAVH<br>AAHAEINEAGREVVGSAEAGVDAASVSEEFRADHPFLFCIKHI<br>ATNAVLFFGRCVSPLEIKRAAAHHHHHH |
| PREDICTED: ovalbumin isoform X1 [*Meleagris gallopavo*] | 65 | MGSIGAVSMEFCFDVFKELKVHHANENIFYSPFTIISALAMVY<br>LGAKDSTRTQINKVVRFDKLPGFGDSVEAQCGTSVNVHSSLR<br>DILNQITKPNDVYSFSLASRLYAEETYPILPEYLQCVKELYRG<br>GLESINFQTAADQARGLINSWVESQTNGMIKNVLQPSSVDSQ<br>TAMVLVNAIVFKGLWEKAFKDEDTQAIPFRVTEQESKPVQM<br>MYQIGLFKVASMASEKMKILELPFASGTMSMWVLLPDEVSG<br>LEQLETTISFEKMTEWISSNIMEERRIKVYLPRMKMEEKYNLT<br>SVLMAMGITDLFSSSANLSGISSAGSLKISQAVHAAYAEIYEA<br>GREVIGSAEAGADATSVSEEFRVDHPFLYCIKHNLTNSILFFGR<br>CISP |
| Ovalbumin precursor [*Meleagris gallopavo*] | 66 | MGSIGAVSMEFCFDVFKELKVHHANENIFYSPFTIISALAMVY<br>LGAKDSTRTQINKVVRFDKLPGFGDSVEAQCGTSVNVHSSLR<br>DILNQITKPNDVYSFSLASRLYAEETYPILPEYLQCVKELYRG<br>GLESINFQTAADQARGLINSWVESQTNGMIKNVLQPSSVDSQ<br>TAMVLVNAIVFKGLWEKAFKDEDTQAIPFRVTEQESKPVQM<br>MYQIGLFKVASMASEKMKILELPFASGTMSMWVLLPDEVSG |

TABLE 43-continued

| OVA Sequences | | |
|---|---|---|
| Name | SEQ ID | Sequence |
| | | LEQLETTISFEKMTEWISSNIMEERRIKVYLPRMKMEEKYNLT SVLMAMGITDLESSSANLSGISSAGSLKISQAAHAAYAEIYEA GREVIGSAEAGADATSVSEEFRVDHPFLYCIKHNLTNSILFFGR CISP |
| Hypothetical protein [*Bambusicola thoracicus*] | 67 | YYRVPCMVLCTAFHPYIFIVLLFALDNSEFTMGSIGAVSMEFC FDVFKELRVHHPNENIFFCPFAIMSAMAMVYLGAKDSTRTQI NKVIRFDKLPGFGDSTEAQCGKSANVHSSLKDILNQITKPNDV YSFSLASRLYADETYSIQSEYLQCVNELYRGGLESINFQTAAD QARELINSWVESQTNGIIRNVLQPSSVDSQTAMVLVNAIVFRG LWEKAFKDEDTQTMPFRVTEQESKPVQMMYQIGSFKVASMA SEKMKILELPLASGTMSMLVLLPDEVSGLEQLETTISFEKLTE WTSSNVMEERKIKVYLPRMKMEEKYNLTSVLMAMGITDLFR SSANLSGISLAGNLKISQAVHAAHAEINEAGRKAVSSAEAGV DATSVSEEFRADRPFLFCIKHIATKVVFFFGRYTSP |
| Egg albumin | 68 | MGSIGAASMEFCFDVFKELKVHHANDNMLYSPFAILSTLAMV FLGAKDSTRTQINKVVHFDKLPGFGDSIEAQCGTSVNVHSSLR DILNQITKQNDAYSFSLASRLYAQETYTVVPEYLQCVKELYR GGLESVNFQTAADQARGLINAWVESQTNGIIRNILQPSSVDSQ TAMVLVNAIAFKGLWEKAFKAEDTQTIPFRVTEQESKPVQM MYQIGSFKVASMASEKMKILELPFASGTMSMLVLLPDDVSGL EQLESIISFEKLTEWTSSSIMEERKVKVYLPRMKMEEKYNLTS LLMAMGITDLFSSSANLSGISSVGSLKISQAVHAAHAEINEAG RDVVGSAEAGVDATEEFRADHPFLFCVKHIETNAILLFGRCVS P |
| Ovalbumin isoform X2 [*Numida meleagris*] | 69 | MASIGAVSTEFCVDVYKELRVHHANENIFYSPFTIISTLAMVY LGAKDSTRTQINKVVRFDKLPGFGDSIEAQCGTSVNVHSSLR DILNQITKPNDVYSFSLASRLYAEETYPILPEYLQCVKELYRG GLESINFQTAADQARELINSWVESQTSGIIKNVLQPSSVNSQTA MVLVNAIYFKGLWERAFKDEDTQAIPFRVTEQESKPVQMMS QIGSFKVASVASEKVKILELPFVSGTMSMLVLLPDEVSGLEQL ESTISTEKLTEWTSSSIMEERKIKVFLPRMRMEEKYNLTSVLM AMGMTDLFSSSANLSGISSAESLKISQAVHAAYAEIYEAGREV VSSAEAGVDATSVSEEFRVDHPFLLCIKHNPTNSILFFGRCISP |
| Ovalbumin isoform X1 [*Numida meleagris*] | 70 | MALCKAFHPYIFIVLLFDVDNSAFTMASIGAVSTEFCVDVYKE LRVHHANENIFYSPFTIISTLAMVYLGAKDSTRTQINKVVRFD KLPGFGDSIEAQCGTSVNVHSSLRDILNQITKPNDVYSFSLASR LYAEETYPILPEYLQCVKELYRGGLESINFQTAADQARELINS WVESQTSGIIKNVLQPSSVNSQTAMVLVNAIYFKGLWERAFK DEDTQAIPFRVTEQESKPVQMMSQIGSFKVASVASEKVKILEL PFVSGTMSMLVLLPDEVSGLEQLESTISTEKLTEWTSSSIMEER KIKVFLPRMRMEEKYNLTSVLMAMGMTDLFSSSANLSGISSA ESLKISQAVHAAYAEIYEAGREVVSSAEAGVDATSVSEEFRV DHPFLLCIKHNPTNSILFFGRCISP |
| PREDICTED: Ovalbumin isoform X2 [*Coturnix japonica*] | 71 | MGSIGAASMEFCFDVFKELKVHHANDNMLYSPFAILSTLAMV FLGAKDSTRTQINKVVHFDKLPGFGDSIEAQCGTSANVHSSLR DILNQITKQNDAYSFSLASRLYAQETYTVVPEYLQCVKELYR GGLESVNFQTAADQARGLINAWVESQTNGIIRNILQPSSVDSQ TAMVLVNAIAFKGLWEKAFKAEDTQTIPFRVTEQESKPVQM MHQIGSFKVASMASEKMKILELPFASGTMSMLVLLPDDVSGL EQLESTISFEKLTEWTSSSIMEERKVKVYLPRMKMEEKYNLTS LLMAMGITDLFSSSANLSGISSVGSLKISQAVHAAYAEINEAG RDVVGSAEAGVDATEEFRADHPFLFCVKHIETNAILLFGRCVS P |
| PREDICTED: ovalbumin isoform X1 [*Coturnix japonica*] | 72 | MGLCTAFHPYIFIVLLFALDNSEFTMGSIGAASMEFCFDVFKE LKVHHANDNMLYSPFAILSTLAMVFLGAKDSTRTQINKVVHF DKLPGFGDSIEAQCGTSANVHSSLRDILNQITKQNDAYSFSLA SRLYAQETYTVVPEYLQCVKELYRGGLESVNFQTAADQARG LINAWVESQTNGIIRNILQPSSVDSQTAMVLVNAIAFKGLWEK AFKAEDTQTIPFRVTEQESKPVQMMHQIGSFKVASMASEKMK ILELPFASGTMSMLVLLPDDVSGLEQLESTISFEKLTEWTSSSI MEERKVKVYLPRMKMEEKYNLTSLLMAMGITDLFSSSANLS GISSVGSLKISQAVHAAYAEINEAGRDVVGSAEAGVDATEEF RADHPFLFCVKHIETNAILLFGRCVSP |
| Egg albumin | 73 | MGSIGAASMEFCFDVFKELKVHHANDNMLYSPFAILSTLAMV FLGAKDSTRTQINKVVHFDKLPGFGDSIEAQCGTSANVHSSLR DILNQITKQNDAYSFSLASRLYAQETYTVVPEYLQCVKELYR GGLESVNFQTAADQARGLINAWVESQINGIIRNILQPSSVDSQ TAMVLVNAIAFKGLWEKAFKAEDTQTIPFRVTEQESKPVQM |

TABLE 43-continued

| OVA Sequences | | |
|---|---|---|
| Name | SEQ ID | Sequence |
| | | MHQIGSFKVASMASEKMKILELPFASGTMSMLVLLPDDVSGL EQLESTISFEKLTEWTSSSIMEERKVKVYLPRMKMEEKYNLTS LLMAMGITDLFSSSANLSGISSVGSLKIPQAVHAAYAEINEAG RDVVGSAEAGVDATEEFRADHPFLFCVKHIETNAILLFGRCVS P |
| ovalbumin [*Anas platyrhynchos*] | 74 | MGSIGAASTEFCFDVFRELRVQHVNENIFYSPFSIISALAMVYL GARDNTRTQIDKVVHFDKLPGFGESMEAQCGTSVSVHSSLRD ILTQITKPSDNFSLSFASRLYAEETYAILPEYLQCVKELYKGGL ESISFQTAADQARELINSWVESQTNGIIKNILQPSSVDSQTTMV LVNAIYFKGMWEKAFKDEDTQAMPFRMTEQESKPVQMMYQ VGSFKVAMVTSEKMKILELPFASGMMSMFVLLPDEVSGLEQL ESTISFEKLTEWTSSTMMEERRMKVYLPRMKMEEKYNLTSVF MALGMTDLFSSSANMSGISSTVSLKMSEAVHAACVEIFEAGR DVVGSAEAGMDVTSVSEEFRADHPFLFFIKHNPTNSILFFGRW MSP |
| PREDICTED: ovalbumin-like [*Anser cygnoides domesticus*] | 75 | MGSIGAASTEFCFDVFRELKVQHVNENIFYSPLSIISALAMVYL GARDNTRTQIDQVVHFDKIPGFGESMEAQCGTSVSVHSSLRDI LTEITKPSDNFSLSFASRLYAEETYTILPEYLQCVKELYKGGLE SISFQTAADQARELINSWVESQTNGIIKNILQPSSVDSQTTMVL VNAIYFKGMWEKAFKDEDTQTMPFRMTEQESKPVQMMYQV GSFKLATVTSEKVKILELPFASGMMSMCVLLPDEVSGLEQLE TTISFEKLTEWTSSTMMEERRMKVYLPRMKMEEKYNLTSVF MALGMTDLFSSSANMSGISSTVSLKMSEAVHAACVEIFEAGR DVVGSAEAGMDVTSVSEEFRADHPFLFFIKHNPSNSILFFGRW ISP |
| PREDICTED: Ovalbumin-like [*Aquila chrysaetos canadensis*] | 76 | MGSIGAASTEFCFDVFKELKVQHVNENIFYSPLTIISALSMVYL GARENTRAQIDKVLHFDKMPGFGDTIESQCGTSVSIHTSLKD MFTQITKPSDNYSLSFASRLYAEETYPILPEYLQCVKELYKGG LETISFQTAAEQARELINSWVESQTNGMIKNILQPSSVDPQTK MVLVNAIYFKGVWEKAFKDEDTQEVPFRVTEQESKPVQMM YQIGSFKVAVMASEKMKILELPYASGQLSMLVLLPDDVSGLE QLESAITFEKLMAWTSSTTMEERKMKVYLPRMKIEEKYNLTS VLMALGVTDLFSSSANLSGISSAESLKISKAVHEAFVEIYEAGS EVVGSTEAGMEVTSVSEEFRADHPFLFLIKHNPTNSILFFGRCF SP |
| PREDICTED: Ovalbumin-like [*Haliaeetus albicilla*] | 77 | MGSIGAASTEFCFDVFKELKVQHVNENIFYSPLTIISALSMVYL GARENTRTQIDKVLHFDKMTGFGDTVESQCGTSVSIHTSLKDI FTQITKPSDNYSLSLASRLYAEETYPILPEYLQCVKELYKGGLE TVSFQTAAEQARELINSWVESQTNGMIKNILQPSSVDPQTKM VLVNAIYFKGVWEKAFKDEDTQEVPFRVTEQESKPVQMMYQ IGSFKVAVMASEKMKILELPYASGQLSMLVLLPDDVSGLEQL ESAITSEKLMEWTSSTTMEERKMKVYLPRMKIEEKYNLTSVL MALGVTDLFSSSADLSGISSAESLKISKAVHEAFVEIYEAGSEV VGSTEGGMEVTSVSEEFRADHPFLFLIKHKPTNSILFFGRCFSP |
| PREDICTED: Ovalbumin-like [*Haliaeetus leucocephalus*] | 78 | MGSIGAASTEFCFDVFKELKVQHVNENIFYSPLTIISALSMVYL GARENTRTQIDKVLHFDKMTGFGDTVESQCGTSVSIHTSLKDI FTQITKPSDNYSLSLASRLYAEETYPILPEYLQCVKELYKGGLE TVSFQTAAEQARELINSWVESQTNGMIKNILQPSSVDPQTKM VLVNAIYFKGVWEKAFKDEDTQEVPFRVTEQESKPVQMMYQ IGSFKVAVMASEKMKILELPYASGQLSMLVLLPDDVSGLEQL ESAITSEKLMEWTSSTTMEERKMKVYLPRMKIEEKYNLTSVL MALGVTDLFSSSADLSGISSAESLKISKAVHEAFVEIYEAGSEV VGSTEGGMEVTSFSEEFRADHPFLFLIKHKPTNSILFFGRCFSP |
| PREDICTED: Ovalbumin [*Fulmarus glacialis*] | 79 | MGSIGAASTEFCFDVFKELKVQHVNENIFYSPLSIISALSMVYL GARENTRAQIDKVVHFDKITGFGETIESQCGTSVSVHTSLKDM FTQITKPSDNYSLSFASRLYAEETYPILPEYLQCVKELYKGGLE TTSFQTAADQARELINSWVESQTNGMIKNILQPGSVDPQTEM VLVNAIYFKGMWEKAFKDEDTQAVPFRMTEQESKTVQMMY QIGSFKVAVMASEKMKILELPYASGELSMLVMLPDDVSGLEQ LETAITFEKLMEWTSSNMMEERKMKVYLPRMKMEEKYNLTS VLMALGVTDLFSSSANLSGISSAESLKMSEAVHEAFVEIYEAG SEVVGSTGAGMEVTSVSEEFRADHPFLFLIKHNPTNSILFFGRC FSP |
| PREDICTED: Ovalbumin-like [*Chlamydotis* macqueenii] | 80 | MGSIGAASTEFCFDVFKELRVQHVNENVCYSPLIIISALSLVYL GARENTRAQIDKVVHFDKITGFGESIESQCGTSVSVHTSLKDM FNQITKPSDNYSLSVASRLYAEERYPILPEYLQCVKELYKGGL ESISFQTAADQAREAINSWVESQTNGMIKNILQPSSVDPQTEM VLVNAIYFKGMWQKAFKDEDTQAVPFRISEQESKPVQMMYQ |

TABLE 43-continued

| OVA Sequences | | |
|---|---|---|
| Name | SEQ ID | Sequence |
| | | IGSFKVAVMAAEKMKILELPYASGELSMLVLLPDEVSGLEQL ENAITVEKLMEWTSSSPMEERIMKVYLPRMKIEEKYNLTSVL MALGITDLFSSSANLSGISAEESLKMSEAVHQAFAEISEAGSEV VGSSEAGIDATSVSEEFRADHPFLFLIKHNATNSILFFGRCFSP |
| PREDICTED: Ovalbumin like [*Nipponia nippon*] | 81 | MGSISAASTEFCFDVFKELKVQHVNENIFYSPLSIISALSMVYL GARENTRAQIEKVVHFDKITGFGESIESQCSTSVSVHTSLKDM FTQITKPSDNYSLSFASRFYAEETYPILPEYLQCVKELYKGGLE TINFRTAADQARELINSWVESQTNGMIKNILQPGSVDPQTDM VLVNAIYFKGMWEKAFKDEDTQALPFRVTEQESKPVQMMY QIGSFKVAVLASEKVKILELPYASGQLSMLVLLPDDVSGLEQL ETAITVEKLMEWTSSNNMEERKIKVYLPRIKIEEKYNLTSVLM ALGITDLFSSSANLSGISSAESLKVSEAIHEAFVEIYEAGSEVAG STEAGIEVTSVSEEFRADHPFLFLIKHNATNSILFFGRCFSP |
| PREDICTED: Ovalbumin-like isoform X2 [*Gavia stellata*] | 82 | MVSIGAASTEFCFDVFKELKVQHVNENIFYSPLSIISALSMVYL GARENTRAQIDKVVHFDKITGFEETIESQCSTSVSVHTSLKDM FTQITKPSDNYSLSFASRLYAEETYPILPEYLQCVKELYKGGLE TISFQTAADQARELINSWVESQTDGMIKNILQPGSVDPQTEMV LVNAIYFKGMWEKAFKDEDTQAVPFRMTEQESKPVQMMYQI GSFKVAVMASEKMKILELPYASGGMSMLVMLPDDVSGLEQL ETAITFEKLMEWTSSNMMEERKMKVYLPRMKMEEKYNLTS VLMALGMTDLFSSSANLSGISSAESLKMSEAVHEAFVEIYEAG SEAVGSTGAGMEVTSVSEEFRADHPFLFLIKHNPTNSILFFGRC FSP |
| PREDICTED: Ovalbumin [*Pelecanus crispus*] | 83 | MGSIGAASTEFCFDVFKELKVQHVNENIFYSPLSIISALSMVYL GARENTRAQIDKVVHFDKITGFGEPIESQCGISVSVHTSLKDMI TQITKPSDNYSLSFASRLYAEETYPILPEYLQCVKELYKGGLET ISFQTAADQARELINSWVENQTNGMIKNILQPGSVDPQTEMV LVNAVYFKGMWEKAFKDEDTQAVPFRMTEQESKPVQMMY QIGSFKVAVMASEKIKILELPYASGELSMLVLLPDDVSGLEQL ETAITLDKLTEWTSSNAMEERKMKVYLPRMKIEKKYNLTSVL IALGMTDLFSSSANLSGISSAESLKMSEAIHEAFLEIYEAGSEV VGSTEAGMEVTSVSEEFRADHPFLFLIKHNPTNSILFFGRCLSP |
| PREDICTED: Ovalbumin-like [*Charadrius vociferus*] | 84 | MGSIGAASTEFCFDVFKELKVQHVNENIFYSPLTIISALSMVYL GARENTRAQIDKVVHFDKIPGFGDTTESQCGTSVSVHTSLKD MFTQITKPSDNYSVSFASRLYAEETYPILPEFLECVKELYKGG LESISFQTAADQARELINSWVESQTNGMIKNILQPGSVDSQTE MVLVNAIYFKGMWEKAFKDEDTQTVPFRMTEQETKPVQMM YQIGTFKVAVMPSEKMKILELPYASGELCMLVMLPDDVSGLE ELESSITVEKLMEWTSSNMMEERKMKVFLPRMKIEEKYNLTS VLMALGMTDLFSSSANLSGISSAEPLKMSEAVHEAFIEIYEAG SEVVGSTGAGMEITSVSEEFRADHPFLFLIKHNPTNSILFFGRC VSP |
| PREDICTED: Ovalbumin-like [*Eurypyga helias*] | 85 | MGSIGAVSTEFCFDVFKELKVQHVNENIFYSPLSIISALSMVYL GARENTRAQIDKVVHFDKITGSGETIEAQCGTSVSVHTSLKD MFTQITKPSENYSVGFASRLYADETYPIIPEYLQCVKELYKGG LEMISFQTAADQARELINSWVESQTNGMIKNILQPGSVDPQTE MILVNAIYFKGVWEKAFKDEDTQAVPFRMTEQESKPVQMMY QFGSFKVAAMAAEKMKILELPYASGALSMLVLLPDDVSGLE QLESAITFEKLMEWTSSNMMEEKKIKVYLPRMKMEEKYNFT SVLMALGMTDLFSSSANLSGISSADSLKMSEVVHEAFVEIYEA GSEVVGSTGSGMEAASVSEEFRADHPFLFLIKHNPTNSILFFGR CFSP |
| PREDICTED: Ovalbumin-like isoform X1 [*Gavia stellata*] | 86 | MVSIGAASTEFCFDVFKELKVQHVNENIFYSPLSIISALSMVYL GARENTRAQIDKVVHFDKITGFEETIESQVQKKQCSTSVSVHT SLKDMFTQITKPSDNYSLSFASRLYAEETYPILPEYLQCVKEL YKGGLETISFQTAADQARELINSWVESQTDGMIKNILQPGSVD PQTEMVLVNAIYFKGMWEKAFKDEDTQAVPFRMTEQESKPV QMMYQIGSFKVAVMASEKMKILELPYASGGMSMLVMLPDD VSGLEQLETAITFEKLMEWTSSNMMEERKMKVYLPRMKMEE KYNLTSVLMALGMTDLFSSSANLSGISSAESLKMSEAVHEAF VEIYEAGSEAVGSTGAGMEVTSVSEEFRADHPFLFLIKHNPTN SILFFGRCFSP |
| PREDICTED: Ovalbumin - like [*Egretta garzetta*] | 87 | MGSIGAASGEFCFDVFKELKVQHVNENIFYSPLSIISALSMVYL GARENTRAQIDKVVHFDKIIGFGESIESQCGTSVSVHTSLKDM FAQITKPSDNYSLSFASRLYAEETFPILPEYLQCVKELYKGGLE TLSFQTAADQARELINSWVESQTNGMIKDILQPGSVDPQTEM VLVNAIYFKGVWEKAFKDEDTQTVPFRMTEQESKPVQMMY QIGSFKVAVVAAEKIKILELPYASGALSMLVLLPDDVSSLEQL |

TABLE 43-continued

OVA Sequences

| Name | SEQ ID | Sequence |
|---|---|---|
| | | ETAITFEKLTEWTSSNIMEERKIKVYLPRMKIEEKYNLTSVLM<br>DLGITDLFSSSANLSGISSAESLKVSEAIHEAIVDIYEAGSEVVG<br>SSGAGLEGTSVSEEFRADHPFLFLIKHNPTSSILFFGRCFSP |
| PREDICTED: Ovalbumin-like [*Balearica regulorum gibbericeps*] | 88 | MGSIGAASTEFCFDVFKELKVQHVNENIFYSPLSIISALSMVYL<br>GARENTRAQIDKVVHFDKITGSGEAIESQCGTSVSVHISLKDM<br>FTQITKPSDNYSLSFASRLYAEETYPILPEYLQCVKELYKEGLA<br>TISFQTAADQAREFINSWVESQTNGMIKNILQPGSVDPQTQMV<br>LVNAIYFKGVWEKAFKDEDTQAVPFRMTKQESKPVQMMYQI<br>GSFKVAVMASEKMKILELPYASGQLSMLVMLPDDVSGLEQIE<br>NAITFEKLMEWTNPNMMEERKMKVYLPRMKMEEKYNLTSV<br>LMALGMTDLFSSSANLSGISSAESLKMSEAVHEAFVEIYEAGS<br>EVVGSTGAGIEVTSVSEEFRADHPFLFLIKHNPTNSILFFGRCFS<br>P |
| PREDICTED: Ovalbumin-like [*Nestor notabilis*] | 89 | MGSIGEASTEFCIDVFRELKVQHVNENIFYSPLSIISALSMVYL<br>GARENTRAQIDQVVHFDKITGFGDTVESQCGSSLSVHSSLKDI<br>FAQITQPKDNYSLNFASRLYAEETYPILPEYLQCVKELYKGGL<br>ETISFQTAADQARELINSWVESQTNGMIKNILQPSSVDPQTEM<br>VLVNAIYFKGVWEKAFKDEETQAVPFRITEQENRPVQIMYQF<br>GSFKVAVVASEKIKILELPYASGQLSMLVLLPDEVSGLEQLEN<br>AITFEKLTEWTSSDIMEEKKIKVFLPRMKIEEKYNLTSVLVAL<br>GIADLFSSSANLSGISSAESLKMSEAVHEAFVEIYEAGSEVVGS<br>SGAGIEAASDSEEFRADHPFLFLIKHKPTNSILFFGRCFSP |
| PREDICTED: Ovalbumin-like [*Pygoscelis adeliae*] | 90 | MGSIGAASTEFCFDIFNELKVQHVNENIFYSPLSIISALSMVYL<br>GARENTKAQIDKVVHFDKITGFGESIESQCSTSASVHTSFKDM<br>FTQITKPSDNYSLSFASRLYAEETYPILPEYSQCVKELYKGGLE<br>SISFQTAADQARELINSWVESQTNGMIKNILQPGSVDPQTELV<br>LVNAIYFKGTWEKAFKDKDTQAVPFRVTEQESKPVQMMYQI<br>GSYKVAVIASEKMKILELPYASGELSMLVLLPDDVSGLEQLET<br>AITFEKLMEWTSSNMMEERKVKVYLPRMKIEEKYNLTSVLM<br>ALGMTDLFSPSANLSGISSAESLKMSEAIHEAFVEIYEAGSEVV<br>GSTEAGMEVTSVSEEFRADHPFLFLIKCNLTNSILFFGRCFSP |
| Ovalbumin-like [*Athene cunicularia*] | 91 | MGSISTASTEFCFDVFKELKVQHVNENIFYSPLSIISALSMVYL<br>GARENTRAQIEKVVHFDKITGFGESIESQCGTSVSVHTSLKDM<br>LIQISKPSDNYSLSFASKLYAEETYPILPEYLQCVKELYKGGLE<br>SINFQTAADQARQLINSWVESQTNGMIKDILQPSSVDPQTEMV<br>LVNAIYFKGIWEKAFKDEDTQEVPFRITEQESKPVQMMYQIG<br>SFKVAVIASEKIKILELPYASGELSMLIVLPDDVSGLEQLETAIT<br>FEKLIEWTSPSIMEERKTKVYLPRMKIEEKYNLTSVLMALGM<br>TDLFSPSANLSGISSAESLKMSEAIHEAFVEIYEAGSEVVGSAE<br>AGMEATSVSEFRVDHPFLFLIKHNPANIILFFGRCVSP |
| PREDICTED: Ovalbumin-like [*Calidris pugnax*] | 92 | MGSIGAASTEFCFDVFKELKVQHVNENIFYSPLTIISALSLVYL<br>GARENTRAQIDKVFHFDKISGFGETTESQCGTSVSVHTSLKEM<br>FTQITKPSDNYSVSFASRLYAEDTYPILPEYLQCVKELYKGGL<br>ETISFQTAADQAREVINSWVESQTNGMIKNILQPGSVDSQTEM<br>VLVNAIYFKGMWEKAFKDEDTQTMPFRITEQERKPVQMMYQ<br>AGSFKVAVMASEKMKILELPYASGEFCMLIMLPDDVSGLEQL<br>ENSFSFEKLMEWTTSNMMEERKMKVYIPRMKMEEKYNLTSV<br>LMALGMTDLFSSSANLSGISSAETLKMSEAVHEAFMEIYEAG<br>SEVVGSTGSGAEVTGVYEEFRADHPFLFLVKHKPTNSILFFGR<br>CVSP |
| PREDICTED: Ovalbumin [*Aptenodytes forsteri*] | 93 | MGSIGAASTEFCFDIFNELKVQHVNENIFYSPLSIISALSMVYL<br>GARENTKAQIDKVVHFDKITGFGETIESQCSTSVSVHTSLKDT<br>FTQITKPSDNYSLSFASRLYAEETYPILPEYSQCVKELYKGGLE<br>TISFQTAADQARELINSWVESQTNGMIKNILQPGSVDPQTELV<br>LVNAIYFKGTWEKAFKDKDTQAVPFRVTEQESKPVQMMYQI<br>GSYKVAVIASEKMKILELPYASRELSMLVLLPDDVSGLEQLET<br>AITFEKLMEWTSSNMMEERKVKVYLPRMKIEEKYNLTSVLM<br>ALGMTDLFSPSANLSGISSAESLKMSEAVHEAFVEIYEAGSEV<br>VGSTGAGMEVTSVSEEFRADHPFLFLIKCNPTNSILFFGRCFSP |
| PREDICTED: Ovalbumin-like [*Pterocles gutturalis*] | 94 | MGSISAASAEFCLDVFKELKVQHVNENIFYSPLSIISALSMVYL<br>GARENTRAQIDKVVHFDKITGSGETIEFQCGTSANIHPSLKDM<br>FTQITRLSDNYSLSFASRLYAEERYPILPEYLQCVKELYKGGLE<br>TISFQTAADQARELINSWVESQTNGMIKNILQPGSVNPQTEMV<br>LVNAIYFKGLWEKAFKDEDTQTVPFRMTEQESKPVQMMYQV<br>GSFKVAVMASDKIKILELPYASGELSMLVLLPDDVTGLEQLET<br>SITFEKLMEWTSSNVMEERTMKVYLPHMRMEEKYNLTSVLM<br>ALGVTDLFSSSANLSGISSAESLKMSEAVHEAFVEIYESGSQV<br>VGSTGAGTEVTSVSEEFRVDHPFLFLIKHNPTNSILFFGRCFSP |

TABLE 43-continued

OVA Sequences

| Name | SEQ ID | Sequence |
|---|---|---|
| Ovalbumin-like [*Falco peregrinus*] | 95 | MGSIGAASVEFCFDVFKELKVQHVNENIFYSPLSIISALSMVYLGARENTKAQIDKVVHFDKIAGFGEAIESQCVTSASIHSLKDMFTQITKPSDNYSLSFASRLYAEEAYSILPEYLQCVKELYKGGLETISFQTAADQARDLINSWVESQTNGMIKNILQPGAVDLETEMVLVNAIYFKGMWEKAFKDEDTQTVPFRMTEQESKPVQMMYQVGSFKVAVMASDKIKILELPYASGQLSMVVVLPDDVSGLEQLEASITSEKLMEWTSSSIMEEKKIKVYFPHMKIEEKYNLTSVLMALGMTDLFSSSANLSGISSAEKLKVSEAVHEAFVEISEAGSEVVGSTEAGTEVTSVSEEFKADHPFLFLIKHNPTNSILFFGRCFSP |
| PREDICTED: Ovalbumin -like isoform X2 [*Phalacrocorax carbo*] | 96 | MGSIGAASSEFCFDIFKELKVQHVNENIFYSPLSIISALSMVYLGARENTRAQIDKVVPFDKITASGESIESQCSTSVSVHTSLKDIFTQITKSSDNHSLSFASRLYAEETYPILPEYLQCVKELYEGGLETISFQTAADQARELINSWIESQTNGRIKNILQPGSVDPQTEMVLVNAIYFKGMWEKAFKDEDTQAVPFRMTEQESKPVQVMHQIGSFKVAVLASEKIKILELPYASGELSMLVLLPDDVSGLEQLETAITFEKLMEWTSPNIMEERKIKVFLPRMKIEEKYNLTSVLMALGITDLFSPLANLSGISSAESLKMSEAIHEAFVEISEAGSEVIGSTEAEVEVTNDPEEFRADHPFLFLIKHNPTNSILFFGRCFSP |
| PREDICTED: Ovalbumin-like [*Merops nubicus*] | 97 | MGSIGAASTEFCFDVFKELKAQYVNENIFYSPMTIITALSMVYLGSKENTRAQIAKVAHFDKITGFGESIESQCGASASIQFSLKDLFTQITKPSGNHSLSVASRIYAEETYPILPEYLECMKELYKGGLETINFQTAANQARELINSWVERQTSGMIKNILQPSSVDSQTEMVLVNAIYFRGLWEKAFKVEDTQATPFRITEQESKPVQMMHQIGSFKVAVVASEKIKILELPYASGRLTMLVVLPDDVSGLKQLETTITFEKLMEWTTSNIMEERKIKVYLPRMKIEEKYNLTSVLMALGLTDLFSSSANLSGISSAESLKMSEAVHEAFVEIYEAGSEVVASAEAGMDATSVSEEFRADHPFLFLIKDNTSNSILFFGRCFSP |
| PREDICTED: Ovalbumin-like [*Tauraco erythrolophus*] | 98 | MGSIGAASTEFCFDVFKELKGQHVNENIFFCPLSIVSALSMVYLGARENTRAQIVKVAHFDKIAGFAESIESQCGTSVSIHTSLKDMFTQITKPSDNYSLNFASRLYAEETYPIIPEYLQCVKELYKGGLETISFQTAADQAREIINSWVESQTNGMIKNILRPSSVHPQTELVLVNAVYFKGTWEKAFKDEDTQAVPFRITEQESKPVQMMYQIGSFKVAAVTSEKMKILEVPYASGELSMLVLLPDDVSGLEQLETAITAEKLIEWTSSTVMEERKLKVYLPRMKIEEKYNLTTVLTALGVTDLFSSSANLSGISSAQGLKMSNAVHEAFVEIYEAGSEVVGSKGEGTEVSSVSDEFKADHPFLFLIKHNPTNSIVFFGRCFSP |
| PREDICTED: Ovalbumin -like [*Cuculus canorus*] | 99 | MGSIGAASTEFCFDVFKELKVHHVNENILYSPLAIISALSMVYLGAKENTRDQIDKVVHFDKITGIGESIESQCSTAVSVHTSLKDVFDQITRPSDNYSLAFASRLYAEKTYPILPEYLQCVKELYKGGLETIDFQTAADQARQLINSWVEDETNGMIKNILRPSSVNPQTKIILVNAIYFKGMWEKAFKDEDTQEVPFRITEQETKSVQMMYQIGSFKVAEVVSDKMKILELPYASGKLSMLVLLPDDVYGLEQLETVITVEKLKEWTSSIVMEERITKVYLPRMKIMEKYNLTSVLTAFGITDLFSPSANLSGISSTESLKVSEAVHEAFVEIHEAGSEVVGSAGAGIEATSVSEEFKADHPFLFLIKHNPTNSILFFGRCFSP |
| Ovalbumin [*Antrostomus carolinensis*] | 100 | MGSIGAASTEFCLDVFKELKVQHVNENIFYSPLSIISALSMVYLGARENTRAQIDKVVHFDKITGFEDSIESQCGTSVSVHTSLKDMFTQITKPSDNYSVGFASRLYAAETYQILPEYSQCVKELYKGGLETINFQKAADQATELINSWVESQTNGMIKNILQPSSVDPQTQIFLVNAIYFKGMWQRAFKEEDTQAVPFRISEKESKPVQMMYQIGSFKVAVIPSEKIKILELPYASGLLSMLVILPDDVSGLEQLENAITLEKLMQWTSSNMMEERKIKVYLPRMRMEEKYNLTSVFMALGITDLFSSSANLSGISSAESLKMSDAVHEASVEIHEAGSEVVGSTGSGTEASSVSEEFRADHPYLFLIKHNPTDSIVFFGRCFSP |
| PREDICTED: Ovalbumin-like [*Opisthocomus hoazin*] | 101 | MGSIGAASTEFCFDVFKELKFQHVDENIFYSPLTIISALSMVYLGARENTRAQIDKVVHFDKIAGFEETVESQCGTSVSVHTSLKDMFAQITKPSDNYSLSFASRLYAEETYPILPEYLQCVKELYKGGLETISFQTAADQARDLINSWVESQTNGMIKNILQPSSVGPQTELILVNAIYFKGMWQKAFKDEDTQEVPFRMTEQQSKPVQMMYQTGSFKVAVVASEKMKILALPYASGQLSLLVMLPDDVSGLKQLESAITSEKLIEWTSPSMMEERKIKVYLPRMKIEEKYNLTSVLMALGITDLFSPSANLSGISSAESLKMSQAVHEAFVEIYEAGSEVVGSTGAGMEDSSDSEEFRVDHPFLFFIKHNPTNSILFFGRCFSP |
| PREDICTED: Ovalbumin-like | 102 | MGSIGPLSVEFCCDVFKELRIQHPRENIFYSPVTIISALSMVYLGARDNTKAQIEKAVHFDKIPGFGESIESQCGTSLSIHTSLKDIFTQITKPSDNYTVGIASRLYAEEKYPILPEYLQCIKELYKGGLEP |

TABLE 43-continued

OVA Sequences

| Name | SEQ ID | Sequence |
|---|---|---|
| [*Lepidothrix coronata*] | | INFQTAAEQARELINSWVESQTNGMIKNILQPSSVNPETDMVL<br>VNAIYFKGLWEKAFKDEDIQTVPFRITEQESKPVQMMFQIGSF<br>RVAEITSEKIRILELPYASGQLSLWVLLPDDISGLEQLETAITFE<br>NLKEWTSSTKMEERKIKVYLPRMKIEEKYNLTSVLTSLGITDL<br>FSSSANLSGISSAESLKVSSAFHEASVEIYEAGSKVVGSTGAEV<br>EDTSVSEEFRADHPFLFLIKHNPSNSIFFFGRCFSP |
| PREDICTED: Ovalbumin [*Struthio camelus australis*] | 103 | MGSIGTASAEFCFDVFKELKVHHVNENIFYSPLSIISALSMVYL<br>GARENTKTQMEKVIHFDKITGLGESMESQCGTGVSIHTALKD<br>MLSEITKPSDNYSLSLASRLYAEQTYAILPEYLQCIKELYKESL<br>ETVSFQTAADQARELINSWIESQTNGVIKNFLQPGSVDSQTEL<br>VLVNAIYFKGMWEKAFKDEDTQEVPFRITEQESRPVQMMYQ<br>AGSFKVATVAAEKIKILELPYASGELSMLVLLPDDISGLEQLE<br>TTISFEKLTEWTSSNMMEDRNMKVYLPRMKIEEKYNLTSVLI<br>ALGMTDLFSPAANLSGISAAESLKMSEAIHAAYVEIYEADSEI<br>VSSAGVQVEVTSDSEEFRVDHPFLFLIKHNPTNSVLFFGRCISP |
| PREDICTED: Ovalbumin-like [*Acanthisitta chloris*] | 104 | MGSIGAVSTEFSCDVFKELRIHHVQENIFYSPVTIISALSMIYLG<br>ARDSTKAQIEKAVHFDKIPGFGESIESQCGTSLSIHTSIKDMFT<br>KITKASDNYSIGIASRLYAEEKYPILPEYLQCVKELYKGGLESI<br>SFQTAAEQAREIINSWVESQTNGMIKNILQPSSVDPQTDIVLV<br>NAIYFKGLWEKAFRDEDTQTVPFKITEQESKPVQMMYQIGSF<br>KVAEITSEKIKILEVPYASGQLSLWVLLPDDISGLEKLETAITFE<br>NLKEWTSSTKMEERKIKVYLPRMKIEEKYNLTSVLTALGITDL<br>FSSSANLSGISSAESLKVSEAFHEAIVEISEAGSKVVGSVGAGV<br>DDTSVSEEFRADHPFLFLIKHNPTSSIFFFGRCFSP |
| PREDICTED: Ovalbumin-like [*Tyto alba*] | 105 | MGSIGAASTEFCFDVFKELKVQHVNENIFYSPLSIISALSMVYL<br>GARENTRAQIDKVVHFDKIAGFGESTESQCGTSVSAHTSLKD<br>MSNQITKLSDNYSLSFASRLYAEETYPILPEYSQCVKELYKGG<br>LESISFQTAAYQARELINAWVESQTNGMIKDILQPGSVDSQTK<br>MVLVNAIYFKGIWEKAFKDEDTQEVPFRMTEQETKPVQMMY<br>QIGSFKVAVIAAEKIKILELPYASGQLSMLVILPDDVSGLEQLE<br>TAITFEKLTEWTSASVMEERKIKVYLPRMSIEEKYNLTSVLIAL<br>GVTDLFSSSANLSGISSAESLRMSEAIHEAFVETYEAGSTESGT<br>EVTSASEEFRVDHPFLFLIKHKPTNSILFFGRCFSP |
| PREDICTED: Ovalbumin - like isoform X1 [*Phalacrocorax carbo*] | 106 | MGSIGAASSEFCFDIFKELKVQHVNENIFYSPLSIISALSMVYL<br>GARENTRAQIDKVVPFDKITASGESIESQVQKIQCSTSVSVHTS<br>LKDIFTQITKSSDNHSLSFASRLYAEETYPILPEYLQCVKELYE<br>GGLETISFQTAADQARELINSWIESQTNGRIKNILQPGSVDPQT<br>EMVLVNAIYFKGMWEKAFKDEDTQAVPFRMTEQESKPVQV<br>MHQIGSFKVAVLASEKIKILELPYASGELSMLVLLPDDVSGLE<br>QLETAITFEKLMEWTSPNIMEERKIKVFLPRMKIEEKYNLTSV<br>LMALGITDLFSPLANLSGISSAESLKMSEAIHEAFVEISEAGSE<br>VIGSTEAEVEVTNDPEEFRADHPFLFLIKHNPTNSILFFGRCFSP |
| Ovalbumin-like [*Pipra filicauda*] | 107 | MGSIGPLSVEFCCDVFKELRIQHARENIFYSPVTIISALSMVYL<br>GARDNTKAQIEKAVHFDKIPGFGESIESQCGTSLSIHTSLKDIF<br>TQITKPSDNYTVGIASRLYAEEKYPILPEYLQCIKELYKGGLEP<br>ISFQTAAEQARELINSWVESQTNGIIKNILQPSSVNPETDMVLV<br>NAIYFKGLWEKAFKDEGTQTVPFRITEQESKPVQMMFQIGSF<br>RVAEIASEKIRILELPYASGQLSLWVLLPDDISGLEQLETAITFE<br>NLKEWTSSTKMEERKIKVYLPRMKIEEKYNLTSVLTSLGITDL<br>FSSSANLSGISSAERLKVSSAFHEASMEINEAGSKVVGAGVDD<br>TSVSEEFRVDRPFLFLIKHNPSNSIFFFGRCFSP |
| Ovalbumin [*Dromaius novaehollandiae*] | 108 | MGSIGAASTEFCFDMFKELKVHHVNENIIYSPLSIISILSMVFLG<br>ARENTKTQMEKVIHFDKITGFGESLESQCGTSVSVHASLKDIL<br>SEITKPSDNYSLSLASKLYAEETYPVLPEYLQCIKELYKGSLET<br>VSFQTAADQARELINSWVETQTNGVIKNFLQPGSVDPQTEMV<br>LVDAIYFKGTWEKAFKDEDTQEVPFRITEQESKPVQMMYQA<br>GSFKVATVAAEKMKILELPYASGELSMFVLLPDDISGLEQLET<br>TISIEKLSEWTSSNMMEDRKMKVYLPHMKIEEKYNLTSVLVA<br>LGMTDLFSPSANLSGISTAQTLKMSEAIHGAYVEIYEAGSEMA<br>TSTGVLVEAASVSEEFRVDHPFLFLIKHNPSNSILFFGRCIFP |
| Chain A, Ovalbumin | 109 | MGSIGAASTEFCFDMFKELKVHHVNENIIYSPLSIISILSMVFLG<br>ARENTKTQMEKVIHFDKITGFGESLESQCGTSVSVHASLKDIL<br>SEITKPSDNYSLSLASKLYAEETYPVLPEYLQCIKELYKGSLET<br>VSFQTAADQARELINSWVETQTNGVIKNFLQPGSVDPQTEMV<br>LVDAIYFKGTWEKAFKDEDTQEVPFRITEQESKPVQMMYQA<br>GSFKVATVAAEKMKILELPYASGELSMFVLLPDDISGLEQLET |

TABLE 43-continued

| OVA Sequences | | |
|---|---|---|
| Name | SEQ ID | Sequence |
| | | TISIEKLSEWTSSNMMEDRKMKVYLPHMKIEEKYNLTSVLVA LGMTDLFSPSANLSGISTAQTLKMSEAIHGAYVEIYEAGSEMA TSTGVLVEAASVSEEFRVDHPFLFLIKHNPSNSILFFGRCIFPHH HHHH |
| Ovalbumin-like [*Corapipo altera*] | 110 | MGSIGPLSVEFCCDVFKELRIQHARENIFYSPVTIISALSMVYL GARDNTKAQIEKAVHFDKIPGFGESIESQCGTSLSIHTSLKDIF TQITKPSDNYTVGIASRLYAEEKYPILPEYLQCIKELYKGGLEP ISFQTAAEQARELINSWVESQTNGMIKNILQPSAVNPETDMVL VNAIYFKGLWEKAFKDEGTQTVPFRITEQESKPVQMMFQIGS FRVAEITSEKIRILELPYASGQLSLWVLLPDDISGLEQLETAITF ENLKEWTSSTKMEERKIKVYLPRMKIEEKYNLTSVLTSLGITD LFSSSANLSGISSAERLKVSSAFHEASMEIYEAGSKVVGSTGA GVDDTSVSEEFRVDRPFLFLIKHNPSNSIFFFGRCFSP |
| Ovalbumin-like protein [*Amazona aestiva*] | 111 | MEDQRGNTGFTMGSIGAASTEFCIDVFRELRVQHVNENIFYSP LTIISALSMVYLGARENTRAQIDQVVHFDKIAGFGDTVESQCG SSPSVHNSLKTVXAQITQPRDNYSLNLASRLYAEESYPILPEYL QCVKELYNGGLETVSFQTAADQARELINSWVESQTNGIIKNIL QPSSVDPQTEMVLVNAIYFKGLWEKAFKDEETQAVPFRITEQ ENRPVQMMYQFGSFKVAXVASEKIKILELPYASGQLSMLVLL PDEVSGLEQNAITFEKLTEWTSSDLMEERKIKVFFPRVKIEEK YNLTAVLVSLGITDLFSSSANLSGISSAENLKMSEAVHEAXVE IYEAGSEVAGSSGAGIEVASDSEEFRVDHPFLFLIXHNPTNSILF FGRCFSP |
| PREDICTED: Ovalbumin-like [*Melopsittacus undulatus*] | 112 | MGSIGAASTEFCIDVFRELRVQHVNENIFYSPLSIISALSMVYL GARENTRAQIDEVFHFDKIAGFGDTVDPQCGASLSVHKSLQN VFAQITQPKDNYSLNLASRLYAEESYPILPEYLQCVKELYNEG LETVSFQTGADQARELINSWVENQTNGVIKNILQPSSVDPQTE MVLVNAIYFKGLWQKAFKDEETQAVPFRITEQENRPVQMMY QFGSFKVAVVASEKVKILELPYASGQLSMWVLLPDEVSGLEQ LENAITFEKLTEWTSSDLTEERKIKVFLPRVKIEEKYNLTAVL MALGVTDLFSSSANFSGISAAENLKMSEAVHEAFVEIYEAGSE VVGSSGAGIEAPSDSEEFRADHPFLFLIKHNPTNSILFFGRCFSP |
| Ovalbumin-like [*Neopelma chrysocephalum*] | 113 | MGSIGPLSVEFCCDVFKELRIQHARDNIFYSPVTIISALSMVYL GARDNTKAQIEKAVHFDKIPGFGESIESQCGTSLSVHTSLKDIF TQITKPRENYTVGIASRLYAEEKYPILPEYLQCIKELYKGGLEP ISFQTAAEQARELINSWVESQTNGMIKNILQPSSVNPETDMVL VNAIYFKGLWKKAFKDEGTQTVPFRITEQESKPVQMMFQIGS FRVAEITSEKIRILELPYASGQLSLWVLLPDDISGLEQLESAITF ENLKEWTSSTKMEERKIKVYLPRMKIEEKYNLTSVLTSLGITD LFSSSANLSGISSAEKLKVSSAFHEASMEIYEAGNKVVGSTGA GVDDTSVSEEFRVDRPFLFLIKHNPSNSIFFFGRCFSP |
| PREDICTED: Ovalbumin-like [*Buceros rhinoceros silvestris*] | 114 | MGSIGAASAEFCVDVFKELKDQHVNNIVESPLMIISALSMVNI GAREDTRAQIDKVVHFDKITGYGESIESQCGTSIGIYFSLKDAF TQITKPSDNYSLSFASKLYAEETYPILPEYLKCVKELYKGGLE TISFQTAADQARELINSWVESQTNGMIKNILQPSSVDPQTEMV LVNAIYFKGLWEKAFKDEDTQAVPFRITEQESKPVQMMYQIG SFKVAVIASEKIKILELPYASGQLSLLVLLPDDVSGLEQLESAIT SEKLLEWTNPNIMEERKTKVYLPRMKIEEKYNLTSVLVALGIT DLFSSSANLSGISSAEGLKLSDAVHEAFVEIYEAGREVVGSSE AGVEDSSVSEEFKADRPFIFLIKHNPTNGILYFGRYISP |
| PREDICTED: Ovalbumin-like [*Cariama cristata*] | 115 | MGSIGAANTDFCFDVFKELKVHHANENIFYSPLSIVSALAMV YLGARENTRAQIDKALHFDKILGFGETVESQCDTSVSVHTSLK DMLIQITKPSDNYSFSFASKIYTEETYPILPEYLQCVKELYKGG VETISFQTAADQAREVINSWVESHTNGMIKNILQPGSVDPQTK MVLVNAVYFKGIWEKAFKEEDTQEMPFRINEQESKPVQMMY QIGSFKLTVAASENLKILEFPYASGQLSMMVILPDEVSGLKQL ETSITSEKLIKWTSSNTMEERKIRVYLPRMKIEEKYNLKSVLM ALGITDLFSSSANLSGISSAESLKMSEAVHEAFVEIYEAGSEVT SSTGTEMEAENVSEEFKADHPFLFLIKHNPTDSIVFFGRCMSP |
| Ovalbumin [*Manacus vitellinus*] | 116 | MGSIGPLSVEFCCDVFKELRIQHARENIFYSPVTIISALSMVYL GARDNTKAQIEKAVHFDKIPGFGESIESQCGTSLSIHTSLKDIF TQITKPSDNYTVGIASRLYAEEKYPILPEYLQCIKELYKGGLEP ISFQTAAEQARELINSWVESQTNGMIKNILQPSSVNPETDMVL VNAIYFKGLWEKAFKDESTQTVPFRITEQESKPVQMMFQIGSF RVAEIASEKIRILELPYASGQLSLWVLLPDDISGLEQLETAITFE NLKEWTSSTKMEERKIKVYLPRMKIEEKYNLTSVLTSLGITDL FSSSANLSGISSAERLKVSSAFHEASMEIYEAGSRVVEAGVDD TSVSEEFRVDRPFLFLIKHNPSNSIFFFGRCFSP |

TABLE 43-continued

OVA Sequences

| Name | SEQ ID | Sequence |
|---|---|---|
| Ovalbumin-like [*Empidonax traillii*] | 117 | MGSIGPVSTEFCCDIFKELRIQHARENIIYSPVTIISALSMVYLG ARDNTKAQIEKAVHFDKIPGFGESIESQCGTSLSIHTSLKDILT QITKPSDNYTVGIASRLYAEEKYPILSEYLQCIKELYKGGLEPI SFQTAAEQARELINSWVESQTNGMIKNILQPSSVNPETDMVL VNAIYFKGLWEKAFKDEGTQTVPFRITEQESKPVQMMFQIGS FKVAEITSEKIRILELPYASGKLSLWVLLPDDISGLEQLETAITF ENLKEWTSSTRMEERKIKVYLPRMKIEEKYNLTSVLTSLGITD LFSSSANLSGISSAERLKVSSAFHEVFVEIYEAGSKVEGSTGAG VDDTSVSEEFRADHPFLFLVKHNPSNSIIFFGRCYLP |
| PREDICTED: Ovalbumin-like [*Leptosomus discolor*] | 118 | MGSTGAASMEFCFALFRELKVQHVNENIFFSPVTIISALSMVY LGARENTRAQLDKVAPFDKITGFGETIGSQCSTSASSHTSLKD VFTQITKASDNYSLSFASRLYAEETYPILPEYLQCVKELYKGG LESISFQTAADQARELINSWVESQTNGMIKDILRPSSVDPQTKI ILITAIYFKGMWEKAFKEEDTQAVPFRMTEQESKPVQMMYQI GSFKVAVIPSEKLKILELPYASGQLSMLVILPDDVSGLEQLETA ITTEKLKEWTSPSMMKERKMKVYFPRMRIEEKYNLTSVLMA LGITDLFSPSANLSGISSAESLKVSEAVHEASVDIDEAGSEVIGS TGVGTEVTSVSEEIRADHPFLFLIKHKPTNSILFFGRCFSP |
| Hypothetical protein H355_008077 [*Colinus virginianus*] | 119 | MEHAQLTQLVNSNMTSNTCHEADEFENIDFRMDSISVTNTKF CFDVFNEMKVHHVNENILYSPLSILTALAMVYLGARGNTESQ MKKALHFDSITGAGSTTDSQCGSSEYIHNLFKEFLTEITRTNAT YSLEIADKLYVDKTFTVLPEYINCARKFYTGGVEEVNFKTAA EEARQLINSWVEKETNGQIKDLLVPSSVDFGTMMVFINTIYFK GIWKTAFNTEDTREMPFSMTKQESKPVQMMCLNDTENMATL PAEKMRILELPYASGELSMLVLLPDEVSGLEQIEKAINFEKLRE WTSTNAMEKKSMKVYLPRMKIEEKYNLTSTLMALGMTDLFS RSANLTGISSVENLMISDAVHGAFMEVNEEGTEAAGSTGAIG NIKHSVEFEEFRADHPFLFLIRYNPTNVILFFDNSEFTMGSIGA VSTEFCFDVFKELRVHHANENIFYSPFTVISALAMVYLGAKDS TRTQINKVVRFDKLPGFGDSIEAQCGTSANVHSSLRDILNQIT KPNDIYSFSLASRLYADETYTILPEYLQCVKELYRGGLESINFQ TAADQARELINSWVESQTSGIIRNVLQPSSVDSQTAMVLVNAI YFKGLWEKGFKDEDTQAMPFRVTEQENKSVQMMYQIGTFK VASVASEKMKILELPFASGTMSMWVLLPDEVSGLEQLETTISI EKLTEWTSSSVMEERKIKVFLPRMKMEEKYNLTSVLMAMGM TDLFSSSANLSGISSTLQKKGFRSQELGDKYAKPMLESPALTP QVTAWDNSWIVAHPAAIEPDLCYQIMEQKWKPFDWPDFRLP MRVSCRFRTMEALNKANTSFALDFFKHECQEDDDENILFSPFS ISSALATVYLGAKGNTADQMAKTEIGKSGNIHAGFKALDLEI NQPTKNYLLNSVNQLYGEKSLPFSKEYLQLAKKYYSAEPQSV DFLGKANEIRREINSRVEHQTEGKIKNLLPPGSIDSLTRLVLVN ALYFKGNWATKFEAEDTRHRPFRINMHTTKQVPMMYLRDKF NWTYVESVQTDVLELPYVNNDLSMFILLPRDITGLQKLINELT FEKLSAWTSPELMEKMKMEVYLPRFTVEKKYDMKSTLSKM GIEDAFTKVDSCGVTNVDEITTHIVSSKCLELKHIQINKKLKCN KAVAMEQVSASIGNFTIDLFNKLNETSRDKNIFFSPWSVSSAL ALTSLAAKGNTAREMAEDPENEQAENIHSGFKELMTALNKPR NTYSLKSANRIYVEKNYPLLPTYIQLSKKYYKAEPYKVNFKT APEQSRKEINNWVEKQTERKIKNFLSSDDVKNSTKSILVNAIY FKAEWEEKFQAGNTDMQPFRMSKNKSKLVKMMYMRHTFPV LIMEKLNFKMIELPYVKRELSMFILLPDDIKDSTTGLEQLEREL TYEKLSEWADSKKMSVTLVDLHLPKFSMEDRYDLKDALKSM GMASAFNSNADFSGMTGFQAVPMESLSASTNSFTLDLYKKL DETSKGQNIFFASWSIATALAMVHLGAKGDTATQVAKGPEY EETENIHSGFKELLSAINKPRNTYLMKSANRLFGDKTYPLLPK FLELVARYYQAKPQAVNFKTDAEQARAQINSWVENETESKIQ NLLPAGSIDSHTVLVLVNAIYFKGNWEKRFLEKDTSKMPFRL SKTETKPVQMMFLKDTFLIHHERTMKFKIIELPYVGNELSAFV LLPDDISDNTTGLELVERELTYEKLAEWSNSASMMKAKVELY LPKLKMEENYDLKSVLSDMGIRSAFDPAQADFTRMSEKKDLF ISKVIHKAFVEVNEEDRIVQLASGRLTGRCRTLANKELSEKNR TKNLFFSPFSISSALSMILLGSKGNTEAQIAKVLSLSKAEDAHN GYQSLLSEINNPDTKYILRTANRLYGEKTFEFLSSFIDSSQKFY HAGLEQTDFKNASEDSRKQINGWVEEKTEGKIQKLLSEGIINS MTKLVLVNAIYFKGNWQEKFDKETTKEMPFKINKNETKPVQ MMFRKGKYNMTYIGDLETTVLEIPYVDNELSMIILLPDSIQDE STGLEKLERELTYEKLMDWINPNMMDSTEVRVSLPRFKLEEN YELKPTLSTMGMPDAFDLRTADFSGISSGNELVLSEVVHKSFV EVNEEGTEAAAATAGIMLLRCAMIVANFTADHPFLFFIRHNK TNSILFCGRFCSP |

TABLE 43-continued

OVA Sequences

| Name | SEQ ID | Sequence |
|---|---|---|
| PREDICTED: Ovalbumin isoform X2 [*Apteryx australis mantelli*] | 120 | MGSIGTASTEFCFDMFKEMKVQHANQNIIFSPLTIISALSMVYL<br>GARDNTKAQMEKVIHFDKITGFGESVESQCGTSVSIHTSLKD<br>MLSEITKPSDNYSLSLASRLYAEETYPILPEYLQCMKELYKGG<br>LETVSFQTAADQARELINSWVESQTNGVIKNFLQPGSVDPQTE<br>MVLVNAIYFKGMWEKAFKDEDTQEVPFRITEQESKPVQMMY<br>QVGSFKVATVAAEKMKILEIPYTHRELSMFVLLPDDISGLEQL<br>ETTISFEKLTEWTSSNMMEERKVKVYLPHMKIEEKYNLTSVL<br>MALGMTDLFSPSANLSGISTAQTLMMSEAIHGAYVEIYEAGR<br>EMASSTGVQVEVTSVLEEVRADKPFLFFIRHNPTNSMVVFGR<br>YMSP |
| Hypothetical protein ASZ78_006 007 [*Callipepla squamata*] | 121 | MTSNTCHEADEFENIDFRMDSISVTNTKFCFDVFNEMKVHHV<br>NENILYSPLSILTALAMVYLGARGNTESQMKKALHEDSITGG<br>GSTTDSQCGSSEYIHNLFKEFLTEITRTNATYSLEIADKLYVDK<br>TFTVLPEYINCARKFYTGGVEEVNFKTAAEEARQLMNSWVE<br>KETNGQIKDLLVPSSVDFGTMMVFINTIYFKGIWKTAFNTEDT<br>REMPFSMTKQESKPVQMMCLNDTFNMVTLPAEKMRILELPY<br>ASGELSMLVLLPDEVSGLERIEKAINFEKLREWTSTNAMEKKS<br>MKVYLPRMKIEEKYNLTSTLMALGMTDLFSRSANLTGISSVD<br>NLMISDAVHGAFMEVNEEGTEAAGSTGAIGNIKHSVEFEEFR<br>ADHPFLFLIRYNPTNVILFFDNSEFTMGSIGAVSTEFCFDVFKE<br>LRVHHANENIFYSPFTIISALAMVYLGAKDSTRTQINKVVRFD<br>KLPGFGDSIEAQCGTSANVHSSLRDILNQITKPNDIYSFSLASR<br>LYADETYTILPEYLQCVKELYRGGLESINFQTAADQARELINS<br>WVESQTSGIIRNVLQPSSVDSQTAMVLVNAIYFKGLWEKGFK<br>DEDTQAIPFRVTEQENKSVQMMYQIGTFKVASVASEKMKILE<br>LPFASGTMSMWVLLPDEVSGLEQLETTISIEKLTEWTSSSVME<br>ERKIKVFLPRMKMEEKYNLTSVLMAMGMTDLFSSSANLSGIS<br>STLQKKGFRSQELGDKYAKPMLESPALTPQATAWDNSWIVA<br>HPPAIEPDLYYQIMEQKWKPFDWPDFRLPMRVSCRFRTMEAL<br>NKANTSFALDFFKHECQEDDSENILFSPFSISSALATVYLGAK<br>GNTADQMAKVLHFNEAEGARNVTTTIRMQVYSRTDQQRLN<br>RRACFQKTEIGKSGNIHAGFKGLNLEINQPTKNYLLNSVNQLY<br>GEKSLPFSKEYLQLAKKYYSAEPQSVDFVGTANEIRREINSRV<br>EHQTEGKIKNLLPPGSIDSLTRLVLVNALYFKGNWATKFEAE<br>DTRHRPFRINTHTTKQVPMMYLSDKFNWTYVESVQTDVLEL<br>PYVNNDLSMFILLPRDITGLQKLINELTFEKLSAWTSPELMEK<br>MKMEVYLPRFTVEKKYDMKSTLSKMGIEDAFTKVDNCGVT<br>NVDEITIHVVPSKCLELKHIQINKELKCNKAVAMEQVSASIGN<br>FTIDLFNKLNETSRDKNIFFSPWSVSSALALTSLAAKGNTARE<br>MAEDPENEQAENIHSGFNELLTALNKPRNTYSLKSANRIYVE<br>KNYPLLPTYIQLSKKYYKAEPHKVNFKTAPEQSRKEINNWVE<br>KQTERKIKNFLSSDDVKNSTKLILVNAIYFKAEWEEKFQAGN<br>TDMQPFRMSKNKSKLVKMMYMRHTFPVLIMEKLNFKMIELP<br>YVKRELSMFILLPDDIKDSTTGLEQLERELTYEKLSEWADSKK<br>MSVTLVDLHLPKFSMEDRYDLKDALRSMGMASAFNSNADFS<br>GMTGERDLVISKVCHQSFVAVDEKGTEAAAATAVIAEAVPM<br>ESLSASTNSFTLDLYKKLDETSKGQNIFFASWSIATALTMVHL<br>GAKGDTATQVAKGPEYEETENIHSGFKELLSALNKPRNTYSM<br>KSANRLFGDKTYPLLPTKTKPVQMMFLKDTFLIHHERTMKFK<br>IIELPYMGNELSAFVLLPDDISDNTTGLELVERELTYEKLAEW<br>SNSASMMKVKVELYLPKLKMEENYDLKSALSDMGIRSAFDP<br>AQADFTRMSEKKDLFISKVIHKAFVEVNEEDRIVQLASGRLTG<br>NTEAQIAKVLSLSKAEDAHNGYQSLLSEINNPDTKYILRTANR<br>LYGEKTFEFLSSFIDSSQKFYHAGLEQTDFKNASEDSRKQING<br>WVEEKTEGKIQKLLSEGIINSMTKLVLVNAIYFKGNWQEKFD<br>KETTKEMPFKINKNETKPVQMMFRKGKYNMTYIGDLETTVL<br>EIPYVDNELSMIILLPDSIQDESTGLEKLERELTYEKLMDWINP<br>NMMDSTEVRVSLPRFKLEENYELKPTLSTMGMPDAFDLRTA<br>DFSGISSGNELVLSEVVHKSFVEVNEEGTEAAAATAGIMLLRC<br>AMIVANFTADHPFLFFIRHNKTNSILFCGRFCSP |
| PREDICTED: Ovalbumin-like [*Mesitornis unicolor*] | 122 | MASIGAASTEFCFDVFKELKTQHVKENIFYSPMAIISALSMVYI<br>GARENTRAEIDKVVHFDKITGFGNAVESQCGPSVSVHSSLKD<br>LITQISKRSDNYSLSYASRIYAEETYPILPEYLQCVKEVYKGGL<br>ESISFQTAADQARENINAWVESQTNGMIKNILQPSSVNPQTEM<br>VLVNAIYLKGMWEKAFKDEDTQTMPFRVTQQESKPVQMMY<br>QIGSFKVAVIASEKMKILELPYTSGQLSMLVLLPDDVSGLEQV<br>ESAITAEKLMEWTSPSIMEERTMKVYLPRMKMVEKYNLTSV<br>LMALGMTDLFTSVANLSGISSAQGLKMSQAIHEAFVEIYEAG<br>SEAVGSTGVGMEITSVSEEFKADLSFLFLIRHNPTNSIIFFGRCI<br>SP |
| Ovalbumin, partial | 123 | MGSIGAASTEFCFDVFRELRVQHVNENIFYSPFSIISALAMVYL<br>GARDNTRTQIDKISQFQALSDEHLVLCIQQLGEFFVCTNRERR |

TABLE 43-continued

OVA Sequences

| Name | SEQ ID | Sequence |
|---|---|---|
| [*Anas platyrhynchos*] | | EVTRYSEQTEDKTQDQNTGQIHKIVDTCMLRQDILTQITKPSD<br>NFSLSFASRLYAEETYAILPEYLQCVKELYKGGLESISFQTAA<br>DQARELINSWVESQTNGIIKNILQPSSVDSQTTMVLVNAIYFK<br>GMWEKAFKDEDTQAMPFRMTEQESKPVQMMYQVGSFKVA<br>MVTSEKMKILELPFASGMMSMFVLLPDEVSGLEQLESTISFEK<br>LTEWTSSTMMEERRMKVYLPRMKMEEKYNLTSVFMALGMT<br>DLFSSSANMSGISSTVSLKMSEAVHAACVEIFEAGRDVVGSAE<br>AGMDVTSVSEEFRADHPFLFFIKHNPTNSILFFGRWMSP |
| PREDICTED: Ovalbumin-like [*Chaetura pelagica*] | 124 | MGSIGAASAEFCLDIFKELKVQHVNENIIFSPMTIISALSLVYL<br>GAKEDTRAQIEKVVPFDKIPGFGEIVESQCPKSASVHSSIQDIF<br>NQIIKRSDNYSLSLASRLYAEESYPIRPEYLQCVKELDKEGLET<br>ISFQTAADQARQLINSWVESQTNGMIKNILQPSSVNSQTEMVL<br>VNAIYFRGLWQKAFKDEDTQAVPFRITEQESKPVQMMQQIGS<br>FKVAEIASEKMKILELPYASGQLSMLVLLPDDVSGLEKLESSIT<br>VEKLIEWTSSNLTEERNVKVYLPRLKIEEKYNLTSVLAALGIT<br>DLFSSSANLSGISTAESLKLSRAVHESFVEIQEAGHEVEGPKEA<br>GIEVTSALDEFRVDRPFLFVTKHNPTNSILFLGRCLSP |
| PREDICTE D: Ovalbumin-like [*Apaloderma vittatum*] | 125 | MGSISAASGEFCLDIFKELKVQHVNENIFYSPMVIVSALSLVY<br>LGARENTRAQIDKVIPFDKITGSSEAVESQCGTPVGAHISLKD<br>VFAQIAKRSDNYSLSFVNRLYAEETYPILPEYLQCVKELYKGG<br>LETISFQTAADQAREIINSWVESQTDGKIKNILQPSSVDPQTKM<br>VLVSAIYFKGLWEKSFKDEDTQAVPFRVTEQESKPVQMMYQI<br>GSFKVAAIAAEKIKILELPYASEQLSMLVLLPDDVSGLEQLEK<br>KISYEKLTEWTSSSVMEEKKIKVYLPRMKIEEKYNLTSILMSL<br>GITDLFSSSANLSGISSTKSLKMSEAVHEASVEIYEAGSEASGIT<br>GDGMEATSVFGEFKVDHPFLFMIKHKPTNSILFFGRCISP |
| Ovalbumin-like [*Corvus cornix cornix*] | 126 | MGSIGPVSTEVCCDIFRELRSQSVQENVCYSPLLIISTLSMVYI<br>GAKDNTKAQIEKAIHFDKIPGFGESTESQCGTSVSIHTSLKDIF<br>TQITKPSDNYSISIARRLYAEEKYPILPEYIQCVKELYKGGLESI<br>SFQTAAEKSRELINSWVESQTNGTIKNILQPSSVSSQTDMVLV<br>SAIYFKGLWEKAFKEEDTQTIPFRITEQESKPVQMMSQIGTFK<br>VAEIPSEKCRILELPYASGRLSLWVLLPDDISGLEQLETAITFEN<br>LKEWTSSSKMEERKIRVYLPRMKIEEKYNLTSVLKSLGITDLF<br>SSSANLSGISSAESLKVSAAFHEASVEIYEAGSKGVGSSEAGV<br>DGTSVSEEIRADHPFLFLIKHNPSDSILFFGRCFSP |
| PREDICTED: Ovalbumin-like [*Calypte anna*] | 127 | MGSIGAASTEFCFDVFKELKVQHVNENIIISPLSIISALSMVYLG<br>AREDTRAQIDKVVHFDKITGFGEAIESQCPTSESVHASLKETFS<br>QLTKPSDNYSLAFASRLYAEETYPILPEYLQCVKELYKGGLET<br>INFQTAAEQARQVINSWVESQTDGMIKSLLQPSSVDPQTEMIL<br>VNAIYFRGLWERAFKDEDTQELPFRITEQESKPVQMMSQIGSF<br>KVAVVASEKVKILELPYASGQLSMLVLLPDDVSGLEQLESSIT<br>VEKLIEWISSNTKEERNIKVYLPRMKIEEKYNLTSVLVALGITD<br>LFSSSANLSGISSAESLKISEAVHEAFVEIQEAGSEVVGSPGPEV<br>EVTSVSEEWKADRPFLFLIKHNPTNSILFFGRYISP |
| PREDICTED: Ovalbumin [*Corvus brachyrhynchos*] | 128 | MGSIGPVSTEVCCDIFRELRSQSVQENVCYSPLLIISTLSMVYI<br>GAKDNTKAQIEKAIHFDKIPGFGESTESQCGTSVSIHTSLKDIF<br>TQITKPSDNYSISIARRLYAEEKYPILQEYIQCVKELYKGGLESI<br>SFQTAAEKSRELINSWVESQTNGTIKNILQPSSVSSQTDMVLV<br>SAIYFKGLWEKAFKEEDTQTIPFRITEQESKPVQMMSQIGTFK<br>VAEIPSEKCRILELPYASGRLSLWVLLPDDISGLEQLETSITFEN<br>LKEWTSSSKMEERKIRVYLPRMKIEEKYNLTSVLKSLGITDLF<br>SSSANLSGISSAESLKVSAVFHEASVEIYEAGSKGVGSSEAGV<br>DGTSVSEEIRADHPFLFLIKHNPSDSILFFGRCFSP |
| Hypothetical protein DUI87_082 70 [*Hirundo rustica rustica*] | 129 | MLNLMHPKQFCCTMGSIGPVSTEVCCDIFRELRSQSVQENVC<br>YSPLLIISTLSMVYIGAKDNTKAQIEKAIHFDKIPGFGESTESQC<br>GTSVSIHTSLKDIFTQITKPSDNYSISIASRLYAEEKYPILPEYIQ<br>CVKELYKGGLESISFQTAAEKSRELINSWVESQTNGTIKNILQP<br>SSVSSQTDMVLVSAIYFKGLWEKAFKEEDTQTVPFRITEQESK<br>PVQMMSQIGTFKVAEIPSEKCRILELPYASGRLSLWVLLPDDIS<br>GLEQLETAITSENLKEWTSSSKMEERKIKVYLPRMKIEEKYNL<br>TSVLKSLGITDLFSSSANLSGISSAESLKVSGAFHEAFVEIYEA<br>GSKAVGSSGAGVEDTSVSEEIRADHPFLFFIKHNPSDSILFFGR<br>CFSP |
| Ostrich OVA sequence as secreted from pichia | 130 | EAEAGSIGTASAEFCFDVFKELKVHHVNENIFYSPLSIISALSM<br>VYLGARENTKTQMEKVIHFDKITGLGESMESQCGTGVSIHTA<br>LKDMLSEITKPSDNYSLSLASRLYAEQTYAILPEYLQCIKELY<br>KESLETVSFQTAADQARELINSWIESQTNGVIKNFLQPGSVDS<br>QTELVLVNAIYFKGMWEKAFKDEDTQEVPFRITEQESRPVQM |

TABLE 43-continued

OVA Sequences

| Name | SEQ ID | Sequence |
|---|---|---|
| | | MYQAGSFKVATVAAEKIKILELPYASGELSMLVLLPDDISGLE QLETTISFEKLTEWTSSNMMEDRNMKVYLPRMKIEEKYNLTS VLIALGMTDLFSPAANLSGISAAESLKMSEAIHAAYVEIYEAD SEIVSSAGVQVEVTSDSEEFRVDHPFLFLIKHNPTNSVLFFGRC ISP |
| Ostrich construct (secretion signal + mature protein) | 131 | MRFPSIFTAVLFAASSALAAPVNTTTEDETAQIPAEAVIGYSDL EGDFDVAVLPFSNSTNNGLLFINTTIASIAAKEEGVSLEKREAE AGSIGTASAEFCFDVFKELKVHHVNENIFYSPLSIISALSMVYL GARENTKTQMEKVIHFDKITGLGESMESQCGTGVSIHTALKD MLSEITKPSDNYSLSLASRLYAEQTYAILPEYLQCIKELYKESL ETVSFQTAADQARELINSWIESQTNGVIKNFLQPGSVDSQTEL VLVNAIYFKGMWEKAFKDEDTQEVPFRITEQESRPVQMMYQ AGSFKVATVAAEKIKILELPYASGELSMLVLLPDDISGLEQLE TTISFEKLTEWTSSNMMEDRNMKVYLPRMKIEEKYNLTSVLI ALGMTDLFSPAANLSGISAAESLKMSEAIHAAYVEIYEADSEI VSSAGVQVEVTSDSEEFRVDHPFLFLIKHNPTNSVLFFGRCISP |
| Duck OVA sequence as secreted from pichia | 132 | EAEAGSIGAASTEFCFDVFRELRVQHVNENIFYSPFSIISALAM VYLGARDNTRTQIDKVVHFDKLPGFGESMEAQCGTSVSVHSS LRDILTQITKPSDNFSLSFASRLYAEETYAILPEYLQCVKELYK GGLESISFQTAADQARELINSWVESQINGIIKNILQPSSVDSQT TMVLVNAIYFKGMWEKAFKDEDTQAMPFRMTEQESKPVQM MYQVGSFKVAMVTSEKMKILELPFASGMMSMFVLLPDEVSG LEQLESTISFEKLTEWTSSTMMEERRMKVYLPRMKMEEKYN LTSVFMALGMTDLFSSSANMSGISSTVSLKMSEAVHAACVEIF EAGRDVVGSAEAGMDVTSVSEEFRADHPFLFFIKHNPTNSILF FGRWMSP |
| Duck construct (secretion signal + mature protein) | 133 | MRFPSIFTAVLFAASSALAAPVNTTTEDETAQIPAEAVIGYSDL EGDFDVAVLPFSNSTNNGLLFINTTIASIAAKEEGVSLEKREAE AGSIGAASTEFCFDVFRELRVQHVNENIFYSPFSIISALAMVYL GARDNTRTQIDKVVHFDKLPGFGESMEAQCGTSVSVHSSLRD ILTQITKPSDNFSLSFASRLYAEETYAILPEYLQCVKELYKGGL ESISFQTAADQARELINSWVESQTNGIIKNILQPSSVDSQTTMV LVNAIYFKGMWEKAFKDEDTQAMPFRMTEQESKPVQMMYQ VGSFKVAMVTSEKMKILELPFASGMMSMFVLLPDEVSGLEQL ESTISFEKLTEWTSSTMMEERRMKVYLPRMKMEEKYNLTSVF MALGMTDLFSSSANMSGISSTVSLKMSEAVHAACVEIFEAGR DVVGSAEAGMDVTSVSEEFRADHPFLFFIKHNPTNSILFFGRW MSP |

Expression of rOVA in a host cell, for instance a *Pichia* species, a *Saccharomyces* species, a *Trichoderma* species, a *Pseudomonas* species may lead to an addition of one or more amino acids to the OVA sequence as part of post-transcriptional or post-translational modifications. Such amino acids may not be part of the native OVA sequences. For instance, expressing an OVA sequence in a *Pichia* species, such as *Komagataella phaffii* and *Komagataella pastoris* may lead to addition of one or more amino acids at the N-terminus or C-terminus. In some cases, four amino acids EAEA (SEQ ID NO: 53) is added to the N-terminus of the OVA sequence upon expression in a host cell as shown in SEQ ID NO:1. For example, chicken rOVA may be provided encoding SEQ ID NO: 60, and following expression and secretion, rOVA has the amino acid sequence of SEQ ID NO:61.

An rOVA can be a non-naturally occurring variant of an OVA. Such variant can comprise one or more amino acid insertions, deletions, or substitutions relative to a native OVA sequence.

Such a variant can have at least 70%, 75%, 80%, 85%, 90%, 95%, 96%, 97%, 98%, or 99% sequence identity to SEQ ID NOs: 60-133. The term "sequence identity" as used herein in the context of amino acid sequences is defined as the percentage of amino acid residues in a candidate sequence that are identical with the amino acid residues in a selected sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, ALIGN-2 or Megalign (DNASTAR) software, with BLAST being the preferable alignment algorithm. Those skilled in the art can determine appropriate parameters for measuring alignment, including any algorithms needed to achieve maximal alignment over the full-length of the sequences being compared.

Depending on the host organism used to express the rOVA, the rOVA can have a glycosylation, acetylation, or phosphorylation pattern different from wildtype OVA. For example, the rOVA herein may or may not be glycosylated, acetylated, or phosphorylated. An rOVA may have an avian, non-avian, microbial, non-microbial, mammalian, or non-mammalian glycosylation, acetylation, or phosphorylation pattern.

In some cases, rOVA may be deglycosylated (e.g., chemically, enzymatically, Endo-H, PNGase F, O-Glycosidase, Neuraminidase, β1-4 Galactosidase, β-N-acetylglucosaminidase), deacetylated (e.g., protein deacetylase, histone deacetylase, sirtuin), or dephosphorylated (e.g., acid phosphatase, lambda protein phosphatase, calf intestinal phosphatase, alkaline phosphatase). Deglycosylation, deacetylation or dephosphorylation may produce a protein that is more uniform or is capable of producing a composition with less variation.

An rOVA is recombinantly expressed in a host cell. As used herein, a "host" or "host cell" denotes here any protein production host selected or genetically modified to produce a desired product. Exemplary hosts include fungi, such as filamentous fungi, as well as bacteria, yeast, plant, insect, and mammalian cells. A host cell may be *Arxula* spp., *Arxula adeninivorans, Kluyveromyces* spp., *Kluyveromyces lactis, Komagataella phaffii, Pichia* spp., *Pichia angusta, Pichia pastoris, Saccharomyces* spp., *Saccharomyces cerevisiae, Schizosaccharomyces* spp., *Schizosaccharomyces pombe, Yarrowia* spp., *Yarrowia lipolytica, Agaricus* spp., *Agaricus bisporus, Aspergillus* spp., *Aspergillus awamori, Aspergillus fumigatus, Aspergillus nidulans, Aspergillus niger, Aspergillus oryzae, Bacillus subtilis, Colletotrichum* spp., *Colletotrichum gloeosporiodes, Endothia* spp., *Endothia parasitica, Escherichia coli, Fusarium* spp., *Fusarium graminearum, Fusarium solani, Mucor* spp., *Mucor miehei, Mucor pusillus, Myceliophthora* spp., *Myceliophthora thermophila, Neurospora* spp., *Neurospora crassa, Penicillium* spp., *Penicillium camemberti, Penicillium canescens, Penicillium chrysogenum, Penicillium* (*Talaromyces*) *emersonii, Penicillium funiculo sum, Penicillium purpurogenum, Penicillium roqueforti, Pleurotus* spp., *Pleurotus ostreatus, Rhizomucor* spp., *Rhizomucor miehei, Rhizomucor pusillus, Rhizopus* spp., *Rhizopus arrhizus, Rhizopus oligosporus, Rhizopus oryzae, Trichoderma* spp., *Trichoderma altroviride, Trichoderma reesei*, or *Trichoderma vireus*. A host cell can be an organism that is approved as generally regarded as safe by the U.S. Food and Drug Administration.

An rOVA protein can be recombinantly expressed in yeast, filamentous fungi or a bacterium. In some embodiments, rOVA protein is recombinantly expressed in a *Pichia* species (*Komagataella phaffii* and *Komagataella pastoris*), a *Saccharomyces* species, a *Trichoderma* species, a *Pseudomonas* species or an *E. coli* species.

Expression of an rOVA can be provided by an expression vector, a plasmid, a nucleic acid integrated into the host genome or other means. For example, a vector for expression can include: (a) a promoter element, (b) a signal peptide, (c) an OVA sequence heterologous to the host cell, and (d) a terminator element.

Expression vectors that can be used for expression of OVA include those containing an expression cassette with elements (a), (b), (c) and (d). In some embodiments, the signal peptide (b) need not be included in the vector. In general, the expression cassette is designed to mediate the transcription of the transgene when integrated into the genome of a cognate host microorganism.

To aide in the amplification of the vector prior to transformation into the host microorganism, a replication origin (e) may be contained in the vector (such as PUC_ORIC and PUC (DNA2.0)). To aide in the selection of microorganism stably transformed with the expression vector, the vector may also include a selection marker (f) such as URA3 gene and Zeocin resistance gene (ZeoR). The expression vector may also contain a restriction enzyme site (g) that allows for linearization of the expression vector prior to transformation into the host microorganism to facilitate the expression vectors stable integration into the host genome. In some embodiments the expression vector may contain any subset of the elements (b), (e), (f), and (g), including none of elements (b), (e), (f), and (g). Other expression elements and vector element known to one of skill in the art can be used in combination or substituted for the elements described herein.

Exemplary promoter elements (a) may include, but are not limited to, a constitutive promoter, inducible promoter, and hybrid promoter. Promoters include, but are not limited to, acu-5, adh1+, alcohol dehydrogenase (ADH1, ADH2, ADH4), AHSB4m, AINV, alcA, α-amylase, alternative oxidase (AOD), alcohol oxidase I (AOX1), alcohol oxidase 2 (AOX2), AXDH, B2, CaMV, cellobiohydrolase I (cbh1), ccg-1, cDNA1, cellular filament polypeptide (cfp), cpc-2, ctr4+, CUP1, dihydroxyacetone synthase (DAS), enolase (ENO, ENO1), formaldehyde dehydrogenase (FLD1), FMD, formate dehydrogenase (FMDH), G1, G6, GAA, GAL1, GAL2, GAL3, GAL4, GAL5, GAL6, GAL7, GAL8, GAL9, GAL10, GCW14, gdhA, gla-1, α-glucoamylase (glaA), glyceraldehyde-3-phosphate dehydrogenase (gpdA, GAP, GAPDH), phosphoglycerate mutase (GPM1), glycerol kinase (GUTi), HSP82, invl+, isocitrate lyase (ICL1), acetohydroxy acid isomeroreductase (ILV5), KAR2, KEX2, β-galactosidase (lac4), LEU2, melO, MET3, methanol oxidase (MOX), nmt1, NSP, pcbC, PET9, peroxin 8 (PEX8), phosphoglycerate kinase (PGK, PGK1), pho1, PHO5, PH089, phosphatidylinositol synthase (PIS1), PYK1, pyruvate kinase (pki1), RPS7, sorbitol dehydrogenase (SDH), 3-phosphoserine aminotransferase (SER1), SSA4, SV40, TEF, translation elongation factor 1 alpha (TEF1), THI11, homoserine kinase (THR1), tpi, TPS1, triose phosphate isomerase (TPI1), XRP2, YPT1, and any combination thereof.

A signal peptide (b), also known as a signal sequence, targeting signal, localization signal, localization sequence, signal peptide, transit peptide, leader sequence, or leader peptide, may support secretion of a protein or polynucleotide. Extracellular secretion of a recombinant or heterologously expressed protein from a host cell may facilitate protein purification. A signal peptide may be derived from a precursor (e.g., prepropeptide, preprotein) of a protein. Signal peptides can be derived from a precursor of a protein other than the signal peptides in native OVA. An example of secretion protein is a *S. cerevisiae* alpha factor pre pro sequence shown bolded and underlined in SEQ ID NO: 60.

Any nucleic acid sequence that encodes OVA can be used as (c). Preferably such sequence is codon optimized for the host cell.

Exemplary transcriptional terminator elements include, but are not limited to, acu-5, adh1+, alcohol dehydrogenase (ADH1, ADH2, ADH4), AHSB4m, AINV, alcA, α-amylase, alternative oxidase (AOD), alcohol oxidase I (AOX1), alcohol oxidase 2 (AOX2), AXDH, B2, CaMV, cellobiohydrolase I (cbh1), ccg-1, cDNA1, cellular filament polypeptide (cfp), cpc-2, ctr4+, CUP1, dihydroxyacetone synthase (DAS), enolase (ENO, ENO1), formaldehyde dehydrogenase (FLD1), FMD, formate dehydrogenase (FMDH), G1, G6, GAA, GAL1, GAL2, GAL3, GAL4, GAL5, GAL6, GAL7, GAL8, GAL9, GAL10, GCW14, gdhA, gla-1, α-glucoamylase (glaA), glyceraldehyde-3-phosphate dehydrogenase (gpdA, GAP, GAPDH), phosphoglycerate mutase (GPM1), glycerol kinase (GUTi), HSP82, invl+, isocitrate lyase (ICL1), acetohydroxy acid isomeroreductase (ILV5), KAR2, KEX2, β-galactosidase (lac4), LEU2, melO, MET3, methanol oxidase (MOX), nmt1, NSP, pcbC, PET9, peroxin 8 (PEX8), phosphoglycerate kinase (PGK, PGK1), pho1, PHO5, PHO89, phosphatidylinositol synthase (PIS1), PYK1, pyruvate kinase (pki1), RPS7, sorbitol dehydrogenase (SDH), 3-phosphoserine aminotransferase (SER1), SSA4, SV40, TEF, translation elongation factor 1 alpha (TEF1), THI11, homoserine kinase (THR1), tpi, TPS1, triose phosphate isomerase (TPI1), XRP2, YPT1, and any combination thereof.

Exemplary selectable markers (f) may include, but are not limited to: an antibiotic resistance gene (e.g. zeocin, ampicillin, blasticidin, kanamycin, nourseothricin, chloroamphenicol, tetracycline, triclosan, ganciclovir, and any combination thereof), an auxotrophic marker (e.g. ade1, arg4, his4, ura3, met2, and any combination thereof).

In one example, a vector for expression in *Pichia* sp. can include an AOX1 promoter operably linked to a signal peptide (alpha mating factor) that is fused in frame with a nucleic acid sequence encoding OVA, and a terminator element (AOX1 terminator) immediately downstream of the nucleic acid sequence encoding OVA.

In another example, a vector comprising a DAS1 promoter is operably linked to a signal peptide (alpha mating factor) that is fused in frame with a nucleic acid sequence encoding OVA and a terminator element (AOX1 terminator) immediately downstream of OVA.

A recombinant protein described herein may be secreted from the one or more host cells. In some embodiments, rOVA protein is secreted from the host cell. The secreted rOVA may be isolated and purified by methods such as centrifugation, fractionation, filtration, ion exchange chromatography, affinity purification and other methods for separating protein from cells, liquid and solid media components and other cellular products and byproducts. In some embodiments, rOVA is produced in a *Pichia* Sp. and secreted from the host cells into the culture media. The secreted rOVA is then separated from other media components for further use.

The present disclosure contemplates modifying glycosylation of the recombinant OVA to alter or enhance one or more functional characteristics of the protein and/or its production. In some embodiments, the change in rOVA glycosylation can be due to the host cell glycosylating the rOVA. In some embodiments, rOVA has a glycosylation pattern that is not identical to a native ovalbumin (nOVA), such as a nOVA from chicken egg. In some embodiments, rOVA is treated with a deglycosylating enzyme before it is used as an ingredient in an rOVA composition, or when rOVA is present in a composition. In some embodiments, the glycosylation of rOVA is modified or removed by expressing one or more enzymes in a host cell and exposing rOVA to the one or more enzymes. In some embodiments, rOVA and the one or more enzymes for modification or removal of glycosylation are co-expressed in the same host cell.

Native ovalbumin (nOVA), such as isolated from a chicken or another avian egg, has a highly complex branched form of glycosylation. The glycosylation pattern comprises N-linked glycan structures such as N-acetylglucosamine units, galactose and N-linked mannose units. See, e.g., FIG. 1A. In some cases, the rOVA for use in a herein disclosed consumable composition and produced using the methods described herein has a glycosylation pattern which is different from the glycosylation pattern of nOVA. For example, when rOVA is produced in a *Pichia* sp., the protein may be glycosylated differently from the nOVA and lack galactose units in the N-linked glycosylation. FIG. 1B illustrates the glycosylation patterns of rOVA produced by *P. pastoris*, showing a complex branched glycosylation pattern. In some embodiments of the compositions and methods disclosed herein, rOVA is treated such that the glycosylation pattern is modified from that of nOVA and also modified as compared to rOVA produced by a *Pichia* sp. without such treatment. In some cases, the rOVA lacks glycosylation.

The molecular weight or rOVA may be different as compared to nOVA. The molecular weight of the protein may be less than the molecular weight of nOVA or less than rOVA produced by the host cell where the glycosylation of rOVA is not modified. In embodiments, the molecular weight of an rOVA may be between 40 kDa and 55 kDa. In some cases, an rOVA with modified glycosylation has a different molecular weight, such as compared to a native OVA (as produced by an avian host species) or as compared to a host cell that glycosylates the rOVA, such as where the rOVA includes N-linked mannosylation. In some cases, the molecular weight of rOVA is greater than the molecular weight of the rOVA that is completely devoid of post-translational modifications. or an rOVA that lacks all forms of N-linked glycosylation.

5. Definitions

The terminology used herein is for the purpose of describing particular cases only and is not intended to be limiting.

As used herein, the singular forms "a" "an" and "the" are intended to include the plural forms as well, unless the context clearly indicates otherwise.

The terms "including", "includes", "having", "has", "with", or variants thereof are used in either the detailed description and/or the claims, such terms are intended to be inclusive in a manner similar to the term "comprising".

Ranges can be expressed herein as from "about" or "approximately" one particular value, and/or to "about" or "approximately" another particular value. When such a range is expressed, another case includes from the one particular value and/or to the other particular value. Similarly, when values are expressed as approximations, by use of the antecedent "about" or "approximately", it will be understood that the particular value forms another case. It will be further understood that the endpoints of each of the ranges are significant both in relation to the other endpoint, and independently of the other endpoint. The term "about" or "approximately" as used herein refers to a range that is 15% plus or minus from a stated numerical value within the context of the particular usage. For example, about 10 would include a range from 8.5 to 11.5. The term "about" or "approximately" also accounts for typical error or imprecision in measurement of values.

Any aspect or embodiment described herein can be combined with any other aspect or embodiment as disclosed herein.

Definitions

The terminology used herein is for the purpose of describing particular cases only and is not intended to be limiting.

As used herein, unless otherwise indicated, the terms "a", "an" and "the" are intended to include the plural forms as well as the single forms, unless the context clearly indicates otherwise.

The terms "comprise", "comprising", "contain," "containing," "including", "includes", "having", "has", "with", or variants thereof as used in either the present disclosure and/or in the claims, are intended to be inclusive in a manner similar to the term "comprising."

The term "about" or "approximately" means within an acceptable error range for the particular value as determined by one of ordinary skill in the art, which will depend in part on how the value is measured or determined, e.g., the limitations of the measurement system. For example, "about" can mean 10% greater than or less than the stated value. In another example, "about" can mean within 1 or more than 1 standard deviation, per the practice in the given value. Where particular values are described in the application and claims, unless otherwise stated the term "about" should be assumed to mean an acceptable error range for the particular value.

The term "substantially" is meant to be a significant extent, for the most part; or essentially. In other words, the term substantially may mean nearly exact to the desired attribute or slightly different from the exact attribute. Substantially may be indistinguishable from the desired attribute. Substantially may be distinguishable from the desired attribute but the difference is unimportant or negligible.

Any aspect or embodiment described herein can be combined with any other aspect or embodiment as disclosed herein.

EXAMPLES

The following examples are given for the purpose of illustrating various embodiments of the invention and are not meant to limit the present invention in any fashion. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

Example 1: Expression Constructs, Transformation, Protein Purification and Processing Two expression constructs were created for expression of OVD (SEQ ID NO: 1) in *Pichia pastoris*. The first construct included the Alcohol oxidase 1 (AOX1) promoter. An OVD coding sequenced was fused in-frame with the alpha mating factor signal sequence downstream of the promoter sequence. A transcriptional terminator from the AOX1 gene was placed downstream of the OVD sequence. The expression construct was placed into a Kpas-URA 3 vector.

A second expression construct was created containing the methanol-inducible DAS1 promoter (ATCC No. 28485) upstream of the alpha mating factor signal sequence fused in frame with a nucleic acid sequence encoding the same OVD protein sequence as in the first expression construct. A transcriptional terminator from the AOX1 gene was placed downstream of the OVD sequence.

In both expression constructs, the OVD sequence was that of chicken (*Gallus gallus*) having amino acid sequence of SEQ ID NO: 1.

Both expression constructs were transformed into *Pichia pastoris*. Successful integration of the two constructs were confirmed by genomic sequencing.

Fermentation: Recombinant OVD (rOVD) from each expression construct was produced in a bioreactor at ambient conditions. A seed train for the fermentation process began with the inoculation of shake flasks with liquid growth broth. The inoculated shake flasks were kept in a shaker after which the grown *Pichia pastoris* was transferred to a production scale reactor.

The culture was grown at 30° C., at a set pH and dissolved oxygen (DO). The culture was fed with a carbon source.

Secreted rOVD was purified by separating cells from the liquid growth broth, performing multiple filtration steps, performing chromatography using and drying the final protein product to produce pure rOVD powder.

Example 2: Expression Construct, Transformation, Protein Purification and Processing Three expression constructs were created for expression of a mature form of OVD (SEQ ID NO: 1) in *Pichia pastoris*. The first construct included the AOX1 promoter. An OVD coding sequenced was fused in-frame with the alpha mating factor signal sequence downstream of the promoter sequence (SEQ ID NO: 39). A transcriptional terminator from the AOX1 gene was placed downstream of the OVD sequence. The host cells had eleven copies of OVD, ten of which were in the hybrid promoter system, with five driven by a shortened pAOX1. The eleventh copy was driven by a full-sized pAOX1 promoter.

A second expression construct was created containing a nucleic acid encoding the *P. pastoris* transcription factor HAC1 under the control of a strong methanol-inducible promoter. A transcriptional terminator from the AOX1 gene was placed downstream of the HAC1 sequence.

A third expression construct was created encoding a fusion protein. The construct comprises a nucleic acid that encodes the first 48 residues of *Pichia* OCH1 protein fused to a catalytically active version of the *Streptomyces coelicoflavus* EndoH (SEQ ID NO.: 52) and under a strong methanol-inducible promoter, pPEX11. A transcriptional terminator from the AOX1 gene was placed downstream of the EndoH-OCH1 fusion protein sequence.

The *P. pastoris* strain was modified to remove cytoplasmic killer plasmids and then further modified to have a deletion in the AOX1 gene. This deletion generated a methanol-utilization slow (mutS) phenotype that reduces the strain's ability to consume methanol. This base strain was transformed with the three expression constructs.

Linear cassettes of methanol-inducible promoter: ScPrePro (*Saccharomyces* pre-pro sequence)::ovomucoid::AOX1term; linear cassettes of methanol-inducible promoter::HAC1::AOX1term; and a linear cassette of methanol-inducible promoter::EndoH-OCH1::AOX1term were introduced into the base *P. pastoris* strain using standard electroporation methods. FIG. 1A illustrates the vector constructs used for the expression of rOVD.

Fermentation: Recombinant OVD from each expression construct was produced in a bioreactor at ambient conditions. A seed train for the fermentation process began with the inoculation of shake flasks with liquid growth broth. The inoculated shake flasks were kept in a shaker after which the grown *P. pastoris* was transferred to a production-scale reactor.

The culture was grown at 30° C., at a set pH and dissolved oxygen (DO). The culture was fed with a carbon source.

To expand production, an rOVD *P. pastoris* seed strain is removed from cryo-storage and thawed to room temperature. Contents of the thawed seed vials are used to inoculate liquid seed culture media in baffled flasks which were grown at 30° C. in shaking incubators. These seed flasks are then transferred and grown in a series of larger and larger seed fermenters (number to vary depending on scale) containing a basal salt media, trace metals, and glucose. Temperature in the seed reactors are controlled at 30° C., pH at 5, and DO at 30%. pH is maintained by feeding ammonia hydroxide which also acts as a nitrogen source. Once sufficient cell mass is reached, the grown rOVD *P. pastoris* is inoculated in a production-scale reactor containing basal salt media, trace metals, and glucose. Like in the seed tanks, the culture is also controlled at 30° C., pH 5 and 30% DO throughout the process. pH is again maintained by feeding ammonia hydroxide. During the initial batch glucose phase, the culture is left to consume all glucose and subsequently-produced ethanol. Once the target cell density is achieved and glucose and ethanol concentrations are confirmed to be zero, the glucose fed-batch growth phase is initiated. In this phase, glucose is fed until the culture reaches a target cell density. Glucose is fed at a limiting rate to prevent ethanol from building up in the presence of non-zero glucose concentrations. In the final induction phase, the culture is co-fed glucose and methanol which induces it to produce rOVD. Glucose is fed at an amount to produce a desired growth rate, while methanol is fed to maintain the methanol concentration at 1% to ensure that expression is consistently induced. Regular samples are taken throughout the fermentation process for analyses of specific process parameters (e.g., cell density, glucose/methanol concentrations, product titer, and quality). After a designated amount of fermentation time, secreted rOVD is collected and transferred for downstream processing.

The rOVD products were purified by separating cells from the liquid growth broth, performing multiple filtration steps, performing chromatography, and/or drying the final protein product to produce pure rOVD powder.

Post-translation modification from the OCH1-EndoH fusion protein resulted in the removal of the alpha factor pre-pro sequence. N-terminal sequencing results showed imprecise cleavage of the N-terminal pro sequence by the *Pichia* host post-transcription machinery fusing an additional four amino acid residues (major) or 6 amino acid residues (minor) to the N-terminus of the produced rOVD (SEQ ID NO: 37) or (SEQ ID NO:38) in comparison to the amino acid sequence of mature OVD (SEQ ID NO:1).

Figure 1D:
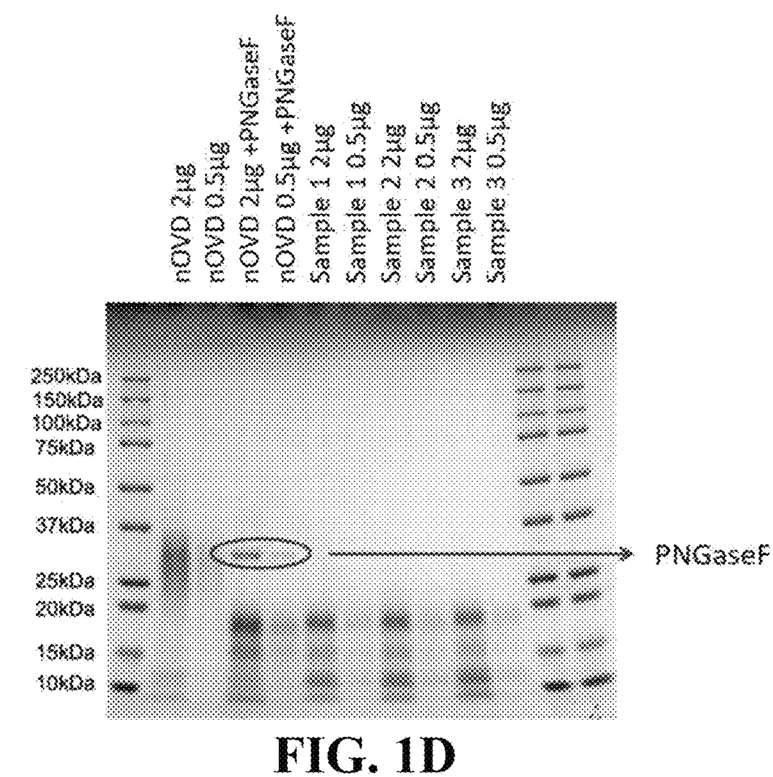
FIG. 1D compares the molecular weight of native OVD, native OVD treated with an endoglycosidase, and recombinant OVD samples.

The molecular weight of rOVD from *Pichia* was compared against native chicken ovomucoid (nOVD) using SDS-PAGE. The rOVD showed a difference in migration. To ascertain whether the difference in gel migration was due to differential post-translational glycosylation, deglycosylated native ovomucoid was treated with PNGase F, an enzyme that specifically deglycosylates proteins (BioLabs 2020), and compared to the rOVD sample. The deglycosylated native ovomucoid (nOVD+PNGaseF) displayed the same band patterns and molecular weight as three rOVD samples tested (FIG. 1D). The difference in glycosylation is attributed to the action of the OCH1-EndoH in the *Pichia* strain, such that rOVD has only the core N-acetylglucosamine unit attached to the Asn residue instead of the complex branched glycosylation (that includes mannose) of nOVD from chicken egg white (FIG. 1B and FIG. 1C).

Mass spectrometry analysis of rOVD expressed in *Pichia* without EndoH is shown to have eight different N-glycan structures (FIG. 1C). The structures include Man9 GlcNAc2, Man9 GlcNAc2 Hex, Man9 GlcNAc2Hex2, Man9 GlcNAc2Hex3, Man9 GlcNAc2Hex4, Man9 GlcNAc2 Hex5,v Man9 GlcNAc2Hex6, and Man9 GlcNAc2 Hex7. Table 2 below shows the percentage of N-linked glycans on the rOVD sample produced without endoglycosidase treatment.

TABLE 2

| N-linked glycans from sample detected by MALDI TOF/TOF MS. | | |
|---|---|---|
| Permethylated mass (m/z)[1] | Text description of structures | Percentage |
| 2396.2 | $Man_9GlcNAc_2$ | 5.6 |
| 2600.3 | $Man_9GlcNAc_2Hex$ | 25.1 |
| 2804.4 | $Man_9GlcNAc_2Hex_2$ | 31.6 |
| 3008.5 | $Man_9GlcNAc_2Hex_3$ | 18.2 |
| 3212.6 | $Man_9GlcNAc_2Hex_4$ | 6.0 |
| 3416.7 | $Man_9GlcNAc_2Hex_5$ | 7.2 |
| 3620.8 | $Man_9GlcNAc_2Hex_6$ | 3.8 |
| 3824.9 | $Man_9GlcNAc_2Hex_7$ | 2.6 |

Example 3: Solubility and Clarity Testing at Varying rOVD Concentrations

Lyophilized rOVD (from Example 2) was blended into aqueous solution (distilled water) at different concentrations and pHs. Clarity and solubility of the rOVD solutions was then assessed visually (e.g., for turbidity, precipitate, viscosity, and color) as well as by measuring absorbance at 600 nm.

FIG. 2 shows the absorbance at 600 nm of deionized water compared with the absorbance at 600 nm of a solution comprising rOVD in deionized water at a protein concentration of 4.23% w/v. The rOVD solution had a pH of 4.11. The deionized water had an absorbance of 0.037 (OD600). The solution with 4.23% w/v rOVD had an absorbance of 0.047, an increase of 27%. The photo in FIG. 2 of the rOVD solution reveals a clear and colorless solution with no precipitate and no apparent viscosity changes in appearance and visual flow of liquid.

Example 4: Solubility and Clarity Testing at Varying Temperatures

The aqueous 30% rOVD (w/v) samples of Example 3, at pH 4.06 or pH 6.3 were incubated at room temperature and subjected to three heat treatments: pasteurization, hot fill, and retorting. The clarity and solubility of rOVD was then assessed visually (e.g., for turbidity, precipitate, viscosity, and color) and by measuring absorbance at 600 nm.

Heat treatments on each sample were executed as follows:

For pasteurization, the samples were heated to 72° C. for 1 minute and then placed in an ice bath for 10 minutes. Following the ice bath, the samples were placed at room temperature and then assessed for solubility and clarity.

For hot fill, the samples were heated to 85° C. for 30 seconds and then placed at room temperature for assessment of solubility and clarity.

For retorting, the samples were heated to 121° C. for 15 minutes at 19 psi and then kept at room temperature for assessment of solubility and clarity.

FIG. 3 shows the results for pH, absorbance and clarity of an rOVD solution comprising 30% rOVD in deionized water. The rOVD was surprisingly soluble in deionized water at 30% (w/v based on protein amount) at either pH 4.06 or pH 6.3. The photos of the rOVD solutions at both pH 4.06 and 6.3 look clear, pale green, and viscous, though less so under the “pre-processing” condition, which was prior to a heat treatment. It can be concluded from FIG. 3 that rOVD can remain soluble in both acidic (pH ~4.0) and slightly acidic (pH ~6) solutions at a concentration of rOVD of 30% w/v. More specifically, the 30% rOVD solution at pH 4.06 had an OD600 of 0.101 after pasteurization and an OD600 of 0.104 after hot filling. At the less acidic pH of 6.3, the OD600 of the 30% rOVD solution after pasteurization was 0.089 and after hot filling was 0.094. As such, there appeared to be greater clarity and solubility of the rOVD at higher pH values.

Figure 4:
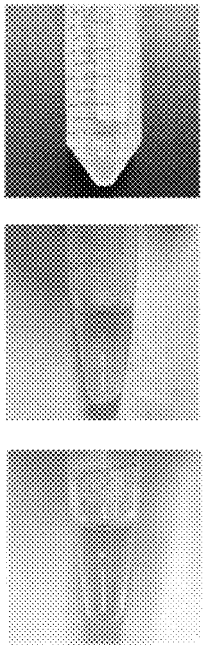
FIG. 4 illustrates rOVD solution clarity after different heat treatments with 30% w/v rOVD in deionized water.

FIG. 4 shows the photos from the pH 4.06 experiments of FIG. 3. It can be concluded from FIG. 4 that rOVD can surprisingly remain in solution following heat application. 30% w/v.

Example 5: Solubility and Clarity Testing at Varying Temperatures and pH

Lyophilized rOVD (from Example 2) was blended into aqueous solution (distilled water) at concentration of 9% (w/v). Sodium citrate buffer (0.1M) was used to adjust the pH of the solutions to pH's of 2.5, 4 or 6, as shown in Table 3 below:

TABLE 3

Composition of the citrate buffer at pH 2.5, 4 or 6

| Citric acid (mL) | Sodium citrate (mL) | DI water (mL) | pH | rOVD |
|---|---|---|---|---|
| 49.2 | 0.8 | 50 | 2.5 | 9% w/v |
| 37 | 13 | 50 | 4 | 9% w/v |
| 6 | 44 | 50 | 6 | 9% w/v |

Following pH adjustment, separate aqueous rOVD samples at each pH were incubated at room temperature and subjected to three types of heat treatments: pasteurization, hot fill and retorting (as described below). The clarity and solubility of rOVD was then assessed visually (e.g., for turbidity, precipitate, viscosity, and color) and by measuring absorbance at 600 nm.

The heat treatments on each sample were executed as follows:

For pasteurization, the samples were heated to 72° C. for 1 minute and then placed in an ice bath for 10 minutes. Following the ice bath, the samples were placed at room temperature and then assessed for solubility and clarity.

For hot fill, the samples were heated to 85° C. for 30 seconds and then placed at room temperature for assessment of solubility and clarity.

For retorting, the samples were heated to 121° C. for 15 minutes at 19 psi and then kept at room temperature for assessment of solubility and clarity.

Figure 5A:
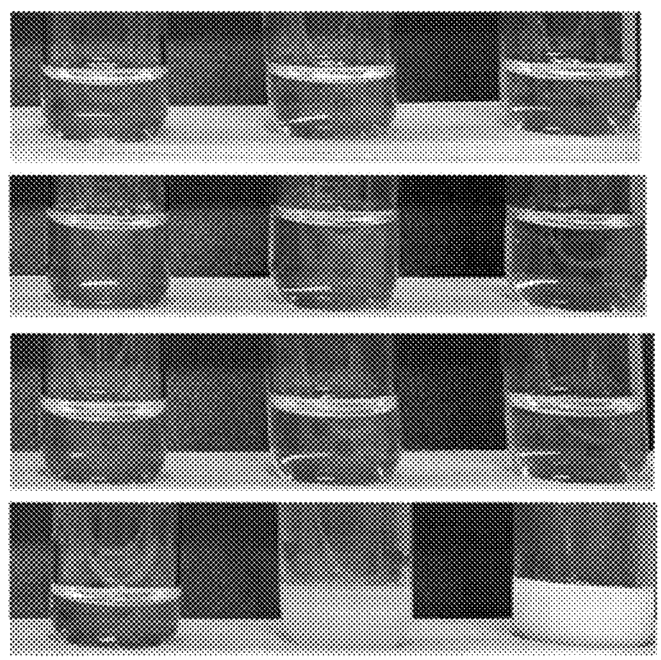
FIG. 5A illustrates rOVD solution (9% w/v) appearance at pH 2.5, 4, and 6 after different heat treatment conditions.
Figure 5B:
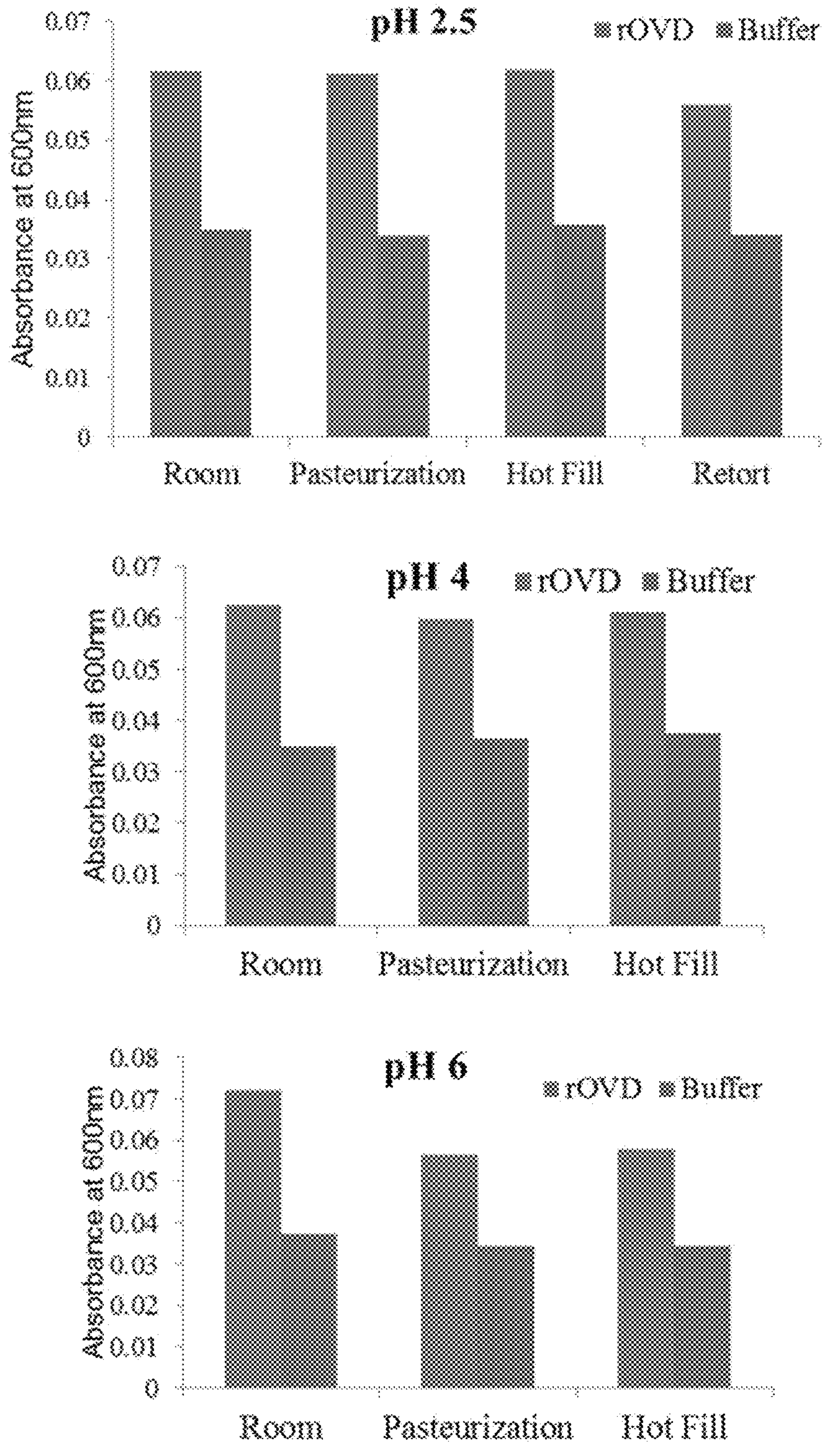
FIG. 5B are graphs showing absorbance of rOVD solution (9% w/v) at 600 nm after different heat treatment conditions at pH 2.5, 4 and 6. In each data pair, data in left columns relate to rOVD and data in right columns relates to Buffer.

The results of visual inspection and OD600 measurements of the samples are provided in FIG. 5A and FIG. 5B.

Pictures of the samples are shown in FIG. 5A. Effect of different heating treatments on absorbance (600 nm) of rOVD solution and buffer.

The addition of rOVD was found to increase the absorbance of the buffer solution. The absorbance of the rOVD solution remained the same following pasteurization and hot fill (no significant difference between pH 2.5 and pH 4). The absorbance was reduced following retorting. It was surprising that at different pH's, the rOVD solution remained clear even after the heating treatments of pasteurization and hot fill. An exception was that the rOVD solution coagulated at retorting conditions at pH 4 or pH 6. These results indicate that rOVD of the present disclosure remains soluble in solution at different acidic pHs, before and after application of heat.

Example 6: Solubility and Clarity of rOVD in Commercially-Available Beverages Based on carbonation levels published in literature (Table 4, below), San Pellegrino® was selected to represent a low carbonated beverage whereas Diet Coke™ was selected as a beverage with higher carbonation level. Gatorade™ and Red Bull™ represented the (non-carbonated) Energy Drink category. Pedialyte® was selected to study effect of electrolytes in a beverage on rOVD solubility.

TABLE 4

Carbonation levels for various commercially-available beverages

| Typical carbonation levels | Volume | g/L |
|---|---|---|
| Lightly Sparkling | 2 | 4 |
| Fruit juice carbonate | 2.5 | 5 |
| Lemonade | 3.0-3.5 | 6-7 |
| Cola | 4 | 8 |
| Mixer | 4.5-5.0 | 9-10 |

Lyophilized rOVD was blended into various drink solutions at a range of concentrations of 30-50% (% expressed as weight protein/volume). Surprisingly rOVD of the present disclosure was soluble at 30% w/v in Pedialyte®, San Pellegrino®, Diet Coke™, and Gatorade™. Red Bull™, was solubility at 26% w/v protein. At higher concentrations (e.g., >30%) rOVD exhibited solubility at some concentrations but was accompanied by a decrease in clarity and an increase in viscosity. At even higher concentrations (e.g., approaching 50% w/v), rOVD was no longer soluble and in some samples did not wet when placed into the drink solution. Results are shown in the tables below for concentrations 30% and higher (26% for Redbull™). A marked color change was seen with added rOVD for beverages that are colorless, whereas for colored beverages (e.g., Diet Coke™), little to no color change was observed with rOVD addition.

TABLE 5

Solubility study of rOVD in San Pellegrino ®

| Protein concentration (%) | Visual inspection | pH of San Pellegrino ® | pH of San Pellegrino ® with rOVD |
|---|---|---|---|
| 50 | Protein powder was not completely wetted. Did not form a solution | | |
| 40 | Protein powder was completely wetted. Formed a thick, pale green syrup-like mixture | | |
| 35 | Viscous suspension, pale brown syrup-like | | |
| 30 | Clear solution, pale green, viscous | 6.46 | 5.03 |

TABLE 6

Solubility study of rOVD in Diet Coke ®

| Protein concentration (%) | Visual inspection | pH of Diet Coke ® base | pH of Diet Coke ® with rOVD |
|---|---|---|---|
| 50 | Protein powder was not completely wetted. Did not form a solution | | |
| 40 | Protein powder was completely wetted.<br>Formed a thick, pale brown syrup-like mixture | | |

TABLE 6-continued

| Solubility study of rOVD in Diet Coke ® | | | |
|---|---|---|---|
| Protein concentration (%) | Visual inspection | pH of Diet Coke ® base | pH of Diet Coke ® with rOVD |
| 35 | Viscous suspension, pale brown syrup-like | | |
| 30 | Clear solution, brown, viscous | 3.0 | 3.55 |

TABLE 7

| Solubility study of rOVD in Gatorade ™ (Thirst Quencher lemon-lime) | | | |
|---|---|---|---|
| Protein concentration (%) | Visual inspection | pH of Gatorade ™ | pH of Gatorade ™ with rOVD |
| 50 | Protein powder was not wetted much. Did not form a solution. | | |
| 40 | Protein powder was not completely wetted. Formed a thick, pale yellow syrup-like mixture | | |
| 35 | Viscous suspension, pale yellow syrup-like | | |
| 30 | Clear solution, pale yellow/green, viscous | 2.78 | 3.7 |

TABLE 8

| Solubility study of rOVD in Red Bull ™ | | | |
|---|---|---|---|
| Protein concentration (%) | Visual inspection | pH of Red Bull ™ | pH of Red Bull ™ with rOVD |
| 50 | Protein powder was not wetted much. Did not form a solution. | | |
| 40 | Protein powder was not completely wetted. Formed a thick, off white syrup-like mixture. | | |
| 35 | Very viscous suspension, off white syrup-like. | | |
| 30 | Very viscous turbid pale green solution. | | |
| 26 | Clear solution, pale yellow/green, viscous. | 3.26 | 3.63 |

TABLE 9

| Solubility study of rOVD in Pedialyte ® | | | |
|---|---|---|---|
| Protein concentration (%) | Visual inspection | pH of Pedialyte ® | pH of Pedialyte ® with rOVD |
| 50 | Protein powder was not completely wetted. Did not form a solution. | | |
| 40 | Protein powder was completely wetted. Formed a thick, off white syrup-like mixture. | | |
| 35 | Viscous suspension, pale brown syrup-like. | | |
| 30 | Clear solution, pale green, viscous. | 5.51 | 5.75 |

Figure 6A:
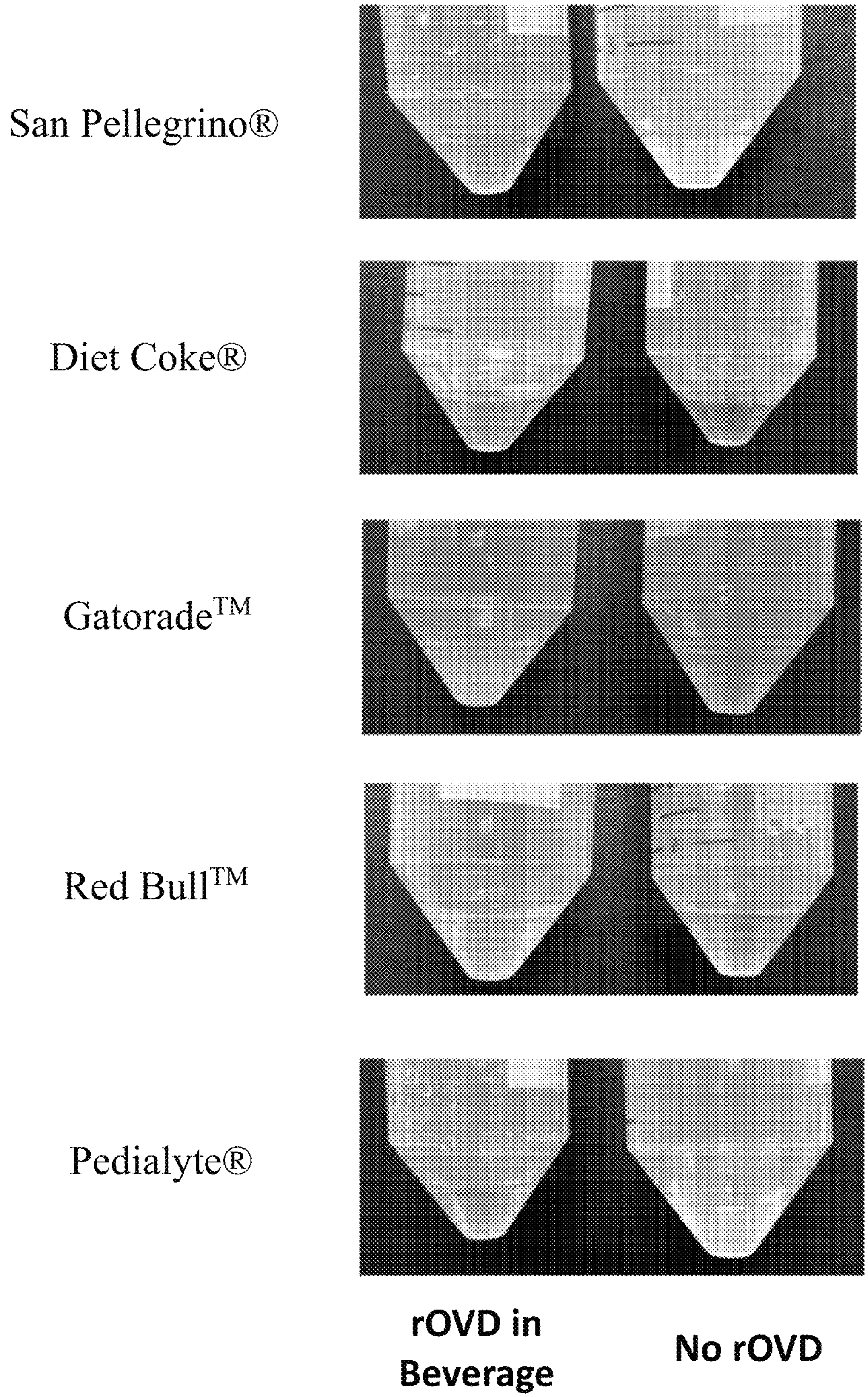
FIG. 6A illustrates rOVD solubility in different beverages.
Figure 6B:
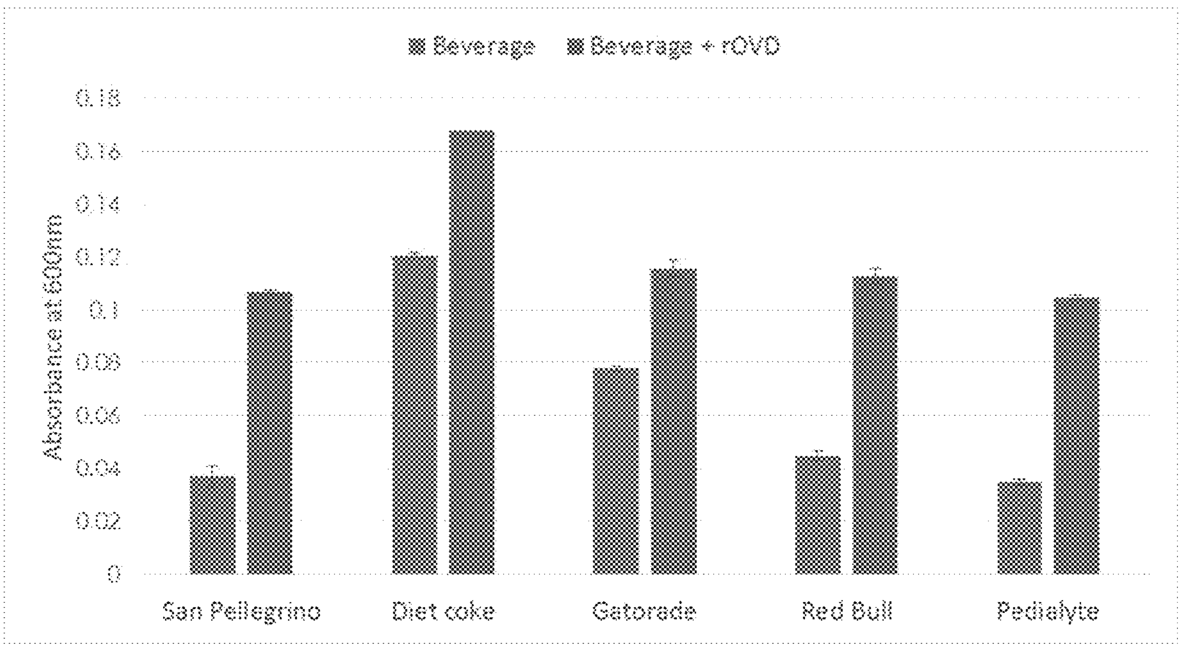
FIG. 6B is a graph showing absorbance of rOVD solution at 600 nm in different beverages. In each data pair, data in left columns relate to beverage and data in right columns relates to beverages with rOVD.
Figure 7:
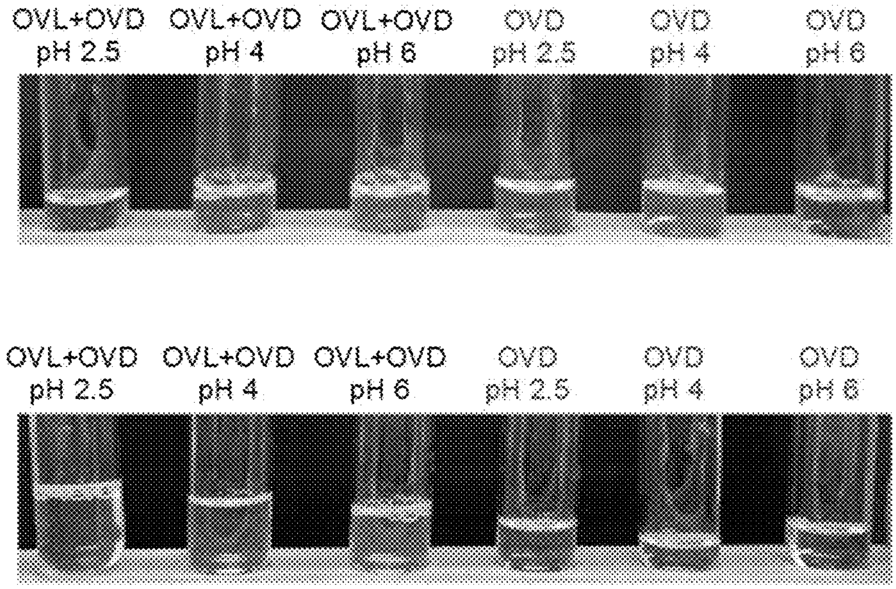
FIG. 7 illustrates, left to right, a comparison of samples at room temperature: OVL+OVD with OVD control at pH 2.5, 4, 6.
Figure 8:
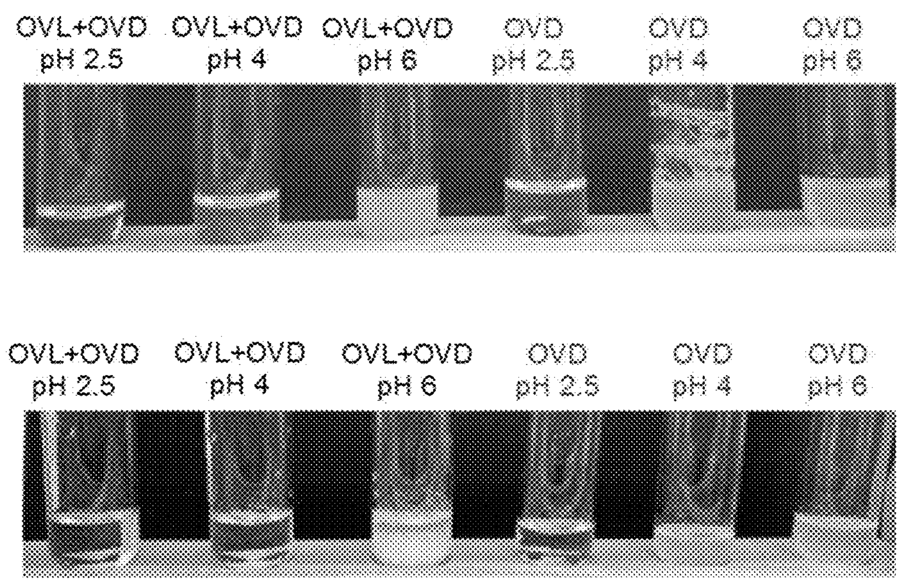
FIG. 8 illustrates, left to right, a comparison of Pasteurized (72° C.) samples: OVL+OVD with OVD control at pH 2.5, 4, 6.
Figure 9:
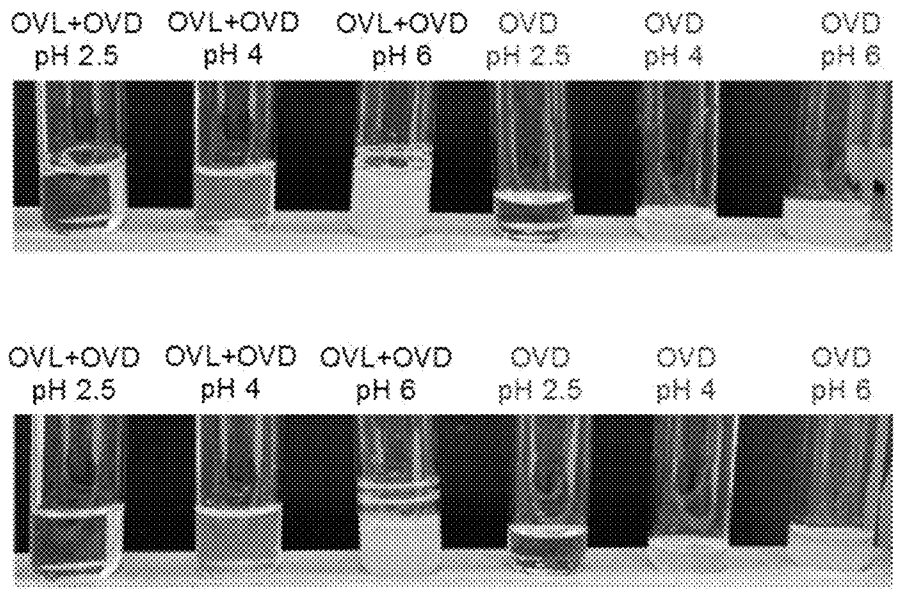
FIG. 9 illustrates, left to right, a comparison of Hot Fill (85° C.) samples of OVL+OVD with OVD control at pH 2.5, 4, 6.
Figure 10:
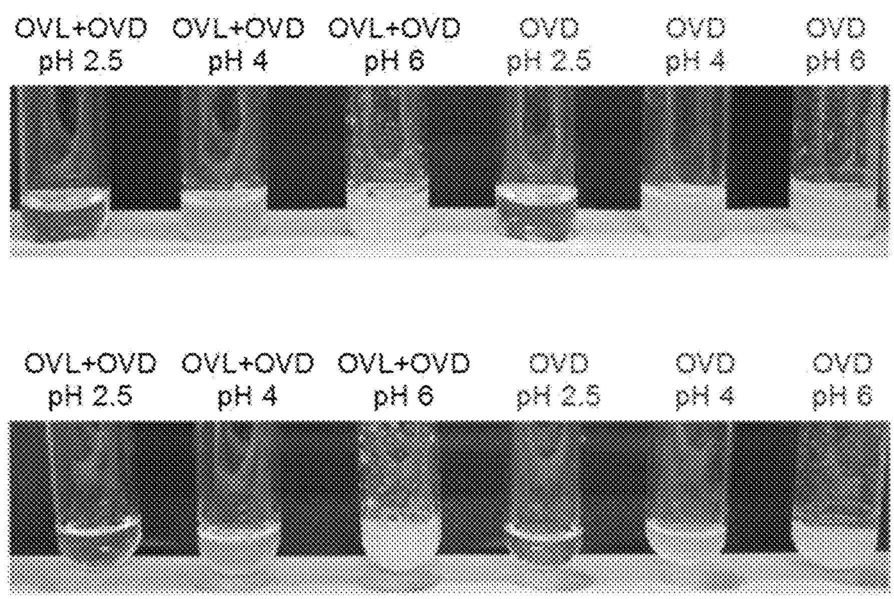
FIG. 10 illustrates, left to right, a comparison of retorted (121° C.) samples of OVL+OVD with OVD control at pH 2.5, 4, 6.

Pictures of the starting drinks (no rOVD) and the 30% rOVD solutions (26% for RedBull™) are shown in FIG. 6A. Absorbance results for rOVD solutions are shown in the graphs of FIG. 6B. The rOVD solutions at 30% w/v (26% w/v for RedBull™) were assessed using absorbance at 600 nm. Change in pH upon rOVD addition was dependent on the beverage composition and initial base pH.

Example 7: Production of Recombinant OVL Protein in *Pichia*

A recombinant lysozyme (rOVL) strain was made by transforming the *Pichia* species *Komagataella phaffii* with an expression cassette containing the OVL of SEQ ID NO: 45 expressed under the control of a methanol-inducible promoter. The OVL coding sequence encoded the mature OVL protein fused to the coding sequence for the alpha factor pre-pro secretion signal from *Saccharomyces cerevisiae*. The rOVL strain secreted rOVL when grown in media containing methanol. The broth containing the rOVL recombinant protein was centrifuged to remove cells and the resulting supernatant was processed similar to that of rOVD, as described above.

Example 8: OVD and OVL Combinations

In this example, solutions were made containing 2.5% (w/v) rOVL and nOVD at 9% (w/v). The resulting protein blend contained 21.7% rOVL and 78.3% and.

The rOVL+OVD blend was then heat treated under the following conditions:

Pasteurization: 72° C. for 1 minute, followed by 10 minutes in an ice bath.

Hot Fill: 85° C. for 30 seconds.

Retorting: 121° C. for 15 minutes at 19 psi.

A control OVD sample kept at room temperature was used to mimic aseptic processing conditions. Sodium citrate buffer (0.1M) was used to adjust the pH of the test solutions as described in Table 10.

TABLE 10

| Composition of the citrate buffer at pH 2.5, 4 and 6 | | | |
|---|---|---|---|
| Citric acid (mL) | Sodium citrate (mL) | DI water (mL) | pH |
| 49.2 | 0.8 | 50 | 2.5 |
| 37 | 13 | 50 | 4 |
| 6 | 44 | 50 | 6 |

As shown in FIG. 7 to FIG. 10 and Table 11, when the rOVL+OVD blend was heat treated by pasteurization, hot fill or retorting. The clarity/solubility of the rOVL+OVD blend, as measured by absorbance at 600 nm, remained unaffected at pH 2.5 compared to OVD control samples left at room temperature. At pH 4, the rOVL+OVD blend retained its clarity/solubility when pasteurized or hot filled. Retorting conditions produced turbidity, as measured by increased optical density (Table 11). Heat treatment at pH 6 resulted in loss of clarity for all samples.

TABLE 11

Absorbance of samples containing rOVL and native OVD at 600 nm

| | Control | Pasteurization | Hot Fill | Retorting |
|---|---|---|---|---|
| pH 2.5 | | | | |
| rOVL + OVD | 0.043 AB | 0.039 B | 0.038 B | 0.045 AB |
| OVD | 0.044 AB* | 0.042 AB | 0.050 A | 0.046 AB |
| rOVL | 0.038 B | 0.038 B | 0.037 B | 0.037 B |
| pH 4 | | | | |
| rOVL + OVD | 0.044 C | 0.065 C | 0.056 C | 0.154 A |
| OVD | 0.055 C | 0.166 A | 0.126 B | 0.315 D |
| rOVL | 0.049 C | 0.042 C | 0.042 C | 0.040 C |
| pH 6 | | | | |
| rOVL + OVD | 0.063 E | 0.610 B | 0.384 C | 0.898 B |
| OVD | 0.041 E | 0.202 D | 0.228 D | 0.525 B |
| rOVL | 0.039 E | 1.425 A | 0.588 B | white precipitate F |

*samples within each sub-table sharing the same letters are statistically similar ($p > 0.05$)

Figure 11:
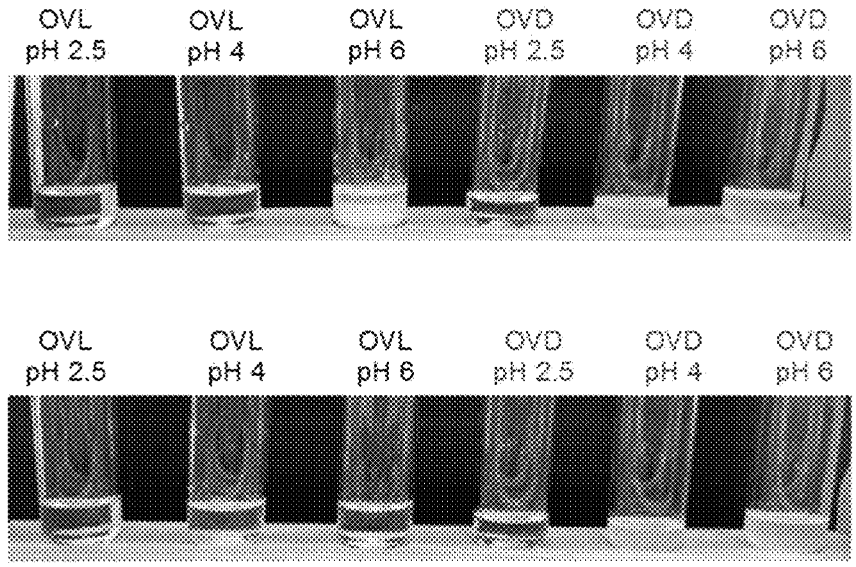
FIG. 11 illustrates, left to right, a comparison of Pasteurized (72° C.) samples of OVL control with OVD control at pH 2.5, 4, 6.
Figure 12:
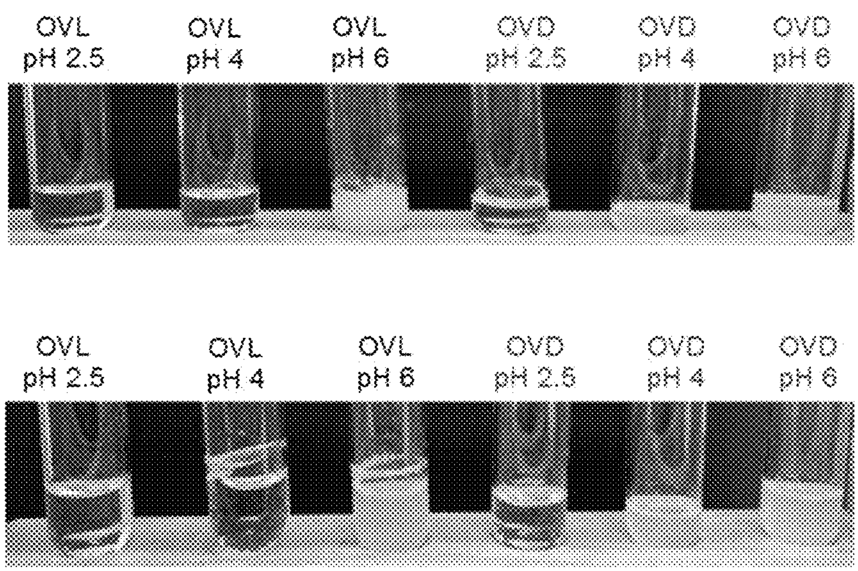
FIG. 12 illustrates, left to right, a comparison of Hot Fill (85° C.) samples of OVL control with OVD control at pH 2.5, 4, 6.
Figure 13:
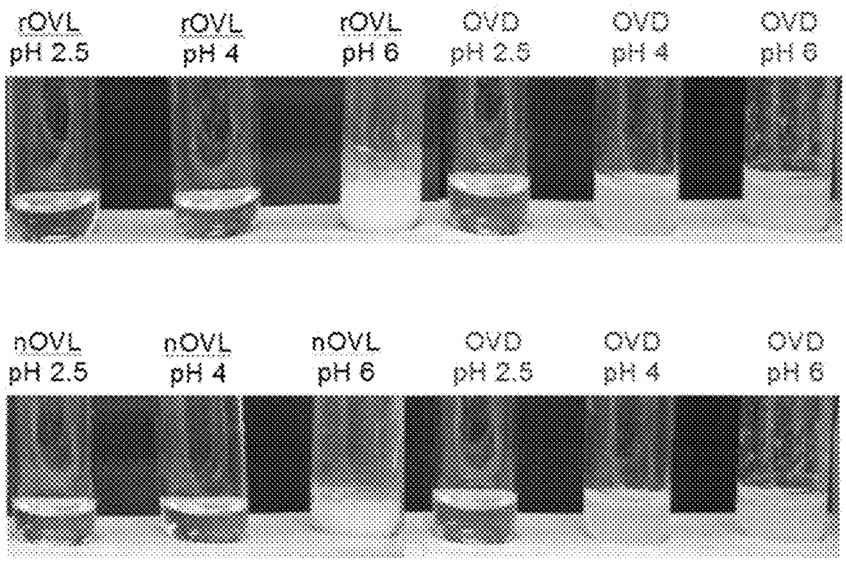
FIG. 13 illustrates, left to right, a comparison of Retorted (121° C.) samples of OVL control with OVD control at pH 2.5, 4, 6.

As shown in FIG. 11 to FIG. 13 and Table 12, native OVL (nOVL) samples had a similar effect on OVD as seen with the recombinant OVL (rOVL). At pH 2.5, the clarity/solubility of nOVL+OVD solutions were maintained when heat treated at all three conditions (pasteurization, hot fill or retorting). The nOVL+OVD solutions maintained their clarity at pH 4, with turbidity development only under retort conditions. pH 6 was not suitable for maintaining clarity after heat treatment.

TABLE 12

Absorbance of samples containing commercial native OVL (nOVL) and native OVD (nOVD) at 600 nm

| | Control | Pasteurization | Hot Fill | Retorting |
|---|---|---|---|---|
| pH 2.5 | | | | |
| nOVL + OVD | 0.043 AB | 0.046 AB | 0.043 AB | 0.051 B |
| OVD | 0.044 AB* | 0.042 AB | 0.050 B | 0.046 AB |
| nOVL | 0.037 A | 0.038 A | 0.038 A | 0.036 A |
| pH 4 | | | | |
| nOVL + OVD | 0.052 CD | 0.073 C | 0.075 C | 0.174 A |
| OVD | 0.055 CD* | 0.166 A | 0.126 B | 0.315 E |
| nOVL | 0.037 D | 0.042 D | 0.042 D | 0.044 D |
| pH 6 | | | | |
| nOVL + OVD | 0.054 A | 0.445 F | 0.322 E | 0.954 H |
| OVD | 0.041 A* | 0.042 CD | 0.228 D | 0.525 G |
| nOVL | 0.041 A | 0.092 B | 0.178 C | Coagulated |

*samples within each sub-table sharing the same letters are statistically similar ($p > 0.05$)

The addition of rOVL to OVD in a sample at room temperature or heat processed increased the protein content of the sample without affecting the clarity or solubility of the sample. Thus, the addition of rOVL to OVD to a beverage increases the protein content of the beverage without affecting clarity or solubility, or sensory quality (appearance, smell, flavor and mouthfeel) either at room temperature or after heat processing.

Figure 14:
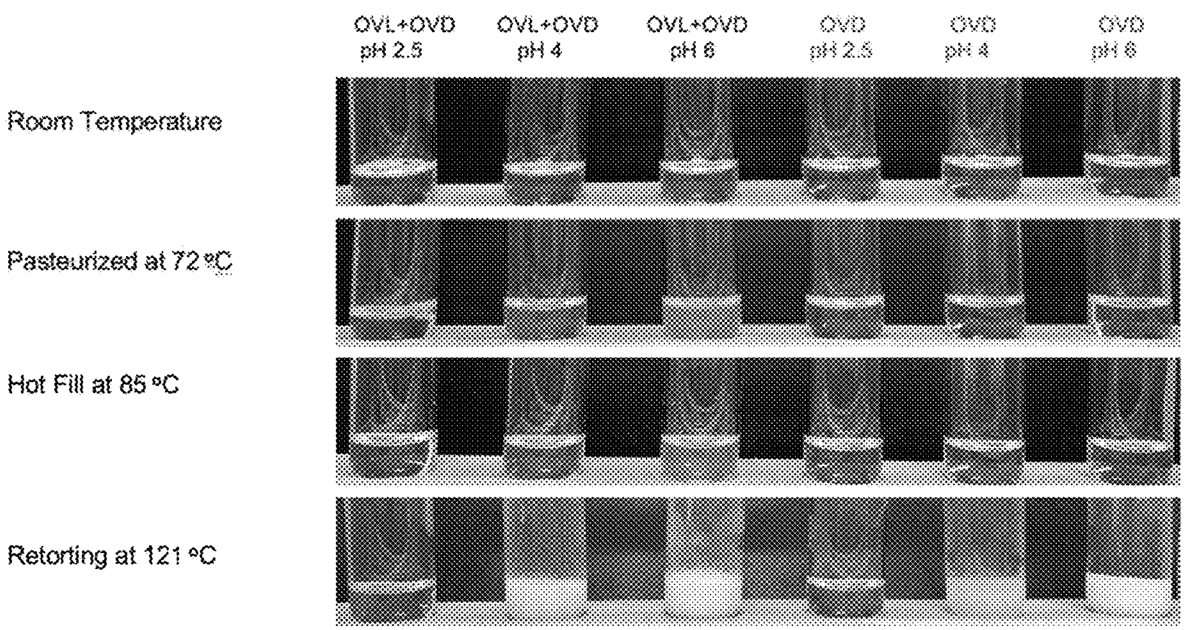
FIG. 14 illustrates, left to right, a comparison of rOVL+rOVD and rOVD samples at room temperature and after different heat treatments at pH 2.5, 4, 6.

Samples were made containing recombinant OVD of the present disclosure (rOVD) at 9% (w/v), and 2.5% (w/v) rOVL. The resulting protein blend contained 78.3% rOVD and 21.7% rOVL. FIG. 14 compares solutions at room temperature and after different heat treatments at pH 2.5, 4, 6: rOVL+rOVD with rOVD control.

TABLE 13

Absorbance of samples containing rOVL and rOVD at 600 nm

| | Room Temp | Pasteurization | Hot Fill | Retorting |
|---|---|---|---|---|
| pH 2.5 | | | | |
| rOVD + rOVL | 0.063 AB* | 0.066 A | 0.061 B | 0.061 B |
| rOVD | 0.062 B | 0.061 B | 0.062 B | 0.056 C |
| pH 4 | | | | |
| rOVD + rOVL | 0.065 B* | 0.109 A | 0.066 B | White coagulate |
| rOVD | 0.062 B | 0.060 B | 0.061 B | White coagulate |
| pH 6 | | | | |
| rOVD + rOVL | 0.066 C* | 0.256 A | 0.091 B | White coagulate |
| rOVD | 0.072 C | 0.056 D | 0.058 D | White coagulate |

*samples within each sub-table sharing the same letters are statistically similar ($p > 0.05$)

Example 9: Comparison to Whey Protein Solutions

To compare results from rOVD to an alternate protein (whey), rOVD or whey proteins +were solubilized in water at a concentration of 9% (w/v). Four commercially-available whey protein isolates (WP1, WP2, WP3 and WP4) were compared to rOVD of the present disclosure. The pH was measured by Hanna Lab pH probe for each sample and the absorbance was measured by SpectroMax at 600 nm wavelength. The results are provided in Table 14. The appearance was assessed by visual inspection; the odor was assessed by sniffing test; and the flavor was assessed by taste using a panel of 3 trained personnel.

TABLE 14

Solution characteristics of whey protein solutions (WPI) compared to rOVD solutions.

| | WPI 1 | WPI 2 | WPI 3 | WPI 4 | rOVD |
|---|---|---|---|---|---|
| pH in 8.45% solution | 3.15 | 6.53 | 3.92 | 6.13 | 5.05 |

TABLE 14-continued

Solution characteristics of whey protein solutions (WPI) compared to rOVD solutions.

| | WPI 1 | WPI 2 | WPI 3 | WPI 4 | rOVD |
|---|---|---|---|---|---|
| Absorbance at 600 nm | 0.039 ± 0.001 | 0.423 ± 0.123 | 0.344 ± 0.038 | 0.792 ± 0.016 | 0.0002 ± 0.000 |
| Appearance | clear, yellow | cloudy, yellow | slightly cloudy, yellow | white, turbid | clear, colorless |
| Odor | lactic acid notes | negative dairy odor | cow/goat shed | milky odor | no odor |
| Flavor | salty, lactic acid notes | plastic taste, unpleasant odor & taste | slightly acidic, negative dairy flavor/odor | neutral taste, no acidity, milk like flavor | slight protein taste |

Figure 15A:
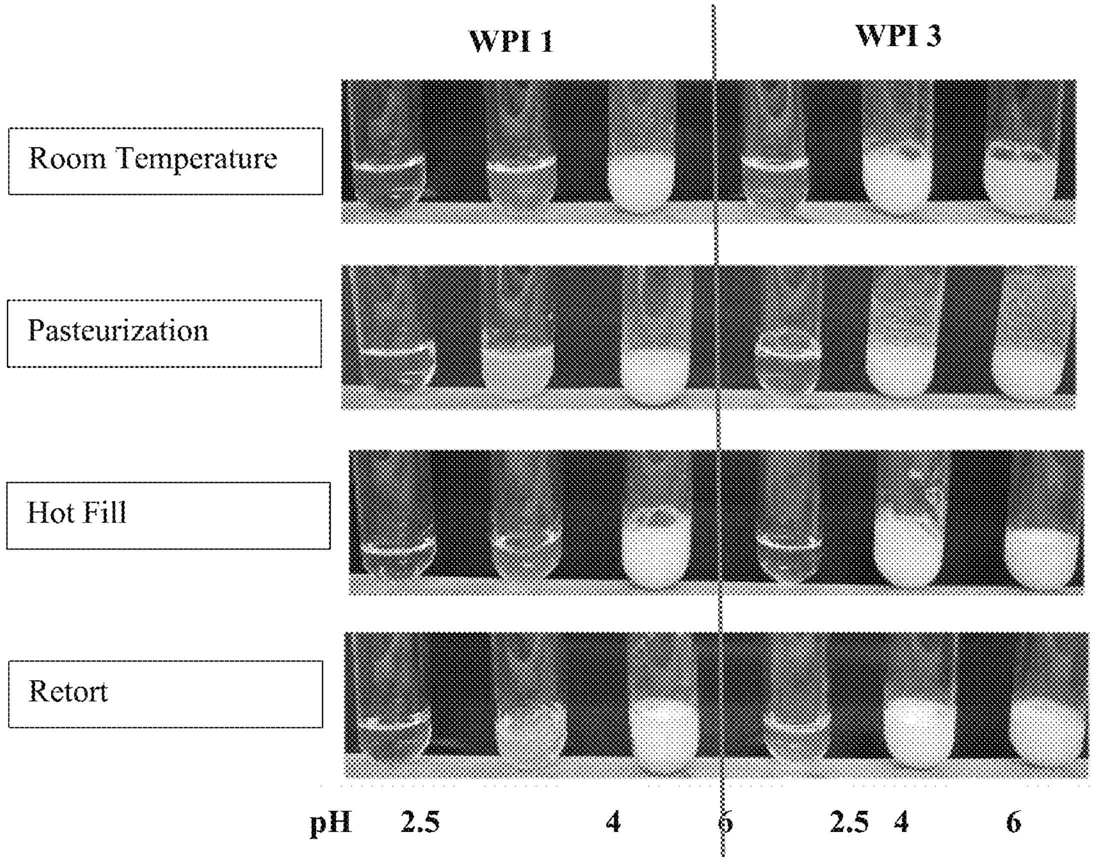
FIG. 15A and FIG. 15B illustrate comparisons of clarity for whey isolate (WPI1 and WPI3, 9% w/v) and rOVD solutions (9% w/v) at pH 2.5, 4 and 6.
Figure 15B:
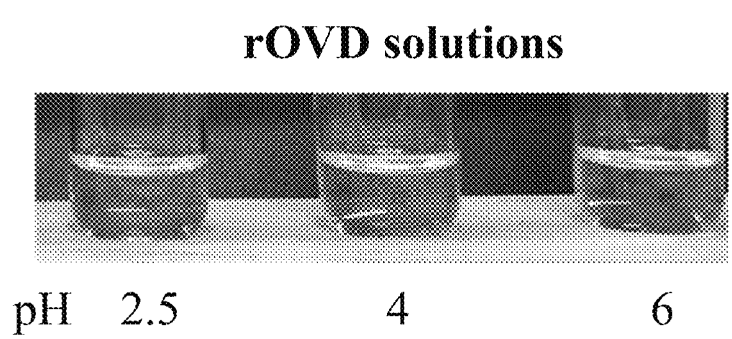

Whey protein isolates (WPI 1 and WPI 3) were at a concentration of 9 g per 100 ml distilled water, adjusted to pH 2, 4, or 6. Comparative results between whey protein solutions (WPI 1 and WPI 3) and rOVD solutions at pH 2, 4 and 6 are shown in FIG. 15A and FIG. 15B. The rOVD solutions show substantially higher solution clarity as compared to whey protein solutions at the same concentrations.

Example 10: Comparison of Clarity of Various Protein Water Solutions

In this example, the solubility of recombinant ovomucoid (rOVD) protein of the present disclosure was compared to the other proteins.

Appropriate amounts of acidic whey protein isolates (WP1 with 90% w/w protein and WP2 with 92.7% w/w protein), nOVD—85% protein content, rOVD—85.6% protein content, pea protein—90% protein content; and soy protein—90% protein content, were blended (using vortex) with water to form 5% protein solutions.

TABLE 15

List of Ingredients and their proportions.

| Ingredient | WP1 (neutral) (5%) % | WP2 (acidic) (5%) % | nOVD (5%) % | rOVD (5%) % | Pea protein (acidic) (5%) % | Soy protein (5%) % |
|---|---|---|---|---|---|---|
| Protein powder | 5.6 | 5.4 | 5.9 | 5.8 | 5.6 | 5.6 |
| DI water | 94.4 | 94.6 | 94.1 | 94.2 | 94.4 | 94.4 |
| Total | 100 | 100 | 100 | 100 | 100 | 100 |

Figure 16:
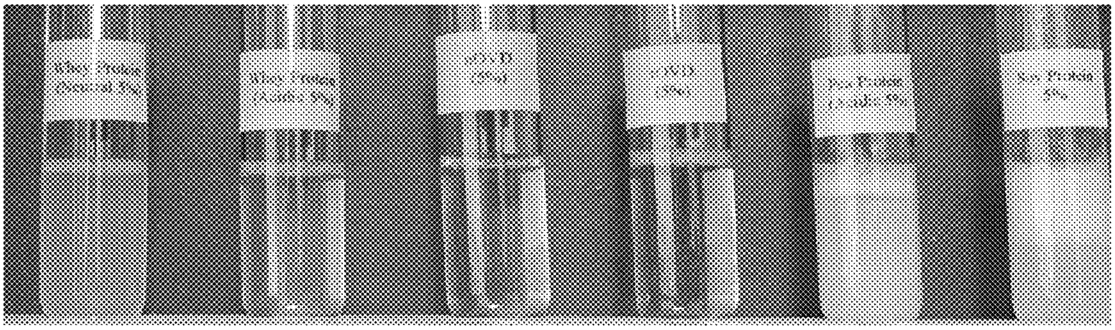
FIG. 16 illustrates protein water samples with 5% protein, from left to right, with whey protein isolate (neutral), whey protein isolate (acidic), nOVD, rOVD, 4%, pea protein (acidic), and soy protein.

FIG. 16 shows examples of the various protein solutions.

100 μl of each protein solution was aliquoted into a flat bottom, clear 96 well plate in three replicates (as shown in Table 15). The absorbance of each sample was measured at 600 nm with a plate adapter on Spectramax. Results are provided in Table 16.

TABLE 16

Absorbance results of various protein solutions.

| | Whey protein isolated (neutral) | Whey protein isolated (acidic) | nOVD | rOVD | pea protein (acidic) | soy protein | Water |
|---|---|---|---|---|---|---|---|
| OD600 | 0.1455 | 0.0527 | 0.0432 | 0.0456 | 0.9860 | 0.8821 | 0.0355 |

Example 11: Comparison of Suspension Stability of Protein Fortified Solutions In this example, the feasibility of fortifying orange juice (with added calcium and vitamin D) with rOVD was determined.

Orange juice (without pulp; with 350 mg Calcium, and 2.5 mcg vitamin D per serving size of 8 fluid oz) was protein fortified using nOVD, whey protein, or rOVD (86% protein content). The samples were treated as follows. The protein of interest was added at various amounts to 10 g orange juice and mixed until completely dissolved to produce a fortified orange juice. The pH of the original orange juice with no protein fortification (as a control sample) was measured and considered as a target pH. The pH of fortified orange juice samples was adjusted using 1M citric acid and/or baking soda to become close to the target pH. The protein solubility and/or precipitation was visually observed in all samples before a heat treatment. A heat treatment of 70° C. for 1 min was applied to sufficiently reduce the microbial load in orange juice. Then, the samples were immediately cooled to 4° C. for 10 minutes.

Figure 17A:
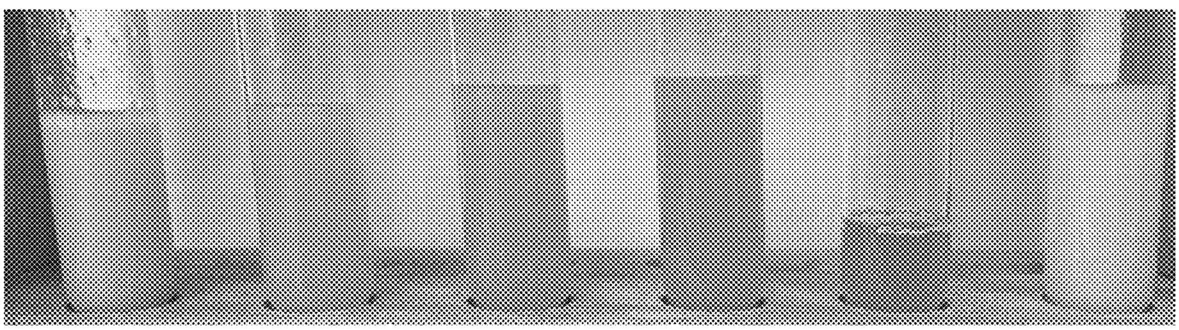
FIG. 17A and FIG. 17B illustrate samples of orange juice, from left to right, with 15% whey protein, 15% nOVD, 15% rOVD, 20% rOVD, 30% rOVD, or (no protein) control respectively.
Figure 17B:
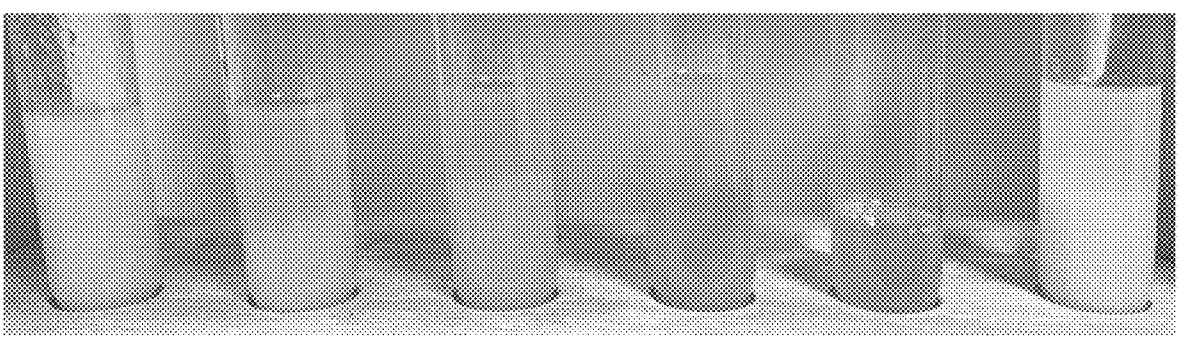

The physical and suspension stability of the samples were evaluated immediately after heating process (FIG. 17A) and after 48 hours storage at 4° C. (FIG. 17B).

The suspension stability of orange juice fortified with 15% of nOVD or 15% of rOVD were found to be similar to the control, which included no protein fortification. After 48 hours, orange juice fortified with 15% of whey protein had slightly formed a gel, thus a separation was not observed in this sample. rOVD at a high concentration (30%) did not precipitate and was completely soluble in the orange juice, even in the presence of 0.25 mcg vitamin D and 35 mg calcium.

rOVD was also found to be heat stable and did not form a gel during pasteurization. In terms of appearance, no significant difference was observed between the control and the orange juice fortified with 15% of nOVD or with rOVD at two levels: 15% or 20%.

Example 12: Comparison of Suspension Stability of Protein-Fortified Jelly

In this example, the feasibility of fortifying jelly with rOVD was evaluated.

Jello™ jelly was used for protein fortification using nOVD (80% protein), rOVD (86-93% protein), unflavored whey isolate proteins (87.5-92.7% protein), unflavored gelatin (92% protein). The samples were prepared as follows:

Control jelly method: hot water was added to the jelly mix power and stirred for two minutes until completely dissolved. Cold water was then added to fill 2 cm of 1 oz cups, capped and then refrigerated.

Fortified jelly method: Hot water was added to the jelly mix power and stirred for two minutes until completely dissolved. Cold water was gradually added to the protein powder and slowly stirred to dissolve. The dissolved jelly solution was transferred in the protein mixture and mixed completely. 2 cm of 1 oz cups were filled, capped and then refrigerated.

Protein jelly formulations: List of ingredients and their proportions used in the control and other experimental jelly samples, with specific protein of interest, are presented below in Table 17.

TABLE 17

| List of Ingredients | | | | |
|---|---|---|---|---|
| Ingredient | Control % | Whey 20% % | nOVD 20% % | rOVD 20% % |
| Jello | 15.23 | 11.7 | 11.4 | 11.7 |
| Cold water | 42.38 | 32.7 | 31.8 | 32.5 |
| Hot water | 42.38 | 32.7 | 31.8 | 32.5 |
| Protein | 0 | 22.9 | 25.0 | 23.3 |
| Total g | 100 | 100 | 100 | 100 |

(* amounts of ingredient adjusted based on % protein w/w content) The textures of the jelly samples were measured using Brookfield CT3 Texture Analyzer (Table 18). From each jelly sample three readings were taken. Jellies were centrally located under the test probe and compressed to a distance of 5 mm following the test settings below. Adhesiveness (also known as stickiness) measured the energy required to separate the attractive forces between the surface of the jelly and the surface of the probe (which approximates the stickiness on a tongue, teeth, and/or palate). Hardness is the force required to compress the jelly to attain a given deformation.

TABLE 18

| Texture Analyzer Test Settings | |
|---|---|
| Test | Compression test |
| probe | TA 5 |
| Textural properties | Hardness (g) and adhesiveness (mj) |
| Speed | 1 mm/sec |
| Distance | 5 mm |
| Sample size | cylinder shape; H: 20 mm D: 36 mm |
| Trigger load | 4.5 g |

In terms of adhesiveness, no statistically-significant difference between jelly fortified with 20% nOVD and the control was observed. On the other hand, the adhesiveness values for jelly with 20% of whey and rOVD proteins were significantly lower (Table 19).

TABLE 19

| Texture Analysis Results. | | | | |
|---|---|---|---|---|
| Treatments | Jelly control | 20% whey protein | 20% nOVD | 20% rOVD |
| Hardness (g) | *53.2 ± 1.7 a | 32.8 ± 3.4 b | 31.1 ± 4.3 b | 32.8 ± 3.4 b |
| Adhesiveness (mj) | 0.09 ± 0.03 a | 0.03 ± 0.005 c | 0.08 ± 0.01 ab | 0.04 ± 0.02 bc |
| Jelly pH | 4.3 | 5.5 | 5 | 5.5 |

*Mean ± Std Dev; Jelly samples containing different letters for a given quantitative parameter (for example Hardness) are statistically different to each other at $p < 0.05$.

Jelly fortified with 20% of whey, nOVD, or rOVD were significantly less hard than the control jelly.

Figure 18A:
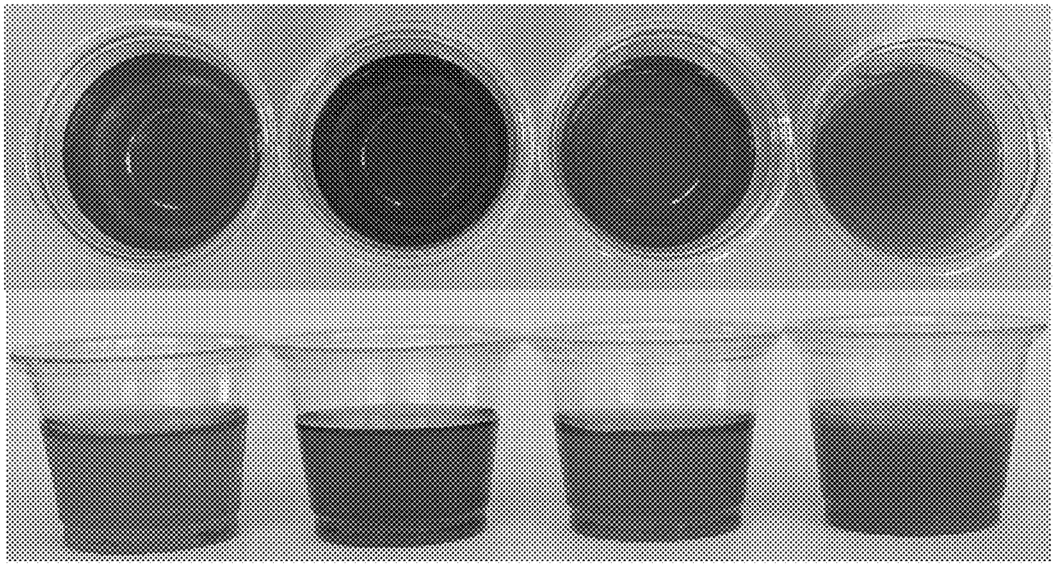
FIG. 18A illustrates jelly samples, from left to right, control (without protein supplementation), supplemented with 20% rOVD, supplemented with 20% nOVD and supplemented with 20% whey protein.
Figure 18B:
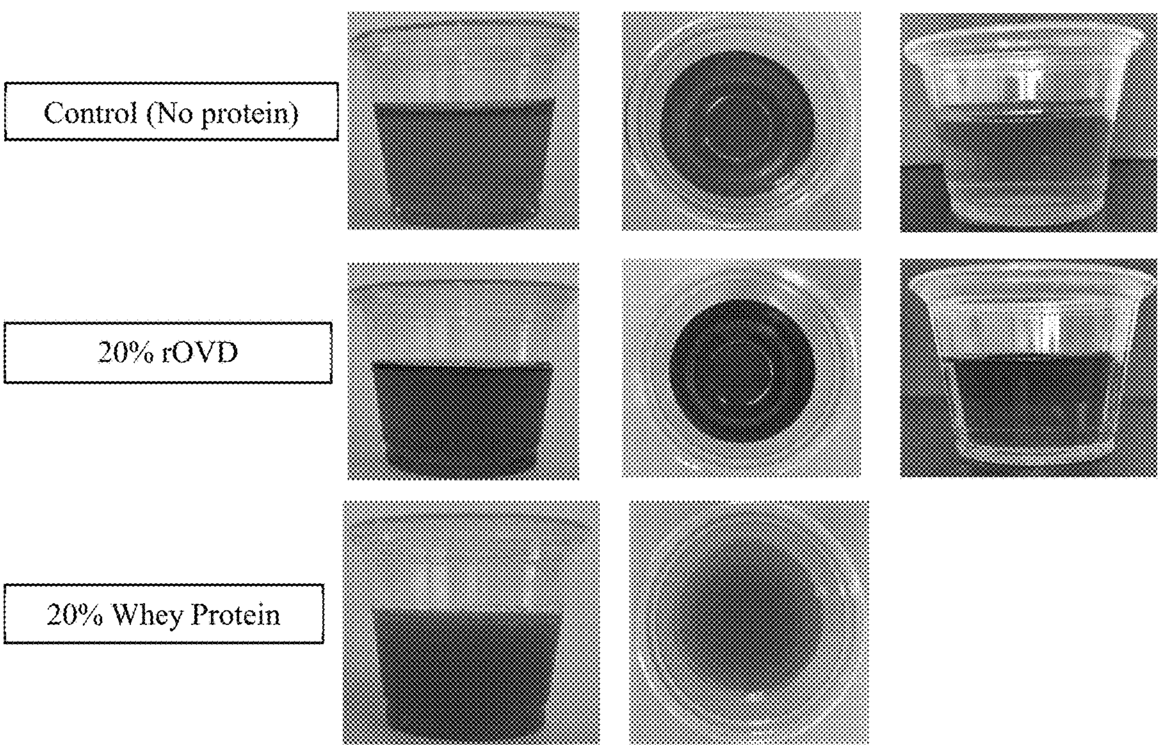
FIG. 18B illustrates comparison of jelly samples with no protein (control), supplemented with 20% rOVD and supplemented with 20% whey protein.

No significant difference was observed between the clarity of the control jelly and jelly fortified with 20% of rOVD ($p<0.05$). Jelly fortified with whey isolate protein was opaque and unclear. (FIG. 18A and FIG. 18B).

Figure 18C:
FIG. 18C to FIG. 18E illustrate jelly samples supplemented with 20% whey protein, supplemented with 16% gelatin and supplemented with 20% gelatin.

The texture of Jello™ fortified with 20% of whey protein was very soft and not comparable to the control. (FIG. 18C).

Figure 18D:
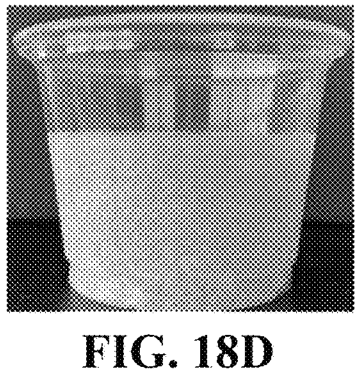
Figure 18E:
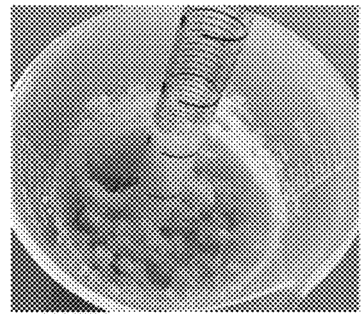

The texture of Jello™ with either 16% or 20% of hydrolyzed gelatin was rubbery, with strong bounce and resistance to deformation. In this experiment aliquoting of the samples was not possible, since the jelly set very quickly at room temperature. (FIG. 18D and FIG. 18E).

Example 13: Testing Recombinant OVD from Various Species

In this example, properties of rOVD having amino acid sequences of non-chicken, avian species was evaluated.

Two expression constructs were created for expression for two non-chicken rOVD (SEQ ID NO: 40 called rOVD-T (Turkey vulture) and SEQ ID NO:43 called rOVD-H (humming bird) hereafter) in *Pichia pastoris* and expressed, purified and processed similar to Example 2. Lyophilized rOVD samples were blended into aqueous solution (distilled water) at different concentrations and pHs. Clarity and solubility of the rOVD solutions was then assessed visually (e.g., for turbidity, precipitate, viscosity, and color) as well as by measuring absorbance at 600 nm.

Figure 19A:
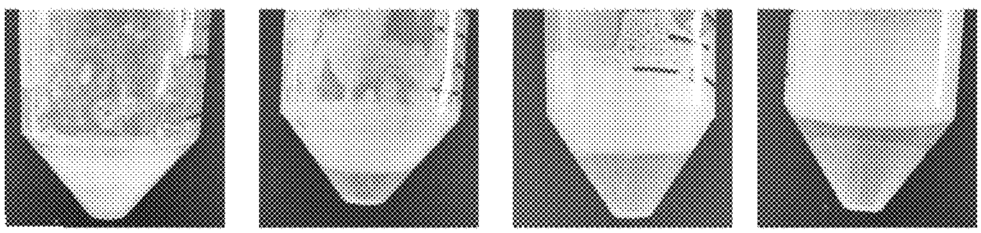
FIG. 19A and FIG. 19B illustrate rOVD-H and rOVD-T samples solubilized in water at various concentrations.

FIG. 19A shows protein-water samples comprising rOVD-H in deionized water at protein concentrations of 4.23%, 10%, 20% or 30% w/v. The solutions had a pH of 4.15. Like the chicken rOVD of the previous examples, FIG. 19A reveals a clear and colorless solution with no precipitate and no apparent viscosity changes in appearance and visual flow of liquid for solutions comprising up to 20% rOVD-H.

Figure 19B:
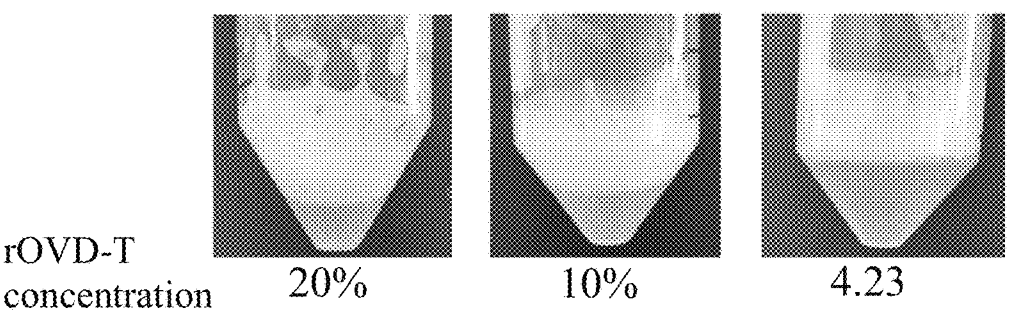

FIG. 19B shows protein-water samples comprising rOVD-T in deionized water at protein concentrations of 4.23%, 10% or 20% w/v. The solutions had a pH of 3.69. Like the chicken rOVD of the previous examples, FIG. 19B reveals a clear solution with no precipitate and no apparent viscosity changes in appearance and visual flow of liquid for solutions comprising up to 10% rOVD-T. At 20% the protein did not fully dissolve.

The samples were incubated at room temperature and subjected to three types of heat treatments: pasteurization, hot fill, or retorting as in Example 4 or Example 5. The clarity and solubility of the various rOVD were then assessed visually (e.g., for turbidity, precipitate, viscosity, and color) as well as by measuring absorbance at 600 nm. Table 20 shows the results for pH, absorbance, and clarity of rOVD solution comprising 4.23% rOVD-H or rOVD-T solutions in buffer or water. Data in the "pre-processing" column was measured before any heat treatment. It was surprising that at different pH's the rOVD solutions remained clear even after extreme heating like pasteurization, hot fill, or retort. These results indicate that rOVD samples remain soluble in solution at different acidic pHs, before and after application of heat.

These data show that the favorable properties disclosed above for the recombinant chicken OVD (see Example 2) are also obtainable with other recombinant OVDs.

TABLE 20

| Solubility and clarity study of rOVD-H and rOVD-T | | | | | |
|---|---|---|---|---|---|
| Sample | pH | OD Pre-processing at RT | OD post pasteurization | OD post hot fill | OD post autoclave/retort |
| rOVD-H + buffer | 2.5 | 0.0569 | 0.0547 | 0.0548 | 0.0537 |
| rOVD-T + buffer | | 0.058 | 0.059 | 0.057 | 0.056 |
| rOVD-H + buffer | 4 | 0.0546 | 0.0544 | 0.0552 | 0.0641 |
| rOVD-T + buffer | | 0.055 | 0.055 | 0.057 | 0.055 |
| rOVD-H + buffer | 6 | 0.053 | 0.053 | 0.055 | 0.061 |
| rOVD-T + buffer | | 0.054 | 0.054 | 0.054 | 0.068 |
| rOVD-H + water | 3.5-3.9 | 0.067 | 0.084 | 0.090 | 0.236 |
| rOVD-T + water | | 0.097 | 0.106 | 0.116 | 0.219 |

Example 14: Comparison of Bovine Trypsin Inhibitory Activity rOVD as produced in Example 2 was utilized in this Example. The trypsin inhibition activity was compared between native OVD (nOVD) and recombinant OVD (rOVD) in a standard assay (AACC #22-40.01) using bovine trypsin. A comparison of rOVD with nOVD is shown in Table 21. One trypsin unit is arbitrarily defined as an increase of 0.01 absorbance unit at 410 nm per 10 ml of reaction mixture under the conditions of the assay. Trypsin inhibitor activity is expressed in terms of trypsin inhibitor units (TIU). Three different batches of rOVD (samples 1-3) were compared to a native chicken ovomucoid.

TABLE 21

| Comparison of trypsin inhibition activity | |
|---|---|
| Product | Trypsin inhibition activity |
| Sample 1 | 8190 TIU/g |
| Sample 2 | 8180 TIU/g |
| Sample 3 | 8649 TIU/g |
| Native chicken Ovomucoid | 13721 TIU/g |

Example 15: Comparison of In Vitro Digestibility

The in vitro digestibility of rOVD samples was measured using the Protein Digestibility Assay procedure (Megazyme, Medallion Labs). A comparison of rOVD samples with nOVD is shown in Table 22. The data demonstrates equivalent in vitro digestibility between native ovomucoid and rOVD.

TABLE 22

| Comparison in vitro digestibility | |
|---|---|
| Product | In-vitro digestibility |
| Sample 1 | 93% |
| Sample 2 | 93% |
| Sample 3 | 93% |
| Native chicken Ovomucoid | 92% |

Example 16: Ovomucoid Specifications

Based upon the characterization of the produced rOVD compositions and the properties of native chicken ovomucoid, product specifications (Table 23) and quality control specifications (Table 24) were constructed for an rOVD of the present disclosure Protein percentages were measured using AOAC 2006. See, Protein (crude) in animal feed, combustion method, 990.03. In: Official methods of analysis of AOAC International. 18th ed. Gaithersburg: ASA-SSA Inc. and AOAC 2006. Proximate Analysis and Calculations Crude Protein Meat and Meat Products Including Pet Foods—item 80. In: Official methods of analysis Association of Analytical Communities, Gaithersburg, MD, 17th edition, Reference data: Method 992.15 (39.1.16); NFNAP; NITR; NT.

Moisture percentages were measured using Association of Official Analytical Chemists. 1995. In Official Methods of Analysis.

Carbohydrate percentages were measured using methods described in J AOAC Int. 2012 September-October; 95(5): 1392-7.

Fat by acid hydrolysis were measured using AOAC International. 2012. Official Method Fat (crude) or ether extraction in pet food. Gravimetric method, 954.02. In: Official Methods of Analysis of AOAC International, 19th ed., AOAC International, Gaithersburg, MD, USA, 2012.

Standard plate count was measured using AOAC International. 2005. Aerobic plate count in foods, dry rehydratable film, method 990.12. AOAC International, 17th ed. Gaithersburg, MD. Yeast and mold counts were measured using AOAC Official Method 997.02. Yeast and Mold Counts in Foods Dry Rehydratable Film Method (Petrifilm™ Method) First Action 1997 Final Action 2000 *Salmonella* was measured using AOAC International. 2005. *Salmonella* in selected foods, BAX automated system, method 2003.09. In Official methods of analysis of AOAC International, 17th ed., AOAC International, Gaithersburg, MD. Total coliform was measured using AOAC International. 2005. *E. coli* count in foods, dry rehydratable film, method 991.14. In Official methods of analysis of AOAC International, 17th ed. AOAC International, Gaithersburg, MD.

TABLE 23

| Specification for Ovomucoid produced by *P. pastoris* DFB-003 | |
|---|---|
| Physical properties | Specification |

TABLE 23-continued

| Specification for Ovomucoid produced by *P. pastoris* DFB-003 | | |
|---|---|---|
| Source | Yeast fermentation-derived | |
| Appearance | White to off-white amorphous powder | |
| Solubility | Soluble in water | |
| **Chemical Properties (in powder as is)** | **Specification** | **Method** |
| Protein | >75% | AOAC 990.03[1a] AOAC 992. 15[1b] |
| Moisture | Maximum 10.0% | AOAC 925.09[2] |
| Carbohydrate | Maximum 20% | Calculated |
| Ash | Maximum 2.0% | AOAC 942.05[3] |
| Fat by Acid Hydrolysis | <0.1% | AOAC 954.02[4] |
| Hg | <1 ppm | ICP-AES[5] |
| Pb | <1 ppm | ICP-AES[5] |
| As | <1 ppm | ICP-AES[5] |
| Cd | <1 ppm | ICP-AES[5] |
| **Microbial Properties (in powder as is)** | **Specification** | **Method** |
| Standard Plate Count | <10000 CFU/g | AOAC 990.12[6] |
| Yeast & Mold | <100 CFU/g | AOAC 997.02[7] |
| *Salmonella* | Not Detected/25 g | AOAC 2003.09[8] |
| *E. coli* | Not Detected/25 g | AOAC 991.14[9] |
| Total coliform | ≤30 CFU/g | AOAC 991.14[9] |

TABLE 24

Quality control results for three lots of Ovomucoid produced by *P. pastoris* DFB-003

| Analysis Parameter | Specification | SOL19303 | SOL19317 | SOL19351 |
|---|---|---|---|---|
| Protein | >75% | 75.31 | 75.06 | 79.94 |
| Protein (% dry weight powder) | >80% | 82.2 | 82.5 | 87.8 |
| Moisture and Volatiles | <10% | 8.4 | 9 | 9 |
| Carbohydrates, Calculated | <20% | 15.53 | 15.28 | 11.06 |
| Ash | <2% | 0.76 | 0.66 | <0.4 |
| Fat by Acid Hydrolysis | <0.1% | <0.10 | <0.10 | <0.10 |
| Arsenic (As) | <1 mg/kg | <0.010 | <0.010 | <0.010 |
| Mercury (Hg) | <1 mg/kg | <0.010 | <0.010 | <0.010 |
| Lead (Pb) | <1 mg/kg | 0.03 | 0.063 | 0.168 |
| Cadmium (Cd) | <1 mg/kg | <0.010 | <0.010 | <0.010 |
| Aerobic Plate Count | <10000 CFU/g | <10 | <10 | <10 |
| Molds | <100 CFU/g | <10 | <10 | <10 |
| Yeast | <100 CFU/g | <10 | <10 | <10 |
| *Salmonella* | Not Detected/ 25 g | Not Detected | Not Detected | Not Detected |
| *Escherichia Coli* | Not Detected/ 25 g | Not Detected | Not Detected | Not Detected |
| Coliforms | <10 CFU/g | <10 | <10 | <10 |
| Absence of source organism from product | Not detected */ mg sample | Not detected | Not detected | Not detected |
| Absence of encoding DNA from product | Not detected **/ mg sample | Not detected | Not detected | Not detected |

* Limit of detection for source organism = 11 CFU/mg sample
** Limit of detection for encoding DNA = 10 femtogram

Example 17: Absence of Production Organism and DNA in rOVD Preparations rOVD powder was plated on PGA plates and if samples yielded colonies, these were re-streaked and analyzed by PCR for the presence of the *Pichia* organism. This procedure was applied to three lots of rOVD powder produced from the recombinant strain. No manufacturing organism was detected in any of the lots (Table 24).

PCR analysis was used to confirm that no encoding pieces of recombinant DNA was present in the rOVD preparation using primers for the rOVD cassette. OVD plasmid DNA was used as a positive control, producing a 570 bp band corresponding the OVD PCR product. This band was absent in all three rOVD powder lots tested.

Example 18: Comparison Immunoreactivity

Figure 20:
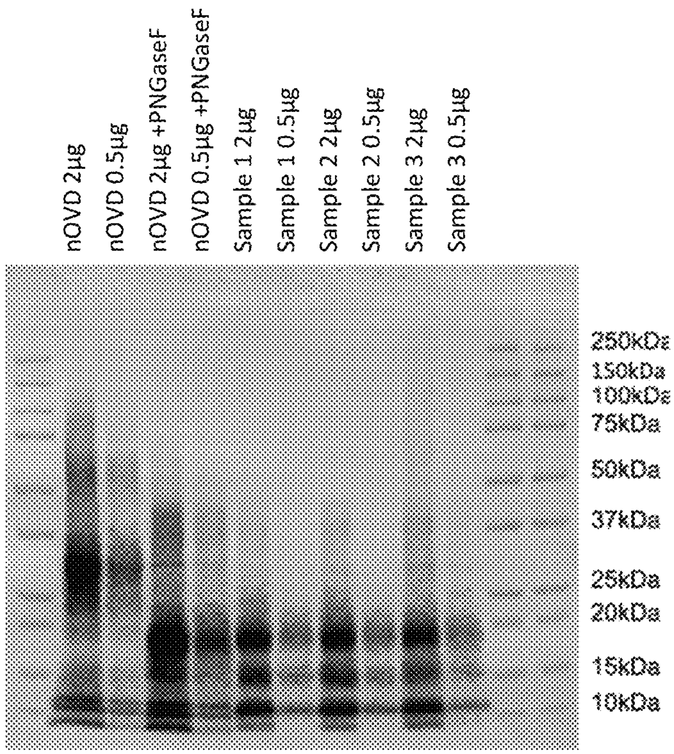
FIG. 20 illustrates the comparison in immunoreactivity for rOVD samples, native ovomucoid from chicken egg white (nOVD) and deglycosylated native ovomucoid (nOVD+PNGaseF).

Western Blot comparisons were performed on three rOVD lots using primary anti-ovomucoid antibody from rabbit (NBP1-74676 Novus) at a 1:2500 dilution. The secondary antibody used was goat anti-rabbit IgG conjugated to alkaline phosphatase (AP ab97048 Abcam). Molecular weight marker preparation used was from Bio Rad (161-0394). The comparison showed the same immunoreactivity for rOVD samples, native ovomucoid from chicken egg white (nOVD) and deglycosylated native ovomucoid (nOVD+PNGaseF) (FIG. 20).

Example 19: Fermentation and Purification of rOVD

An rOVD *P. pastoris* seed strain was removed from cryo-storage and thawed to room temperature. Contents of the thawed seed vials were used to inoculate liquid culture media in the primary fermenter and grown at process temperature until target cell density was reached. Then, the grown rOVD *P. pastoris* was transferred to a production-scale reactor. The culture was grown in the production bioreactor at target fermentation conditions and fed a series of substrates. The fermentation was analyzed for culture purity at multiple times during the process.

The recombinant OVD was purified by separating the cells from the liquid medium by centrifugation, followed by microfiltration. Fermentation broth was first brought to pH 3 and diluted with DI water. Cells were removed using bucket centrifugation. The collected supernatant was brought to pH 7 using sodium hydroxide and a 0.2 μm filtration was performed followed by diafiltration with five volumes of deionized water. The permeates of the 0.2 μm were adjusted to pH 5 and then concentrated via 5 kDa TFF membrane. The 5 kDa retentate was precipitated using 65% saturation ammonium sulfate. After salt addition, the pH was adjusted to pH 4-4.1 with phosphoric acid. The mixture was incubated with agitation at room temperature overnight. The next day, precipitates were spun down using bucket centrifugation. The rOVD precipitates were dissolved in DI water and pH adjusted to 5 using sodium hydroxide. The rOVD solution was then diafiltered and then the retentate was passed through 0.2 μm bottle filters.

A spray dryer was used to dehydrate the rOVD solution into rOVD powder.

Example 20: Hydrogen Peroxide Treatment During rOVD Purification

Liquid rOVD was concentrated to 50-60 g/L using a 5 kDa TFF membrane. The rOVD solution was passed through a 0.2 μm filter to remove microbes. Hydrogen peroxide, an oxygen-generating agent, in an amount to equal 10% volume of the solution was slowly added to the rOVD solution while stirring. The mixture was incubated with agitation and monitored to ensure color change from a dark green-brown color before treatment to a pale-yellow color after treatment. After 1.5 hours, diafiltration was performed via 5 kDa TFF membrane with 5 volumes of DI water. The rOVD in the 5 kDa diafiltration retentate was precipitated using ammonium sulfate at 65% salt saturation at room temperature. After addition of salt, the pH was adjusted to pH4-4.1 with phosphoric acid. The mixture was incubated with agitation overnight to form precipitates. The next day, the precipitates were spun down using bucket centrifugation. The precipitates were removed, dissolved in deionized water and pH adjusted to 5 using sodium hydroxide. Five kDa TFF membranes were cleaned and diafiltration was performed using volumes of DI water until a retentate conductivity of less than 2.0 mS was achieved. The retentate was passed through 0.2 μm bottle filters. The filtered rOVD solution was then spray dried and stored.

Example 21: Reprocessed rOVD Treated with Hydrogen Peroxide

OVD powder was dissolved in deionized water to 50-60 g/L and filtered through a hollow fiber 0.2 μm tangential flow filter, then through a 0.2 μm bottle filter. Hydrogen peroxide in an amount to provide a 10% solution was slowly stirred into the rOVD solution and incubated for thirty minutes. The treated solution was washed through a 5 kDa membrane using 5 volumes of DI water.

Ammonium sulfate was slowly added to the retentate solution and the pH changed to between 4 to 4.1 using phosphoric acid. After overnight incubation with medium agitation, the solution was centrifuged, and supernatants discarded. Precipitates were collected, dissolved in DI water, and brought to pH 5 using sodium hydroxide. The protein solution was desalted with a 5 kDa membrane and filtered through a 0.2 μm bottle filter. Then, the protein solution was spray dried to produce rOVD powder.

Example 22: Sensory Testing and Results

The rOVD sample and the $H_2O_2$ reprocessed sample called RE-RC were analyzed for their sensory characteristics to determine the effects of hydrogen peroxide treatment.

A solution of each dry sample was prepared with Deionized water at 4.23% w/v concentration. Both samples were presented to the panelists in the same session, monadically. Trained panelists (n=6) evaluated both the samples in terms of their appearance, smell, taste, mouthfeel and aftertaste. For each category, the panelists described the perceived attributes and then rated each attribute's intensity (Kemp et al. 2009) using the intensity rating scale (Table 25).

Table 26 shows that the hydrogen peroxide-treated sample was lighter in color, and had a cleaner sensory profile, with fewer sensory attributes compared to the control sample.

TABLE 25

Attribute Intensity Rating Scale

| APPEARANCE (Clarity) | APPEARANCE (Color Intensity) | SMELL, FLAVOR, AFTERTASTE & MOUTHFEEL (Intensity rating for "Individual attributes in each category) |
|---|---|---|
| 0 = clear | 0 = no color | 0 = not detected |
| 1 = very slightly turbid | 1 = very pale | 1 = very mild |
| 2 = slightly turbid | 2 = pale | 2 = mild |
| 3 = mild/moderate turbidity | 3 = moderate intensity | 3 = moderate |
| 4 = moderately turbid | 4 = dark | 4 = strong |
| 5 = very turbid | 5 = very dark | 5 = very strong |

TABLE 26

Sensory evaluation results

| Powder Batch Name | rOVD | $H_2O_2$ Reprocessed RE-RC |
|---|---|---|
| Appearance | pale yellow/green (2), clear (0), bubbly, not easy to mix (sediments visible) | very pale yellow (1), clear (0), very frothy |
| Smell | mild yeasty (2), mild/moderate musty (2.5), mild nutty (2) | very mild musty (1) |
| Taste | mild buttermilk (2), mild/moderate toasted nutty (2.5), mild yeasty (2) | very mild yeasty (1) |
| Mouthfeel | None (0) | None (0) |
| Aftertaste | None (0) | None (0) |

Example 23: $H_2O_2$ Treated rOVD Tested for Solubility and Clarity

Solubility and clarity of the control and hydrogen peroxide treated sample solutions (at 4.23% w/v) were measured in terms of optical density ($A_{600}$) using a Spectrophotometer. Lower absorbance value (at 600 nm wavelength) indicates higher clarity and solubility of the sample solution.

Figure 21:
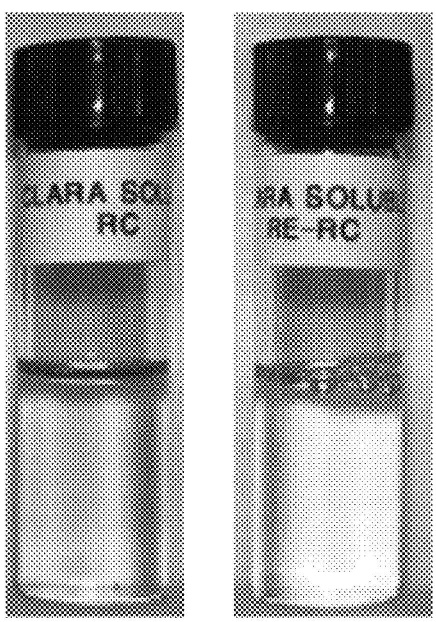
FIG. 21 indicates the color of an rOVD solution without (left) and with (right) hydrogen peroxide treatment.

The hydrogen peroxide-treated sample had lower absorbance (Table 27) and a paler color compared to the control. This indicated that the treatment resulted in improved appearance, in terms of less intense color and clear solution. These features are illustrated in FIG. 21.

TABLE 27

Absorbance (at 600 nm) of sample solutions (4.23% w/v)

| | rOVD | $H_2O_2$ Reprocessed RE-RC |
|---|---|---|
| Absorbance | 0.068 | 0.046 |

Example 24: Protein Bar Preparation and Testing for Hardness and Sensory Likeability Homogenous mixtures of chopped dates chopped nuts (almonds and walnuts), and cocoa was combined with a protein powder of interest as shown in in Table 28. The amount of dates and nuts was reduced in formulations that included protein powders as seen in Table 29. The dates:nuts ratio was kept at a constant 4.6 level. Egg white protein powder and nOVD were prepared at inclusion levels of 2, 8, 16 or 23% while rOVD was prepared at inclusion levels of 2, 4, 8, 12, or 16%. (Table 28 to Table 31).

Half of each mixture was baked in an oven at 350 degrees F. for ten minutes. The other half of each mixture was tested as an unbaked mixture.

TABLE 28

| List of Ingredients and their proportions used in control formulation | |
|---|---|
| Ingredients | Amount (%) |
| Dates | 78.67 |
| Nuts | 17.33 |
| Cocoa | 4 |
| Total | 100 |

TABLE 29

| List of Ingredients and their proportions used in egg white protein formulations | | | | | |
|---|---|---|---|---|---|
| Ingredients | 2% protein | 8% protein | 16% protein | 23% protein | 32% protein |
| Dates | 76.67 | 71 | 63.33 | 56.67 | 48 |
| Nuts | 17 | 15.67 | 14 | 12.50 | 10.67 |
| Cocoa | 4 | 4 | 4 | 4 | 4 |
| Protein | 2.33 | 9.33 | 18.67 | 26.83 | 37.33 |
| Total | 100 | 100 | 100 | 100 | 100 |

TABLE 30

| List of Ingredients and their proportions used in nOVD formulations | | | | |
|---|---|---|---|---|
| Ingredients | 2% protein | 8% protein | 16% protein | 23% protein |
| Dates | 76.67 | 70.67 | 62.33 | 55.25 |
| Nuts | 16.83 | 15.33 | 13.67 | 12 |
| Cocoa | 4 | 4 | 4 | 4 |
| Protein | 2.5 | 10 | 20 | 28.75 |
| Total | 100 | 100 | 100 | 100 |

TABLE 31

| List of Ingredients and their proportions used in rOVD formulations: | | | | | |
|---|---|---|---|---|---|
| Ingredients | 2% protein | 4% protein | 8% protein | 12% protein | 16% protein |
| Dates | 76.71 | 74.95 | 71.14 | 67.28 | 63.61 |
| Nuts | 16.99 | 16.46 | 15.66 | 14.93 | 14 |
| Cocoa | 4 | 4 | 4 | 4 | 4 |
| Protein | 2.3 | 4.59 | 9.20 | 13.79 | 18.39 |
| Total | 100 | 100 | 100 | 100 | 100 |

Example 25: Protein Bar Hardness/Texture Test

The textural properties of the baked and unbaked protein bars as prepared in Example 25 were measured using a CT3 Brookfield Texture Analyzer (1500 g load cell). A three-point bend test was used to snap, bend and measure the hardness of the protein bars. One sample for each protein inclusion level was analyzed. The test parameters used are shown in Table 32.

The hardness results for the baked protein bars were much higher than the hardness results in the unbaked version. Within the unbaked protein bars, 8% inclusion for all protein powders resulted in similar hardness values. Hardness profile for all unbaked protein bars gradually increased as the protein inclusion rates increased. Hardness values at 16% and 23% protein inclusion were also comparable for egg white protein, native OVD and rOVD. See, Table 33 and Table 34.

Egg white protein could be included up to 32% protein levels. A maximum of 23% protein inclusion levels in a protein bar, was observed for native and rOVD. Higher protein concentrations were unable to incorporate in a protein bar form.

The hardness value for nOVD at 8% inclusion level was much lower than egg white protein and rOVD. However, similar hardness values were observed for all protein bar samples at an inclusion level of 16% and 23%. The baked protein bars with native and rOVD exhibited a porous crumb and hard outer shell for higher inclusion levels of 16% and 23%. Overall, 8% protein powder inclusion level was the most desirable (higher palatability and texture attributes) across all protein powders.

TABLE 32

| Test parameters used for three-point bend test to measure hardness using a CT3 Brookfield Texture Analyzer | |
|---|---|
| Test type | Rupture test |
| Probe | TA7 blade |
| Base Fixture | TA-TPB |
| Trigger load | 5 g |
| Correction load | 30 g |
| Test speed | 3 mm/s |
| Sample rate | 30 points/sec |
| Distance between support arms | 2.5 cm |
| Textural properties | Hardness (g) |

TABLE 33

| Test results for unbaked protein bar samples | | | | | | |
|---|---|---|---|---|---|---|
| | Hardness (g) for protein inclusion levels | | | | | |
| Sample | Control (0%) | 8% | 12% | 16% | 23% | 32% |
| Egg white protein | 86.33 | 186.2 | 386.6 | 299.2 | 434.6 | 393.6 |
| nOVD | | 173.2 | 463.8 | 360 | 411 | n/a |
| rOVD | | 182.2 | 291.2 | 338.2 | 402.4 | n/a |

TABLE 34

| Test results for baked protein bar samples | | | | | | |
|---|---|---|---|---|---|---|
| | Hardness (g) for protein inclusion levels | | | | | |
| Sample | Control (0%) | 8% | 12% | 16% | 23% | 32% |
| Egg white protein | 1193 | 1525.2 | 1490 | 1544.4 | 1506.6 | 1534.2 |
| nOVD | | 1072.8 | 1054.4 | 1506.2 | 1433.8 | n/a |
| rOVD | | 1380.4 | 1499 | 1504 | 1565.4 | n/a |

Example 26: Protein Bar Sensory Test

Samples prepared as described in Example 26 were evaluated for quality descriptors by trained in-house panelists.

The quality attributes tested included appearance, smell, taste/flavor, mouthfeel/texture and overall liking in a nine-point scale from 1: Dislike extremely, 2: Dislike very much, 3: Dislike moderately, 4: Dislike slightly, 5: Neither like nor dislike, 6: Like slightly, 7: Like moderately, 8: Like very much, and 9: Like extremely.

TABLE 35

Sensory likeability results for 8% protein bar samples

| Attribute Likeability | Unbaked Control | 8% Protein inclusion (Unbaked) Egg white protein | nOVD | rOVD | Baked Control | 8% Protein inclusion (Baked) Egg white protein | nOVD | rOVD |
|---|---|---|---|---|---|---|---|---|
| Appearance | 8 | 7.5 | 8 | 6.5 | 9 | 7.5 | 8 | 6.5 |
| Smell | 9 | 8 | 9 | 8 | 9 | 7 | 9 | 8 |
| Taste/Flavor | 9 | 6.5 | 4 | 7 | 9 | 6 | 4 | 7 |
| Texture/Mouthfeel | 6 | 6 | 4.5 | 8 | 9 | 4 | 4.5 | 8 |
| Overall | 7 | 7 | 4 | 7 | 9 | 5 | 4 | 7 |

For the control unbaked sample, panelists noted that it had a good appearance, slightly soft texture/bite but overall good taste and no unpleasant aftertaste. For the baked version, panelists liked every attribute of the sample to the highest score and gave it a perfect score.

For the unbaked (8%) protein bars, panelists provided the following comments: the egg white protein bar tasted like tootsie roll, it was sweet and cohesive but had a dry mouthfeel; the native OVD bar was less sticky as compared to control but had a strong OVD-like, metallic and acidic taste and with a dry mouthfeel; and the rOVD bar had no acidity, was slightly less sweet but was cohesive and had a pleasant aftertaste.

For the baked (8%) protein bars, panelists provided the following comments: the egg white protein bar was slightly acidic, had a cracker/toasted cereal like taste and aftertaste; the native OVD bar was harder and tacky as compared to control and was more palatable; and the rOVD bars lacked acidity, were chewy, and tacky which the panelists liked.

TABLE 36

Sensory likeability results for 16% protein bar samples

| Attribute Likeability | Unbaked Control | 16% Protein inclusion (Unbaked) Egg white protein | nOVD | rOVD | Baked Control | 16% Protein inclusion (Baked) Egg white protein | nOVD | rOVD |
|---|---|---|---|---|---|---|---|---|
| Appearance | 8 | 7 | 8 | 5 | 9 | 5 | 6 | 5 |
| Smell | 9 | 5.5 | 7 | 5.5 | 9 | 2 | 7 | 5 |
| Taste/Flavor | 9 | 5 | 1 | 7 | 9 | 3 | 1 | 6 |
| Texture/Mouthfeel | 6 | 4 | −1 | 8 | 9 | 2 | 1 | 5 |
| Overall | 7 | 4 | 1 | 6.5 | 9 | 2 | 2 | 6 |

For the baked (16%) protein bars, panelists provided the following comments: the egg white protein bar tasted toasted and bready, was whiteish and had a powdery mouthfeel; the nOVD bar was very hard and difficult to bite, looked like a hard bread, had a strong sour taste which left a burning sensation; the rOVD bar had muted sweetness, a mealy and a toasty flavor, with no acidity or aftertaste, and it was tacky but hard.

Overall, rOVD bars performed better than nOVD bars and comparable to egg white protein samples in tests described in Example 25 to Example 27. A maximum of 23% protein inclusion for nOVD and rOVD seemed possible while egg white protein samples were able to go as high as 32% inclusion levels. Eight percent bars were deemed as the best inclusion levels for all the protein bars.

Twelve percent rOVD bars had slight acidity in the unbaked bars, however no acidity was perceived in the baked bars. The baked bars were chewy, tacky and hard.

Example 27: rOVD Salad Dressing

A salad dressing was prepared using a L5M-A homogenizer (Silverson) at ambient temperature. Emulsions were prepared by dispersing protein powder and salt into the aqueous phase (water and vinegar) and stirring at 2000 rpm for 5 minutes using General Purpose Disintegrating Head. After mixing, canola oil was added in a controlled manner and homogenized at 6000 rpm for 15 minutes using Square Hole High Shear Screen to make a stable oil-in-water emulsion.

All emulsion samples were transferred into glass tubes, sealed with a plastic cap, and stored at 4 C for seven days. The stabilities of the samples were evaluated by visually monitoring the height of the visible serum separation at the bottom phase with storage time. Physical stability was monitored until no visual phase separation happened. The stability of the emulsion was expressed as: % serum=(Ht/H0)*100. H0 represents the initial emulsion height and the height of visible serum separation layer (Ht).

List of ingredients and their proportions used in the control and other salad dressing samples with specific protein of interest were presented (Table 37).

TABLE 37

| List of Ingredients. | | | |
|---|---|---|---|
| Ingredient | Control % | nOVD 9% % | rOVD 9% % |
| Canola oil | 45 | 45 | 45 |
| Water | 43.4 | 33.4 | 33.1 |
| Vinegar | 9.6 | 9.6 | 9.6 |
| Emulsifier | 0 | 10 | 10.3 |
| Salt | 2 | 2 | 2 |
| Total | 100.0 | 100.0 | 100 |

Table 38 presents the emulsion stability of the dressings with storage time. Both nOVD and rOVD samples showed better emulsion stability compared to the Control sample that underwent phase separation during the first day of storage at 4 C. After Day 2, samples containing nOVD and rOVD did not exhibit much change in the emulsion phase separation. Higher values indicate lower emulsion stability.

TABLE 38

| Results of emulsion stability | | |
|---|---|---|
| Time | sample | Emulsion stability % |
| Day 1 | 9% rOVD | 17 |
| | 9% nOVD | 15 |
| | Control | 44 |
| Day 2 | 9% rOVD | 29.4 |
| | 9% nOVD | 18.8 |
| | Control | 48.2 |
| Day 3 | 9% rOVD | 26 |
| | 9% nOVD | 21.3 |
| | Control | 47.2 |
| Day 7 | 9% rOVD | 26 |
| | 9% nOVD | 21.3 |
| | Control | 48.2 |
| Day 8 | 9% rOVD | 27.6 |
| | 9% nOVD | 23.3 |
| | Control | 49.1 |
| Day 9 | 9% rOVD | 25.6 |
| | 9% nOVD | 23.3 |
| | Control | 49.1 |

Example 28: rOVD Egg Wash Formation

The film formation and sheen formation functionality of rOVD was evaluated in a bread application. Baking instructions:

a. In a small container, mix together yeast and sugar, and add warm water (85-95 F). Let it sit for 5 min
b. Add the water in a mixing bowl
c. Slowly mix in flour (30 sec) until a firm dough is formed (mix for 2 min on speed 3)
d. Knead dough (folding 7 times) on a lightly floured board for 30 sec, adding small sprinkles of flour only as needed
e. Place dough in a greased bowl. Flip dough over inside the bowl so that the dough top is also lightly greased. Cover and let rise for 45 minutes at 80 F proofing temperature (1st proof)
f. Turn dough out onto a floured board and knead out air (fold 7 times)
g. Shape into mini loaf and place in a greased mini pan
h. Cover and let rise for 30 minutes at room temperature (2nd proof)
i. Apply appropriate wash on top of the dough balls at a 3% level. (In case of sesame seed application, apply 10 sesame seeds to each dough ball over the wash)
j. Bake at 350 F for 8 minutes or until golden brown (switch the location of the bread at 4 min to achieve even baking on all samples)
k. 3% wash of total bread dough weight was added on top. 25 g samples each were used (total egg wash=0.75 g).
l. For samples with whole egg and commercial egg wash substitute, 0.75 g of each sample was applied to the dough surface.

The formulations used for protein of interest are shown in Table 39:

TABLE 39

| List of Ingredients and their proportions used in egg wash formulation: | | |
|---|---|---|
| Ingredients | Egg white powder % | rOVD % |
| DI water | 90.67 | 91.21 |
| Film forming agent | 9.33 | 8.79 |

Retention of sesame seeds: Retention of any topping on cake, bread, bagels or other baked goods is an important factor for egg wash. Sesame seeds were used to evaluate the binding function of each film forming agent post baking. 10 sesame seeds were applied to each dough ball post the application of wash and before baking. Retention of these sesame seeds was calculated based on the amount of seeds stuck to the bread post baking.

The following results were obtained:

TABLE 40

| Samples | Negative Control | Commercial egg wash substitute | Whole egg | Egg white protein | rOVD |
|---|---|---|---|---|---|
| Retention level | 0% | 100% | 100% | 100% | 100% |

The control sample with no egg wash had no binding capacity for the sesame seeds and zero sesame seeds were retained on the surface post baking. However, all other film-forming agents were able to retain all 10 seeds post baking suggesting a 100% retention rate for toppings.

Colorimetric assay: Individual sample pictures were analyzed for color data in the RGB spectrum using the Colorgrab application (Loomatix). Sample values were generated using a 2×2 cm cross-section taken from the center of the bread surface. RGB data was then converted to a CIELAB system using the online software www.colormine.org. CIELAB model is a color space system that expresses color in 3 values: L* for the lightness from black (0) to white (100), a* from green (−) to red (+), b* from blue (−) to yellow (+).

TABLE 42

| CIELAB results for bread post baking | | | |
|---|---|---|---|
| | L* | a* | b* |
| Negative Control | 63.669 | 1.10972 | 25.4527 |
| Whole egg | 62.255 | 8.39894 | 45.57611 |
| Commercial egg wash substitute | 68.349 | 0.04763 | 34.7033 |
| Egg white protein | 76.831 | 2.58977 | 31.1123 |
| rOVD | 83.591 | 4.58532 | 42.2485 |

rOVD and egg white protein samples had a higher L* value suggesting higher brightness or luminance. Control (no egg wash), commercial egg wash substitute and egg white protein samples had a low a* value suggesting lower redness or brownness as compared to Whole egg, and rOVD samples.

Whole egg wash and rOVD samples also had similar b* values, suggesting similar yellow hues as compared to the other samples.

Figure 22:
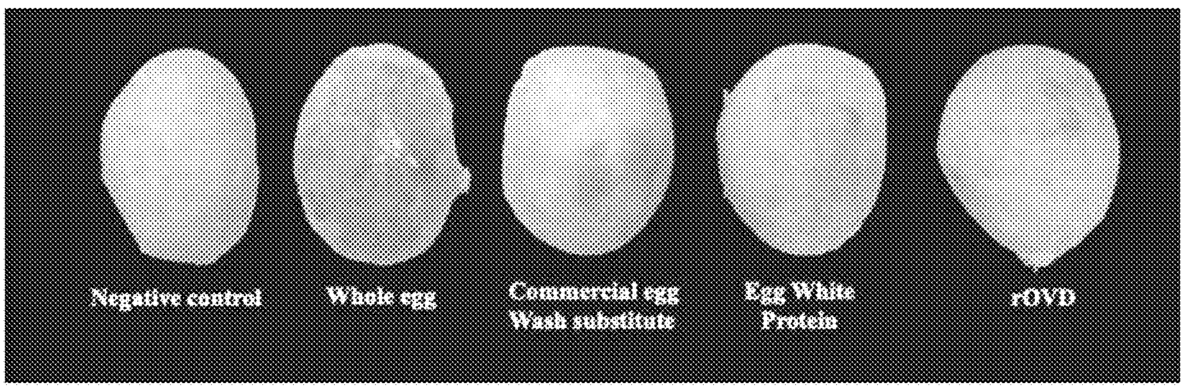
FIG. 22 illustrates a comparison of film formation using various protein samples.

Visual Inspection: The control sample looked pale, wrinkly and had no shine. The sample with egg-wash had good browning, great sheen and a smooth surface. The bake sheen sample had a smooth surface with a slight noticeable sheen. Egg white protein powder sample along with rOVD sample had a good sheen and browning.

rOVD worked well as a film forming and sheen forming agent. All the sesame seeds remained on the surface post browning suggesting good film forming and binding capabilities. The visual inspection and color values suggested good sheen formation and browning as compared to other samples (FIG. 22).

Example 29: Preparation of Recombinant Ovalbumin

A *Gallus gallus* OVA coding sequence was fused in-frame with the alpha mating factor signal sequence downstream of the promoter sequence (SEQ ID NO:60). A promoter was placed upstream of the signal sequence OVA coding sequence and a transcriptional terminator was placed downstream of the OVA sequence. The expression construct was placed into a Kpas-URA 3 vector.

The expression constructs were transformed into *Pichia pastoris*. Successful integration was confirmed by genomic sequencing.

Fermentation: Recombinant OVA was produced in a bioreactor at ambient conditions. A seed train for the fermentation process begins with the inoculation of shake flasks with liquid growth broth using 2 ml cryovials of *Pichia pastoris* which are stored at −80° C. and thawed at room temperature prior to inoculation.

The inoculated shake flasks were kept in a shaker at 30° C. for 24 hours, after which the grown *Pichia pastoris* was transferred to a production scale reactor.

The culture was grown at 30° C., at a set pH and dissolved oxygen (DO). The culture was fed with a carbon source. At the end of the fermentation, the target OVA protein was harvested from the supernatant.

Cell debris was removed, protein was purified and lyophilized to a dry powder. The OVA produced was used in the examples described below.

Example 30: Preparation of an Eggless Cake Using Recombinant Ovalbumin

An eggless pound cake can be prepared with the following ingredients. A first ingredient composition made by mixing 2% to 5% recombinant ovalbumin and 0.05% to 0.5% sunflower lecithin. To prepare the pound cake, up to 4% of the dry first ingredient composition is added to 22-26% of unsalted butter, 20-25% of all-purpose flour, 18-26% of water, 20-25% sugar, 4-6% of sour cream, 1.2% of baking powder, 0.4% of vanilla flavor, 0.05 to 1.5% gums and starch and 0.18% of salt and all ingredients are then mixed to create a batter. For this recipe recombinant ovalbumin may be used at 2-5% and sunflower lecithin from 0.05 to 0.5%.

In one example, pound cakes with rOVA and with whole egg (as a comparison) were made as follows:

TABLE 44

| Cake with rOVA+ Xanthan gum | |
|---|---|
| Ingredients | % w/w |
| Lecithin | 0.09 |
| All-purpose Flour | 22.61 |
| Granulated Sugar | 22.61 |
| Unsalted butter | 25.63 |
| Sour cream | 5.03 |
| Coarse salt | 0.18 |
| Baking powder | 1.21 |
| vanilla extract | 0.37 |
| rOVA | 3.41 |
| Water | 18.74 |
| Xanthan gum | 0.05 |
| Marigold yellow | 0.06 |
| Total | 100.00 |

TABLE 45

| Control Pound Cake with whole Egg | |
|---|---|
| Ingredients | % w/w |
| Flour | 23.34 |
| Sugar | 23.34 |
| Whole egg | 23.34 |
| unsalted butter | 23.34 |
| Sour cream | 5.19 |
| baking powder | 1.25 |
| Vanilla | 0.38 |
| coarse salt | 0.21 |
| Total | 100.00 |

TABLE 46

| Cake with rOVA+ Potato Starch+ Xanthan gum | |
|---|---|
| Ingredients | % w/w |
| Flour | 20.73 |
| Sugar | 20.73 |
| Unsalted butter | 22.08 |
| Sour cream | 4.61 |
| Coarse salt | 0.16 |
| Baking powder | 1.11 |
| Vanilla | 0.34 |
| rOVA | 3.10 |
| Potato starch | 1.48 |
| Xanthan gum | 0.09 |
| Lecithin | 0.05 |
| water | 25.45 |
| Marigold yellow | 0.05 |
| Total | 100.00 |

For each of the recipes, the batter was baked at 325° F. until cooked such time that a toothpick, when inserted at the middle of the cake, came out clean.

TABLE 47

Results from using rOVA in pound cake compositions

| | rOVA + Xanthan gum | rOVA + Potato Starch + Xanthan gum | Control Egg pound cake |
|---|---|---|---|
| Cohesiveness | *0.6 ± 0.02 a | 0.64 ± 0.02 a | 0.62 ± 0.02 a |
| Resilience | 0.31 ± 0 a | 0.36 ± 0.05 a | 0.32 ± 0.01 a |
| Hardness (g) | 73.9 ± 2.1 a | 75.5 ± 7.5 a | 75.6 ± 12.7 a |
| Chewiness (mJ) | 1.48 ± 0.04 a | 1.78 ± 0.3 a | 1.63 ± 0.5 a |
| Springiness (mm) | 3.41 ± 0 a | 3.72 ± 0.21 a | 3.48 ± 0.32 a |
| Cake height (cm) | 30.08 ± 1.4 a | 30.07 ± 1.04 a | 30.64 ± 1.01 a |
| Sensory | Appearance: good yellow crumb, compact crumb, light brown crust. Good rise and volume. Aroma: butter, cakey Flavor: buttery, cakey Texture: more moist texture than control cake with egg, not as cohesive as egg control. | Appearance: pale crust color, good yellow crumb color, open pores in crumb like the Control, good rise/volume Aroma: buttery, cakey Flavor: cakey, sweet Texture: more moist texture than egg control, more cohesive than control cake with egg. | Appearance: open pores, golden crust, good yellow crumb color Texture: good chewy, slightly dry Flavor: cakey, buttery Aroma: cakey buttery |

*Similar letters within each marker indicate there is no significant difference between the samples (mean ± std dev; $p > 0.05$)

Texture qualities such as cohesiveness, resilience, hardness, chewiness and springiness were measured using a Brookfield CT3 Texture analyzer, 1500 g load cell. No significant difference was observed between the Control Egg cakes and cakes made with rOVA in terms of textural properties and cake height. The sensory properties were comparable to the Control cake made with whole egg.

The rOVA in the pound cake demonstrated several functional features with utility in baked goods, as well as for other food products and ingredients. Results are shown in FIG. 24.

TABLE 48

Functional features provided by rOVA in pound cakes

| Functionality | Evidence |
|---|---|
| Foaming | Air cells formed, evident in the crumb structure (cross section photo) |
| Whipping | Air incorporation during mixing of batter, evident from air cells in crumb structure |
| Gelling | Protein coagulation upon heating. Creates structure of cake. |
| Binding | Binds with other ingredients, giving strength and structure to cake. Evident from texture and sensory measurements. |
| Springiness | Texture measurement |
| Texturizer | Provides structure while baking, evidenced by textural characteristics: chewiness, hardness, resilience, cohesiveness |

Example 31: rOVA Applications in Meringue

This example examined the feasibility of making meringue with rOVA in the recipe without using cream of tartar.

Material: rOVA (pH: 4.12 as is), nOVA (pH: 6.06 as is), Fresh egg white (pH: 9 as is), Xanthan gum, Sodium lauryl sulfate (SLS), Cream of tartar, Granulated sugar, Flavor.

Equipment: Kitchen Aid, Classic Plus, Breville BOV800XL Smart Electric Oven.

Method: Separated egg white from the egg yolk carefully at the refrigerator temperature and then let egg whites get to room temperature before whipping. Egg white was used to make Control meringue sample. nOVA or rOVA was used to make test samples. Egg white or nOVA or rOVA solution (10% solution) was transferred to a mixer bowl and whipped for 30 seconds at medium speed (to obtain a homogeneous solution), then cream of tartar was added (for egg-whites only) and mixed at high speed until soft peaks form. While beating constantly, sugar was added gradually and beaten at high speed after each addition until sugar was dissolved completely. Continued mixing until a glossy and firm peak was formed and at the end, flavors were added. The soft meringue mix was transferred into the pan. An oven was preheated to 250° F., and meringues were baked for 50 minutes (or until an internal temperature of 160° F.). After cooling, meringues were stored in an airtight container.

Exemplary meringue recipes using rOVA can include rOVA between 5-10%, sugar at about 26-32%, flavoring (e.g., 1-4%), water at about 59-64%, xanthan gum at about 0.01-0.5%, sodium lauryl sulfate at about 0.01-0.1% (all w/w). One such exemplary recipe, and comparison recipes with fresh egg white or with native OVA or with rOVA was constructed as shown below:

TABLE 49

Recipes

| Meringue with fresh egg white | | Meringue with rOVA and nOVA (same recipe) | |
|---|---|---|---|
| Ingredients | % w/w | Ingredients | % w/w |
| Fresh egg white | 68.19 | nOVA and/or rOVA | 8.14 |
| Cream of tartar | 1.14 | Sugar | 28.28 |
| Sugar | 28.41 | Flavor | 2.26 |
| Flavor | 2.26 | Water | 61.12 |
| Total weight | 100 | Xanthan gum | 0.1 |
| | | SLS (Sodium lauryl sulfate) | 0.1 |
| | | Total weight | 100 |

TABLE 50

Results of meringue recipes

| | Egg white meringue | nOVA meringue | rOVA meringue |
|---|---|---|---|
| weight loss % | *51 ± 1 b | 60 ± 14.6 a | **40 ± 4.5 c** |
| volume (ml) | 6.9 ± 1.94a | 7.82 ± 1.5a | 8.05 ± 2.16a |
| Density (g/ml) | 0.1 ± 0.06 a | 0.07 ± 0.01ab | **0.06 ± 0.01b** |
| 1/density | 9.14 | 13.78 | 16.65 |
| fluffiness | 100 | 150.5 | **182.1** |

*Samples with different letters across a row are significantly different ($p < 0.05$; mean ± std dev).

Conclusion: Lowest weight loss was observed in meringue with rOVA. Furthermore, rOVA meringue indicated the highest fluffiness compared to the egg control and nOVA. Results are presented in FIG. 25.

The rOVA usage in meringue demonstrates several functional features of rOVA.

TABLE 51

| Functional features provided by rOVA in meringues | |
|---|---|
| Functionality | Evidence |
| Foaming | Increased foam capacity compared to egg white |
| Whipping | Whips easily-Reduced whipping/ whisking time compared to egg white |
| Aeration | Holds air bubbles, soft peak |
| Fluffing | Provides increased volume and fluffiness |
| Gelling | Protein coagulation upon heating, provides structure to the meringue sample |

Example 32: Comparison of Foam Capacity and Foam Stability

This example evaluated the foam capacity/stability and coagulation properties of rOVA and compared it to fresh whole egg, egg white and nOVA.

Materials: store-bought egg, nOVA (Bioceutica), rOVA.

Method: A stock solution of OVA (nOVA or rOVA) was made by mixing 0.7 g OVA in 9.3 g distilled water (total volume 10 ml). Cream of tartar was used (see Table 52 below) to adjust pH. Foam was made using a Dremel at speed 3. The time of whisking was recorded. Gel was made by heating 1 ml of sample at 72° C. for 10 min using a heat block.

TABLE 52 pH adjustments to rOVA, nOVA and egg white compositions pH adjustment

| | Initial pH | Temperature | Amount of cream of tartar added (g) | pH after adding cream of tartar |
|---|---|---|---|---|
| rOVA solution | 3.86 | 21 | 0 | 3.86 |
| nOVA solution | 5.45 | 20.7 | 0.1 | 4.01 |
| Fresh egg white | 8.57 | 20 | 2 | 4.64 |

Results of the foam capacity and stability are shown in the Table 53 below. In this set, pH was not adjusted.

*Foam capacity %=[Initial liquid Vol. (ml)/Foam Vol. (ml)]*100

**Foam stability %=[(Initial liquid Vol. (ml)−Liquid drainage Vol. at 30 min (ml))/Initial liquid Vol. (ml)]*100

TABLE 53

Results of foam capacity and stability

| | Whole egg | Egg white | nOVA |
|---|---|---|---|
| *Foam capacity % | 210 ± 14.1 a | 300 ± 0 b | 338.5 ± 2.2 c |
| Foam Stability % | 56 ± 2.8 b | 71 ± 1.4 a | 59.3 ± 0.92 b |
| time of whisking (second) | >120 | 80 | 19 |
| pH as is | 7.6 | 9.1 | 5.9 |

Conclusion: nOVA at pH 6 indicated the highest foam capacity compared to the egg white; however, its foam stability was lower than the egg white. Results are presented in FIG. 4

The experiment was repeated using cream of tartar to adjust the pH.

TABLE 54

Results of foam capacity and stability after pH adjustment using cream of tartar

| | Egg white | nOVA | rOVA |
|---|---|---|---|
| Foam capacity % | 316.3 ± 5.3 b | 457.9 ± 31.2 a | 367.9 ± 2.9 b |
| Foam Stability % | 83.6 ± 6.2 a | 65.1 ± 1.3 b | 60.5 ± 0.7 b |
| time of whisking (second) | 64 | 19 | 32 |
| Initial pH (as is) | 8.57 | 5.45 | 3.86 |
| Final pH (after adjusting with cream of tartar) | 4.65 | 4.01 | 3.86 |

Conclusion: The foam capacity of nOVA after reducing pH was still higher than egg white. The foam capacity of rOVA was higher in value compared to that of fresh egg white. The whisking time for rOVA was half that required for fresh egg white. Results are shown in FIG. 27.

Example 33: Preparation of Recombinant Chicken Ovalbumin Expression Strain

Expression Constructs Seven expression cassettes were created for expression of *Gallus gallus* OVA (SEQ ID NO: 61) in *Pichia pastoris*.

TABLE 55

Expression Cassettes of Interest

| Strain | Cassette | Promoter | Terminator |
|---|---|---|---|
| Chicken OVA | GgOVA-A1 | K phaffii AOX1 promoter | K phaffii AOX1 transcriptional terminator |
| Chicken OVA | GgOVA-A2 | K phaffii AOX1 promoter | K phaffii AOX1 transcriptional terminator |
| Chicken OVA | GgOVA-A3 | K phaffii AOX1 promoter | K phaffii AOX1 transcriptional terminator |
| Chicken OVA | GgOVA-D1 | K pastoris DAS promoter | K phaffii AOX1 transcriptional terminator |
| Chicken OVA | GgOVA-F2 | K pastoris FLD1 promoter | K phaffii AOX1 transcriptional terminator |
| Chicken OVA | GgOVA-F3 | K pastoris FLD1 promoter | K phaffii AOX1 transcriptional terminator |
| Chicken OVA | HF-1 | K phaffii PEX11 promoter | K phaffii AOX1 transcriptional terminator |

The first three cassettes were made to express a chicken OVA that comprises the amino acid sequence of chicken OVA (SEQ ID NO:61) fused in-frame with a nucleic acid encoding a secretion signal sequence; the expressed fusion protein has the amino acid sequence of (SEQ ID NO: 60). In each of the three cassettes, the Alcohol oxidase 1 (AOX1) promoter was placed upstream of the secretion signal sequence and a *K. phaffii* AOX1 transcriptional terminator was placed downstream of the OVA-encoding sequence. These cassettes were labeled GgOVA-A1, GgOVA-A2, and GgOVA-A3 and combined into a first plasmid.

The fourth cassette included a chicken OVA coding sequence (which encodes SEQ ID NO: 61) fused in-frame with a nucleic acid encoding a secretion signal sequence (thereby encoding SEQ ID NO: 60) but with a dihydroxyacetone synthase (DAS2) promoter placed upstream of the secretion signal sequence and a *K. phaffii* AOX1 transcriptional terminator placed downstream of the OVA-encoding sequence. This construct was labeled GgOVA-D1.

The fifth and sixth cassettes included the chicken OVA coding sequence (which encodes SEQ ID NO: 60) fused in-frame with a nucleic acid encoding a secretion signal sequence (thereby encoding SEQ ID NO: 61) but with a formaldehyde dehydrogenase (FLD) promote placed upstream of the secretion signal sequence and a *K. phaffii* AOX1 transcriptional terminator placed downstream of the OVA-encoding sequence. These cassettes were labeled GgOVA-F1 and GgOVA-F2 and were combined with GgOVA-D1 in a second plasmid.

The seventh cassette included the peroxisome biogenesis (PEX11) promoter placed upstream of a Helper factor protein HAC1 coding sequence and a *K. phaffii* AOX1 transcriptional terminator placed downstream of the Helper factor sequence. This cassette was labeled HF-1 and was transformed into a third plasmid.

The three plasmids were transformed stepwise into a background strain of *Pichia pastoris*. Genomic sequencing confirmed integration of the expression constructs and copy number of each construct is shown in Table 56 below.

TABLE 56

| Strain Genomic Composition | | |
|---|---|---|
| Strain | Cassette | Copies integrated |
| Chicken OVA | GgOVA-A1 | 1 |
| | GgOVA-A2 | 1 |
| | GgOVA-A3 | 1 |
| | GgOVA-D1 | 2 |
| | GgOVA-F2 | 2 |
| | GgOVA-F3 | 2 |
| | HF-1 | 8 |

Example 34: Preparation of Recombinant Ovalbumin Expression Strains for Duck and Ostrich Expression Constructs: one cassette for expression of *Anas platyrhynchos* (duck) OVA and one cassette for expression of *Struthio camelus* (ostrich) OVA were created for expression in *Pichia pastoris*.

TABLE 57

| Expression cassettes of interest | | | | |
|---|---|---|---|---|
| Strain | Cassette | Promoter | ORF | Terminator |
| Duck OVA | ApdOVA | K phaffii AOX1 promoter | Duck OVA | K phaffii AOX1 transcriptional terminator |
| Ostrich OVA | ScOVA | K phaffii AOX1 promoter | Ostrich OVA | K phaffii AOX1 transcriptional terminator |

One expression cassette was created for the expression of ostrich OVA. A nucleic acid encoding *Struthio camelus* OVA (SEQ ID NO: 130) was fused in-frame with a nucleic acid encoding a secretion signal sequence (thereby encoding SEQ ID NO: 131). The ostrich construct included the Alcohol oxidase 1 (AOX1) promoter placed upstream of the secretion signal sequence and a *K. phaffii* AOX1 transcriptional terminator was placed downstream of the OVA sequence. This expression cassette called ScOVA was transformed into *Pichia pastoris*. Successful integration of four copies of the ostrich OVA construct was confirmed by genomic sequencing. See Table 57.

One expression cassette was created for the expression of duck OVA. A nucleic acid encoding *Anas platyrhynchos* OVA (SEQ ID NO: 132) was fused in-frame with a nucleic acid encoding a secretion signal sequence (thereby encoding SEQ ID NO: 133). The duck cassette included the Alcohol oxidase 1 (AOX1) promoter placed upstream of the secretion signal sequence and a *K. phaffii* AOX1 transcriptional terminator was placed downstream of the OVA sequence. This expression cassette called ApdOVA was transformed into *Pichia pastoris*. Successful integration of two copies of the duck OVA construct was confirmed by genomic sequencing. See, Table 58.

TABLE 58

| Strain genomic composition | | |
|---|---|---|
| Strain | Cassette | Copies integrated |
| Duck OVA | ApdOVA | 2 |
| Ostrich OVA | ScOVA | 4 |

Example 35: Fermentation and Production of rOVA

Fermentation: Strains for fermenting recombinant OVA (rOVA) were each cultured in a bioreactor at ambient conditions. A seed train for the fermentation process began with the inoculation of shake flasks with liquid growth broth. The inoculated shake flasks were kept in a shaker after which the grown *P. pastoris* was transferred to a production-scale reactor.

To expand production, a seed vial of rOVA *P. pastoris* seed strain was removed from cryo-storage and thawed to room temperature. Contents of the thawed seed vials were used to inoculate liquid seed culture media in baffled flasks which were grown at 30° C. in shaking incubators. These seed flasks were then transferred and grown in a series of larger and larger seed fermenters (number to vary depending on scale) containing a basal salt media, trace metals, and glucose. Temperature in the seed reactors was controlled at 30° C., pH at 5, and dissolved oxygen (DO) at 30%. pH was maintained by feeding ammonia hydroxide, which also acted as a nitrogen source. Once sufficient cell mass was reached, the grown rOVA *P. pastoris* was inoculated into a production-scale reactor containing basal salt media, trace metals, and glucose.

Like in the seed tanks, the culture was also controlled at 30° C., pH5 and 30% DO throughout the process. pH was again maintained by feeding ammonia hydroxide. During the initial batch glucose phase, the culture was left to consume all glucose and subsequently-produced ethanol. Once the target cell density was achieved and glucose and ethanol concentrations were confirmed to be zero, the glucose fed-batch growth phase was initiated. In this phase, glucose was fed until the culture reached a target cell density. Glucose was fed at a limiting rate to prevent ethanol from building up in the presence of non-zero glucose concentrations. In the final induction phase, the culture was co-fed glucose and methanol which induced it to produce rOVA via the pAOX promoters. Glucose was fed at an amount to produce a desired growth rate, while methanol was fed to maintain the methanol concentration at 1% to ensure that expression was consistently induced. Regular samples were taken throughout the fermentation process for analyses of specific process parameters (e.g., cell density, glucose/methanol concentrations, product titer, and quality). After a designated amount of fermentation time, secreted rOVA was collected and transferred for downstream processing.

The fermentation broth containing the secreted rOVA was subjected to centrifugation at 12,000 rpm. The supernatant was clarified using microfiltration. To concentrate the protein and remove excess water, ultrafiltration at room temperature was used. An appropriately sized filter was used to retain the target rOVA while the compounds, salts, and water smaller than rOVA passed through the filter. To reduce the final salt content and conductivity in preparation for chromatography, the concentrated rOVA retentate was dialyzed at pH 3.5 until the final conductivity of the material was 1.7 mS/cm. The bulk of the purification was done using cation exchange chromatography at pH 3.5. Citrate buffer containing a high salt concentration of sodium chloride was used to elute the bound rOVA from the resin. To remove the excess salts, the eluant was finally dialyzed to make a final protein solution containing about 5-10% protein and 85-95% water. The final solution was sterilized by passing it through a 0.2 um bioburden filter. The water was evaporated using a spray dryer/lyophilizer at appropriate temperatures to produce a final powder containing about 80% protein.

Example 36: Preparation of Solubilized rOVA

In this example, hydrophobic recombinant chicken rOVA was solubilized and passed through a 0.2 μm filter.

Recombinant rOVA was purified through ion exchange chromatography at pH 3.5 and was found to be insoluble. Sodium hydroxide was added to the solution to change the pH to 12.5 and solubilize the rOVA. The rOVA solution at pH 12.5 was passed through a 0.2 μm filter. Following filtration, the pH was returned to 6.5 using hydrochloric acid and the rOVA was spray dried or lyophilized. This dried chicken rOVA was then used in the Examples below.

Example 37: Glycosylation of *Gallus gallus* rOVA

In this example, *Pichia*-secreted rOVA was analyzed for glycosylation patterns.

Figure 23A:
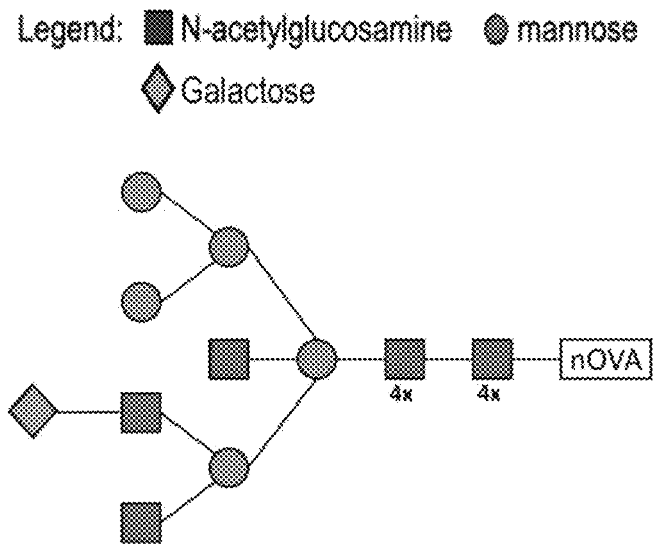
FIGS. 23A-23B illustrate glycosylation patterns of native OVA and rOVA produced in *P. pastoris* respectively.
Figure 23B:
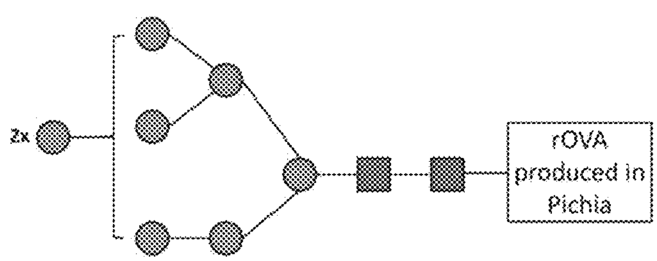

Native ovalbumin (nOVA) has two potential N-linked glycosylation sites (FIG. 23A). A single site of glycosylation at Asn-292 is found in the egg white. MALDI-TOF analysis has shown that the typical glycans on native OVA are organized as (Man)5(GlcNAc)5(Gal)1 (FIG. 23A) (Harvey et al., 2000). Analysis of glycans on rOVA showed a typical glycosylation pattern shown in (FIG. 23B).

Figure 28A:
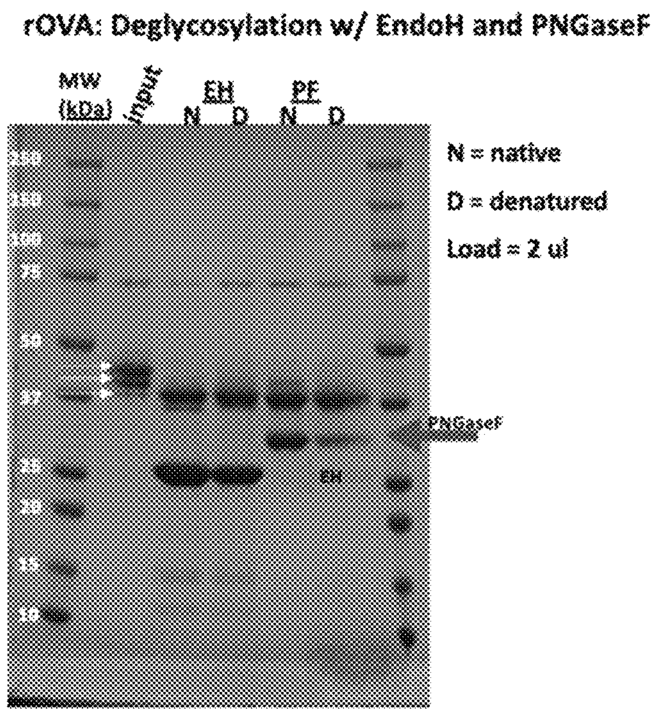
FIG. 28A illustrates gel electrophoresis migration of glycosylated native and recombinant OVA. Also shown are deglycosylated recombinant OVA treated with EndoH and PNGaseF enzymes.

*Pichia* secreted chicken rOVA from the above Example was analyzed by gel electrophoresis migration and observed in three distinct forms (three white arrows pointing to rOVA in the “Input” lane below a) glycosylation-free, b) mono-glycosylated and c) di-glycosylated. Both the mono- and di-glycosylated glycosyl chains were cleaved from the mature rOVA protein using either of the endoglycanases EndoH or PNGaseF. Both the “denatured” or “native” deglycosylation protocols were used (as described in the NEB catalog). The green arrow indicates exogenous EndoH and the purple arrow indicates exogenous PNGaseF added to the in vitro reactions (FIG. 28A).

Figure 28B:
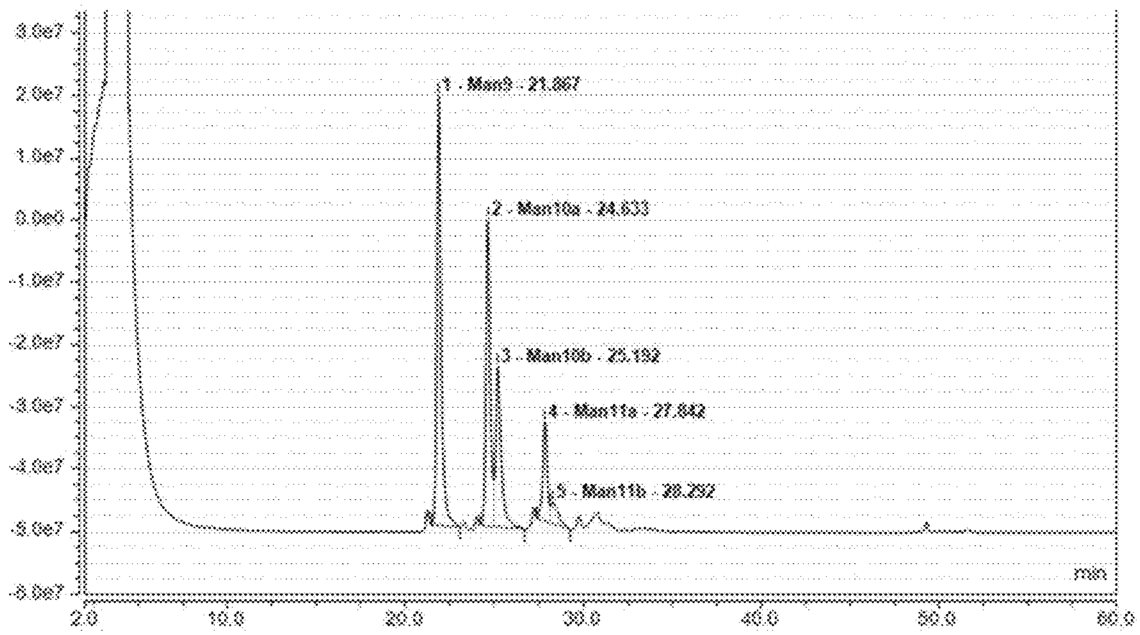
FIG. 28B illustrates a chromatogram depicting glycosylation patterns of rOVA produced in *P. pastoris.*

*Pichia* secreted chicken rOVA was subjected to standard analysis using Mass spectrometry. It was found to have five versions of N-linked Glycans (ManGlcNAc): high-mannose glycans of Man9 (~40%), Man10 (~47%) or Man11 (~13%) type of N-glycan structures (FIG. 28B).

Example 38: Comparison of Foaming Functionalities of Various Species rOVA

In this example, chicken rOVA, duck rOVA and ostrich rOVA were evaluated for properties of foaming ability and foam retention.

rOVA from ostrich and duck were produced, purified and lyophilized using methods similar to those set forth in Example 33 to 35. The ostrich rOVA and duck rOVA remained close to the acidic pH used for purification. Chicken rOVA was produced as set forth in Example 33 and solubilized at pH 12 before removing bioburden and returned to pH 6 before drying as set forth in Example 35.

Lyophilized rOVA samples were blended into distilled water. Clarity and solubility of the rOVA solutions were then assessed visually. All samples were compared to chicken nOVA and chicken rOVA.

Eleven mL of solution (7% w/v of protein) was created for each ostrich rOVA, chicken rOVA, and chicken nOVA. A 6 mL solution (7% w/v of protein) was created for duck rOVA due to limited availability of sample. Percent protein of the powders was used in the calculations to determine the amount necessary for a 7% solution. One mL of each solution was reserved before validation in a microtube for later use to test gelation. The samples were divided into 5 mL aliquots to be tested for foam capacity and stability.

Each 5 mL aliquot was pipetted into a beaker and whipped using the Dremel on speed 3. After a stiff foam was achieved, the foaming time was recorded as well as the initial volume of the foam. Foam capacity was determined by measuring the initial volume of foam following the whipping and comparing against the initial volume of 5 mL. Foam Capacity (%) (volume of foam/initial volume)*100.

The drainage was measured in 10 minute increments for 30 minutes to gather data for foam stability. The drained volume after 30 minutes was compared to the initial liquid volume (5 mL). Foam Stability (%): (Initial volume−drained volume)/initial volume*100.

Chicken rOVA and ostrich rOVA were adjusted to pH 6 and tested again to ascertain effect of pH.

Chicken nOVA quickly formed stiff white foam. Ostrich rOVA foamed after 15 seconds. Duck rOVA foamed after 20 seconds.

TABLE 59

Foaming Parameters for rOVA in various species

| Sample | pH | Foaming Time (s) | Foam Capacity (%) | Foam Stability (%) |
|---|---|---|---|---|
| Chicken nOVA | 5.87 | 16 | 415 | 66.5 |
| Chicken rOVA | 6.49 | 101 | 257 | 61 |
| Chicken rOVA | 6.08 | 21 | 417 | 66.7 |
| Chicken rOVA | 3.5 | 28 | 472 | 100 |
| Ostrich rOVA | 3.7 | 22 | 490 | 81.5 |
| Ostrich rOVA (pH adjusted) | 5.73 | 55 | 275 | 58 |
| Duck rOVA | 4.3 | 26 | 400 | 70 |
| Egg White | 9.01 | 66.5 | 267.9 | 76.6 |

Table 59 shows the results for foaming time, foaming capacity, foam stability for chicken nOVA, at pH 5.87, chicken rOVA at pH 6.49 and pH 6.08, ostrich rOVA at pH 3.7 and pH 5.73, duck rOVA at pH 4.3 and egg white OVA at pH 9.0. Recombinant OVA from chicken, duck and ostrich generally had a similar or improved foaming capacity and foam stability as compared to egg white and these recombinant OVA proteins provided foaming capacity and foam stability between at least pH 3.5 and 6.5. Foam capacity and foam stability of rOVAs provide utility in compositions such as baked compositions.

Example 39: Comparison of Gelation of Various rOVA Species

In this example, chicken, duck, and ostrich rOVA protein were evaluated for gelation properties. Gelation properties provide utility in applications such as cooked egg compositions.

One mL of each OVA solution was reserved for use to test gelation. After the Dremel procedure and foaming test in Example 38 was completed, another 1 mL sample was extracted from the drained liquid (containing the OVA) and pipetted into another microtube. Both the fractions collected, before and after foaming, were placed in a water bath and heated to 72° C. for 10 minutes. Samples were observed for gel formation.

FIG. 29 shows the results for gelation before and after foaming for chicken nOVA, at pH 5.87, chicken rOVA at pH 6.49 and pH 6.08, ostrich rOVA at PH 3.7 and pH 5.73, duck rOVA at pH 4.3 and egg white OVA at pH 9.0. Duck rOVA showed better gelation characteristics compared to chicken rOVA. Duck rOVA had gelation functionality close to that of natural egg white.

These data showed that the favorable properties disclosed above for the recombinant chicken OVA (see Example 38) are also obtainable with recombinant OVAs from other species.

Example 40: Comparison of Foaming rOVA Solutions

In this example, rOVA (chicken), solutions were compared to fresh egg white and evaluated for properties of foaming ability and foam retention.

Lyophilized samples were blended into aqueous solution (distilled water) at different concentrations and pHs. Clarity and solubility of the solutions was then assessed visually for foaming ability and foaming retention.

Protein solutions were created for each 4% rOVA, 7% rOVA, Fresh Egg White (12% protein), and 12% rOVA. Percent protein of the powders was used in the calculations to determine the amount necessary for each solution. 1 mL of each solution was reserved before validation in a microtube for later use to test gelation. The samples were divided into 5 mL aliquots to be tested for foam capacity and stability.

Each 5 mL aliquot was pipetted into a beaker and whipped using the Dremel on speed 3. After a stiff foam was achieved, the foaming time was recorded as well as the initial volume of the foam. Foam capacity was determined by measuring the initial volume of foam following the whipping and compare against the initial volume of 5 mL. Foam Capacity (%)=(volume of foam/initial volume)*100.

The drainage was measured in 10-minute increments for 30 minutes to gather data for foam stability. The drained volume after 30 minutes was compared to the initial liquid volume (5 mL). Foam Stability (%): (Initial volume−drained volume)/initial volume*100.

TABLE 60

Foaming functionality for chicken rOVA

| Protein Combination | pH | Foaming Capacity (%) | Foam Stability (%) | Time Spent Foaming (s) |
|---|---|---|---|---|
| Fresh Egg White (12% protein) | 9.01 | 268 | 77 | 67 |
| 4% OVA | 6.05 | 333 | 57 | 25 |
| 7% OVA | 6.03 | 333 | 66 | 19 |
| 12% OVA | 6.05 | 313 | 69 | 18 |

rOVA at 4%, 7% and 12% has greater foaming capacity, more foaming stability, and forms a foam more quickly than fresh egg white.

Example 41: Browning and Sheen Properties of rOVA

In this example, the film formation properties of browning and sheen were evaluated for functionality of rOVA in a bread application. The functionality of rOVA for film formation was evaluated regarding the visual (sensory) characteristics of bread.

Baking instructions: Yeast, sugar and warm water were mixed together in a small bowl and left to sit for five minutes. Flour was mixed into the yeast solution (30 seconds) until a firm dough was formed (mixed for 2 minutes at speed 3). Dough was kneaded on a floured board, placed into a greased bowl and left to rise for 45 minutes at 80° F. Dough was kneaded again, shaped into a 25 g mini loaf, and placed in a greased pan. The mini loaf was covered and allowed to rise for 30 minutes at room temperature. A volume of 0.75 g of the appropriate wash was applied to the top of the dough balls. Mini loaves were baked at 350° F. for eight minutes or until golden brown. Bread loaves' locations were switched in the oven at four minutes to achieve even baking of all samples.

Lists of ingredients and their proportions used in the control bread and other samples are presented in the Table 61 below.

TABLE 61

Bread Ingredients

| Ingredients | % |
|---|---|
| DI Water | 41.77 |
| Granulated Sugar | 2.94 |
| Bakers Yeast | 1 |
| All-Purpose Flour | 53.62 |
| Salt | 0.67 |
| Total | 100.00 |

The formulations used for protein of interest are shown in Table 62.

TABLE 62

| Ingredients used in wash formulations: | | |
|---|---|---|
| Ingredient | Egg White Powder % | rOVA % |
| DI water | 90.67 | 91.30 |
| Film forming agent | 9.33 | 8.7 |

Colorimetric assay: Individual sample pictures were analyzed for color data in the RGB spectrum using the Colorgrab application (Loomatix). Sample values were generated using a 2×2 cm cross-section taken from the center of the bread surface. RGB data was then converted to a CIELAB system using the online software www.colormine.org. CIELAB model is a color space system that expresses color in 3 values: L* for the lightness from black (0) to white (100), a* from green (−) to red (+), b* from blue (−) to yellow (+).

TABLE 63

| CIELAB results for bread post baking: | | | |
|---|---|---|---|
| | L* | a | b* |
| Negative Control | 63.669 | 1.10972 | 25.4527 |
| Whole egg | 62.255 | 8.39894 | 45.57611 |
| Commercial egg wash substitute | 68.349 | 0.04763 | 34.7033 |
| 8% Egg white protein | 76.831 | 2.58977 | 31.1123 |
| 8% rOVA | 80.135 | 3.24212 | 31.53948 |

rOVA and egg white protein samples had a higher L* value suggesting higher brightness or luminance. Control (no egg wash), commercial egg wash substitute and egg white protein samples had a low a* value suggesting lower redness or brownness as compared to whole egg, and rOVA samples. 8% egg white protein and rOVA samples also had similar b* values, suggesting similar yellow hues as compared to the other samples.

Figure 30:
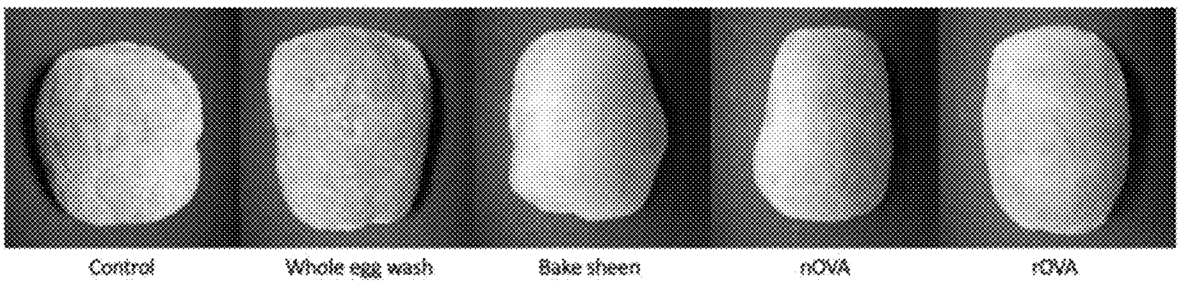
FIG. 30 illustrates film formation using nOVA, rOVA, whole egg wash and a commercial egg-white substitute.

Visual Inspection: The control sample looked pale, wrinkly and had no shine. The sample with whole egg had good browning, great sheen and a smooth surface. The commercial egg wash substitute sample had a smooth surface, slight noticeable sheen but lacked on browning. nOVA samples had good brown, smooth skin but lacked shine/sheen. Similarly, for rOVA samples, it had good browning, smooth skin but lacked shine/sheen. Photographs of the samples are shown in FIG. 30. In conclusion, rOVA was able to form a film comparable to a commercial egg wash substitute and nOVA.

Example 42: Adhesive Properties of rOVA

In this example, rOVA was evaluated for the film formation property of adhesiveness functionality in a bread application creating a uniform film to aid addition of toppings (e.g., sesame seeds).

Retention of sesame seeds: Retention of any topping on cake, bread, bagels or other baked goods is an intended consequence of an egg wash. Sesame seeds were used to evaluate the toping retention function of each film forming agent after baking.

Dough balls and protein of interest were prepared as Example 41. Ten sesame seeds were applied to each dough ball after the application of wash and before baking. Retention of these sesame seeds was calculated based on the amount of seeds stuck to the bread after baking.

The following results were obtained: The control sample with no egg wash had no binding capacity for the sesame seeds and zero sesame seeds were retained on the surface after baking. All other film-forming agents retained all 10 seeds post baking suggesting a 100% retention rate for toppings.

TABLE 64

| Retention levels of sesame seeds | | | | | |
|---|---|---|---|---|---|
| Samples | Negative Control | Commercial egg wash | Whole egg | Egg white protein (EWP) | rOVA 8% |
| Retention level | 0% | 100% | 100% | 100% | 100% |

Example 43: Combined Proteins rOVA Emulsions

In this example, the emulsification functionality of recombinant proteins individually and in combination was observed in a salad dressing application.

Lists of ingredients and their proportions used in the control dressing and other samples are presented in the Table 65 below.

TABLE 65

| List of Ingredients<br>Ingredients for Salad dressing |
|---|
| Canola oil |
| DI water |
| Vinegar |
| Proteins of interest to be tested: |
| nOVA-90% Protein content |
| rOVA-92% Protein Content |
| Egg white protein powder-85.71% Protein content |

Water, vinegar and protein of interest were combined in a mixer for 30 seconds. Oil was gradually added for 30 seconds and mixed for an additional 2.5 minutes. Samples were prepared without vinegar to test the emulsification capabilities of the proteins at neutral pH. pH of the solutions was adjusted using 1N sodium hydroxide. The emulsion was homogenized with a L5M-A homogenizer (Silverson) Square Hole shear head mixer for 9 minutes at 4000 rpm at ambient temperature.

All emulsion samples were transferred into glass tubes, sealed with a plastic cap, and stored at 4° C. or ambient temperature for 3 days. The stability of the samples was evaluated by visually monitoring the height of the visible serum separation at the bottom phase with storage time. Physical stability was monitored for 3 days at both ambient and refrigerated conditions. The stability of the emulsion was expressed as: Creaming Index (CI)=(Ht/H0)*100. Where (H0) represents the initial emulsion height and the height of visible serum separation layer (Ht).

List of ingredients and their proportions used in the control and other salad dressing samples with specific protein of interest are presented in Table 67.

TABLE 66

| List of Ingredients | | | | | | | |
|---|---|---|---|---|---|---|---|
| | Acidic pH | | | | Neutral pH | | |
| Ingredient | Egg white protein (EWP) 8% % | nOVA 8% % | rOVA 8% % | Negative control % | Egg white protein 8% % | rOVA 8% % | Negative control % |
| Canola oil | 30 | 30 | 30 | 30 | 30 | 30 | 30 |
| Water | 54.67 | 55.11 | 55.30 | 64 | 60.67 | 61.30 | 70 |
| Vinegar | 6 | 6 | 6 | 6 | 0 | 0 | 0 |
| Emulsifier | 9.33 | 8.89 | 8.70 | 0 | 9.33 | 8.70 | 0 |
| Total | 100 | 100 | 100 | 100 | 100 | 100 | 100 |

TABLE 67

| Creaming Index | | | | | | | |
|---|---|---|---|---|---|---|---|
| | Acidic pH | | | | Neutral pH | | |
| | 8% EWP | 8% nOVA | 8% rOVA | Negative control | 8% EWP | 8% rOVA | Negative control |
| Day 0 | 0 | 0 | 0 | 40 | 0 | 0 | 40 |
| Day 1 Ambient | 40 | 50 | 5 | 60 | — | — | — |
| Day 1 Refrigerated | 40 | 50 | 5 | 90 | — | — | — |
| Day 2 Ambient | 40 | 50 | 10 | 70 | — | — | — |
| Day 2 Refrigerated | 40 | 50 | 10 | 90 | — | — | — |
| Day 3 Ambient | 40 | 50 | 15 | 70 | 38 | 41 | 39 |
| Day 3 Refrigerated | 40 | 50 | 15 | 90 | 38 | 40 | 43 |

Figure 31A:
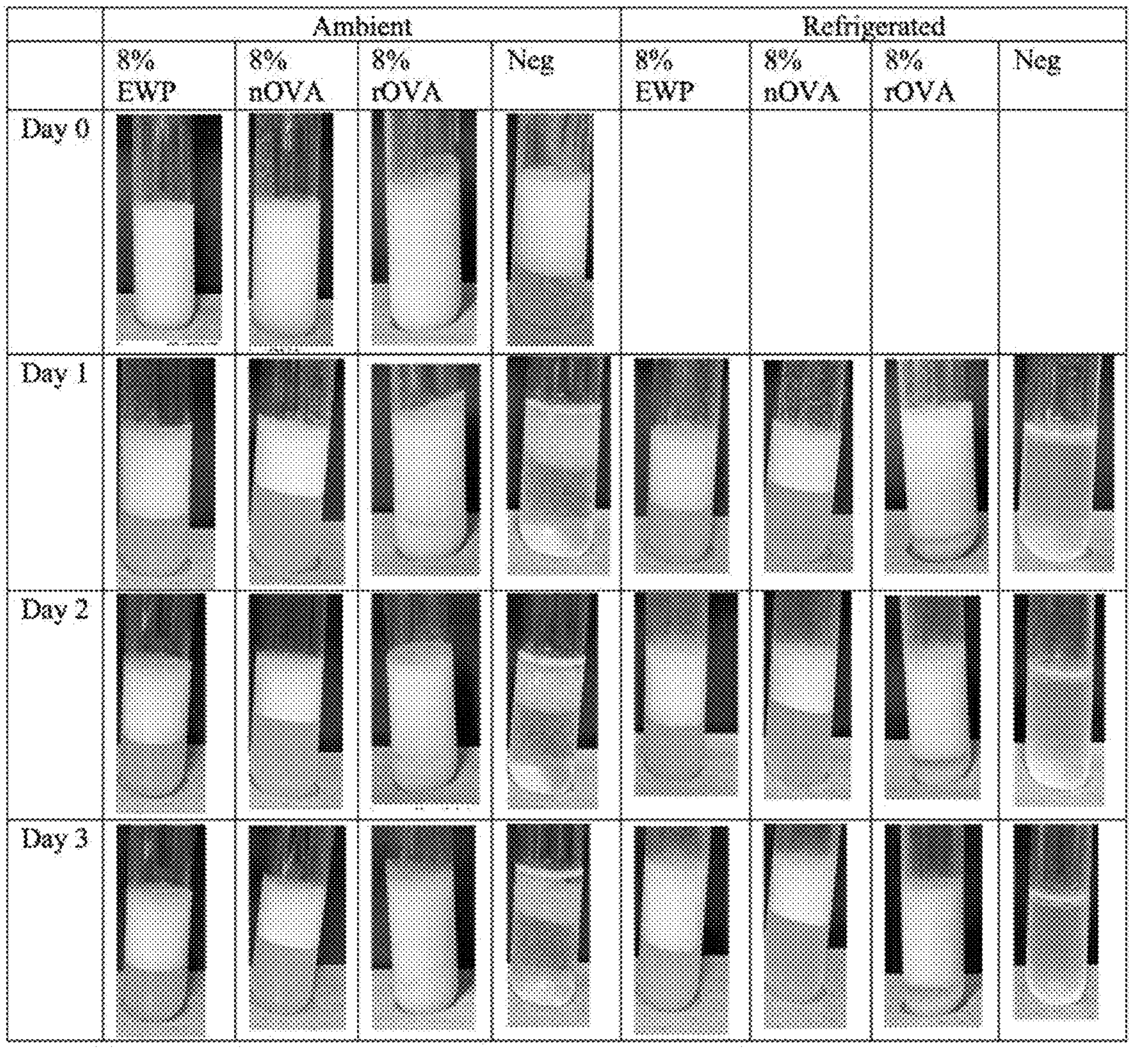
Figure 33:
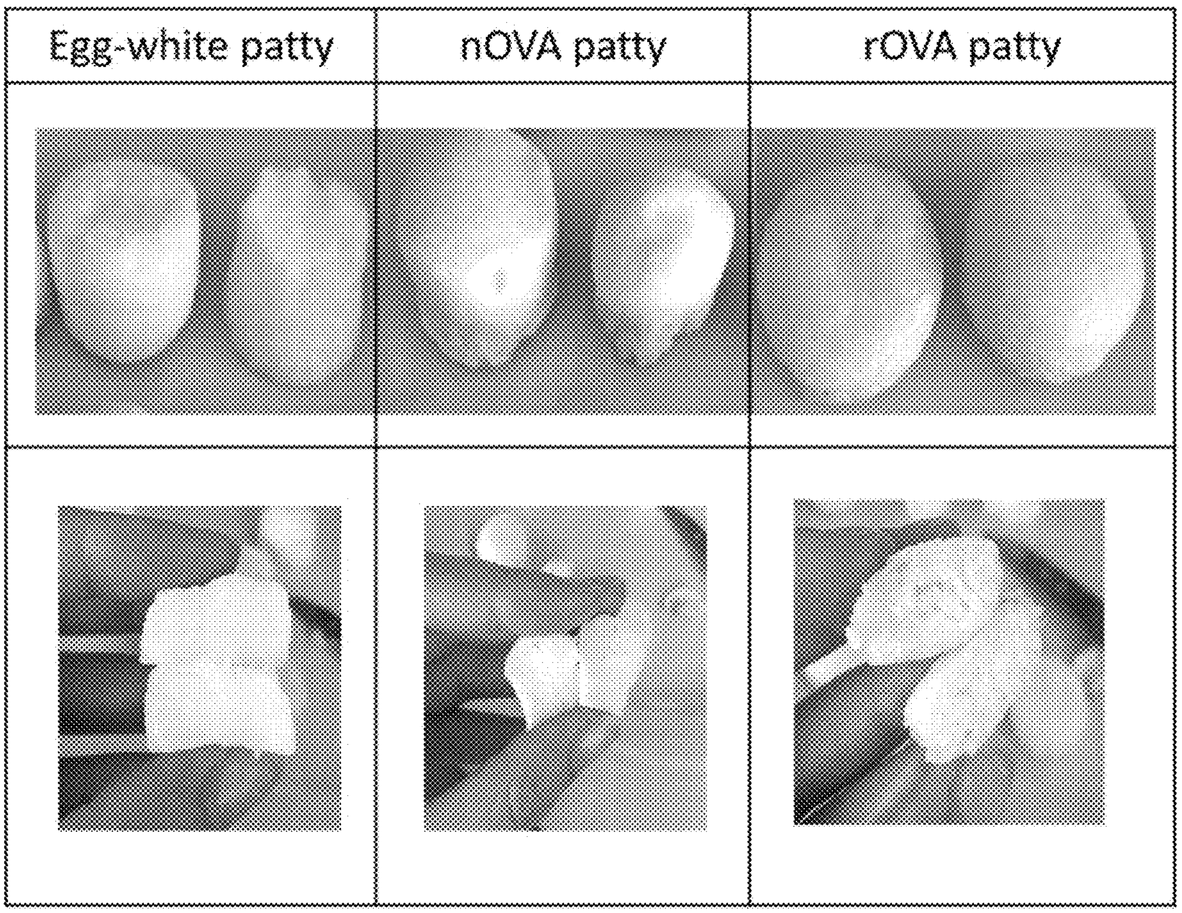
FIG. 33 illustrates egg patties made using nOVA, rOVA and egg white proteins.

Acidic pH results: On day 0, all samples except the negative control showed good emulsification properties. Thereafter, the samples were stored in ambient temperature or refrigerated temperatures to monitor stability. Samples with egg white protein (EWP) had a slight yellow appearance and separated on day 1 for both conditions of storage. Control samples separated immediately on day 1 for both conditions of storage. Eight percent nOVA also exhibited emulsion breakage on day 1, however, recombinant OVA exhibited good emulsion properties with only minimally noticeable separation. The emulsion remained equally stable until day 3 without any further separation observed. Overall, 8% rOVA performed significantly better than 8% nOVA. rOVA also exhibited better emulsion stability than EWP. Photographs of the samples are shown in FIG. 31A.

Neutral pH results: Emulsion stability of rOVA was comparable to egg white proteins on day 0 and 3. Neither rOVA, nor egg white proteins were able to maintain emulsion stability over three days in refrigerated form or at ambient temperature. Photographs of the samples are shown in FIG. 31B.

Example 44: Foaming Functionality

In this example, the foaming functionality of rOVA was observed in an alcohol-based drink (e.g., such as a Whiskey Sour which includes a foaming agent).

Bourbon whisky, fresh lemon juice, simple syrup, and protein of interest were combined in a cocktail shaker and shaken for 15 seconds. Ice was added to the cocktail shaker and the mixture shaken for another 15 seconds. Shaken mixture was poured into a glass and observed.

Formulations: Control formulation included natural egg white. The negative formulation was prepared without any egg white.

TABLE 68

| List of ingredients and the formulations | | |
|---|---|---|
| Ingredient | Ounces | mL |
| Bourbon Whiskey | 2 | 59 |
| Fresh Lemon Juice | 0.75 | 22.125 |
| Simple syrup | 0.5 | 14.75 |
| Egg white | 0.5 | 14.75 |
| Total | 3.75 | 110.625 |

The proteins of interest were used to substitute the natural egg white protein and the following formulations were used:

TABLE 69

| Protein formulation | | |
|---|---|---|
| Ingredients | 7% rOVA | 12% rOVA |
| rOVA | 8.40 | 14.41 |
| Water | 91.60 | 85.59 |
| Total | 100 | 100 |

The pH of the rOVA solutions was adjusted to pH 6 (with 1M NaOH) to provide optimal foaming performance.

Original recipe used 0.5 oz egg white and the same proportion was used for recombinant protein testing. rOVA at 7% and 12% foamed well but no significant difference was observed between the two levels.

Photographs of craft cocktails prepared with the samples are shown in FIG. 32.

Example 45: Burger Binding

In this example, texture analysis was used to observe hardness attributes along with cohesiveness, springiness and chewiness of both raw and cooked vegan burgers made with rOVA and other binding agents.

The objective of this example was to evaluate the binding functionality of rOVA. Parameters such as appearance (how well the burger held together), textural aspects such as cohesiveness, springiness, chewiness and hardness were evaluated and compared against egg white, nOVA and commercially used non-protein binder.

Materials: Dry base ingredients: Extruded soy protein 1 (Arcon T U172 (158172)), Extruded soy protein 2 (Arcon T Caramel Crumble 240 (158225)), Extruded soy protein 3 (Arcon T U-118 (158118)), Binding agent/Protein of interest. Wet ingredients: Canola oil, coconut oil, Water. Binding agents of interest to be tested: Natural egg white protein ("NEW"), Methylcellulose ("MC"), nOVA 90% Protein content, rOVA (chicken) 92% Protein Content.

Mixing: Extruded soy protein 1 was mixed with ⅓rd amount of water for 2.5 min. The remaining extrudated samples and water were combined with the previous mix for another 7.5 min. The blend was chilled in the freezer for 10 minutes. The binding agent was added and mixed in for 30 seconds. Canola and coconut oil blend was added and mixed for 30 seconds. The mixture was chilled in the freezer for 5 minutes, then molded into 5 g burger forms and frozen.

Cooking: The frozen burger samples were thawed in the refrigerator to a 4° C. internal temperature. The samples were cooked on a griddle set at 350° F. for 5-6 min until an internal temperature of 165° F. was reached.

Formulations: List of ingredients and their proportions used in the control and other experimental burger samples, with specific protein of interest, are presented below in Table 70.

TABLE 70

List of Ingredients.

| Ingredients | Control-Methylcellulose % | Natural Egg White % | nOVA % | rOVA % |
|---|---|---|---|---|
| Extruded soy protein 1 | 5 | 5 | 5 | 5 |
| Extruded soy protein 2 | 13 | 13 | 13 | 13 |
| Extruded soy protein 3 | 8 | 8 | 8 | 8 |
| Binding agent | 0.7 | 25 | 5 | 5 |
| Canola oil | 12 | 12 | 12 | 12 |
| Coconut oil | 6.5 | 6.5 | 6.5 | 6.5 |
| Water | 54.8 | 30.5 | 50.5 | 50.5 |
| Total | 100.00 | 100.00 | 100.00 | 100.00 |

Texture Analysis: Texture analysis was performed to analyze the attributes of vegan burgers against the control. Texture analysis was used to quantify hardness attributes along with cohesiveness, springiness and chewiness.

The textural properties of vegan burgers were measured using a CT3 Brookfield Texture Analyzer (1500 g load cell). The test parameters were used are presented in Table 29.

TABLE 71

Test parameters used for three-point bend test to measure hardness of vegan burgers using a CT3 Brookfield Texture Analyzer

| | |
|---|---|
| Test type | Texture Profile Analysis (TPA) |
| Probe | TA52 (Mohrs shear blade) |
| Base Fixture | TA-Base Fixture |
| Target type | Distance |
| Target value | 5 mm |
| Trigger load | 15 g |
| Test speed | 0.5 mm/s |
| Post test speed | 4.5 mm/s |
| Textural properties | Hardness 1 (g), Hardness 2 (g), Cohesiveness, Springiness, Chewiness |
| Average Sample dimensions (Diameter*Height) | 25 mm *12.5 mm |

The frozen samples were thawed in the refrigerator to a 4° C. internal temperature and tested for raw binding. The thawed samples were also cooked and used to measure the cooked binding values.

Findings for raw binding: In terms of hardness, rOVA was significantly higher than methylcellulose and natural egg white and no difference was observed between nOVA and rOVA. All the samples were similar in terms of cohesiveness and springiness. rOVA exhibited significantly more chewiness than methylcellulose and natural egg white. Results are presented in Table 72.

Table 72: Texture (TPA) results for raw binding in terms of hardness, cohesiveness, springiness and chewiness. Data that does not share the same letter within a specific attribute is significantly different from each other ($p<0.05$). The results were averaged over n=3.

TABLE 72

| Texture (TPA) results for raw binding in vegan burgers | | | | | |
|---|---|---|---|---|---|
| Sample | Hardness 1 (g) | Hardness 2 (g) | Cohesiveness | Springiness | Chewiness |
| methylcellulose 0.7% | 58.27 ± 10.17 (a) | 40.53 ± 9.59 (a) | 0.12 ± 0.07 (a) | 0.42 ± 0.05 (a) | 3.0 ± 1.56 (a) |
| natural egg white 25% | 45.27 ± 9.45 (a) | 33.20 ± 5.02 (a) | 0.21 ± 0.03 (a) | 0.34 ± 0.1 (a) | 3.33 ± 1.26 (ab) |
| nOVA 5% | 81 ± 4.39 (ab) | 44.27 ± 6.45 (a) | 0.18 ± 0.01 (a) | 0.46 ± 0.04 (a) | 6.93 ± 1.12 (bc) |
| rOVA 5% | 145.07 ± 52.85 (b) | 62.80 ± 21.70 (a) | 0.13 ± 0.01 (a) | 0.47 ± 0.04 (a) | 8.23 ± 1.86 (c) |

Findings for cooked binding: rOVA exhibited significantly higher hardness values than methylcellulose and natural egg white. All the samples were similar to each other in terms of cohesiveness. For springiness, methylcellulose samples exhibited significantly lower values than natural egg white, nOVA and rOVA. Both nOVA and rOVA samples exhibited higher values chewiness values than methylcellulose. Results are presented in Table 31.

Table 73: Texture (TPA) results for cooked binding in terms of hardness, cohesiveness, springiness and chewiness. Data that does not share the same letter within a specific attribute is significantly different from each other ($p<0.05$). The results are averaged over n=3.

Mixing: The dry ingredients from Table 74, except sodium alginate were mixed together. The tapioca syrup, sodium alginate and lemon-yellow color were blended separately in water. All ingredients were mixed with oil and vortexed till all ingredients are dissolved. The mixture was allowed to equilibrate by allowing to stand for 10 minutes.

Cooking: A griddle was used to cook the samples. The griddle was set to 250° F. and ½ inch diameter ring molds were used to cook samples. The molds were sprayed with oil and the mixture was poured into the molds. ½ ice cubes were added to the molds to generate steam. The patties were allowed to cook and another ice cube was added. The patties were cooked for 5 minutes and the lid was opened. The ring molds with the cooked samples to serving plates.

TABLE 73

| Texture (TPA) results for cooked binding in vegan burgers | | | | | |
|---|---|---|---|---|---|
| Sample | Hardness 1 (g) | Hardness 2 (g) | Cohesiveness | Springiness | Chewiness |
| Methylcellulose 0.7% | 281.73 ± 154.7 (a) | 215.80 ± 161.84 (a) | 0.37 ± 0.07 (a) | 0.69 ± 0.05 (a) | 76.03 ± 55.15 (a) |
| Natural egg white 25% | 390.33 ± 158.15 (a) | 304.27 ± 55.83 (a) | 0.57 ± 0.11 (a) | 0.80 ± 0.03 (b) | 178.07 ± 65.85 (ab) |
| nOVA 5% | 617.07 ± 197.49 (ab) | 464.07 ± 135.33 (ab) | 0.56 ± 0.08 (a) | 0.81 ± 0.05 (b) | 285.5 ± 104.72 (bc) |
| rOVA 5% | 922.0 ± 96.71 (b) | 1712.33 ± 78.23 (b) | 0.51 ± 0.08 (a) | 0.86 ± 0.02 (b) | 398.13 ± 44.37 (c) |

Example 46: Egg White Patty

In this example, the suitability of inclusion of native and recombinant protein OVA in an egg white patty application as an example of cooked egg systems was evaluated. Parameters such as nutritional value of fresh egg white when substituted by OVA and effects on texture (in terms of functionality) and appearance were evaluated.

TABLE 74

| List of ingredients used to prepare egg white patties<br>Ingredients |
|---|
| Dry base ingredients: Gellan gum (LT100-Modernist pantry), baking powder (Trader Joe's), salt (The spice club), Sodium Alginate (CP Kelco), Psyllium (CFF) |
| Wet ingredients: Coconut oil, canola oil (Crisco), tapioca syrup (Ciranda), pineapple yellow AET color (Sensient), water |
| Proteins of interest to be tested: |
| Natural egg white |
| nOVA (Neova Technologies)-90% Protein content |
| rOVA (Clara Foods: 008USU_CW)-86.1% Protein Content |

The textural properties of egg white patties were measured using a CT3 Brookfield Texture Analyzer (1500 g load cell). A TPA compression test was used to compress and measure the hardness of egg white patties. Four samples from each set were analyzed to compare. The following test parameters were used:

TABLE 75

| Test parameters used for TPA test to measure textural properties of patty: | |
|---|---|
| Test type | TPA |
| Test parameters | 50% deformation |
| Probe | TA4 (38 mm diameter cylinder) |
| Base Fixture | Base fixture |
| Trigger load | 5 g |
| Test speed | 2 mm/s |
| Textural properties | Hardness (g), Adhesiveness, Cohesiveness, Chewiness, Gumminess |
| Sample dimension (Height) * (Diameter) | ~12 mm * 12 mm |

Results:

TABLE 76

| Texture Analyzer results | | | | | | | |
|---|---|---|---|---|---|---|---|
| Sample/ Attribute | Hardness 1 (g) | Hardness 2 (g) | Adhesiveness | Fracturability | Cohesiveness | Gumminess | Chewiness |
| Natural egg white | 726.3 ± 6.65 a | 652 ± 15.56 a | 0.375 ± 0.11 a | 726.7 ± 7.21 a | 0.765 ± 0.05 a | 555.1 ± 44.55 a | 33.75 ± 0.05 ab |
| nOVA | 817.6 ± 174.51 a | 761.3 ± 171.54 a | 0.315 ± 0.02 a | 817.6 ± 174.51 a | 0.71 ± 0.01 a | 583.55 ± 133.86 a | 50.95 ± 9.40 a |
| rOVA | 869.9 ± 58.12 a | 747.1 ± 50.49 a | 0.185 ± 0.16 a | 869.9 ± 58.12 a | 0.55 ± 0.04 a | 484.65 ± 3.46 a | 25.53 ± 3.82 b |

Data that does not share the same letter for a given attribute is significantly different from each other ($p < 0.05$)

Data that does not share the same letter for a given attribute is significantly different from each other ($p<0.05$)

Findings: All the samples, natural egg white, nOVA and rOVA were statistically similar in terms of hardness, adhesiveness, fracturability, cohesiveness and gumminess. For chewiness, natural egg white patty was similar to nOVA and rOVA individually, however, nOVA and rOVA were statistically different from each other. nOVA had higher chewiness values as compared to other samples. Overall, OVA protein, in both native and recombinant form, provides a good substitute to natural egg white in a non-animal patty (cooked egg application). rOVA liquid formulation was thicker in viscosity than nOVA sample and egg white sample. Results are shown in FIG. 34.

Example 47: Meringue

The functionality of rOVA in a meringue food system compared to fresh egg white was evaluated in this example.

Material:

rOVA (Lyo 008; pH: 6.7 as is)

Fresh egg white (pH: 9 as is)

Sugar (C&H Sugar, Pure Cane, Granulated white)

Xanthan—pre hydrated Ticaxan—Tic Gums

TEC (Triethyl Citrate)

SLS (Sodium lauryl sulfate)

Kitchen Aid, Classic Plus

Breville BOV800XL Smart Electric Oven

Method: Egg white was separated from the egg yolk carefully at the refrigerator temperature and let egg whites get to the room temperature before whipping. rOVA powder, SLS, Xanthan gum and TEC were reconstituted in DI water at the room temperature. The mixture was whipped for 30 seconds at speed 5 (to obtain a homogeneous solution), then mixed at speed 8 until soft peaks formed. While beating constantly, sugar was added gradually and beat at high speed after each addition until sugar was dissolved before adding the next. Mixing was continued until a glossy and firm peak was formed. Oven (Breville BOV800XL Smart Electric Oven) was heated to 200° F.; meringues were baked for 70 minutes (or until light and crisp but not brown. After cooling, meringues were stored in an airtight container. Whipping time to produced firm foam for each protein solution was recorded.

TABLE 77

| Formulations | | | | | |
|---|---|---|---|---|---|
| Fresh egg white | | rOVA8.3% + SLS + Xanthan gum | | rOVA8.3% + TEC + Xanthan gum | |
| Ingredients | Percentage % | Ingredients | Percentage % | Ingredients | Percentage % |
| Fresh egg white | 70.6 | rOVA | 9.5 | rOVA | 9.5 |
| Sugar | 29.4 | Sugar | 29 | Sugar | 29 |
| — | — | Water | 61.3 | Water | 61.3 |
| — | — | Xanthan gum | 0.1 | Xanthan gum | 0.1 |
| — | — | SLS | 0.1 | TEC | 0.048 |
| Total weight | 100 | Total weight | 100 | Total weight | 100 |

TABLE 78

| Physical parameters of meringues | | | |
|---|---|---|---|
| Parameter | Fresh egg white | rOVA 8.3% + SLS + Xanthan gum | rOVA 8.3% + TEC + Xanthan gum |
| weight loss % | * 60 ± 2 | 60 ± 1.1 | 58 ± 2.5 |
| volume (ml) | 7 ± 1.5 | 7.3 ± 1.5 | 7.9 ± 2 |
| foam density (g/ml) | 0.19 | 0.2 | 0.22 |
| Meringue density (g/ml) | 0.056 ± 0.014 | 0.074 ± 0.02 | 0.064 ± 0.018 |

* Average ± standard deviation (n = 6)

Figure 35:
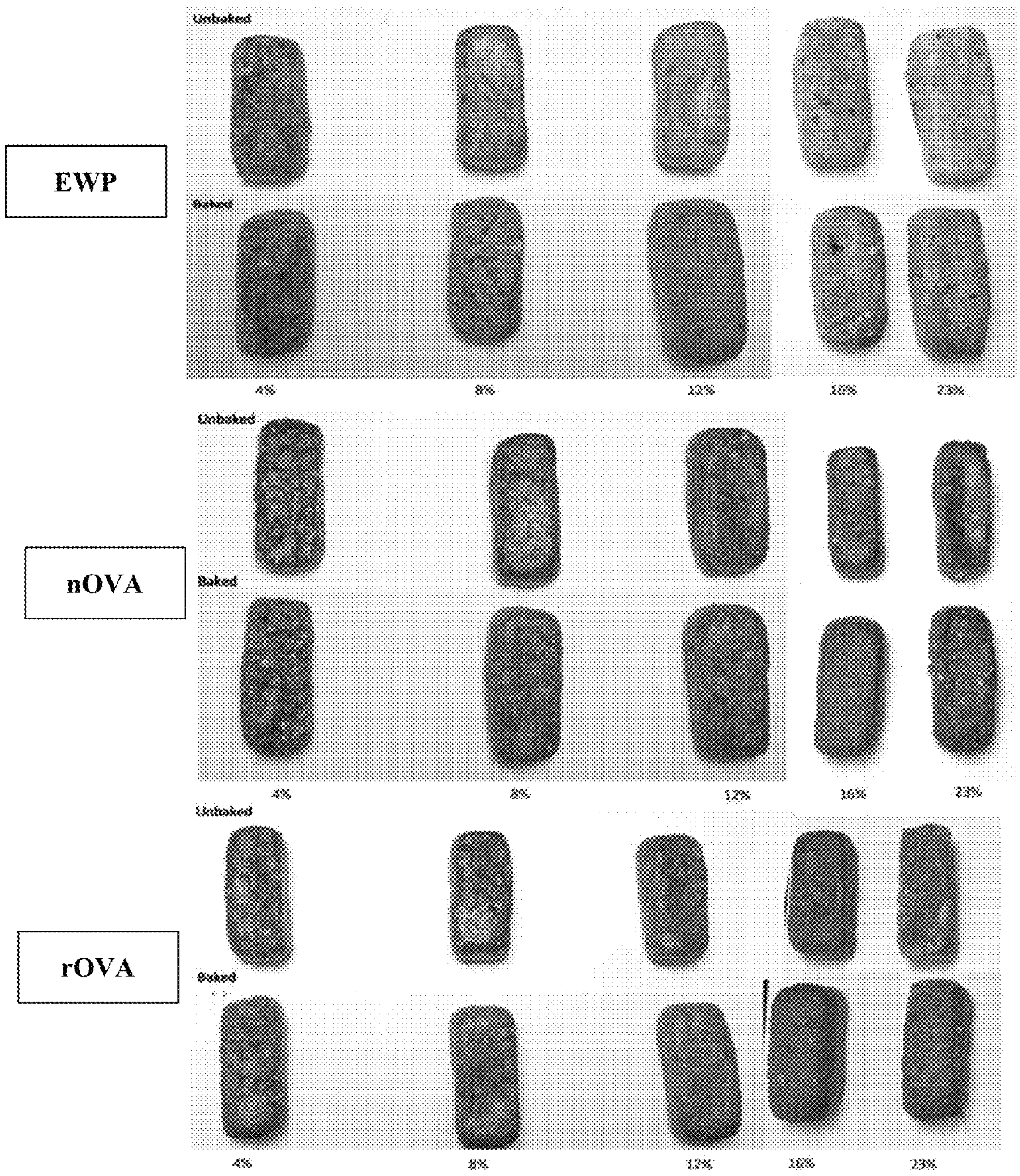
FIG. 35 illustrates protein bars made with egg white proteins (EWP), nOVA and rOVA at different protein inclusion levels.

Findings: rOVA produces meringue that is comparable to fresh egg white sample in terms of physical parameters. The appearance of rOVA meringues were visually better than fresh egg white controls. The ridges were more well defined in rOVA meringue and the samples were whiter compared to the fresh egg white control. Results are shown in FIG. 35.

Example 48: Effect of pH on Gelation Characteristics

The effects of different pH conditions on the gelation characteristics of rOVA compositions in comparison to fresh egg white was evaluated in this example.

TABLE 79

| Materials: Ingredients |
|---|
| DI water, 1N Hydrochloric acid, 1N Sodium hydroxide, 3N Sodium hydroxide |
| Proteins of interests |
| rOVA (008USU_CW-86.1% protein content) |
| Egg white protein (Modernist pantry-85.71% protein content) |

Method:

7% protein solution was prepared for both rOVA and egg white protein

Based on the native pH, the pH of the solution was adjusted to pH 3, 4, 5, 6 with 1N HCl pH was also adjusted to the alkaline spectrum of pH 7, 8, 9, 10, 11 and 12 with microliter amounts of 1N and 3N sodium hydroxide All solutions were gelled at 85° C. for 5 min and then cooled at room temperature All the gels/solutions were taken out and evaluated visually for gel characteristics

TABLE 80

Results: pH was recorded as follows before any pH adjustments:

| Sample | pH |
|---|---|
| 7% EWP | 6.98 |
| 7% rOVA | 6.82 |

Findings: Egg white protein exhibited gelling properties at all pH's while forming firm gels at pH 4-10. The solutions for both EWP and rOVA at pH 11 and pH 12 were clear liquids, however, only EWP gelled into clear gels, while rOVA remained in solution at pH 11 and 12. rOVA 7% solutions gelled at pH 6, 7, 8 and 9. Dramatic increase in viscosity was observed for rOVA solutions at pH 5 and lower. All EWP gels had a strong egg-like smell, while for rOVA, only solutions/gels for pH 9-12 had an egg-like smell. pH 3.5-8 for rOVA did not have any characteristic smell properties. EWP and rOVA both gelled at pH 6-9; however, EWP gels were stronger and firmer than rOVA gels. Overall, although EWP exhibited better gelling properties than rOVA over a broader pH spectrum, it came with the presence of a strong egg-like smell. rOVA provided gelling properties in the pH 6-8 range and provided sensory neutrality (e.g., no smell). At pH 8 and 9, rOVA provided clear firm gel which can have unique value proposition in embodiments requiring transparent visual appearance.

Example 49: Protein Bars rOVA was used as a protein source in a protein bar application and compared to eff white proteins and nOVA.

Preparation Instructions:

In a small mixer, dates, nuts were chopped/blended. Dates, nuts, cocoa and the protein of interest were added in a mixing bowl till a homogenous mixture was formed. The mixture was split into two equal parts and one part was tested as the unbaked version. The other half was baked in an oven at 350 F for 10 minutes.

TABLE 81

List of Ingredients and their proportions used in control formulation:

| Ingredients | Amount (%) |
|---|---|
| Dates | 78.53 |
| Nuts | 17.47 |
| Cocoa | 4 |
| Total | 100 |

For formulations with inclusion of protein powders, the dates and nuts inclusion was reduced, however keeping the dates: nuts ratio constant at a 4.5 level.

TABLE 82

List of Ingredients and their proportions used in egg white protein formulations:

| Ingredients | 4% protein | 8% protein | 12% protein | 16% protein | 23% protein |
|---|---|---|---|---|---|
| Dates | 74.73 | 70.93 | 67.13 | 63.27 | 56.62 |
| Nuts | 16.60 | 15.73 | 14.87 | 14.07 | 12.54 |
| Cocoa | 4 | 4 | 4 | 4 | 4 |
| Protein powder | 4.67 | 9.33 | 14 | 18.67 | 26.84 |
| Total | 100 | 100 | 100 | 100 | 100 |

TABLE 83

List of Ingredients and their proportions used in nOVA formulations:

| Ingredients | 4% protein | 8% protein | 12% protein | 16% protein | 23% protein |
|---|---|---|---|---|---|
| Dates | 75.02 | 71.25 | 67.67 | 64.01 | 57.72 |
| Nuts | 16.54 | 15.86 | 13.33 | 14.20 | 12 |
| Cocoa | 4 | 4 | 4 | 4 | 4 |
| Protein powder | 4.45 | 8.89 | 15 | 17.78 | 28.75 |
| Total | 100 | 100 | 100 | 100 | 100 |

TABLE 84

List of Ingredients and their proportions used in rOVA formulations:

| Ingredients | 4% protein | 8% protein | 12% protein | 16% protein | 23% protein |
|---|---|---|---|---|---|
| Dates | 74.60 | 70.66 | 66.76 | 62.86 | 55.92 |
| Nuts | 16.6 | 15.73 | 14.83 | 13.93 | 12.52 |
| Cocoa | 4 | 4 | 4 | 4 | 4 |
| Protein powder | 4.8 | 9.60 | 14.40 | 19.21 | 27.57 |
| Total | 100 | 100 | 100 | 100 | 100 |

Texture analysis: The textural properties of the protein bar (baked and unbaked) were measured using a CT3 Brookfield Texture Analyzer (1500 g load cell). A three point bend test was used to snap, bend and measure the hardness of the protein bar. One sample for each protein inclusion level was analyzed. The following test parameters were used:

TABLE 85

Test parameters used for three-point bend test to measure hardness of crackers using a CT3 Brookfield Texture Analyzer

| | |
|---|---|
| Test type | Rupture test |
| Probe | TA7 blade |
| Base Fixture | TA-TPB |
| Trigger load | 5 g |
| Correction load | 30 g |
| Test speed | 3 mm/s |
| Sample rate | 30 points/sec |
| Distance between support arms | 2.5 cm |
| Textural properties | Hardness (g) |

TABLE 86

Texture analysis test results for unbaked protein bar samples: (n = 1)

| | Hardness (g) for protein inclusion levels | | | | | |
|---|---|---|---|---|---|---|
| Sample | Control (0%) | 4% | 8% | 12% | 16% | 23% |
| Egg white protein | 113.9 | 168.8 | 319.2 | 422.8 | 475 | 597.8 |
| nOVA | | 204.8 | 231 | 408 | 420.05 | 443.8 |
| rOVA | | 182 | 222.6 | 314.4 | 418 | 689.8 |

TABLE 87

Texture analysis test results for baked protein bar samples: (n = 1)

| | Hardness (g) for protein inclusion levels | | | | | |
|---|---|---|---|---|---|---|
| Sample | Control (0%) | 4% | 8% | 12% | 16% | 23% |
| Egg white protein | 902.7 | 1499.6 | 1484 | 1561 | 1553.4 | 1609.4 |
| nOVA | | 1505.4 | 1523.8 | 1542.2 | 1585 | 1662.8 |
| rOVA | | 1485.2 | 1530 | 1561 | 1522.4 | 1552.8 |

For the unbaked samples, the control sample with no protein had the lowest hardness values. For all the proteins of interest, EWP, nOVA and rOVA, hardness values increased with increasing protein content. Egg white protein samples had higher hardness values than nOVA and rOVA samples at 8, 12, 16 and 23%. nOVA samples had minimal increase in hardness from 12-23% protein inclusion. nOVA and rOVA sample hardness was comparable at 4, 8, 12 and 16%. However, rOVA had a much higher hardness value for 23% protein inclusion.

Overall, the hardness of the baked samples was much higher than the unbaked samples. The control sample had the lowest hardness. All the samples with protein inclusions were much harder even at lower protein inclusion rates. The upper threshold limit (load cell) for the TA unit is 1500 g. All the baked protein samples reached the threshold value making it difficult to identify subtle differences between the samples. nOVA and rOVA sample hardness was comparable at 4, 8, 12 and 16% for both, unbaked and baked protein bar. Photos are shown in FIG. 36.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

INCORPORATION BY REFERENCE

All publications, patents, and patent applications mentioned in this specification are herein incorporated by reference to the same extent as if each individual publication, patent, or patent application was specifically and individually indicated to be incorporated by reference.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

What is claimed is:

1. An ingredient composition for producing a food item, the ingredient composition comprising:

recombinant ovomucoid protein (rOVD); and one or more additional consumable ingredients;

wherein:

the rOVD comprises at least one glycosylated asparagine residue, the rOVD is substantially devoid of N-linked mannosylation, and wherein:

the rOVD is capable of forming a clear liquid at a pH of from about 2.5 to about 6, and/or the clear liquid comprising the rOVD shows substantially higher liquid clarity as compared to a whey protein fluid at a pH of from about 2 to about 6.

2. The ingredient composition of claim 1, wherein the rOVD comprises a polypeptide represented by an amino acid sequence selected from the group consisting of SEQ ID NO. 1-44 or an amino acid sequence having at least 97% sequence identity with SEQ ID NO. 1-44.

3. The ingredient composition of claim 1, wherein the rOVD is expressed by a microbial organism selected from a *Pichia* species, a *Saccharomyces* species, a *Trichoderma* species, a *Pseudomonas* species, an *Aspergillus* species, and an *E. coli* species.

4. The ingredient composition of claim 1, wherein the concentration of rOVD is from about 0.1% w/v to about 30% w/v in an aqueous liquid, at a pH of from about 2.5 to about 6, and at room temperature.

5. The ingredient composition of claim 4, wherein the concentration of rOVD is about 10% w/v or less or about 20% w/v or less.

6. The ingredient composition of claim 4, wherein the composition is substantially optically clear.

7. The ingredient composition of claim 1, wherein the rOVD is substantially a full-length protein.

8. An ingredient composition for producing a food item, the ingredient composition comprising:

a recombinant ovalbumin protein (rOVA); and one or more additional consumable ingredients;

wherein:

the pH of the ingredient composition, when solubilized in an aqueous solution, is above 3.5, and the ingredient composition provides to the food item at least one characteristic that is at least equivalent to a same characteristic in an otherwise similar food item that comprises native egg white and does not comprise rOVA.

9. The ingredient composition of claim 8, wherein the rOVA has a glycosylation, acetylation, or phosphorylation pattern different from wildtype OVA.

10. The ingredient composition of claim 8, wherein the rOVA may comprise one or more N-linked glycosylation sites having mannose linked to an N-acetyl glucosamine, and wherein the N-linked glycosylation sites lack galactose.

11. The ingredient composition of claim 8, wherein the amino acid sequence of the rOVA lacks an N-terminal methionine.

12. The ingredient composition of claim 8, wherein a glycosylation pattern of the rOVA is devoid of N-linked galactose units.

13. The ingredient composition of claim 8, wherein the ingredient composition does not comprise any natural egg white proteins or a natural egg white.

14. The ingredient composition of claim 8, wherein the rOVA comprises an amino acid sequence of a duck OVA, an ostrich OVA, or a chicken OVA.

15. The ingredient composition of claim 8, wherein the rOVA is expressed by a yeast host cell.

16. The ingredient composition of claim 15, wherein the host cell is selected from a *Pichia* species, and a *Saccharomyces* species.

17. The ingredient composition of claim 8, wherein the rOVA is expressed by a fungal host cell.

18. The ingredient composition of claim 17, wherein the host cell is selected from a *Trichoderma* species, and an *Aspergillus* species.

19. The ingredient composition of claim 8, wherein the rOVA comprises a polypeptide represented by an amino acid sequence of SEQ ID NO: 2 or an amino acid sequence with at least 97% identity with one of SEQ ID NO: 2.

20. The ingredient composition of claim 8, further comprising at least one plant protein selected from a group consisting of: a soy protein, a nut protein, a pea protein, a lentil protein, an almond protein, an oat protein, a flax seed protein, or a pulse protein.

21. The ingredient composition of claim 8, wherein the composition further comprises at least one starch selected from a group consisting of: corn, potato, sorghum, and arrowroot.

22. The ingredient composition of claim 8, wherein the composition further comprises at least one flour selected from a group consisting of: wheat flour, rice flour, corn flour, millet flour, spelt flour, and oat flour.

23. The ingredient composition of claim 8, wherein the rOVA provides to the food item a foam capacity higher than a foam capacity provided by native egg white in a similar food item.

24. A food item made with the ingredient composition of claim 8.

25. The food item of claim 24, further comprising at least one characteristic equivalent to or better than a similar food item made with a natural egg white or a natural whole egg, wherein the characteristic is selected from the group consisting of: hardness, cohesiveness, springiness, and chewiness foam capacity, foam stability, fluffing, clarification, resilience, hardness, chewiness, and gelling.

26. The food item of claim 24, wherein rOVA is present in the food item in an amount from about 2% to about 15% (weight rOVA/weight food item) before or after preparation of the food item.

27. The food item of claim 24, wherein rOVA is present in the food item in an amount less than 8% (weight rOVA/weight food item) before or after preparation of the food item.

28. The food item of claim 24, wherein the food item is a meat-based food item for which the ingredient composition binds together meat components, the meat-based food item further comprising:

one or more fats or oils;

one or more extruded proteins;

at least one starch; and at least one gum.

29. The food item of claim 24, wherein the food item is a baked food item that further comprises:

lecithin, a starch or a gum, and baking powder.

30. The food item of claim 29, wherein the food item comprises from about 1% to 5% (w/w) rOVA.

* * * * *

SEQUENCE LISTING

```
Sequence total quantity: 135
SEQ ID NO: 1            moltype = AA  length = 186
FEATURE                 Location/Qualifiers
source                  1..186
                        mol_type = protein
                        organism = Gallus gallus
SEQUENCE: 1
AEVDCSRFPN ATDKEGKDVL VCNKDLRPIC GTDGVTYTND CLLCAYSIEF GTNISKEHDG  60
ECKETVPMNC SSYANTTSED GKVMVLCNRA FNPVCGTDGV TYDNECLLCA HKVEQGASVD  120
KRHDGGCRKE LAAVSVDCSE YPKPDCTAED RPLCGSDNKT YGNKCNFCNA VVESNGTLTL  180
SHFGKC                                                            186

SEQ ID NO: 2            moltype = AA  length = 186
FEATURE                 Location/Qualifiers
source                  1..186
                        mol_type = protein
                        organism = Gallus gallus
SEQUENCE: 2
AEVDCSRFPN ATDMEGKDVL VCNKDLRPIC GTDGVTYTND CLLCAYSVEF GTNISKEHDG  60
ECKETVPMNC SSYANTTSED GKVMVLCNRA FNPVCGTDGV TYDNECLLCA HKVEQGASVD  120
```

```
KRHDGGCRKE LAAVSVDCSE YPKPDCTAED RPLCGSDNKT YGNKCNFCNA VVESNGTLTL  180
SHFGKC                                                             186

SEQ ID NO: 3           moltype = AA  length = 186
FEATURE                Location/Qualifiers
source                 1..186
                       mol_type = protein
                       organism = Gallus gallus
SEQUENCE: 3
AEVDCSRFPN ATDMEGKDVL VCNKDLRPIC GTDGVTYTND CLLCAYSVEF GTNISKEHDG  60
ECKETVPMNC SSYANTTSED GKVMVLCNRA FNPVCGTDGV TYDNECLLCA HKVEQGASVD  120
KRHDGGCRKE LAAVSVDCSE YPKPDCTAED RPLCGSDNKT YMNKCNACNA VVESNGTLTL  180
SHFGKC                                                             186

SEQ ID NO: 4           moltype = AA  length = 210
FEATURE                Location/Qualifiers
source                 1..210
                       mol_type = protein
                       organism = Gallus gallus
SEQUENCE: 4
MAMAGVFVLF SFVLCGFLPD AAFGAEVDCS RFPNATDKEG KDVLVCNKDL RPICGTDGVT  60
YTNDCLLCAY SIEFGTNISK EHDGECKETV PMNCSSYANT TSEDGKVMVL CNRAFNPVCG  120
TDGVTYDNEC LLCAHKVEQG ASVDKRHDGG CRKELAAVSV DCSEYPKPDC TAEDRPLCGS  180
DNKTYGNKCN FCNAVVESNG TLTLSHFGKC                                   210

SEQ ID NO: 5           moltype = AA  length = 210
FEATURE                Location/Qualifiers
source                 1..210
                       mol_type = protein
                       organism = Gallus gallus
SEQUENCE: 5
MAMAGVFVLF SFVLCGFLPD AVFGAEVDCS RFPNATDMEG KDVLVCNKDL RPICGTDGVT  60
YTNDCLLCAY SVEFGTNISK EHDGECKETV PMNCSSYANT TSEDGKVMVL CNRAFNPVCG  120
TDGVTYDNEC LLCAHKVEQG ASVDKRHDGG CRKELAAVSV DCSEYPKPDC TAEDRPLCGS  180
DNKTYGNKCN FCNAVVESNG TLTLSHFGKC                                   210

SEQ ID NO: 6           moltype = AA  length = 208
FEATURE                Location/Qualifiers
source                 1..208
                       mol_type = protein
                       organism = Gallus gallus
SEQUENCE: 6
MAMAGVFVLF SFVLCGFLPD AAFGAEVDCS RFPNATDKEG KDVLVCNKDL RPICGTDGVT  60
YTNDCLLCAY SIEFGTNISK EHDGECKETV PMNCSSYANT TSEDGKVMVL CNRAFNPVCG  120
TDGVTYDNEC LLCAHKVEQG ASVDKRHDGG CRKELAAVDC SEYPKPDCTA EDRPLCGSDN  180
KTYGNKCNFC NAVVESNGTL TLSHFGKC                                     208

SEQ ID NO: 7           moltype = AA  length = 186
FEATURE                Location/Qualifiers
source                 1..186
                       mol_type = protein
                       organism = Gallus gallus
SEQUENCE: 7
AEVDCSRFPN ATDKEGKDVL VCNKDLRPIC GTDGVTYNNE CLLCAYSIEF GTNISKEHDG  60
ECKETVPMNC SSYANTTSED GKVMVLCNRA FNPVCGTDGV TYDNECLLCA HKVEQGASVD  120
KRHDGECRKE LAAVSVDCSE YPKPDCTAED RPLCGSDNKT YGNKCNFCNA VVESNGTLTL  180
SHFGKC                                                             186

SEQ ID NO: 8           moltype = AA  length = 208
FEATURE                Location/Qualifiers
source                 1..208
                       mol_type = protein
                       organism = Numida meleagris
SEQUENCE: 8
MAMAGVFVLF SFALCGFLPD AAFGVEVDCS RFPNATNEEG KDVLVCTEDL RPICGTDGVT  60
YSNDCLLCAY NIEYGTNISK EHDGECREAV PVDCSRYPNM TSEEGKVLIL CNKAFNPVCG  120
TDGVTYDNEC LLCAHNVEQG TSVGKKHDGE CRKELAAVDC SEYPKPACTM EYRPLCGSDN  180
KTYDNKCNFC NAVVESNGTL TLSHFGKC                                     208

SEQ ID NO: 9           moltype = AA  length = 239
FEATURE                Location/Qualifiers
source                 1..239
                       mol_type = protein
                       organism = Meleagris gallopavo
SEQUENCE: 9
MQTITWRQPQ GDHLRSRAPA ATCRAGQYLT MAMAGIFVLF SFALCGFLPD AAFGVEVDCS  60
RFPNTTNEEG KDVLVCTEDL RPICGTDGVT HSECLLCAYN IEYGTNISKE HDGECREAVP  120
MDCSRYPNTT NEEGKVMILC NKALNPVCGT DGVTYDNECV LCAHNLEQGT SVGKKHDGGC  180
RKELAAVSVD CSEYPKPACT LEYRPLCGSD NKTYGNKCNF CNAVVESNGT LTLSHFGKC   239
```

```
SEQ ID NO: 10          moltype = AA  length = 185
FEATURE                Location/Qualifiers
source                 1..185
                       mol_type = protein
                       organism = Meleagris gallopavo
SEQUENCE: 10
VEVDCSRFPN TTNEEGKDVL VCTEDLRPIC GTDGVTHSEC LLCAYNIEYG TNISKEHDGE  60
CREAVPMDCS RYPNTTSEEG KVMILCNKAL NPVCGTDGVT YDNECVLCAH NLEQGTSVGK  120
KHDGECRKEL AAVSVDCSEY PKPACTLEYR PLCGSDNKTY GNKCNFCNAV VESNGTLTLS  180
HFGKC                                                              185

SEQ ID NO: 11          moltype = AA  length = 237
FEATURE                Location/Qualifiers
source                 1..237
                       mol_type = protein
                       organism = Meleagris gallopavo
SEQUENCE: 11
MQTITWRQPQ GDHLRSRAPA ATCRAGQYLT MAMAGIFVLF SFALCGFLPD AAFGVEVDCS  60
RFPNTTNEEG KDVLVCTEDL RPICGTDGVT HSECLLCAYN IEYGTNISKE HDGECREAVP  120
MDCSRYPNTT NEEGKVMILC NKALNPVCGT DGVTYDNECV LCAHNLEQGT SVGKKHDGGC  180
RKELAAVDCS EYPKPACTLE YRPLCGSDNK TYGNKCNFCN AVVESNGTLT LSHFGKC     237

SEQ ID NO: 12          moltype = AA  length = 128
FEATURE                Location/Qualifiers
source                 1..128
                       mol_type = protein
                       organism = Bambusicola thoracicus
SEQUENCE: 12
EYGTNISIKH NGECKETVPM DCSRYANMTN EEGKVMMPCD RTYNPVCGTD GVTYDNECQL  60
CAHNVEQGTS VDKKHDGVCG KELAAVSVDC SEYPKPECTA EERPICGSDN KTYGNKCNFC  120
NAVVYVQP                                                           128

SEQ ID NO: 13          moltype = AA  length = 195
FEATURE                Location/Qualifiers
source                 1..195
                       mol_type = protein
                       organism = Callipepla squamata
SEQUENCE: 13
VDCSRFPNTT NEEGKDVLAC TKELHPICGT DGVTYSNECL LCYYNIEYGT NISKEHDGEC  60
TEAVPVDCSR YPNTTSEEGK VLIPCNRDFN PVCGSDGVTY ENECLLCAHN VEQGTSVGKK  120
HDGGCRKEFA AVSVDCSEYP KPDCTLEYRP LCGSDNKTYA SKCNFCNAVV IWEQEKNTRH  180
HASHSVFFIS ARLVC                                                   195

SEQ ID NO: 14          moltype = AA  length = 339
FEATURE                Location/Qualifiers
source                 1..339
                       mol_type = protein
                       organism = Colinus virginianus
SEQUENCE: 14
MLPLGLREYG TNTSKEHDGE CTEAVPVDCS RYPNTTSEEG KVRILCKKDI NPVCGTDGVT  60
YDNECLLCSH SVGQGASIDK KHDGGCRKEF AAVSVDCSEY PKPACMSEYR PLCGSDNKTY  120
VNKCNFCNAV VYVQPWLHSR CRLPPTGTSF LGSEGRETSL LTSRATDLQV AGCTAISAME  180
ATRAAALLGL VLLSSFCELS HLCFSQASCD VYRLSGSRNL ACPRIFQPVC GTDNVTYPNE  240
CSLCRQMLRS RAVYKKHDGR CVKVDCTGYM RATGGLGTAC SQQYSPLYAT NGVIYSNKCT  300
FCSAVANGED IDLLAVKYPE EESWISVSPT PWRMLSAGA                         339

SEQ ID NO: 15          moltype = AA  length = 238
FEATURE                Location/Qualifiers
source                 1..238
                       mol_type = protein
                       note = Anser cygnoides domesticus
                       organism = Anser cygnoides
SEQUENCE: 15
MSWWGIKPAL ERPSQEQSTS GQPVDSGSTS TTTMAGIFVL LSLVLCCFPD AAFGVEVDCS  60
RFPNTTNEEG KEVLLCTKDL SPICGTDGVT YSNECLLCAY NIEYGTNISK DHDGECKEAV  120
PVDCSTYPNM TNEEGKVMLV CNKMFSPVCG TDGVTYDNEC MLCAHNVEQG TSVGKKYDGK  180
CKKEVATVDC SDYPKPACTV EYMPLCGSDN KTYDNKCNFC NAVVDSNGTL TLSHFGKC    238

SEQ ID NO: 16          moltype = AA  length = 284
FEATURE                Location/Qualifiers
source                 1..284
                       mol_type = protein
                       note = Anser cygnoides domesticus
                       organism = Anser cygnoides
SEQUENCE: 16
MSSQNQLHRR RRPLPGGQDL NKYYWPHCTS DRFSWLLHVT AEQFRHCVCI YLQPALERPS  60
QEQSTSGQPV DSGSTSTTTM AGIFVLLSLV LCCFPDAAFG VEVDCSRFPN TTNEEGKEVL  120
LCTKDLSPIC GTDGVTYSNE CLLCAYNIEY GTNISKDHDG ECKEAVPVDC STYPNMTNEE  180
```

```
GKVMLVCNKM FSPVCGTDGV TYDNECMLCA HNVEQGTSVG KKYDGKCKKE VATVDCSDYP  240
KPACTVEYMP LCGSDNKTYD NKCNFCNAVV DSNGTLTLSH FGKC                   284

SEQ ID NO: 17          moltype = AA  length = 186
FEATURE                Location/Qualifiers
source                 1..186
                       mol_type = protein
                       organism = Coturnix japonica
SEQUENCE: 17
VEVDCSRFPN TTNEEGKDEV VCPDELRLIC GTDGVTYNHE CMLCFYNKEY GTNISKEQDG  60
ECGETVPMDC SRYPNTTSED GKVTILCTKD FSFVCGTDGV TYDNECMLCA HNVVQGTSVG  120
KKHDGECRKE LAAVSVDCSE YPKPACPKDY RPVCGSDNKT YSNKCNFCNA VVESNGTLTL  180
NHFGKC                                                             186

SEQ ID NO: 18          moltype = AA  length = 210
FEATURE                Location/Qualifiers
source                 1..210
                       mol_type = protein
                       organism = Coturnix japonica
SEQUENCE: 18
MAMAGVFLLF SFALCGFLPD AAFGVEVDCS RFPNTTNEEG KDEVVCPDEL RLICGTDGVT  60
YNHECMLCFY NKEYGTNISK EQDGECGETV PMDCSRYPNT TSEDGKVTIL CTKDFSFVCG  120
TDGVTYDNEC MLCAHNIVQG TSVGKKHDGE CRKELAAVSV DCSEYPKPAC PKDYRPVCGS  180
DNKTYSNKCN FCNAVVESNG TLTLNHFGKC                                   210

SEQ ID NO: 19          moltype = AA  length = 205
FEATURE                Location/Qualifiers
source                 1..205
                       mol_type = protein
                       organism = Anas platyrhynchos
SEQUENCE: 19
MAGVFVLLSL VLCCFPDAAF GVEVDCSRFP NTTNEEGKDV LLCTKELSPV CGTDGVTYSN  60
ECLLCAYNIE YGTNISKDHD GECKEAVPAD CSMYPNMTNE EGKMTLLCNK MFSPVCGTDG  120
VTYDNECMLC AHNVEQGTSV GKKYDGKCKK EVATVDCSGY PKPACTMEYM PLCGSDNKTY  180
GNKCNFCNAV VDSNGTLTLS HFGEC                                        205

SEQ ID NO: 20          moltype = AA  length = 171
FEATURE                Location/Qualifiers
source                 1..171
                       mol_type = protein
                       organism = Anas platyrhynchos
SEQUENCE: 20
QVDCSRFPNT TNEEGKEVLL CTKELSPVCG TDGVTYSNEC LLCAYNIEYG TNISKDHDGE  60
CKEAVPADCS MYPNMTNEEG KMTLLCNKMF SPVCGTDGVT YDNECMLCAH NVEQGTSVGK  120
KYDGKCKKEV ATVSVDCSGY PKPACTMEYM PLCGSDNKTY GNKCNFCNAV V           171

SEQ ID NO: 21          moltype = AA  length = 207
FEATURE                Location/Qualifiers
source                 1..207
                       mol_type = protein
                       organism = Tyto alba
SEQUENCE: 21
MTMPGAFVVL SFVLCCFPDA TFGVEVDCST YPNTTNEEGK EVLVCSKILS PICGTDGVTY  60
SNECLLCANN IEYGTNISKY HDGECKEFVP VNCSRYPNTT NEEGKVMLIC NKDLSPVCGT  120
DGVTYDNECL LCAHNLEPGT SVGKKYDGEC KKEIATVDCS DYPKPVCSLE SMPLCGSDNK  180
TYSNKCNFCN AVVDSNETLT LSHFGKC                                      207

SEQ ID NO: 22          moltype = AA  length = 207
FEATURE                Location/Qualifiers
source                 1..207
                       mol_type = protein
                       note = Balearica regulorum gibbericeps
                       organism = Balearica regulorum
SEQUENCE: 22
MTMAGVFVLL SFALCCFPDA AFGVEVDCST YPNTTNEEGK EVLVCTKILS PICGTDGVTY  60
SNECLLCAYN IEYGTNVSKD HDGECKEVVP VDCSRYPNST NEEGKVVMLC SKDLNPVCGT  120
DGVTYDNECV LCAHNVESGT SVGKKYDGEC KKETATVDCS DYPKPACTLE YMPFCGSDSK  180
TYSNKCNFCN AVVDSNGTLT LSHFGKC                                      207

SEQ ID NO: 23          moltype = AA  length = 207
FEATURE                Location/Qualifiers
source                 1..207
                       mol_type = protein
                       organism = Cathartes aura
SEQUENCE: 23
MTTAGVFVLL SFALCSFPDA AFGVEVDCST YPNTTNEEGK EVLVCTKILS PICGTDGVTY  60
SNECLLCAYN IEYGTNVSKD HDGECKEFVP VDCSRYPNTT NEDGKVVLLC NKDLSPICGT  120
DGVTYDNECL LCARNLEPGT SVGKKYDGEC KKEIATVDCS DYPKPVCSLE YMPLCGSDSK  180
TYSNKCNFCN AVVDSNGTLT LSHFGKC                                      207
```

```
SEQ ID NO: 24          moltype = AA  length = 207
FEATURE                Location/Qualifiers
source                 1..207
                       mol_type = protein
                       organism = Cuculus canorus
SEQUENCE: 24
MTTAGVFVLL SFTLCSFPDA AFGVEVDCSP YPNTTNEEGK EVLVCNKILS PICGTDGVTY  60
SNECLLCAYN LEYGTNISKD YDGECKEVAP VDCSRHPNTT NEEGKVELLC NKDLNPICGT  120
NGVTYDNECL LCARNLESGT SIGKKYDGEC KKEIATVDCS DYPKPVCTLE EMPLCGSDNK  180
TYGNKCNFCN AVVDSNGTLT LSHFGKC                                     207

SEQ ID NO: 25          moltype = AA  length = 207
FEATURE                Location/Qualifiers
source                 1..207
                       mol_type = protein
                       organism = Antrostomus carolinensis
SEQUENCE: 25
MTTAVVFVLL SFALCCFPDA AFGVEVDCST YPNSTNEEGK DVLVCPKILG PICGTDGVTY  60
SNECLLCAYN IQYGTNVSKD HDGECKEIVP VDCSRYPNTT NEEGKVVFLC NKNFDPVCGT  120
DGDTYDNECM LCARSLEPGT TVGKKHDGEC KREIATVDCS DYPKPTCSAE DMPLCGSDSK  180
TYSNKCNFCN AVVDSNGTLT LSRFGKC                                     207

SEQ ID NO: 26          moltype = AA  length = 207
FEATURE                Location/Qualifiers
source                 1..207
                       mol_type = protein
                       organism = Cariama cristata
SEQUENCE: 26
MTMTGVFVLL SFAICCFPDA AFGVEVDCST YPNTTNEEGK EVLVCTKILS PICGTDGVTY  60
SNECLLCAYN IEYGTNVSKD HDGECKEVVP VDCSKYPNTT NEEGKVVLLC SKDLSPVCGT  120
DGVTYDNECL LCARNLEPGS SVGKKYDGEC KKEIATIDCS DYPKPVCSLE YMPLCGSDSK  180
TYDNKCNFCN AVVDSNGTLT LSHFGKC                                     207

SEQ ID NO: 27          moltype = AA  length = 207
FEATURE                Location/Qualifiers
source                 1..207
                       mol_type = protein
                       organism = Pygoscelis adeliae
SEQUENCE: 27
MTTAGVFVLL SFVLCCFPDA VFGVEVDCST YPNTTNEEGK EVLVCTKILS PICGTDGVTY  60
SNECLLCAYN IEYGTNVSKD HDGECKEVVP VNCSRYPNTT NEEGKVVLRC SKDLSPVCGT  120
DGVTYDNECL MCARNLEPGA VVGKNYDGEC KKEIATVDCS DYPKPVCSLE YMPLCGSDSK  180
TYSNKCNFCN AVVDSNGTLT LSHFGKC                                     207

SEQ ID NO: 28          moltype = AA  length = 207
FEATURE                Location/Qualifiers
source                 1..207
                       mol_type = protein
                       organism = Nipponia nippon
SEQUENCE: 28
MTTAGVFVLL SIALCCFPDA AFGVEVDCSA YSNTTSEEGK EVLSCTKILS PICGTDGVTY  60
SNECLLCAYN IEYGTNISKD HDGECKEVVS VDCSRYPNTT NEEGKAVLLC NKDLSPVCGT  120
DGVTYDNECL LCAHNLEPGT SVGKKYDGAC KKEIATVDCS DYPKPVCTLE YLPLCGSDSK  180
TYSNKCDFCN AVVDSNGTLT LSHFGKC                                     207

SEQ ID NO: 29          moltype = AA  length = 206
FEATURE                Location/Qualifiers
source                 1..206
                       mol_type = protein
                       organism = Phaethon lepturus
SEQUENCE: 29
MTTAGVFVLL SFALCCFPDA AFGVEVDCST YPNTTNEEGK EVLVCTKILS PICGTDGTTY  60
SNECLLCAYN IEYGTNVSKD HDGECKVVPV DCSKYPNTTN EDGKVVLLCN KALSPICGTD  120
RVTYDNECLM CAHNLEPGTS VGKKHDGECQ KEVATVDCSD YPKPVCSLEY MPLCGSDGKT  180
YSNKCNFCNA VVNSNGTLTL SHFEKC                                      206

SEQ ID NO: 30          moltype = AA  length = 213
FEATURE                Location/Qualifiers
source                 1..213
                       mol_type = protein
                       organism = Melopsittacus undulatus
SEQUENCE: 30
MTTAGVFVLL SFVLCCFFPD AAFGVEVDCS TYPNTTNEEG KEVLVCAKIL SPVCGTDGVT  60
YSNECLLCAH NIENGTNVGK DHDGKCKEAV PVDCSRYPNT TDEEGKVVLL CNKDVSPVCG  120
TDGVTYDNEC LLCAHNLEAG TSVDKKNDSE CKTEDTTLAA VSVDCSDYPK PVCTLEYLPL  180
CGSDNKTYSN KCRFCNAVVD SNGTLTLSRF GKC                              213

SEQ ID NO: 31          moltype = AA  length = 207
```

```
FEATURE                Location/Qualifiers
source                 1..207
                       mol_type = protein
                       organism = Podiceps cristatus
SEQUENCE: 31
MTTAGVFVLL SFALCCSPDA AFGVEVDCST YPNTTNEEGK EVLACTKILS PICGTDGVTY  60
SNECLLCAYN MEYGTNVSKD HDGKCKEVVP VDCSRYPNTT NEEGKVVLLC NKDLSPVCGT  120
DGVTYDNECL LCARNLEPGA SVGKKYDGEC KKEIATVDCS DYPKPVCSLE HMPLCGSDSK  180
TYSNKCTFCN AVVDSNGTLT LSHFGKC                                      207

SEQ ID NO: 32          moltype = AA  length = 207
FEATURE                Location/Qualifiers
source                 1..207
                       mol_type = protein
                       organism = Fulmarus glacialis
SEQUENCE: 32
MTTAGVFVLL SFALCCFPDA AFGVEVDCST YPNTTNEEGR EVLVCTKILS PICGTDGVTY  60
SNECLLCAYN IEYGTNVSKD HDGECKEVAP VGCSRYPNTT NEEGKVVLLC NKDLSPVCGT  120
DGVTYDNECL LCARHLEPGT SVGKKYDGEC KKEIATVDCS DYPKPVCSLE YMPLCGSDSK  180
TYSNKCNFCN AVLDSNGTLT LSHFGKC                                      207

SEQ ID NO: 33          moltype = AA  length = 207
FEATURE                Location/Qualifiers
source                 1..207
                       mol_type = protein
                       organism = Aptenodytes forsteri
SEQUENCE: 33
MTTAGVFVLL SFALCCFPDA VFGVEVDCST YPNTTNEEGK EVLVCTKILS PICGTDGVTY  60
SNECLLCAYN IEYGTNVSKD HDGECKEVVP VDCSRYPNTT NEEGKVVLRC NKDLSPVCGT  120
DGVTYDNECL MCARNLEPGA IVGKKYDGEC KKEIATVDCS DYPKPVCSLE YMPLCGSDSK  180
TYSNKCNFCN AVVDSNGTLI LSHFGKC                                      207

SEQ ID NO: 34          moltype = AA  length = 207
FEATURE                Location/Qualifiers
source                 1..207
                       mol_type = protein
                       organism = Pygoscelis adeliae
SEQUENCE: 34
MTTAGVFVLL SFVLCCFPDA VFGVEVDCST YPNTTNEEGK EVLVCTKILS PICGTDGVTY  60
SNECLLCAYN IEYGTNVSKD HDGECKEVVP VDCSRYPNTT NEEGKVVLRC SKDLSPVCGT  120
DGVTYDNECL MCARNLEPGA VVGKNYDGEC KKEIATVDCS DYPKPVCSLE YMPLCGSDSK  180
TYSNKCNFCN AVVDSNGTLT LSHFGKC                                      207

SEQ ID NO: 35          moltype = AA  length = 282
FEATURE                Location/Qualifiers
source                 1..282
                       mol_type = protein
                       organism = Aptenodytes forsteri
SEQUENCE: 35
MSSQNQLPSR CRPLPGSQDL NKYYQPHCTG DRFCWLFYVT VEQFRHCICI YLQLALERPS  60
HEQSGQPADS RNTSTMTTAG VFVLLSFALC CFPDAVFGVE VDCSTYPNTT NEEGKEVLVC  120
TKILSPICGT DGVTYSNECL LCAYNIEYGT NVSKDHDGEC KEVVPVDCSR YPNTTNEEGK  180
VVLRCNKDLS PVCGTDGVTY DNECLMCARN LEPGAIVGKK YDGECKKEIA TVDCSDYPKP  240
VCSLEYMPLC GSDSKTYSNK CNFCNAVVDS NGTLILSHFG KC                     282

SEQ ID NO: 36          moltype = AA  length = 193
FEATURE                Location/Qualifiers
source                 1..193
                       mol_type = protein
                       organism = Antrostomus carolinensis
SEQUENCE: 36
MTTAVVFVLL SFALCCFPDA AFGVEVDCST YPNSTNEEGK DVLVCPKILG PICGTDGVTY  60
SNECLLCAYN IQYGTNVSKD HDGECKEIVP VDCSRYPNTT NEEGKVVFLC NKNFDPVCGT  120
DGDTYDNECM LCARSLEPGT TVGKKHDGEC KREIATVDCS DYPKPTCSAE DMPLCGSDSK  180
TYSNKCNFCN AVV                                                     193

SEQ ID NO: 37          moltype = AA  length = 190
FEATURE                Location/Qualifiers
source                 1..190
                       mol_type = protein
                       organism = Gallus gallus
SEQUENCE: 37
EAEAAEVDCS RFPNATDKEG KDVLVCNKDL RPICGTDGVT YTNDCLLCAY SIEFGTNISK  60
EHDGECKETV PMNCSSYANT TSEDGKVMVL CNRAFNPVCG TDGVTYDNEC LLCAHKVEQG  120
ASVDKRHDGG CRKELAAVSV DCSEYPKPDC TAEDRPLCGS DNKTYGNKCN FCNAVVESNG  180
TLTLSHFGKC                                                         190

SEQ ID NO: 38          moltype = AA  length = 199
FEATURE                Location/Qualifiers
```

```
source                  1..199
                        mol_type = protein
                        organism = Gallus gallus
SEQUENCE: 38
EEGVSLEKRE AEAAEVDCSR FPNATDKEGK DVLVCNKDLR PICGTDGVTY TNDCLLCAYS  60
IEFGTNISKE HDGECKETVP MNCSSYANTT SEDGKVMVLC NRAFNPVCGT DGVTYDNECL  120
LCAHKVEQGA SVDKRHDGGC RKELAAVSVD CSEYPKPDCT AEDRPLCGSD NKTYGNKCNF  180
CNAVVESNGT LTLSHFGKC                                              199

SEQ ID NO: 39           moltype = AA  length = 275
FEATURE                 Location/Qualifiers
source                  1..275
                        mol_type = protein
                        organism = Gallus gallus
SEQUENCE: 39
MRFPSIFTAV LFAASSALAA PVNTTTEDET AQIPAEAVIG YSDLEGDFDV AVLPFSNSTN  60
NGLLFINTTI ASIAAKEEGV SLEKREAEAA EVDCSRFPNA TDKEGKDVLV CNKDLRPICG  120
TDGVTYTNDC LLCAYSIEFG TNISKEHDGE CKETVPMNCS SYANTTSEDG KVMVLCNRAF  180
NPVCGTDGVT YDNECLLCAH KVEQGASVDK RHDGGCRKEL AAVSVDCSEY PKPDCTAEDR  240
PLCGSDNKTY GNKCNFCNAV VESNGTLTLS HFGKC                            275

SEQ ID NO: 40           moltype = AA  length = 273
FEATURE                 Location/Qualifiers
source                  1..273
                        mol_type = protein
                        organism = Cathartes aura
SEQUENCE: 40
MRFPSIFTAV LFAASSALAA PVNTTTEDET AQIPAEAVIG YSDLEGDFDV AVLPFSNSTN  60
NGLLFINTTI ASIAAKEEGV SLEKREAEAV EVDCSTYPNT TNEEGKEVLV CTKILSPICG  120
TDGVTYSNEC LLCAYNIEYG TNVSKDHDGE CKEFVPVDCS RYPNTTNEDG KVVLLCNKDL  180
SPICGTDGVT YDNECLLCAR NLEPGTSVGK KYDGECKKEI ATVDCSDYPK PVCSLEYMPL  240
CGSDSKTYSN KCNFCNAVVD SNGTLTLSHF GKC                              273

SEQ ID NO: 41           moltype = AA  length = 188
FEATURE                 Location/Qualifiers
source                  1..188
                        mol_type = protein
                        organism = Cathartes aura
SEQUENCE: 41
EAEAVEVDCS TYPNTTNEEG KEVLVCTKIL SPICGTDGVT YSNECLLCAY NIEYGTNVSK  60
DHDGECKEFV PVDCSRYPNT TNEDGKVVLL CNKDLSPICG TDGVTYDNEC LLCARNLEPG  120
TSVGKKYDGE CKKEIATVDC SDYPKPVCSL EYMPLCGSDS KTYSNKCNFC NAVVDSNGTL  180
TLSHFGKC                                                          188

SEQ ID NO: 42           moltype = AA  length = 206
FEATURE                 Location/Qualifiers
source                  1..206
                        mol_type = protein
                        organism = Calypte anna
SEQUENCE: 42
MTMAGVFVLL SFILCCFPDT AFGVEVDCSI YPNTTSEEGK EVLVCTETLS PICGSDGVTY  60
NNECQLCAYN VEYGTNVSKD HDGECKEIVP VDCSRYPNTT EEGRVVMLCN KALSPVCGTD  120
GVTYDNECLL CARNLESGTS VGKKFDGECK KEIATVDCTD YPKPVCSLDY MPLCGSDSKT  180
YSNKCNFCNA VMDSNGTLTL NHFGKC                                      206

SEQ ID NO: 43           moltype = AA  length = 272
FEATURE                 Location/Qualifiers
source                  1..272
                        mol_type = protein
                        organism = Calypte anna
SEQUENCE: 43
MRFPSIFTAV LFAASSALAA PVNTTTEDET AQIPAEAVIG YSDLEGDFDV AVLPFSNSTN  60
NGLLFINTTI ASIAAKEEGV SLDKREAEAV EVDCSIYPNT TSEEGKEVLV CTETLSPICG  120
SDGVTYNNEC QLCAYNVEYG TNVSKDHDGE CKEIVPVDCS RYPNTTEEGR VVMLCNKALS  180
PVCGTDGVTY DNECLLCARN LESGTSVGKK FDGECKKEIA TVDCTDYPKP VCSLDYMPLC  240
GSDSKTYSNK CNFCNAVMDS NGTLTLNHFG KC                               272

SEQ ID NO: 44           moltype = AA  length = 187
FEATURE                 Location/Qualifiers
source                  1..187
                        mol_type = protein
                        organism = Calypte anna
SEQUENCE: 44
EAEAVEVDCS IYPNTTSEEG KEVLVCTETL SPICGSDGVT YNNECQLCAY NVEYGTNVSK  60
DHDGECKEIV PVDCSRYPNT TEEGRVVMLC NKALSPVCGT DGVTYDNECL LCARNLESGT  120
SVGKKFDGEC KKEIATVDCT DYPKPVCSLD YMPLCGSDSK TYSNKCNFCN AVMDSNGTLT  180
LNHFGKC                                                           187

SEQ ID NO: 45           moltype = AA  length = 218
```

```
FEATURE                Location/Qualifiers
source                 1..218
                       mol_type = protein
                       organism = Gallus gallus
SEQUENCE: 45
MRFPSIFTAV LFAASSALAA PVNTTTEDET AQIPAEAVIG YSDLEGDFDV AVLPFSNSTN  60
NGLLFINTTI ASIAAKEEGV SLDKREAEAK VFGRCELAAA MKRHGLDNYR GYSLGNWVCA  120
AKFESNFNTQ ATNRNTDGST DYGILQINSR WWCNDGRTPG SRNLCNIPCS ALLSSDITAS  180
VNCAKKIVSD GNGMNAWVAW RNRCKGTDVQ AWIRGCRL                          218

SEQ ID NO: 46          moltype = AA  length = 133
FEATURE                Location/Qualifiers
source                 1..133
                       mol_type = protein
                       organism = Gallus gallus
SEQUENCE: 46
EAEAKVFGRC ELAAAMKRHG LDNYRGYSLG NWVCAAKFES NFNTQATNRN TDGSTDYGIL  60
QINSRWWCND GRTPGSRNLC NIPCSALLSS DITASVNCAK KIVSDGNGMN AWVAWRNRCK  120
GTDVQAWIRG CRL                                                     133

SEQ ID NO: 47          moltype = AA  length = 129
FEATURE                Location/Qualifiers
source                 1..129
                       mol_type = protein
                       organism = Gallus gallus
SEQUENCE: 47
KVFGRCELAA AMKRHGLDNY RGYSLGNWVC AAKFESNFNT QATNRNTDGS TDYGILQINS  60
RWWCNDGRTP GSRNLCNIPC SALLSSDITA SVNCAKKIVS DGNGMNAWVA WRNRCKGTDV  120
QAWIRGCRL                                                          129

SEQ ID NO: 48          moltype = AA  length = 129
FEATURE                Location/Qualifiers
source                 1..129
                       mol_type = protein
                       organism = Gallus gallus
SEQUENCE: 48
KVFGRCELAA AMKRHGLDNY RGYSLGNWVC VAKFESNFNT QATNRNTDGS TDYGILQINS  60
RWWCNDGRTP GSRNLCNIPC SALLSSDITA SVNCAKKIVS DGNGMSAWVA WRNRCKGTDV  120
QAWIRGCRL                                                          129

SEQ ID NO: 49          moltype = AA  length = 130
FEATURE                Location/Qualifiers
source                 1..130
                       mol_type = protein
                       organism = Homo sapiens
SEQUENCE: 49
KVFERCELAR TLKRLGMDGY RGISLANWMC LAKWESGYNT RATNYNAGDR STDYGIFQIN  60
SRYWCNDGKT PGAVNACHLS CSALLQDNIA DAVACAKRVV RDPQGIRAWV AWRNRCQNRD  120
VRQYVQGCGV                                                         130

SEQ ID NO: 50          moltype = AA  length = 129
FEATURE                Location/Qualifiers
source                 1..129
                       mol_type = protein
                       organism = Bos taurus
SEQUENCE: 50
KVFERCELAR TLKKLGLDGY KGVSLANWLC LTKWESSYNT KATNYNPSSE STDYGIFQIN  60
SKWWCNDGKT PNAVDGCHVS CRELMENDIA KAVACAKHIV SEQGITAWVA WKSHCRDHDV  120
SSYVEGCTL                                                          129

SEQ ID NO: 51          moltype = AA  length = 147
FEATURE                Location/Qualifiers
source                 1..147
                       mol_type = protein
                       organism = Gallus gallus
SEQUENCE: 51
MRSLLILVLC FLPLAALGKV FGRCELAAAM KRHGLDNYRG YSLGNWVCAA KFESNFNTQA  60
TNRNTDGSTD YGILQINSRW WCNDGRTPGS RNLCNIPCSA LLSSDITASV NCAKKIVSDG  120
NGMNAWVAWR NRCKGTDVQA WIRGCRL                                      147

SEQ ID NO: 52          moltype = AA  length = 321
FEATURE                Location/Qualifiers
REGION                 1..321
                       note = Synthetic Peptide
source                 1..321
                       mol_type = protein
                       organism = synthetic construct
SEQUENCE: 52
MAKADGSLLY YNPHNPPRRY YFYMAIFAVS VICVLYGPSQ QLSSPKIDAS APAPVKQGPT  60
```

```
SVAYVEVNNN SMLNVGKYTL ADGGGNAFDV AVIFAANINY DTGTKTAYLH FNENVQRVLD  120
NAVTQIRPLQ QQGIKVLLSV LGNHQGAGFA NFPSQQAASA FAKQLSDAVA KYGLDGVDFD  180
DEYAEYGNNG TAQPNDSSFV HLVTALRANM PDKIISLYNI GPAASRLSYG GVDVSDKFDY  240
AWNPYYGTWQ VPGIALPKAQ LSPAAVEIGR TSRSTVADLA RRTVDEGYGV YLTYNLDGGD  300
RTADVSAFTR ELYGSEAVRT P                                            321

SEQ ID NO: 53          moltype = AA  length = 4
FEATURE                Location/Qualifiers
REGION                 1..4
                       note = Synthetic Peptide
source                 1..4
                       mol_type = protein
                       organism = synthetic construct
SEQUENCE: 53
EAEA                                                              4

SEQ ID NO: 54          moltype =   length =
SEQUENCE: 54
000

SEQ ID NO: 55          moltype =   length =
SEQUENCE: 55
000

SEQ ID NO: 56          moltype =   length =
SEQUENCE: 56
000

SEQ ID NO: 57          moltype =   length =
SEQUENCE: 57
000

SEQ ID NO: 58          moltype =   length =
SEQUENCE: 58
000

SEQ ID NO: 59          moltype =   length =
SEQUENCE: 59
000

SEQ ID NO: 60          moltype = AA  length = 474
FEATURE                Location/Qualifiers
REGION                 1..474
                       note = Synthetic Polypeptide
source                 1..474
                       mol_type = protein
                       organism = synthetic construct
SEQUENCE: 60
MRFPSIFTAV LFAASSALAA PVNTTTEDET AQIPAEAVIG YSDLEGDFDV AVLPFSNSTN  60
NGLLFINTTI ASIAAKEEGV SLDKREAEAG SIGAASMEFC FDVFKELKVH HANENIFYCP  120
IAIMSALAMV YLGAKDSTRT QINKVVRFDK LPGFGDSIEA QCGTSVNVHS SLRDILNQIT  180
KPNDVYSFSL ASRLYAEERY PILPEYLQCV KELYRGGLEP INFQTAADQA RELINSWVES  240
QTNGIIRNVL QPSSVDSQTA MVLVNAIVFK GLWEKAFKDE DTQAMPFRVT EQESKPVQMM  300
YQIGLFRVAS MASEKMKILE LPFASGTMSM LVLLPDEVSG LEQLESIINF EKLTEWTSSN  360
VMEERKIKVY LPRMKMEEKY NLTSVLMAMG ITDVFSSSAN LSGISSAESL KISQAVHAAH  420
AEINEAGREV VGSAEAGVDA ASVSEEFRAD HPFLFCIKHI ATNAVLFFGR CVSP        474

SEQ ID NO: 61          moltype = AA  length = 389
FEATURE                Location/Qualifiers
REGION                 1..389
                       note = Synthetic Polypeptide
source                 1..389
                       mol_type = protein
                       organism = synthetic construct
SEQUENCE: 61
EAEAGSIGAA SMEFCFDVFK ELKVHHANEN IFYCPIAIMS ALAMVYLGAK DSTRTQINKV  60
VRFDKLPGFG DSIEAQCGTS VNVHSSLRDI LNQITKPNDV YSFSLASRLY AEERYPILPE  120
YLQCVKELYR GGLEPINFQT AADQARELIN SWVESQTNGI IRNVLQPSSV DSQTAMVLVN  180
AIVFKGLWEK AFKDEDTQAM PFRVTEQESK PVQMMYQIGL FRVASMASEK MKILELPFAS  240
GTMSMLVLLP DEVSGLEQLE SIINFEKLTE WTSSNVMEER KIKVYLPRMK MEEKYNLTSV  300
LMAMGITDVF SSSANLSGIS SAESLKISQA VHAAHAEINE AGREVVGSAE AGVDAASVSE  360
EFRADHPFLF CIKHIATNAV LFFGRCVSP                                   389

SEQ ID NO: 62          moltype = AA  length = 419
FEATURE                Location/Qualifiers
REGION                 1..419
                       note = Synthetic Polypeptide
source                 1..419
                       mol_type = protein
```

```
                       organism = synthetic construct
SEQUENCE: 62
MRVPAQLLGL LLLWLPGARC GSIGAASMEF CFDVFKELKV HHANENIFYC PIAIMSALAM  60
VYLGAKDSTR TQINKVVRFD KLPGFGDSIE AQCGTSVNVH SSLRDILNQI TKPNDVYSFS  120
LASRLYAEER YPILPEYLQC VKELYRGGLE PINFQTAADQ ARELINSWVE SQTNGIIRNV  180
LQPSSVDSQT AMVLVNAIVF KGLWEKAFKD EDTQAMPFRV TEQESKPVQM MYQIGLFRVA  240
SMASEKMKIL ELPFASGTMS MLVLLPDEVS GLEQLESIIN FEKLTEWTSS NVMEERKIKV  300
YLPRMKMEEK YNLTSVLMAM GITDVFSSSA NLSGISSAES LKISQAVHAA HAEINEAGRE  360
VVGSAEAGVD AASVSEEFRA DHPFLFCIKH IATNAVLFFG RCVSPLEIKR AAAHHHHHH   419

SEQ ID NO: 63          moltype = AA  length = 406
FEATURE                Location/Qualifiers
REGION                 1..406
                       note = Synthetic Polypeptide
source                 1..406
                       mol_type = protein
                       organism = synthetic construct
SEQUENCE: 63
MTSGFANELG PRLMGKLTMG SIGAASMEFC FDVFKELKVH HANENIFYCP IAIMSALAMV  60
YLGAKDSTRT QINKVVRFDK LPGFGDSIEA QCGTSVNVHS SLRDILNQIT KPNDVYSFSL  120
ASRLYAEERY PILPEYLQCV KELYRGGLEP INFQTAADQA RELINSWVES QTNGIIRNVL  180
QPSSVDSQTA MVLVNAIVFK GLWEKTFKDE DTQAMPFRVT EQESKPVQMM YQIGLFRVAS  240
MASEKMKILE LPFASGTMSM LVLLPDEVSG LEQLESIINF EKLTEWTSSN VMEERKIKVY  300
LPRMKMEEKY NLTSVLMAMG ITDVFSSSAN LSGISSAESL KISQAVHAAH AEINEAGREV  360
VGSAEAGVDA ASVSEEFRAD HPFLFCIKHI ATNAVLFFGR CVSPSR                 406

SEQ ID NO: 64          moltype = AA  length = 451
FEATURE                Location/Qualifiers
REGION                 1..451
                       note = Synthetic Polypeptide
source                 1..451
                       mol_type = protein
                       organism = synthetic construct
SEQUENCE: 64
MGGRRVRWEV YISRAGYVNR QIAWRRHHRS LTMRVPAQLL GLLLLWLPGA RCGSIGAASM  60
EFCFDVFKEL KVHHANENIF YCPIAIMSAL AMVYLGAKDS TRTQINKVVR FDKLPGFGDS  120
IEAQCGTSVN VHSSLRDILN QITKPNDVYS FSLASRLYAE ERYPILPEYL QCVKELYRGG  180
LEPINFQTAA DQARELINSW VESQTNGIIR NVLQPSSVDS QTAMVLVNAI VFKGLWEKAF  240
KDEDTQAMPF RVTEQESKPV QMMYQIGLFR VASMASEKMK ILELPFASGT MSMLVLLPDE  300
VSGLEQLESI INFEKLTEWT SSNVMEERKI KVYLPRMKME EKYNLTSVLM AMGITDVFSS  360
SANLSGISSA ESLKISQAVH AAHAEINEAG REVVGSAEAG VDAASVSEEF RADHPFLFCI  420
KHIATNAVLF FGRCVSPLEI KRAAAHHHHH H                                 451

SEQ ID NO: 65          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 65
MGSIGAVSME FCFDVFKELK VHHANENIFY SPFTIISALA MVYLGAKDST RTQINKVVRF  60
DKLPGFGDSV EAQCGTSVNV HSSLRDILNQ ITKPNDVYSF SLASRLYAEE TYPILPEYLQ  120
CVKELYRGGL ESINFQTAAD QARGLINSWV ESQTNGMIKN VLQPSSVDSQ TAMVLVNAIV  180
FKGLWEKAFK DEDTQAIPFR VTEQESKPVQ MMYQIGLFKV ASMASEKMKI LELPFASGTM  240
SMWVLLPDEV SGLEQLETTI SFEKMTEWIS SNIMEERRIK VYLPRMKMEE KYNLTSVLMA  300
MGITDLFSSS ANLSGISSAG SLKISQAVHA AYAEIYEAGR EVIGSAEAGA DATSVSEEFR  360
VDHPFLYCIK HNLTNSILFF GRCISP                                       386

SEQ ID NO: 66          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 66
MGSIGAVSME FCFDVFKELK VHHANENIFY SPFTIISALA MVYLGAKDST RTQINKVVRF  60
DKLPGFGDSV EAQCGTSVNV HSSLRDILNQ ITKPNDVYSF SLASRLYAEE TYPILPEYLQ  120
CVKELYRGGL ESINFQTAAD QARGLINSWV ESQTNGMIKN VLQPSSVDSQ TAMVLVNAIV  180
FKGLWEKAFK DEDTQAIPFR VTEQESKPVQ MMYQIGLFKV ASMASEKMKI LELPFASGTM  240
SMWVLLPDEV SGLEQLETTI SFEKMTEWIS SNIMEERRIK VYLPRMKMEE KYNLTSVLMA  300
MGITDLFSSS ANLSGISSAG SLKISQAAHA AYAEIYEAGR EVIGSAEAGA DATSVSEEFR  360
VDHPFLYCIK HNLTNSILFF GRCISP                                       386

SEQ ID NO: 67          moltype = AA  length = 417
FEATURE                Location/Qualifiers
REGION                 1..417
                       note = Synthetic Polypeptide
```

```
source                  1..417
                        mol_type = protein
                        organism = synthetic construct
SEQUENCE: 67
YYRVPCMVLC TAFHPYIFIV LLFALDNSEF TMGSIGAVSM EFCFDVFKEL RVHHPNENIF  60
FCPFAIMSAM AMVYLGAKDS TRTQINKVIR FDKLPGFGDS TEAQCGKSAN VHSSLKDILN  120
QITKPNDVYS FSLASRLYAD ETYSIQSEYL QCVNELYRGG LESINFQTAA DQARELINSW  180
VESQTNGIIR NVLQPSSVDS QTAMVLVNAI VFRGLWEKAF KDEDTQTMPF RVTEQESKPV  240
QMMYQIGSFK VASMASEKMK ILELPLASGT MSMLVLLPDE VSGLEQLETT ISFEKLTEWT  300
SSNVMEERKI KVYLPRMKME EKYNLTSVLM AMGITDLFRS SANLSGISLA GNLKISQAVH  360
AAHAEINEAG RKAVSSAEAG VDATSVSEEF RADRPFLFCI KHIATKVVFF FGRYTSP     417

SEQ ID NO: 68           moltype = AA  length = 383
FEATURE                 Location/Qualifiers
REGION                  1..383
                        note = Synthetic Polypeptide
source                  1..383
                        mol_type = protein
                        organism = synthetic construct
SEQUENCE: 68
MGSIGAASME FCFDVFKELK VHHANDNMLY SPFAILSTLA MVFLGAKDST RTQINKVVHF  60
DKLPGFGDSI EAQCGTSVNV HSSLRDILNQ ITKQNDAYSF SLASRLYAQE TYTVVPEYLQ  120
CVKELYRGGL ESVNFQTAAD QARGLINAWV ESQTNGIIRN ILQPSSVDSQ TAMVLVNAIA  180
FKGLWEKAFK AEDTQTIPFR VTEQESKPVQ MMYQIGSFKV ASMASEKMKI LELPFASGTM  240
SMLVLLPDDV SGLEQLESII SFEKLTEWTS SSIMEERKVK VYLPRMKMEE KYNLTSLLMA  300
MGITDLFSSS ANLSGISSVG SLKISQAVHA AHAEINEAGR DVVGSAEAGV DATEEFRADH  360
PFLFCVKHIE TNAILLFGRC VSP                                          383

SEQ ID NO: 69           moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 69
MASIGAVSTE FCVDVYKELR VHHANENIFY SPFTIISTLA MVYLGAKDST RTQINKVVRF  60
DKLPGFGDSI EAQCGTSVNV HSSLRDILNQ ITKPNDVYSF SLASRLYAEE TYPILPEYLQ  120
CVKELYRGGL ESINFQTAAD QARELINSWV ESQTSGIIKN VLQPSSVNSQ TAMVLVNAIY  180
FKGLWERAFK DEDTQAIPFR VTEQESKPVQ MMSQIGSFKV ASVASEKVKI LELPFVSGTM  240
SMLVLLPDEV SGLEQLESTI STEKLTEWTS SSIMEERKIK VFLPRMRMEE KYNLTSVLMA  300
MGMTDLFSSS ANLSGISSAE SLKISQAVHA AYAEIYEAGR EVVSSAEAGV DATSVSEEFR  360
VDHPFLLCIK HNPTNSILFF GRCISP                                       386

SEQ ID NO: 70           moltype = AA  length = 411
FEATURE                 Location/Qualifiers
REGION                  1..411
                        note = Synthetic Polypeptide
source                  1..411
                        mol_type = protein
                        organism = synthetic construct
SEQUENCE: 70
MALCKAFHPY IFIVLLFDVD NSAFTMASIG AVSTEFCVDV YKELRVHHAN ENIFYSPFTI  60
ISTLAMVYLG AKDSTRTQIN KVVRFDKLPG FGDSIEAQCG TSVNVHSSLR DILNQITKPN  120
DVYSFSLASR LYAEETYPIL PEYLQCVKEL YRGGLESINF QTAADQAREL INSWVESQTS  180
GIIKNVLQPS SVNSQTAMVL VNAIYFKGLW ERAFKDEDTQ AIPFRVTEQE SKPVQMMSQI  240
GSFKVASVAS EKVKILELPF VSGTMSMLVL LPDEVSGLEQ LESTISTEKL TEWTSSSIME  300
ERKIKVFLPR MRMEEKYNLT SVLMAMGMTD LFSSSANLSG ISSAESLKIS QAVHAAYAEI  360
YEAGREVVSS AEAGVDATSV SEEFRVDHPF LLCIKHNPTN SILFFGRCIS P           411

SEQ ID NO: 71           moltype = AA  length = 383
FEATURE                 Location/Qualifiers
REGION                  1..383
                        note = Synthetic Polypeptide
source                  1..383
                        mol_type = protein
                        organism = synthetic construct
SEQUENCE: 71
MGSIGAASME FCFDVFKELK VHHANDNMLY SPFAILSTLA MVFLGAKDST RTQINKVVHF  60
DKLPGFGDSI EAQCGTSANV HSSLRDILNQ ITKQNDAYSF SLASRLYAQE TYTVVPEYLQ  120
CVKELYRGGL ESVNFQTAAD QARGLINAWV ESQTNGIIRN ILQPSSVDSQ TAMVLVNAIA  180
FKGLWEKAFK AEDTQTIPFR VTEQESKPVQ MMHQIGSFKV ASMASEKMKI LELPFASGTM  240
SMLVLLPDDV SGLEQLESTI SFEKLTEWTS SSIMEERKVK VYLPRMKMEE KYNLTSLLMA  300
MGITDLFSSS ANLSGISSVG SLKISQAVHA AYAEINEAGR DVVGSAEAGV DATEEFRADH  360
PFLFCVKHIE TNAILLFGRC VSP                                          383

SEQ ID NO: 72           moltype = AA  length = 408
FEATURE                 Location/Qualifiers
REGION                  1..408
```

```
                         note = Synthetic Polypeptide
source                   1..408
                         mol_type = protein
                         organism = synthetic construct
SEQUENCE: 72
MGLCTAFHPY IFIVLLFALD NSEFTMGSIG AASMEFCFDV FKELKVHHAN DNMLYSPFAI  60
LSTLAMVFLG AKDSTRTQIN KVVHFDKLPG FGDSIEAQCG TSANVHSSLR DILNQITKQN  120
DAYSFSLASR LYAQETYTVV PEYLQCVKEL YRGGLESVNF QTAADQARGL INAWVESQTN  180
GIIRNILQPS SVDSQTAMVL VNAIAFKGLW EKAFKAEDTQ TIPFRVTEQE SKPVQMMHQI  240
GSFKVASMAS EKMKILELPF ASGTMSMLVL LPDDVSGLEQ LESTISFEKL TEWTSSSIME  300
ERKVKVYLPR MKMEEKYNLT SLLMAMGITD LFSSSANLSG ISSVGSLKIS QAVHAAYAEI  360
NEAGRDVVGS AEAGVDATEE FRADHPFLFC VKHIETNAIL LFGRCVSP              408

SEQ ID NO: 73            moltype = AA  length = 383
FEATURE                  Location/Qualifiers
REGION                   1..383
                         note = Synthetic Polypeptide
source                   1..383
                         mol_type = protein
                         organism = synthetic construct
SEQUENCE: 73
MGSIGAASME FCFDVFKELK VHHANDNMLY SPFAILSTLA MVFLGAKDST RTQINKVVHF  60
DKLPGFGDSI EAQCGTSANV HSSLRDILNQ ITKQNDAYSF SLASRLYAQE TYTVVPEYLQ  120
CVKELYRGGL ESVNFQTAAD QARGLINAWV ESQTNGIIRN ILQPSSVDSQ TAMVLVNAIA  180
FKGLWEKAFK AEDTQTIPFR VTEQESKPVQ MMHQIGSFKV ASMASEKMKI LELPFASGTM  240
SMLVLLPDDV SGLEQLESTI SFEKLTEWTS SSIMEERKVK VYLPRMKMEE KYNLTSLLMA  300
MGITDLFSSS ANLSGISSVG SLKIPQAVHA AYAEINEAGR DVVGSAEAGV DATEEFRADH  360
PFLFCVKHIE TNAILLFGRC VSP                                         383

SEQ ID NO: 74            moltype = AA  length = 386
FEATURE                  Location/Qualifiers
REGION                   1..386
                         note = Synthetic Polypeptide
source                   1..386
                         mol_type = protein
                         organism = synthetic construct
SEQUENCE: 74
MGSIGAASTE FCFDVFRELR VQHVNENIFY SPFSIISALA MVYLGARDNT RTQIDKVVHF  60
DKLPGFGESM EAQCGTSVSV HSSLRDILTQ ITKPSDNFSL SFASRLYAEE TYAILPEYLQ  120
CVKELYKGGL ESISFQTAAD QARELINSWV ESQTNGIIKN ILQPSSVDSQ TTMVLVNAIY  180
FKGMWEKAFK DEDTQAMPFR MTEQESKPVQ MMYQVGSFKV AMVTSEKMKI LELPFASGMM  240
SMFVLLPDEV SGLEQLESTI SFEKLTEWTS STMMEERRMK VYLPRMKMEE KYNLTSVFMA  300
LGMTDLFSSS ANMSGISSTV SLKMSEAVHA ACVEIFEAGR DVVGSAEAGM DVTSVSEEFR  360
ADHPFLFFIK HNPTNSILFF GRWMSP                                      386

SEQ ID NO: 75            moltype = AA  length = 386
FEATURE                  Location/Qualifiers
REGION                   1..386
                         note = Synthetic Polypeptide
source                   1..386
                         mol_type = protein
                         organism = synthetic construct
SEQUENCE: 75
MGSIGAASTE FCFDVFRELK VQHVNENIFY SPLSIISALA MVYLGARDNT RTQIDQVVHF  60
DKIPGFGESM EAQCGTSVSV HSSLRDILTE ITKPSDNFSL SFASRLYAEE TYTILPEYLQ  120
CVKELYKGGL ESISFQTAAD QARELINSWV ESQTNGIIKN ILQPSSVDSQ TTMVLVNAIY  180
FKGMWEKAFK DEDTQTMPFR MTEQESKPVQ MMYQVGSFKL ATVTSEKVKI LELPFASGMM  240
SMCVLLPDEV SGLEQLETTI SFEKLTEWTS STMMEERRMK VYLPRMKMEE KYNLTSVFMA  300
LGMTDLFSSS ANMSGISSTV SLKMSEAVHA ACVEIFEAGR DVVGSAEAGM DVTSVSEEFR  360
ADHPFLFFIK HNPSNSILFF GRWISP                                      386

SEQ ID NO: 76            moltype = AA  length = 386
FEATURE                  Location/Qualifiers
REGION                   1..386
                         note = Synthetic Polypeptide
source                   1..386
                         mol_type = protein
                         organism = synthetic construct
SEQUENCE: 76
MGSIGAASTE FCFDVFKELK VQHVNENIFY SPLTIISALS MVYLGARENT RAQIDKVLHF  60
DKMPGFGDTI ESQCGTSVSI HTSLKDMFTQ ITKPSDNYSL SFASRLYAEE TYPILPEYLQ  120
CVKELYKGGL ETISFQTAAE QARELINSWV ESQTNGMIKN ILQPSSVDPQ TKMVLVNAIY  180
FKGVWEKAFK DEDTQEVPFR VTEQESKPVQ MMYQIGSFKV AVMASEKMKI LELPYASGQL  240
SMLVLLPDDV SGLEQLESAI TFEKLMAWTS STTMEERKMK VYLPRMKIEE KYNLTSVLMA  300
LGVTDLFSSS ANLSGISSAE SLKISKAVHE AFVEIYEAGS EVVGSTEAGM EVTSVSEEFR  360
ADHPFLFLIK HNPTNSILFF GRCFSP                                      386

SEQ ID NO: 77            moltype = AA  length = 386
FEATURE                  Location/Qualifiers
```

```
REGION                1..386
                      note = Synthetic Polypeptide
source                1..386
                      mol_type = protein
                      organism = synthetic construct
SEQUENCE: 77
MGSIGAASTE FCFDVFKELK VQHVNENIFY SPLTIISALS MVYLGARENT RTQIDKVLHF  60
DKMTGFGDTV ESQCGTSVSI HTSLKDIFTQ ITKPSDNYSL SLASRLYAEE TYPILPEYLQ  120
CVKELYKGGL ETVSFQTAAE QARELINSWV ESQTNGMIKN ILQPSSVDPQ TKMVLVNAIY  180
FKGVWEKAFK DEDTQEVPFR VTEQESKPVQ MMYQIGSFKV AVMASEKMKI LELPYASGQL  240
SMLVLLPDDV SGLEQLESAI TSEKLMEWTS STTMEERKMK VYLPRMKIEE KYNLTSVLMA  300
LGVTDLFSSS ADLSGISSAE SLKISKAVHE AFVEIYEAGS EVVGSTEGGM EVTSVSEEFR  360
ADHPFLFLIK HKPTNSILFF GRCFSP                                    386

SEQ ID NO: 78         moltype = AA  length = 386
FEATURE               Location/Qualifiers
REGION                1..386
                      note = Synthetic Polypeptide
source                1..386
                      mol_type = protein
                      organism = synthetic construct
SEQUENCE: 78
MGSIGAASTE FCFDVFKELK VQHVNENIFY SPLTIISALS MVYLGARENT RTQIDKVLHF  60
DKMTGFGDTV ESQCGTSVSI HTSLKDIFTQ ITKPSDNYSL SLASRLYAEE TYPILPEYLQ  120
CVKELYKGGL ETVSFQTAAE QARELINSWV ESQTNGMIKN ILQPSSVDPQ TKMVLVNAIY  180
FKGVWEKAFK DEDTQEVPFR VTEQESKPVQ MMYQIGSFKV AVMASEKMKI LELPYASGQL  240
SMLVLLPDDV SGLEQLESAI TSEKLMEWTS STTMEERKMK VYLPRMKIEE KYNLTSVLMA  300
LGVTDLFSSS ADLSGISSAE SLKISKAVHE AFVEIYEAGS EVVGSTEGGM EVTSFSEEFR  360
ADHPFLFLIK HKPTNSILFF GRCFSP                                    386

SEQ ID NO: 79         moltype = AA  length = 386
FEATURE               Location/Qualifiers
REGION                1..386
                      note = Synthetic Polypeptide
source                1..386
                      mol_type = protein
                      organism = synthetic construct
SEQUENCE: 79
MGSIGAASTE FCFDVFKELK VQHVNENIFY SPLSIISALS MVYLGARENT RAQIDKVVHF  60
DKITGFGETI ESQCGTSVSV HTSLKDMFTQ ITKPSDNYSL SFASRLYAEE TYPILPEYLQ  120
CVKELYKGGL ETTSFQTAAD QARELINSWV ESQTNGMIKN ILQPGSVDPQ TEMVLVNAIY  180
FKGMWEKAFK DEDTQAVPFR MTEQESKTVQ MMYQIGSFKV AVMASEKMKI LELPYASGEL  240
SMLVMLPDDV SGLEQLETAI TFEKLMEWTS SNMMEERKMK VYLPRMKMEE KYNLTSVLMA  300
LGVTDLFSSS ANLSGISSAE SLKMSEAVHE AFVEIYEAGS EVVGSTGAGM EVTSVSEEFR  360
ADHPFLFLIK HNPTNSILFF GRCFSP                                    386

SEQ ID NO: 80         moltype = AA  length = 386
FEATURE               Location/Qualifiers
REGION                1..386
                      note = Synthetic Polypeptide
source                1..386
                      mol_type = protein
                      organism = synthetic construct
SEQUENCE: 80
MGSIGAASTE FCFDVFKELR VQHVNENVCY SPLIIISALS LVYLGARENT RAQIDKVVHF  60
DKITGFGESI ESQCGTSVSV HTSLKDMFNQ ITKPSDNYSL SVASRLYAEE RYPILPEYLQ  120
CVKELYKGGL ESISFQTAAD QAREAINSWV ESQTNGMIKN ILQPSSVDPQ TEMVLVNAIY  180
FKGMWQKAFK DEDTQAVPFR ISEQESKPVQ MMYQIGSFKV AVMAAEKMKI LELPYASGEL  240
SMLVLLPDEV SGLEQLENAI TVEKLMEWTS SSPMEERIMK VYLPRMKIEE KYNLTSVLMA  300
LGITDLFSSS ANLSGISAEE SLKMSEAVHQ AFAEISEAGS EVVGSSEAGI DATSVSEEFR  360
ADHPFLFLIK HNATNSILFF GRCFSP                                    386

SEQ ID NO: 81         moltype = AA  length = 386
FEATURE               Location/Qualifiers
REGION                1..386
                      note = Synthetic Polypeptide
source                1..386
                      mol_type = protein
                      organism = synthetic construct
SEQUENCE: 81
MGSISAASTE FCFDVFKELK VQHVNENIFY SPLSIISALS MVYLGARENT RAQIEKVVHF  60
DKITGFGESI ESQCSTSVSV HTSLKDMFTQ ITKPSDNYSL SFASRFYAEE TYPILPEYLQ  120
CVKELYKGGL ETINFRTAAD QARELINSWV ESQTNGMIKN ILQPGSVDPQ TDMVLVNAIY  180
FKGMWEKAFK DEDTQALPFR VTEQESKPVQ MMYQIGSFKV AVLASEKVKI LELPYASGQL  240
SMLVLLPDDV SGLEQLETAI TVEKLMEWTS SNNMEERKIK VYLPRIKIEE KYNLTSVLMA  300
LGITDLFSSS ANLSGISSAE SLKVSEAIHE AFVEIYEAGS EVAGSTEAGI EVTSVSEEFR  360
ADHPFLFLIK HNATNSILFF GRCFSP                                    386

SEQ ID NO: 82         moltype = AA  length = 386
```

```
FEATURE                 Location/Qualifiers
REGION                  1..386
                        note = Synthetic Polypeptide
source                  1..386
                        mol_type = protein
                        organism = synthetic construct
SEQUENCE: 82
MVSIGAASTE FCFDVFKELK VQHVNENIFY SPLSIISALS MVYLGARENT RAQIDKVVHF  60
DKITGFEETI ESQCSTSVSV HTSLKDMFTQ ITKPSDNYSL SFASRLYAEE TYPILPEYLQ  120
CVKELYKGGL ETISFQTAAD QARELINSWV ESQTDGMIKN ILQPGSVDPQ TEMVLVNAIY  180
FKGMWEKAFK DEDTQAVPFR MTEQESKPVQ MMYQIGSFKV AVMASEKMKI LELPYASGGM  240
SMLVMLPDDV SGLEQLETAI TFEKLMEWTS SNMMEERKMK VYLPRMKMEE KYNLTSVLMA  300
LGMTDLFSSS ANLSGISSAE SLKMSEAVHE AFVEIYEAGS EAVGSTGAGM EVTSVSEEFR  360
ADHPFLFLIK HNPTNSILFF GRCFSP                                      386

SEQ ID NO: 83           moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 83
MGSIGAASTE FCFDVFKELK VQHVNENIFY SPLSIISALS MVYLGARENT RAQIDKVVHF  60
DKITGFGEPI ESQCGISVSV HTSLKDMITQ ITKPSDNYSL SFASRLYAEE TYPILPEYLQ  120
CVKELYKGGL ETISFQTAAD QARELINSWV ENQTNGMIKN ILQPGSVDPQ TEMVLVNAVY  180
FKGMWEKAFK DEDTQAVPFR MTEQESKPVQ MMYQIGSFKV AVMASEKIKI LELPYASGEL  240
SMLVLLPDDV SGLEQLETAI TLDKLTEWTS SNAMEERKMK VYLPRMKIEK KYNLTSVLIA  300
LGMTDLFSSS ANLSGISSAE SLKMSEAIHE AFLEIYEAGS EVVGSTEAGM EVTSVSEEFR  360
ADHPFLFLIK HNPTNSILFF GRCLSP                                      386

SEQ ID NO: 84           moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 84
MGSIGAASTE FCFDVFKELK VQHVNENIFY SPLTIISALS MVYLGARENT RAQIDKVVHF  60
DKIPGFGDTT ESQCGTSVSV HTSLKDMFTQ ITKPSDNYSV SFASRLYAEE TYPILPEFLE  120
CVKELYKGGL ESISFQTAAD QARELINSWV ESQTNGMIKN ILQPGSVDSQ TEMVLVNAIY  180
FKGMWEKAFK DEDTQTVPFR MTEQETKPVQ MMYQIGTFKV AVMPSEKMKI LELPYASGEL  240
CMLVMLPDDV SGLEELESSI TVEKLMEWTS SNMMEERKMK VFLPRMKIEE KYNLTSVLMA  300
LGMTDLFSSS ANLSGISSAE PLKMSEAVHE AFIEIYEAGS EVVGSTGAGM EITSVSEEFR  360
ADHPFLFLIK HNPTNSILFF GRCVSP                                      386

SEQ ID NO: 85           moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 85
MGSIGAVSTE FCFDVFKELK VQHVNENIFY SPLSIISALS MVYLGARENT RAQIDKVVHF  60
DKITGSGETI EAQCGTSVSV HTSLKDMFTQ ITKPSENYSV GFASRLYADE TYPIIPEYLQ  120
CVKELYKGGL EMISFQTAAD QARELINSWV ESQTNGMIKN ILQPGSVDPQ TEMILVNAIY  180
FKGVWEKAFK DEDTQAVPFR MTEQESKPVQ MMYQFGSFKV AAMAAEKMKI LELPYASGAL  240
SMLVLLPDDV SGLEQLESAI TFEKLMEWTS SNMMEEKKIK VYLPRMKMEE KYNFTSVLMA  300
LGMTDLFSSS ANLSGISSAD SLKMSEVVHE AFVEIYEAGS EVVGSTGSGM EAASVSEEFR  360
ADHPFLFLIK HNPTNSILFF GRCFSP                                      386

SEQ ID NO: 86           moltype = AA  length = 391
FEATURE                 Location/Qualifiers
REGION                  1..391
                        note = Synthetic Polypeptide
source                  1..391
                        mol_type = protein
                        organism = synthetic construct
SEQUENCE: 86
MVSIGAASTE FCFDVFKELK VQHVNENIFY SPLSIISALS MVYLGARENT RAQIDKVVHF  60
DKITGFEETI ESQVQKKQCS TSVSVHTSLK DMFTQITKPS DNYSLSFASR LYAEETYPIL  120
PEYLQCVKEL YKGGLETISF QTAADQAREL INSWVESQTD GMIKNILQPG SVDPQTEMVL  180
VNAIYFKGMW EKAFKDEDTQ AVPFRMTEQE SKPVQMMYQI GSFKVAVMAS EKMKILELPY  240
ASGGMSMLVM LPDDVSGLEQ LETAITFEKL MEWTSSNMME ERKMKVYLPR MKMEEKYNLT  300
SVLMALGMTD LFSSSANLSG ISSAESLKMS EAVHEAFVEI YEAGSEAVGS TGAGMEVTSV  360
SEEFRADHPF LFLIKHNPTN SILFFGRCFS P                                391
```

```
SEQ ID NO: 87          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 87
MGSIGAASGE FCFDVFKELK VQHVNENIFY SPLSIISALS MVYLGARENT RAQIDKVVHF  60
DKIIGFGESI ESQCGTSVSV HTSLKDMFAQ ITKPSDNYSL SFASRLYAEE TFPILPEYLQ  120
CVKELYKGGL ETLSFQTAAD QARELINSWV ESQTNGMIKD ILQPGSVDPQ TEMVLVNAIY  180
FKGVWEKAFK DEDTQTVPFR MTEQESKPVQ MMYQIGSFKV AVVAAEKIKI LELPYASGAL  240
SMLVLLPDDV SSLEQLETAI TFEKLTEWTS SNIMEERKIK VYLPRMKIEE KYNLTSVLMD  300
LGITDLFSSS ANLSGISSAE SLKVSEAIHE AIVDIYEAGS EVVGSSGAGL EGTSVSEEFR  360
ADHPFLFLIK HNPTSSILFF GRCFSP                                      386

SEQ ID NO: 88          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 88
MGSIGAASTE FCFDVFKELK VQHVNENIFY SPLSIISALS MVYLGARENT RAQIDKVVHF  60
DKITGSGEAI ESQCGTSVSV HISLKDMFTQ ITKPSDNYSL SFASRLYAEE TYPILPEYLQ  120
CVKELYKEGL ATISFQTAAD QAREFINSWV ESQTNGMIKN ILQPGSVDPQ TQMVLVNAIY  180
FKGVWEKAFK DEDTQAVPFR MTKQESKPVQ MMYQIGSFKV AVMASEKMKI LELPYASGQL  240
SMLVMLPDDV SGLEQIENAI TFEKLMEWTN PNMMEERKMK VYLPRMKMEE KYNLTSVLMA  300
LGMTDLFSSS ANLSGISSAE SLKMSEAVHE AFVEIYEAGS EVVGSTGAGI EVTSVSEEFR  360
ADHPFLFLIK HNPTNSILFF GRCFSP                                      386

SEQ ID NO: 89          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 89
MGSIGEASTE FCIDVFRELK VQHVNENIFY SPLSIISALS MVYLGARENT RAQIDQVVHF  60
DKITGFGDTV ESQCGSSLSV HSSLKDIFAQ ITQPKDNYSL NFASRLYAEE TYPILPEYLQ  120
CVKELYKGGL ETISFQTAAD QARELINSWV ESQTNGMIKN ILQPSSVDPQ TEMVLVNAIY  180
FKGVWEKAFK DEETQAVPFR ITEQENRPVQ IMYQFGSFKV AVVASEKIKI LELPYASGQL  240
SMLVLLPDEV SGLEQLENAI TFEKLTEWTS SDIMEEKKIK VFLPRMKIEE KYNLTSVLVA  300
LGIADLFSSS ANLSGISSAE SLKMSEAVHE AFVEIYEAGS EVVGSSGAGI EAASDSEEFR  360
ADHPFLFLIK HKPTNSILFF GRCFSP                                      386

SEQ ID NO: 90          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 90
MGSIGAASTE FCFDIFNELK VQHVNENIFY SPLSIISALS MVYLGARENT KAQIDKVVHF  60
DKITGFGESI ESQCSTSASV HTSFKDMFTQ ITKPSDNYSL SFASRLYAEE TYPILPEYSQ  120
CVKELYKGGL ESISFQTAAD QARELINSWV ESQTNGMIKN ILQPGSVDPQ TELVLVNAIY  180
FKGTWEKAFK DKDTQAVPFR VTEQESKPVQ MMYQIGSYKV AVIASEKMKI LELPYASGEL  240
SMLVLLPDDV SGLEQLETAI TFEKLMEWTS SNMMEERKVK VYLPRMKIEE KYNLTSVLMA  300
LGMTDLFSPS ANLSGISSAE SLKMSEAIHE AFVEIYEAGS EVVGSTEAGM EVTSVSEEFR  360
ADHPFLFLIK CNLTNSILFF GRCFSP                                      386

SEQ ID NO: 91          moltype = AA  length = 385
FEATURE                Location/Qualifiers
REGION                 1..385
                       note = Synthetic Polypeptide
source                 1..385
                       mol_type = protein
                       organism = synthetic construct
SEQUENCE: 91
MGSISTASTE FCFDVFKELK VQHVNENIFY SPLSIISALS MVYLGARENT RAQIEKVVHF  60
DKITGFGESI ESQCGTSVSV HTSLKDMLIQ ISKPSDNYSL SFASKLYAEE TYPILPEYLQ  120
CVKELYKGGL ESINFQTAAD QARQLINSWV ESQTNGMIKD ILQPSSVDPQ TEMVLVNAIY  180
FKGIWEKAFK DEDTQEVPFR ITEQESKPVQ MMYQIGSFKV AVIASEKIKI LELPYASGEL  240
SMLIVLPDDV SGLEQLETAI TFEKLIEWTS PSIMEERKTK VYLPRMKIEE KYNLTSVLMA  300
LGMTDLFSPS ANLSGISSAE SLKMSEAIHE AFVEIYEAGS EVVGSAEAGM EATSVSEFRV  360
DHPFLFLIKH NPANIILFFG RCVSP                                       385
```

```
SEQ ID NO: 92          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 92
MGSIGAASTE FCFDVFKELK VQHVNENIFY SPLTIISALS LVYLGARENT RAQIDKVFHF  60
DKISGFGETT ESQCGTSVSV HTSLKEMFTQ ITKPSDNYSV SFASRLYAED TYPILPEYLQ  120
CVKELYKGGL ETISFQTAAD QAREVINSWV ESQTNGMIKN ILQPGSVDSQ TEMVLVNAIY  180
FKGMWEKAFK DEDTQTMPFR ITEQERKPVQ MMYQAGSFKV AVMASEKMKI LELPYASGEF  240
CMLIMLPDDV SGLEQLENSF SFEKLMEWTT SNMMEERKMK VYIPRMKMEE KYNLTSVLMA  300
LGMTDLFSSS ANLSGISSAE TLKMSEAVHE AFMEIYEAGS EVVGSTGSGA EVTGVYEEFR  360
ADHPFLFLVK HKPTNSILFF GRCVSP                                      386

SEQ ID NO: 93          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 93
MGSIGAASTE FCFDIFNELK VQHVNENIFY SPLSIISALS MVYLGARENT KAQIDKVVHF  60
DKITGFGETI ESQCSTSVSV HTSLKDTFTQ ITKPSDNYSL SFASRLYAEE TYPILPEYSQ  120
CVKELYKGGL ETISFQTAAD QARELINSWV ESQTNGMIKN ILQPGSVDPQ TELVLVNAIY  180
FKGTWEKAFK DKDTQAVPFR VTEQESKPVQ MMYQIGSYKV AVIASEKMKI LELPYASREL  240
SMLVLLPDDV SGLEQLETAI TFEKLMEWTS SNMMEERKVK VYLPRMKIEE KYNLTSVLMA  300
LGMTDLFSPS ANLSGISSAE SLKMSEAVHE AFVEIYEAGS EVVGSTGAGM EVTSVSEEFR  360
ADHPFLFLIK CNPTNSILFF GRCFSP                                      386

SEQ ID NO: 94          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 94
MGSISAASAE FCLDVFKELK VQHVNENIFY SPLSIISALS MVYLGARENT RAQIDKVVHF  60
DKITGSGETI EFQCGTSANI HPSLKDMFTQ ITRLSDNYSL SFASRLYAEE RYPILPEYLQ  120
CVKELYKGGL ETISFQTAAD QARELINSWV ESQTNGMIKN ILQPGSVNPQ TEMVLVNAIY  180
FKGLWEKAFK DEDTQTVPFR MTEQESKPVQ MMYQVGSFKV AVMASDKIKI LELPYASGEL  240
SMLVLLPDDV TGLEQLETSI TFEKLMEWTS SNVMEERTMK VYLPHMRMEE KYNLTSVLMA  300
LGVTDLFSSS ANLSGISSAE SLKMSEAVHE AFVEIYESGS QVVGSTGAGT EVTSVSEEFR  360
VDHPFLFLIK HNPTNSILFF GRCFSP                                      386

SEQ ID NO: 95          moltype = AA  length = 385
FEATURE                Location/Qualifiers
REGION                 1..385
                       note = Synthetic Polypeptide
source                 1..385
                       mol_type = protein
                       organism = synthetic construct
SEQUENCE: 95
MGSIGAASVE FCFDVFKELK VQHVNENIFY SPLSIISALS MVYLGARENT KAQIDKVVHF  60
DKIAGFGEAI ESQCVTSASI HSLKDMFTQI TKPSDNYSLS FASRLYAEEA YSILPEYLQC  120
VKELYKGGLE TISFQTAADQ ARDLINSWVE SQTNGMIKNI LQPGAVDLET EMVLVNAIYF  180
KGMWEKAFKD EDTQTVPFRM TEQESKPVQM MYQVGSFKVA VMASDKIKIL ELPYASGQLS  240
MVVVLPDDVS GLEQLEASIT SEKLMEWTSS SIMEEKKIKV YFPHMKIEEK YNLTSVLMAL  300
GMTDLFSSSA NLSGISSAEK LKVSEAVHEA FVEISEAGSE VVGSTEAGTE VTSVSEEFKA  360
DHPFLFLIKH NPTNSILFFG RCFSP                                       385

SEQ ID NO: 96          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 96
MGSIGAASSE FCFDIFKELK VQHVNENIFY SPLSIISALS MVYLGARENT RAQIDKVVPF  60
DKITASGESI ESQCSTSVSV HTSLKDIFTQ ITKSSDNHSL SFASRLYAEE TYPILPEYLQ  120
CVKELYEGGL ETISFQTAAD QARELINSWI ESQTNGRIKN ILQPGSVDPQ TEMVLVNAIY  180
FKGMWEKAFK DEDTQAVPFR MTEQESKPVQ VMHQIGSFKV AVLASEKIKI LELPYASGEL  240
SMLVLLPDDV SGLEQLETAI TFEKLMEWTS PNIMEERKIK VFLPRMKIEE KYNLTSVLMA  300
LGITDLFSPL ANLSGISSAE SLKMSEAIHE AFVEISEAGS EVIGSTEAEV EVTNDPEEFR  360
```

```
ADHPFLFLIK HNPTNSILFF GRCFSP                                    386

SEQ ID NO: 97          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 97
MGSIGAASTE FCFDVFKELK AQYVNENIFY SPMTIITALS MVYLGSKENT RAQIAKVAHF  60
DKITGFGESI ESQCGASASI QFSLKDLFTQ ITKPSGNHSL SVASRIYAEE TYPILPEYLE  120
CMKELYKGGL ETINFQTAAN QARELINSWV ERQTSGMIKN ILQPSSVDSQ TEMVLVNAIY  180
FRGLWEKAFK VEDTQATPFR ITEQESKPVQ MMHQIGSFKV AVVASEKIKI LELPYASGRL  240
TMLVVLPDDV SGLKQLETTI TFEKLMEWTT SNIMEERKIK VYLPRMKIEE KYNLTSVLMA  300
LGLTDLFSSS ANLSGISSAE SLKMSEAVHE AFVEIYEAGS EVVASAEAGM DATSVSEEFR  360
ADHPFLFLIK DNTSNSILFF GRCFSP                                    386

SEQ ID NO: 98          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 98
MGSIGAASTE FCFDVFKELK GQHVNENIFF CPLSIVSALS MVYLGARENT RAQIVKVAHF  60
DKIAGFAESI ESQCGTSVSI HTSLKDMFTQ ITKPSDNYSL NFASRLYAEE TYPIIPEYLQ  120
CVKELYKGGL ETISFQTAAD QAREIINSWV ESQTNGMIKN ILRPSSVHPQ TELVLVNAVY  180
FKGTWEKAFK DEDTQAVPFR ITEQESKPVQ MMYQIGSFKV AAVTSEKMKI LEVPYASGEL  240
SMLVLLPDDV SGLEQLETAI TAEKLIEWTS STVMEERKLK VYLPRMKIEE KYNLTTVLTA  300
LGVTDLFSSS ANLSGISSAQ GLKMSNAVHE AFVEIYEAGS EVVGSKGEGT EVSSVSDEFK  360
ADHPFLFLIK HNPTNSIVFF GRCFSP                                    386

SEQ ID NO: 99          moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 99
MGSIGAASTE FCFDVFKELK VHHVNENILY SPLAIISALS MVYLGAKENT RDQIDKVVHF  60
DKITGIGESI ESQCSTAVSV HTSLKDVFDQ ITRPSDNYSL AFASRLYAEK TYPILPEYLQ  120
CVKELYKGGL ETIDFQTAAD QARQLINSWV EDETNGMIKN ILRPSSVNPQ TKIILVNAIY  180
FKGMWEKAFK DEDTQEVPFR ITEQETKSVQ MMYQIGSFKV AEVVSDKMKI LELPYASGKL  240
SMLVLLPDDV YGLEQLETVI TVEKLKEWTS SIVMEERITK VYLPRMKIME KYNLTSVLTA  300
FGITDLFSPS ANLSGISSTE SLKVSEAVHE AFVEIHEAGS EVVGSAGAGI EATSVSEEFK  360
ADHPFLFLIK HNPTNSILFF GRCFSP                                    386

SEQ ID NO: 100         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 100
MGSIGAASTE FCLDVFKELK VQHVNENIFY SPLSIISALS MVYLGARENT RAQIDKVVHF  60
DKITGFEDSI ESQCGTSVSV HTSLKDMFTQ ITKPSDNYSV GFASRLYAAE TYQILPEYSQ  120
CVKELYKGGL ETINFQKAAD QATELINSWV ESQTNGMIKN ILQPSSVDPQ TQIFLVNAIY  180
FKGMWQRAFK EEDTQAVPFR ISEKESKPVQ MMYQIGSFKV AVIPSEKIKI LELPYASGLL  240
SMLVILPDDV SGLEQLENAI TLEKLMQWTS SNMMEERKLK VYLPRMRMEE KYNLTSVFMA  300
LGITDLFSSS ANLSGISSAE SLKMSDAVHE ASVEIHEAGS EVVGSTGSGT EASSVSEEFR  360
ADHPYLFLIK HNPTDSIVFF GRCFSP                                    386

SEQ ID NO: 101         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 101
MGSIGAASTE FCFDVFKELK FQHVDENIFY SPLTIISALS MVYLGARENT RAQIDKVVHF  60
DKIAGFEETV ESQCGTSVSV HTSLKDMFAQ ITKPSDNYSL SFASRLYAEE TYPILPEYLQ  120
CVKELYKGGL ETISFQTAAD QARDLINSWV ESQTNGMIKN ILQPSSVGPQ TELILVNAIY  180
FKGMWQKAFK DEDTQEVPFR MTEQQSKPVQ MMYQTGSFKV AVVASEKMKI LALPYASGQL  240
SLLVMLPDDV SGLKQLESAI TSEKLIEWTS PSMMEERKIK VYLPRMKIEE KYNLTSVLMA  300
```

```
LGITDLFSPS ANLSGISSAE SLKMSQAVHE AFVEIYEAGS EVVGSTGAGM EDSSDSEEFR  360
VDHPFLFFIK HNPTNSILFF GRCFSP                                       386

SEQ ID NO: 102          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 102
MGSIGPLSVE FCCDVFKELR IQHPRENIFY SPVTIISALS MVYLGARDNT KAQIEKAVHF  60
DKIPGFGESI ESQCGTSLSI HTSLKDIFTQ ITKPSDNYTV GIASRLYAEE KYPILPEYLQ  120
CIKELYKGGL EPINFQTAAE QARELINSWV ESQTNGMIKN ILQPSSVNPE TDMVLVNAIY  180
FKGLWEKAFK DEDIQTVPFR ITEQESKPVQ MMFQIGSFRV AEITSEKIRI LELPYASGQL  240
SLWVLLPDDI SGLEQLETAI TFENLKEWTS STKMEERKIK VYLPRMKIEE KYNLTSVLTS  300
LGITDLFSSS ANLSGISSAE SLKVSSAFHE ASVEIYEAGS KVVGSTGAEV EDTSVSEEFR  360
ADHPFLFLIK HNPSNSIFFF GRCFSP                                       386

SEQ ID NO: 103          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 103
MGSIGTASAE FCFDVFKELK VHHVNENIFY SPLSIISALS MVYLGARENT KTQMEKVIHF  60
DKITGLGESM ESQCGTGVSI HTALKDMLSE ITKPSDNYSL SLASRLYAEQ TYAILPEYLQ  120
CIKELYKESL ETVSFQTAAD QARELINSWI ESQTNGVIKN FLQPGSVDSQ TELVLVNAIY  180
FKGMWEKAFK DEDTQEVPFR ITEQESRPVQ MMYQAGSFKV ATVAAEKIKI LELPYASGEL  240
SMLVLLPDDI SGLEQLETTI SFEKLTEWTS SNMMEDRNMK VYLPRMKIEE KYNLTSVLIA  300
LGMTDLFSPA ANLSGISAAE SLKMSEAIHA AYVEIYEADS EIVSSAGVQV EVTSDSEEFR  360
VDHPFLFLIK HNPTNSVLFF GRCISP                                       386

SEQ ID NO: 104          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 104
MGSIGAVSTE FSCDVFKELR IHHVQENIFY SPVTIISALS MIYLGARDST KAQIEKAVHF  60
DKIPGFGESI ESQCGTSLSI HTSIKDMFTK ITKASDNYSI GIASRLYAEE KYPILPEYLQ  120
CVKELYKGGL ESISFQTAAE QAREIINSWV ESQTNGMIKN ILQPSSVDPQ TDIVLVNAIY  180
FKGLWEKAFR DEDTQTVPFK ITEQESKPVQ MMYQIGSFKV AEITSEKIKI LEVPYASGQL  240
SLWVLLPDDI SGLEKLETAI TFENLKEWTS STKMEERKIK VYLPRMKIEE KYNLTSVLTA  300
LGITDLFSSS ANLSGISSAE SLKVSEAFHE AIVEISEAGS KVVGSVGAGV DDTSVSEEFR  360
ADHPFLFLIK HNPTSSIFFF GRCFSP                                       386

SEQ ID NO: 105          moltype = AA  length = 381
FEATURE                 Location/Qualifiers
REGION                  1..381
                        note = Synthetic Polypeptide
source                  1..381
                        mol_type = protein
                        organism = synthetic construct
SEQUENCE: 105
MGSIGAASTE FCFDVFKELK VQHVNENIFY SPLSIISALS MVYLGARENT RAQIDKVVHF  60
DKIAGFGEST ESQCGTSVSA HTSLKDMSNQ ITKLSDNYSL SFASRLYAEE TYPILPEYSQ  120
CVKELYKGGL ESISFQTAAY QARELINAWV ESQTNGMIKD ILQPGSVDSQ TKMVLVNAIY  180
FKGIWEKAFK DEDTQEVPFR MTEQETKPVQ MMYQIGSFKV AVIAAEKIKI LELPYASGQL  240
SMLVILPDDV SGLEQLETAI TFEKLTEWTS ASVMEERKIK VYLPRMSIEE KYNLTSVLIA  300
LGVTDLFSSS ANLSGISSAE SLRMSEAIHE AFVETYEAGS TESGTEVTSA SEEFRVDHPF  360
LFLIKHKPTN SILFFGRCFS P                                            381

SEQ ID NO: 106          moltype = AA  length = 391
FEATURE                 Location/Qualifiers
REGION                  1..391
                        note = Synthetic Polypeptide
source                  1..391
                        mol_type = protein
                        organism = synthetic construct
SEQUENCE: 106
MGSIGAASSE FCFDIFKELK VQHVNENIFY SPLSIISALS MVYLGARENT RAQIDKVVPF  60
DKITASGESI ESQVQKIQCS TSVSVHTSLK DIFTQITKSS DNHSLSFASR LYAEETYPIL  120
PEYLQCVKEL YEGGLETISF QTAADQAREL INSWIESQTN GRIKNILQPG SVDPQTEMVL  180
VNAIYFKGMW EKAFKDEDTQ AVPFRMTEQE SKPVQVMHQI GSFKVAVLAS EKIKILELPY  240
```

```
ASGELSMLVL LPDDVSGLEQ LETAITFEKL MEWTSPNIME ERKIKVFLPR MKIEEKYNLT  300
SVLMALGITD LFSPLANLSG ISSAESLKMS EAIHEAFVEI SEAGSEVIGS TEAEVEVTND  360
PEEFRADHPF LFLIKHNPTN SILFFGRCFS P                                 391

SEQ ID NO: 107         moltype = AA  length = 383
FEATURE                Location/Qualifiers
REGION                 1..383
                       note = Synthetic Polypeptide
source                 1..383
                       mol_type = protein
                       organism = synthetic construct
SEQUENCE: 107
MGSIGPLSVE FCCDVFKELR IQHARENIFY SPVTIISALS MVYLGARDNT KAQIEKAVHF  60
DKIPGFGESI ESQCGTSLSI HTSLKDIFTQ ITKPSDNYTV GIASRLYAEE KYPILPEYLQ  120
CIKELYKGGL EPISFQTAAE QARELINSWV ESQTNGIIKN ILQPSSVNPE TDMVLVNAIY  180
FKGLWEKAFK DEGTQTVPFR ITEQESKPVQ MMFQIGSFRV AEIASEKIRI LELPYASGQL  240
SLWVLLPDDI SGLEQLETAI TFENLKEWTS STKMEERKIK VYLPRMKIEE KYNLTSVLTS  300
LGITDLFSSS ANLSGISSAE RLKVSSAFHE ASMEINEAGS KVVGAGVDDT SVSEEFRVDR  360
PFLFLIKHNP SNSIFFFGRC FSP                                          383

SEQ ID NO: 108         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 108
MGSIGAASTE FCFDMFKELK VHHVNENIIY SPLSIISILS MVFLGARENT KTQMEKVIHF  60
DKITGFGESL ESQCGTSVSV HASLKDILSE ITKPSDNYSL SLASKLYAEE TYPVLPEYLQ  120
CIKELYKGSL ETVSFQTAAD QARELINSWV ETQTNGVIKN FLQPGSVDPQ TEMVLVDAIY  180
FKGTWEKAFK DEDTQEVPFR ITEQESKPVQ MMYQAGSFKV ATVAAEKMKI LELPYASGEL  240
SMFVLLPDDI SGLEQLETTI SIEKLSEWTS SNMMEDRKMK VYLPHMKIEE KYNLTSVLVA  300
LGMTDLFSPS ANLSGISTAQ TLKMSEAIHG AYVEIYEAGS EMATSTGVLV EAASVSEEFR  360
VDHPFLFLIK HNPSNSILFF GRCIFP                                       386

SEQ ID NO: 109         moltype = AA  length = 392
FEATURE                Location/Qualifiers
REGION                 1..392
                       note = Synthetic Polypeptide
source                 1..392
                       mol_type = protein
                       organism = synthetic construct
SEQUENCE: 109
MGSIGAASTE FCFDMFKELK VHHVNENIIY SPLSIISILS MVFLGARENT KTQMEKVIHF  60
DKITGFGESL ESQCGTSVSV HASLKDILSE ITKPSDNYSL SLASKLYAEE TYPVLPEYLQ  120
CIKELYKGSL ETVSFQTAAD QARELINSWV ETQTNGVIKN FLQPGSVDPQ TEMVLVDAIY  180
FKGTWEKAFK DEDTQEVPFR ITEQESKPVQ MMYQAGSFKV ATVAAEKMKI LELPYASGEL  240
SMFVLLPDDI SGLEQLETTI SIEKLSEWTS SNMMEDRKMK VYLPHMKIEE KYNLTSVLVA  300
LGMTDLFSPS ANLSGISTAQ TLKMSEAIHG AYVEIYEAGS EMATSTGVLV EAASVSEEFR  360
VDHPFLFLIK HNPSNSILFF GRCIFPHHHH HH                                392

SEQ ID NO: 110         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 110
MGSIGPLSVE FCCDVFKELR IQHARENIFY SPVTIISALS MVYLGARDNT KAQIEKAVHF  60
DKIPGFGESI ESQCGTSLSI HTSLKDIFTQ ITKPSDNYTV GIASRLYAEE KYPILPEYLQ  120
CIKELYKGGL EPISFQTAAE QARELINSWV ESQTNGMIKN ILQPSAVNPE TDMVLVNAIY  180
FKGLWEKAFK DEGTQTVPFR ITEQESKPVQ MMFQIGSFRV AEITSEKIRI LELPYASGQL  240
SLWVLLPDDI SGLEQLETAI TFENLKEWTS STKMEERKIK VYLPRMKIEE KYNLTSVLTS  300
LGITDLFSSS ANLSGISSAE RLKVSSAFHE ASMEIYEAGS KVVGSTGAGV DDTSVSEEFR  360
VDRPFLFLIK HNPSNSIFFF GRCFSP                                       386

SEQ ID NO: 111         moltype = AA  length = 395
FEATURE                Location/Qualifiers
REGION                 1..395
                       note = Synthetic Polypeptide
source                 1..395
                       mol_type = protein
                       organism = synthetic construct
SEQUENCE: 111
MEDQRGNTGF TMGSIGAAST EFCIDVFREL RVQHVNENIF YSPLTIISAL SMVYLGAREN  60
TRAQIDQVVH FDKIAGFGDT VESQCGSSPS VHNSLKTVXA QITQPRDNYS LNLASRLYAE  120
ESYPILPEYL QCVKELYNGG LETVSFQTAA DQARELINSW VESQTNGIIK NILQPSSVDP  180
```

```
QTEMVLVNAI YFKGLWEKAF KDEETQAVPF RITEQENRPV QMMYQFGSFK VAXVASEKIK  240
ILELPYASGQ LSMLVLLPDE VSGLEQNAIT FEKLTEWTSS DLMEERKIKV FFPRVKIEEK  300
YNLTAVLVSL GITDLFSSSA NLSGISSAEN LKMSEAVHEA XVEIYEAGSE VAGSSGAGIE  360
VASDSEEFRV DHPFLFLIXH NPTNSILFFG RCFSP                             395

SEQ ID NO: 112          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 112
MGSIGAASTE FCIDVFRELR VQHVNENIFY SPLSIISALS MVYLGARENT RAQIDEVFHF  60
DKIAGFGDTV DPQCGASLSV HKSLQNVFAQ ITQPKDNYSL NLASRLYAEE SYPILPEYLQ  120
CVKELYNEGL ETVSFQTGAD QARELINSWV ENQTNGVIKN ILQPSSVDPQ TEMVLVNAIY  180
FKGLWQKAFK DEETQAVPFR ITEQENRPVQ MMYQFGSFKV AVVASEKVKI LELPYASGQL  240
SMWVLLPDEV SGLEQLENAI TFEKLTEWTS SDLTEERKIK VFLPRVKIEE KYNLTAVLMA  300
LGVTDLFSSS ANFSGISAAE NLKMSEAVHE AFVEIYEAGS EVVGSSGAGI EAPSDSEEFR  360
ADHPFLFLIK HNPTNSILFF GRCFSP                                      386

SEQ ID NO: 113          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 113
MGSIGPLSVE FCCDVFKELR IQHARDNIFY SPVTIISALS MVYLGARDNT KAQIEKAVHF  60
DKIPGFGESI ESQCGTSLSV HTSLKDIFTQ ITKPRENYTV GIASRLYAEE KYPILPEYLQ  120
CIKELYKGGL EPISFQTAAE QARELINSWV ESQTNGMIKN ILQPSSVNPE TDMVLVNAIY  180
FKGLWKKAFK DEGTQTVPFR ITEQESKPVQ MMFQIGSFRV AEITSEKIRI LELPYASGQL  240
SLWVLLPDDI SGLEQLESAI TFENLKEWTS STKMEERKIK VYLPRMKIEE KYNLTSVLTS  300
LGITDLFSSS ANLSGISSAE KLKVSSAFHE ASMEIYEAGN KVVGSTGAGV DDTSVSEEFR  360
VDRPFLFLIK HNPSNSIFFF GRCFSP                                      386

SEQ ID NO: 114          moltype = AA  length = 385
FEATURE                 Location/Qualifiers
REGION                  1..385
                        note = Synthetic Polypeptide
source                  1..385
                        mol_type = protein
                        organism = synthetic construct
SEQUENCE: 114
MGSIGAASAE FCVDVFKELK DQHVNNIVFS PLMIISALSM VNIGAREDTR AQIDKVVHFD  60
KITGYGESIE SQCGTSIGIY FSLKDAFTQI TKPSDNYSLS FASKLYAEET YPILPEYLKC  120
VKELYKGGLE TISFQTAADQ ARELINSWVE SQTNGMIKNI LQPSSVDPQT EMVLVNAIYF  180
KGLWEKAFKD EDTQAVPFRI TEQESKPVQM MYQIGSFKVA VIASEKIKIL ELPYASGQLS  240
LLVLLPDDVS GLEQLESAIT SEKLLEWTNP NIMEERKTKV YLPRMKIEEK YNLTSVLVAL  300
GITDLFSSSA NLSGISSAEG LKLSDAVHEA FVEIYEAGRE VVGSSEAGVE DSSVSEEFKA  360
DRPFIFLIKH NPTNGILYFG RYISP                                       385

SEQ ID NO: 115          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 115
MGSIGAANTD FCFDVFKELK VHHANENIFY SPLSIVSALA MVYLGARENT RAQIDKALHF  60
DKILGFGETV ESQCDTSVSV HTSLKDMLIQ ITKPSDNYSF SFASKIYTEE TYPILPEYLQ  120
CVKELYKGGV ETISFQTAAD QAREVINSWV ESHTNGMIKN ILQPGSVDPQ TKMVLVNAVY  180
FKGIWEKAFK EEDTQEMPFR INEQESKPVQ MMYQIGSFKL TVAASENLKI LEFPYASGQL  240
SMMVILPDEV SGLKQLETSI TSEKLIKWTS SNTMEERKIR VYLPRMKIEE KYNLKSVLMA  300
LGITDLFSSS ANLSGISSAE SLKMSEAVHE AFVEIYEAGS EVTSSTGTEM EAENVSEEFK  360
ADHPFLFLIK HNPTDSIVFF GRCMSP                                      386

SEQ ID NO: 116          moltype = AA  length = 383
FEATURE                 Location/Qualifiers
REGION                  1..383
                        note = Synthetic Polypeptide
source                  1..383
                        mol_type = protein
                        organism = synthetic construct
SEQUENCE: 116
MGSIGPLSVE FCCDVFKELR IQHARENIFY SPVTIISALS MVYLGARDNT KAQIEKAVHF  60
DKIPGFGESI ESQCGTSLSI HTSLKDIFTQ ITKPSDNYTV GIASRLYAEE KYPILPEYLQ  120
```

```
CIKELYKGGL EPISFQTAAE QARELINSWV ESQTNGMIKN ILQPSSVNPE TDMVLVNAIY  180
FKGLWEKAFK DESTQTVPFR ITEQESKPVQ MMFQIGSFRV AEIASEKIRI LELPYASGQL  240
SLWVLLPDDI SGLEQLETAI TFENLKEWTS STKMEERKIK VYLPRMKIEE KYNLTSVLTS  300
LGITDLFSSS ANLSGISSAE RLKVSSAFHE ASMEIYEAGS RVVEAGVDDT SVSEEFRVDR  360
PFLFLIKHNP SNSIFFGRC FSP                                          383

SEQ ID NO: 117         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 117
MGSIGPVSTE FCCDIFKELR IQHARENIIY SPVTIISALS MVYLGARDNT KAQIEKAVHF  60
DKIPGFGESI ESQCGTSLSI HTSLKDILTQ ITKPSDNYTV GIASRLYAEE KYPILSEYLQ  120
CIKELYKGGL EPISFQTAAE QARELINSWV ESQTNGMIKN ILQPSSVNPE TDMVLVNAIY  180
FKGLWEKAFK DEGTQTVPFR ITEQESKPVQ MMFQIGSFKV AEITSEKIRI LELPYASGKL  240
SLWVLLPDDI SGLEQLETAI TFENLKEWTS STRMEERKIK VYLPRMKIEE KYNLTSVLTS  300
LGITDLFSSS ANLSGISSAE RLKVSSAFHE VFVEIYEAGS KVEGSTGAGV DDTSVSEEFR  360
ADHPFLFLVK HNPSNSIIFF GRCYLP                                      386

SEQ ID NO: 118         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 118
MGSTGAASME FCFALFRELK VQHVNENIFF SPVTIISALS MVYLGARENT RAQLDKVAPF  60
DKITGFGETI GSQCSTSASS HTSLKDVFTQ ITKASDNYSL SFASRLYAEE TYPILPEYLQ  120
CVKELYKGGL ESISFQTAAD QARELINSWV ESQTNGMIKD ILRPSSVDPQ TKIILITAIY  180
FKGMWEKAFK EEDTQAVPFR MTEQESKPVQ MMYQIGSFKV AVIPSEKLKI LELPYASGQL  240
SMLVILPDDV SGLEQLETAI TTEKLKEWTS PSMMKERKMK VYFPRMRIEE KYNLTSVLMA  300
LGITDLFSPS ANLSGISSAE SLKVSEAVHE ASVDIDEAGS EVIGSTGVGT EVTSVSEEIR  360
ADHPFLFLIK HKPTNSILFF GRCFSP                                      386

SEQ ID NO: 119         moltype = AA  length = 2174
FEATURE                Location/Qualifiers
REGION                 1..2174
                       note = Synthetic Polypeptide
source                 1..2174
                       mol_type = protein
                       organism = synthetic construct
SEQUENCE: 119
MEHAQLTQLV NSNMTSNTCH EADEFENIDF RMDSISVTNT KFCFDVFNEM KVHHVNENIL  60
YSPLSILTAL AMVYLGARGN TESQMKKALH FDSITGAGST TDSQCGSSEY IHNLFKEFLT  120
EITRTNATYS LEIADKLYVD KTFTVLPEYI NCARKFYTGG VEEVNFKTAA EEARQLINSW  180
VEKETNGQIK DLLVPSSVDF GTMMVFINTI YFKGIWKTAF NTEDTREMPF SMTKQESKPV  240
QMMCLNDTFN MATLPAEKMR ILELPYASGE LSMLVLLPDE VSGLEQIEKA INFEKLREWT  300
STNAMEKKSM KVYLPRMKIE EKYNLTSTLM ALGMTDLFSR SANLTGISSV ENLMISDAVH  360
GAFMEVNEEG TEAAGSTGAI GNIKHSVEFE EFRADHPFLF LIRYNPTNVI LFFDNSEFTM  420
GSIGAVSTEF CFDVFKELRV HHANENIFYS PFTVISALAM VYLGAKDSTR TQINKVVRFD  480
KLPGFGDSIE AQCGTSANVH SSLRDILNQI TKPNDIYSFS LASRLYADET YTILPEYLQC  540
VKELYRGGLE SINFQTAADQ ARELINSWVE SQTSGIIRNV LQPSSVDSQT AMVLVNAIYF  600
KGLWEKGFKD EDTQAMPFRV TEQENKSVQM MYQIGTFKVA SVASEKMKIL ELPFASGTMS  660
MWVLLPDEVS GLEQLETTIS IEKLTEWTSS SVMEERKIKV FLPRMKMEEK YNLTSVLMAM  720
GMTDLFSSSA NLSGISSTLQ KKGFRSQELG DKYAKPMLES PALTPQVTAW DNSWIVAHPA  780
AIEPDLCYQI MEQKWKPFDW PDFRLPMRVS CRFRTMEALN KANTSFALDF FKHECQEDDD  840
ENILFSPFSI SSALATVYLG AKGNTADQMA KTEIGKSGNI HAGFKALDLE INQPTKNYLL  900
NSVNQLYGEK SLPFSKEYLQ LAKKYYSAEP QSVDFLGKAN EIRREINSRV EHQTEGKIKN  960
LLPPGSIDSL TRLVLVNALY FKGNWATKFE AEDTRHRPFR INMHTTKQVP MMYLRDKFNW  1020
TYVESVQTDV LELPYVNNDL SMFILLPRDI TGLQKLINEL TFEKLSAWTS PELMEKMKME  1080
VYLPRFTVEK KYDMKSTLSK MGIEDAFTKV DSCGVTNVDE ITTHIVSSKC LELKHIQINK  1140
KLKCNKAVAM EQVSASIGNF TIDLFNKLNE TSRDKNIFFS PWSVSSALAL TSLAAKGNTA  1200
REMAEDPENE QAENIHSGFK ELMTALNKPR NTYSLKSANR IYVEKNYPLL PTYIQLSKKY  1260
YKAEPYKVNF KTAPEQSRKE INNWVEKQTE RKIKNFLSSD DVKNSTKSIL VNAIYFKAEW  1320
EEKFQAGNTD MQPFRMSKNK SKLVKMMYMR HTFPVLIMEK LNFKMIELPY VKRELSMFIL  1380
LPDDIKDSTT GLEQLERELT YEKLSEWADS KKMSVTLVDL HLPKFSMEDR YDLKDALKSM  1440
GMASAFNSNA DFSGMTGFQA VPMESLSAST NSFTLDLYKK LDETSKGQNI FFASWSIATA  1500
LAMVHLGAKG DTATQVAKGP EYEETENIHS GFKELLSAIN KPRNTYLMKS ANRLFGDKTY  1560
PLLPKFLELV ARYYQAKPQA VNFKTDAEQA RAQINSWVEN ETESKIQNLL PAGSIDSHTV  1620
LVLVNAIYFK GNWEKRFLEK DTSKMPFRLS KTETKPVQMM FLKDTFLIHH ERTMKFKIIE  1680
LPYVGNELSA FVLLPDDISD NTTGLELVER ELTYEKLAEW SNSASMMKAK VELYLPKLKM  1740
EENYDLKSVL SDMGIRSAFD PAQADFTRMS EKKDLFISKV IHKAFVEVNE EDRIVQLASG  1800
RLTGRCRTLA NKELSEKNRT KNLFFSPFSI SSALSMILLG SKGNTEAQIA KVLSLSKAED  1860
AHNGYQSLLS EINNPDTKYI LRTANRLYGE KTFEFLSSFI DSSQKFYHAG LEQTDFKNAS  1920
EDSRKQINGW VEEKTEGKIQ KLLSEGIINS MTKLVLVNAI YFKGNWQEKF DKETTKEMPF  1980
```

```
KINKNETKPV QMMFRKGKYN MTYIGDLETT VLEIPYVDNE LSMIILLPDS IQDESTGLEK  2040
LERELTYEKL MDWINPNMMD STEVRVSLPR FKLEENYELK PTLSTMGMPD AFDLRTADFS  2100
GISSGNELVL SEVVHKSFVE VNEEGTEAAA ATAGIMLLRC AMIVANFTAD HPFLFFIRHN  2160
KTNSILFCGR FCSP                                                    2174

SEQ ID NO: 120         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 120
MGSIGTASTE FCFDMFKEMK VQHANQNIIF SPLTIISALS MVYLGARDNT KAQMEKVIHF  60
DKITGFGESV ESQCGTSVSI HTSLKDMLSE ITKPSDNYSL SLASRLYAEE TYPILPEYLQ  120
CMKELYKGGL ETVSFQTAAD QARELINSWV ESQTNGVIKN FLQPGSVDPQ TEMVLVNAIY  180
FKGMWEKAFK DEDTQEVPFR ITEQESKPVQ MMYQVGSFKV ATVAAEKMKI LEIPYTHREL  240
SMFVLLPDDI SGLEQLETTI SFEKLTEWTS SNMMEERKVK VYLPHMKIEE KYNLTSVLMA  300
LGMTDLFSPS ANLSGISTAQ TLMMSEAIHG AYVEIYEAGR EMASSTGVQV EVTSVLEEVR  360
ADKPFLFFIR HNPTNSMVVF GRYMSP                                       386

SEQ ID NO: 121         moltype = AA  length = 2104
FEATURE                Location/Qualifiers
REGION                 1..2104
                       note = Synthetic Polypeptide
source                 1..2104
                       mol_type = protein
                       organism = synthetic construct
SEQUENCE: 121
MTSNTCHEAD EFENIDFRMD SISVTNTKFC FDVFNEMKVH HVNENILYSP LSILTALAMV  60
YLGARGNTES QMKKALHFDS ITGGGSTTDS QCGSSEYIHN LFKEFLTEIT RTNATYSLEI  120
ADKLYVDKTF TVLPEYINCA RKFYTGGVEE VNFKTAAEEA RQLMNSWVEK ETNGQIKDLL  180
VPSSVDFGTM MVFINTIYFK GIWKTAFNTE DTREMPFSMT KQESKPVQMM CLNDTFNMVT  240
LPAEKMRILE LPYASGELSM LVLLPDEVSG LERIEKAINF EKLREWTSTN AMEKKSMKVY  300
LPRMKIEEKY NLTSTLMALG MTDLFSRSAN LTGISSVDNL MISDAVHGAF MEVNEEGTEA  360
AGSTGAIGNI KHSVEFEEFR ADHPFLFLIR YNPTNVILFF DNSEFTMGSI GAVSTEFCFD  420
VFKELRVHHA NENIFYSPFT IISALAMVYL GAKDSTRTQI NKVVRFDKLP GFGDSIEAQC  480
GTSANVHSSL RDILNQITKP NDIYSFSLAS RLYADETYTI LPEYLQCVKE LYRGGLESIN  540
FQTAADQARE LINSWVESQT SGIIRNVLQP SSVDSQTAMV LVNAIYFKGL WEKGFKDEDT  600
QAIPFRVTEQ ENKSVQMMYQ IGTFKVASVA SEKMKILELP FASGTMSMWV LLPDEVSGLE  660
QLETTISIEK LTEWTSSSVM EERKIKVFLP RMKMEEKYNL TSVLMAMGMT DLFSSSANLS  720
GISSTLQKKG FRSQELGDKY AKPMLESPAL TPQATAWDNS WIVAHPPAIE PDLYYQIMEQ  780
KWKPFDWPDF RLPMRVSCRF RTMEALNKAN TSFALDFFKH ECQEDDSENI LFSPFSISSA  840
LATVYLGAKG NTADQMAKVL HFNEAEGARN VTTTIRMQVY SRTDQQRLNR RACFQKTEIG  900
KSGNIHAGFK GLNLEINQPT KNYLLNSVNQ LYGEKSLPFS KEYLQLAKKY YSAEPQSVDF  960
VGTANEIRRE INSRVEHQTE GKIKNLLPPG SIDSLTRLVL VNALYFKGNW ATKFEAEDTR  1020
HRPFRINTHT TKQVPMMYLS DKFNWTYVES VQTDVLELPY VNNDLSMFIL LPRDITGLQK  1080
LINELTFEKL SAWTSPELME KMKMEVYLPR FTVEKKYDMK STLSKMGIED AFTKVDNCGV  1140
TNVDEITIHV VPSKCLELKH IQINKELKCN KAVAMEQVSA SIGNFTIDLF NKLNETSRDK  1200
NIFFSPWSVS SALALTSLAA KGNTAREMAE DPENEQAENI HSGFNELLTA LNKPRNTYSL  1260
KSANRIYVEK NYPLLPTYIQ LSKKYYKAEP HKVNFKTAPE QSRKEINNWV EKQTERKIKN  1320
FLSSDDVKNS TKLILVNAIY FKAEWEEKFQ AGNTDMQPFR MSKNKSKLVK MMYMRHTFPV  1380
LIMEKLNFKM IELPYVKREL SMFILLPDDI KDSTTGLEQL ERELTYEKLS EWADSKKMSV  1440
TLVDLHLPKF SMEDRYDLKD ALRSMGMASA FNSNADFSGM TGERDLVISK VCHQSFVAVD  1500
EKGTEAAAAT AVIAEAVPME SLSASTNSFT LDLYKKLDET SKGQNIFFAS WSIATALTMV  1560
HLGAKGDTAT QVAKGPEYEE TENIHSGFKE LLSALNKPRN TYSMKSANRL FGDKTYPLLP  1620
TKTKPVQMMF LKDTFLIHHE RTMKFKIIEL PYMGNELSAF VLLPDDISDN TTGLELVERE  1680
LTYEKLAEWS NSASMMKVKV ELYLPKLKME ENYDLKSALS DMGIRSAFDP AQADFTRMSE  1740
KKDLFISKVI HKAFVEVNEE DRIVQLASGR LTGNTEAQIA KVLSLSKAED AHNGYQSLLS  1800
EINNPDTKYI LRTANRLYGE KTFEFLSSFI DSSQKFYHAG LEQTDFKNAS EDSRKQINGW  1860
VEEKTEGKIQ KLLSEGIINS MTKLVLVNAI YFKGNWQEKF DKETTKEMPF KINKNETKPV  1920
QMMFRKGKYN MTYIGDLETT VLEIPYVDNE LSMIILLPDS IQDESTGLEK LERELTYEKL  1980
MDWINPNMMD STEVRVSLPR FKLEENYELK PTLSTMGMPD AFDLRTADFS GISSGNELVL  2040
SEVVHKSFVE VNEEGTEAAA ATAGIMLLRC AMIVANFTAD HPFLFFIRHN KTNSILFCGR  2100
FCSP                                                               2104

SEQ ID NO: 122         moltype = AA  length = 386
FEATURE                Location/Qualifiers
REGION                 1..386
                       note = Synthetic Polypeptide
source                 1..386
                       mol_type = protein
                       organism = synthetic construct
SEQUENCE: 122
MASIGAASTE FCFDVFKELK TQHVKENIFY SPMAIISALS MVYIGARENT RAEIDKVVHF  60
DKITGFGNAV ESQCGPSVSV HSSLKDLITQ ISKRSDNYSL SYASRIYAEE TYPILPEYLQ  120
CVKEVYKGGL ESISFQTAAD QARENINAWV ESQTNGMIKN ILQPSSVNPQ TEMVLVNAIY  180
LKGMWEKAFK DEDTQTMPFR VTQQESKPVQ MMYQIGSFKV AVIASEKMKI LELPYTSGQL  240
SMLVLLPDDV SGLEQVESAI TAEKLMEWTS PSIMEERTMK VYLPRMKMVE KYNLTSVLMA  300
```

```
LGMTDLFTSV ANLSGISSAQ GLKMSQAIHE AFVEIYEAGS EAVGSTGVGM EITSVSEEFK  360
ADLSFLFLIR HNPTNSIIFF GRCISP                                       386

SEQ ID NO: 123          moltype = AA  length = 420
FEATURE                 Location/Qualifiers
REGION                  1..420
                        note = Synthetic Polypeptide
source                  1..420
                        mol_type = protein
                        organism = synthetic construct
SEQUENCE: 123
MGSIGAASTE FCFDVFRELR VQHVNENIFY SPFSIISALA MVYLGARDNT RTQIDKISQF  60
QALSDEHLVL CIQQLGEFFV CTNRERREVT RYSEQTEDKT QDQNTGQIHK IVDTCMLRQD  120
ILTQITKPSD NFSLSFASRL YAEETYAILP EYLQCVKELY KGGLESISFQ TAADQARELI  180
NSWVESQTNG IIKNILQPSS VDSQTTMVLV NAIYFKGMWE KAFKDEDTQA MPFRMTEQES  240
KPVQMMYQVG SFKVAMVTSE KMKILELPFA SGMMSMFVLL PDEVSGLEQL ESTISFEKLT  300
EWTSSTMMEE RRMKVYLPRM KMEEKYNLTS VFMALGMTDL FSSSANMSGI SSTVSLKMSE  360
AVHAACVEIF EAGRDVVGSA EAGMDVTSVS EEFRADHPFL FFIKHNPTNS ILFFGRWMSP  420

SEQ ID NO: 124          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 124
MGSIGAASAE FCLDIFKELK VQHVNENIIF SPMTIISALS LVYLGAKEDT RAQIEKVVPF  60
DKIPGFGEIV ESQCPKSASV HSSIQDIFNQ IIKRSDNYSL SLASRLYAEE SYPIRPEYLQ  120
CVKELDKEGL ETISFQTAAD QARQLINSWV ESQTNGMIKN ILQPSSVNSQ TEMVLVNAIY  180
FRGLWQKAFK DEDTQAVPFR ITEQESKPVQ MMQQIGSFKV AEIASEKMKI LELPYASGQL  240
SMLVLLPDDV SGLEKLESSI TVEKLIEWTS SNLTEERNVK VYLPRLKIEE KYNLTSVLAA  300
LGITDLFSSS ANLSGISTAE SLKLSRAVHE SFVEIQEAGH EVEGPKEAGI EVTSALDEFR  360
VDRPFLFVTK HNPTNSILFL GRCLSP                                       386

SEQ ID NO: 125          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 125
MGSISAASGE FCLDIFKELK VQHVNENIFY SPMVIVSALS LVYLGARENT RAQIDKVIPF  60
DKITGSSEAV ESQCGTPVGA HISLKDVFAQ IAKRSDNYSL SFVNRLYAEE TYPILPEYLQ  120
CVKELYKGGL ETISFQTAAD QAREIINSWV ESQTDGKIKN ILQPSSVDPQ TKMVLVSAIY  180
FKGLWEKSFK DEDTQAVPFR VTEQESKPVQ MMYQIGSFKV AAIAAEKIKI LELPYASEQL  240
SMLVLLPDDV SGLEQLEKKI SYEKLTEWTS SSVMEEKKIK VYLPRMKIEE KYNLTSILMS  300
LGITDLFSSS ANLSGISSTK SLKMSEAVHE ASVEIYEAGS EASGITGDGM EATSVFGEFK  360
VDHPFLFMIK HKPTNSILFF GRCISP                                       386

SEQ ID NO: 126          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 126
MGSIGPVSTE VCCDIFRELR SQSVQENVCY SPLLIISTLS MVYIGAKDNT KAQIEKAIHF  60
DKIPGFGEST ESQCGTSVSI HTSLKDIFTQ ITKPSDNYSI SIARRLYAEE KYPILPEYIQ  120
CVKELYKGGL ESISFQTAAE KSRELINSWV ESQTNGTIKN ILQPSSVSSQ TDMVLVSAIY  180
FKGLWEKAFK EEDTQTIPFR ITEQESKPVQ MMSQIGTFKV AEIPSEKCRI LELPYASGRL  240
SLWVLLPDDI SGLEQLETAI TFENLKEWTS SSKMEERKIR VYLPRMKIEE KYNLTSVLKS  300
LGITDLFSSS ANLSGISSAE SLKVSAAFHE ASVEIYEAGS KGVGSSEAGV DGTSVSEEIR  360
ADHPFLFLIK HNPSDSILFF GRCFSP                                       386

SEQ ID NO: 127          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 127
MGSIGAASTE FCFDVFKELK VQHVNENIII SPLSIISALS MVYLGAREDT RAQIDKVVHF  60
DKITGFGEAI ESQCPTSESV HASLKETFSQ LTKPSDNYSL AFASRLYAEE TYPILPEYLQ  120
CVKELYKGGL ETINFQTAAE QARQVINSWV ESQTDGMIKS LLQPSSVDPQ TEMILVNAIY  180
FRGLWERAFK DEDTQELPFR ITEQESKPVQ MMSQIGSFKV AVVASEKVKI LELPYASGQL  240
```

```
SMLVLLPDDV SGLEQLESSI TVEKLIEWIS SNTKEERNIK VYLPRMKIEE KYNLTSVLVA  300
LGITDLFSSS ANLSGISSAE SLKISEAVHE AFVEIQEAGS EVVGSPGPEV EVTSVSEEWK  360
ADRPFLFLIK HNPTNSILFF GRYISP                                      386

SEQ ID NO: 128          moltype = AA  length = 386
FEATURE                 Location/Qualifiers
REGION                  1..386
                        note = Synthetic Polypeptide
source                  1..386
                        mol_type = protein
                        organism = synthetic construct
SEQUENCE: 128
MGSIGPVSTE VCCDIFRELR SQSVQENVCY SPLLIISTLS MVYIGAKDNT KAQIEKAIHF  60
DKIPGFGEST ESQCGTSVSI HTSLKDIFTQ ITKPSDNYSI SIARRLYAEE KYPILQEYIQ  120
CVKELYKGGL ESISFQTAAE KSRELINSWV ESQTNGTIKN ILQPSSVSSQ TDMVLVSAIY  180
FKGLWEKAFK EEDTQTIPFR ITEQESKPVQ MMSQIGTFKV AEIPSEKCRI LELPYASGRL  240
SLWVLLPDDI SGLEQLETSI TFENLKEWTS SSKMEERKIR VYLPRMKIEE KYNLTSVLKS  300
LGITDLFSSS ANLSGISSAE SLKVSAVFHE ASVEIYEAGS KGVGSSEAGV DGTSVSEEIR  360
ADHPFLFLIK HNPSDSILFF GRCFSP                                      386

SEQ ID NO: 129          moltype = AA  length = 399
FEATURE                 Location/Qualifiers
REGION                  1..399
                        note = Synthetic Polypeptide
source                  1..399
                        mol_type = protein
                        organism = synthetic construct
SEQUENCE: 129
MLNLMHPKQF CCTMGSIGPV STEVCCDIFR ELRSQSVQEN VCYSPLLIIS TLSMVYIGAK  60
DNTKAQIEKA IHFDKIPGFG ESTESQCGTS VSIHTSLKDI FTQITKPSDN YSISIASRLY  120
AEEKYPILPE YIQCVKELYK GGLESISFQT AAEKSRELIN SWVESQTNGT IKNILQPSSV  180
SSQTDMVLVS AIYFKGLWEK AFKEEDTQTV PFRITEQESK PVQMMSQIGT FKVAEIPSEK  240
CRILELPYAS GRLSLWVLLP DDISGLEQLE TAITSENLKE WTSSSKMEER KIKVYLPRMK  300
IEEKYNLTSV LKSLGITDLF SSSANLSGIS SAESLKVSGA FHEAFVEIYE AGSKAVGSSG  360
AGVEDTSVSE EIRADHPFLF FIKHNPSDSI LFFGRCFSP                        399

SEQ ID NO: 130          moltype = AA  length = 389
FEATURE                 Location/Qualifiers
REGION                  1..389
                        note = Synthetic Polypeptide
source                  1..389
                        mol_type = protein
                        organism = synthetic construct
SEQUENCE: 130
EAEAGSIGTA SAEFCFDVFK ELKVHHVNEN IFYSPLSIIS ALSMVYLGAR ENTKTQMEKV  60
IHFDKITGLG ESMESQCGTG VSIHTALKDM LSEITKPSDN YSLSLASRLY AEQTYAILPE  120
YLQCIKELYK ESLETVSFQT AADQARELIN SWIESQTNGV IKNFLQPGSV DSQTELVLVN  180
AIYFKGMWEK AFKDEDTQEV PFRITEQESR PVQMMYQAGS FKVATVAAEK IKILELPYAS  240
GELSMLVLLP DDISGLEQLE TTISFEKLTE WTSSNMMEDR NMKVYLPRMK IEEKYNLTSV  300
LIALGMTDLF SPAANLSGIS AAESLKMSEA IHAAYVEIYE ADSEIVSSAG VQVEVTSDSE  360
EFRVDHPFLF LIKHNPTNSV LFFGRCISP                                   389

SEQ ID NO: 131          moltype = AA  length = 474
FEATURE                 Location/Qualifiers
REGION                  1..474
                        note = Synthetic Polypeptide
source                  1..474
                        mol_type = protein
                        organism = synthetic construct
SEQUENCE: 131
MRFPSIFTAV LFAASSALAA PVNTTTEDET AQIPAEAVIG YSDLEGDFDV AVLPFSNSTN  60
NGLLFINTTI ASIAAKEEGV SLEKREAEAG SIGTASAEFC FDVFKELKVH HVNENIFYSP  120
LSIISALSMV YLGARENTKT QMEKVIHFDK ITGLGESMES QCGTGVSIHT ALKDMLSEIT  180
KPSDNYSLSL ASRLYAEQTY AILPEYLQCI KELYKESLET VSFQTAADQA RELINSWIES  240
QTNGVIKNFL QPGSVDSQTE LVLVNAIYFK GMWEKAFKDE DTQEVPFRIT EQESRPVQMM  300
YQAGSFKVAT VAAEKIKILE LPYASGELSM LVLLPDDISG LEQLETTISF EKLTEWTSSN  360
MMEDRNMKVY LPRMKIEEKY NLTSVLIALG MTDLFSPAAN LSGISAAESL KMSEAIHAAY  420
VEIYEADSEI VSSAGVQVEV TSDSEEFRVD HPFLFLIKHN PTNSVLFFGR CISP        474

SEQ ID NO: 132          moltype = AA  length = 389
FEATURE                 Location/Qualifiers
REGION                  1..389
                        note = Synthetic Polypeptide
source                  1..389
                        mol_type = protein
                        organism = synthetic construct
SEQUENCE: 132
EAEAGSIGAA STEFCFDVFR ELRVQHVNEN IFYSPFSIIS ALAMVYLGAR DNTRTQIDKV  60
VHFDKLPGFG ESMEAQCGTS VSVHSSLRDI LTQITKPSDN FSLSFASRLY AEETYAILPE  120
```

-continued

```
YLQCVKELYK GGLESISFQT AADQARELIN SWVESQTNGI IKNILQPSSV DSQTTMVLVN  180
AIYFKGMWEK AFKDEDTQAM PFRMTEQESK PVQMMYQVGS FKVAMVTSEK MKILELPFAS  240
GMMSMFVLLP DEVSGLEQLE STISFEKLTE WTSSTMMEER RMKVYLPRMK MEEKYNLTSV  300
FMALGMTDLF SSSANMSGIS STVSLKMSEA VHAACVEIFE AGRDVVGSAE AGMDVTSVSE  360
EFRADHPFLF FIKHNPTNSI LFFGRWMSP                                    389

SEQ ID NO: 133         moltype = AA  length = 474
FEATURE                Location/Qualifiers
REGION                 1..474
                       note = Synthetic Polypeptide
source                 1..474
                       mol_type = protein
                       organism = synthetic construct
SEQUENCE: 133
MRFPSIFTAV LFAASSALAA PVNTTTEDET AQIPAEAVIG YSDLEGDFDV AVLPFSNSTN  60
NGLLFINTTI ASIAAKEEGV SLEKREAEAG SIGAASTEFC FDVFRELRVQ HVNENIFYSP  120
FSIISALAMV YLGARDNTRT QIDKVVHFDK LPGFGESMEA QCGTSVSVHS SLRDILTQIT  180
KPSDNFSLSF ASRLYAEETY AILPEYLQCV KELYKGGLES ISFQTAADQA RELINSWVES  240
QTNGIIKNIL QPSSVDSQTT MVLVNAIYFK GMWEKAFKDE DTQAMPFRMT EQESKPVQMM  300
YQVGSFKVAM VTSEKMKILE LPFASGMMSM FVLLPDEVSG LEQLESTISF EKLTEWTSST  360
MMEERRMKVY LPRMKMEEKY NLTSVFMALG MTDLFSSSAN MSGISSTVSL KMSEAVHAAC  420
VEIFEAGRDV VGSAEAGMDV TSVSEEFRAD HPFLFFIKHN PTNSILFFGR WMSP        474

SEQ ID NO: 134         moltype =   length =
SEQUENCE: 134
000

SEQ ID NO: 135         moltype =   length =
SEQUENCE: 135
000
```